US006136521A

United States Patent [19]

Hikosaka et al.

[11] Patent Number: 6,136,521

[45] Date of Patent: Oct. 24, 2000

[54] POLYCARBONATE, AND MOLDING AND ELECTROPHOTOGRAPHIC PHOTORECEPTOR PREPARED THEREFROM

[75] Inventors: Takaaki Hikosaka; Yasuaki Horikawa; Shuji Sakamoto, all of Sodegaura; Haruhiko Furukawa, Ichihara; Tadashi Okawa, Ichihara; Hiroshi Ueki, Ichihara; Yoshitsugu Morita, Ichihara; Ryuko Manzoji, Ichihara, all of Japan

[73] Assignees: Idemitsu Kosan Co., Ltd.; Dow Corning Toray Silicone Co., Ltd., both of Tokyo, Japan

[21] Appl. No.: 09/171,484

[22] PCT Filed: Feb. 20, 1998

[86] PCT No.: PCT/JP98/00702

§ 371 Date: Oct. 20, 1998

§ 102(e) Date: Oct. 20, 1998

[87] PCT Pub. No.: WO98/37120

PCT Pub. Date: Aug. 27, 1998

[30] Foreign Application Priority Data

Feb. 20, 1997 [JP] Japan .................................... 9-036774
Feb. 20, 1997 [JP] Japan .................................... 9-036775

[51] Int. Cl.$^7$ ............................ G03L 1/76; G03G 15/04; C08G 77/04

[52] U.S. Cl. ............................ 430/533; 428/412; 430/61; 430/69; 430/905; 430/908; 528/26

[58] Field of Search ............................... 430/61, 69, 905, 430/908, 533; 528/26; 428/412

[56] References Cited

U.S. PATENT DOCUMENTS 5,932,677 8/1999 Hoover et al. ............................ 528/26

FOREIGN PATENT DOCUMENTS 8-095264 4/1996 Japan .
8-176427 7/1996 Japan .
8-234457 9/1996 Japan .
9-208703 8/1997 Japan .

*Primary Examiner*—Robert Dawson
*Assistant Examiner*—Jeffrey B. Robertson
*Attorney, Agent, or Firm*—Antonelli, Terry, Stout & Kraus, LLP

[57] ABSTRACT

A polycarbonate containing repeating units (1) represented by the general formula (1), a polycarbonate molding produced by molding the polycarbonate, and an electrophotographic photoreceptor having a photosensitive layer which has a surface layer containing the polycarbonate:

(1)

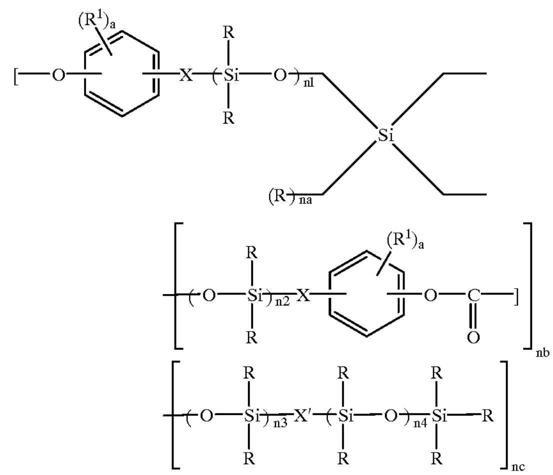

wherein R is an aliphatic unsaturation-free monovalent hydrocarbon group, $R^1$ is a halogen atom, an alkyl group, an alkoxy group or an aryl group, X is an alkylene group or an alkyleneoxyalkylene group, X' is an alkylene group of 2 or more carbon atoms, an alkyleneoxyalkylene group or oxygen atom, a is an integer of 0 to 4, na is 0 or 1, nb is 1 or 2, nc is 1 or 2, provided na+nb+nc=3, n1, n2, n3 and n4 are 0 or an integer of 1 or more, provided n1+n2+n3+n4 is an integer of 0 to 450.

17 Claims, No Drawings

POLYCARBONATE, AND MOLDING AND ELECTROPHOTOGRAPHIC PHOTORECEPTOR PREPARED THEREFROM

TECHNICAL FIELD

The present invention relates to a novel polyorganosiloxane-containing polycarbonate and to a molding prepared therefrom.

The present invention also relates to an electrophotographic photoreceptor, which has a photosensitive layer having a surface layer containing the polyorganosiloxane-containing polycarbonate and maintains high mechanical strength and good electrophotographic properties for a long term.

BACKGROUND ART

Polyorganosiloxanes having organic functional groups are used widely, for example as modifiers for organic resins, surfactants or fiber-treating agents. The chemical structures of such polyorganosiloxanes depend on the kinds, numbers and positions of the organic functional groups, and so on, and are selected properly according to uses. Particularly, to modify organic resins by incorporating polyorganosiloxanes into the molecules of the organic resins by copolymerization, organic functional groups copolymerizable with the organic resins should be chosen, and the number and positions thereof should also be adjusted precisely. Some of such polyorganosiloxanes have organic functional groups at both ends of the molecule chain, and some have an organic functional group at only one end of the molecule chain. The former having organic functional groups at both ends of the molecule chain are used to modify organic resins produced mainly by condensation polymerization, such as polyester resins, polyamide resins, polycarbonate resins and polysulfones. Such polyorganosiloxanes involve the problem that the copolymerization thereof with organic resin monomers cannot give graft copolymers having polyorganosiloxane chains branching from the molecular chain of the organic resins. The latter having one organic functional group at one end of the molecule chain also involve the problems that when copolymerized in the same manner, they cannot improve the properties of the resulting organic resins sufficiently.

To solve these problems, polyorganosiloxanes having two or more organic functional groups at one end of the molecule chain were proposed (Japanese Patent Application Unexamined Publication No. 4-323222 (1992)), but are inapplicable to modify polycarbonates and polysulfones because their organic functional groups are limited to amino, carboxyl, hydroxyl and epoxy.

Polycarbonate resins, being excellent in heat resistance and impact resistance, have been used extensively. They, however, are poor in moldability, releasability and water repellence. So, there are proposed the addition of additives, such as plasticizers and release agents, and copolymerization with polyorganosiloxanes having the above-described organic functional groups. The latter technique gives, for example, polycarbonate resins containing siloxane units in the main chain (Japanese Patent Application Unexamined Publication No. 3-79626 (1991)), and polycarbonate resins wherein siloxane chains are grafted to improve the free rotation of polyorganosiloxane chains (Japanese Patent Application Unexamined Publication Nos. 5-155999 (1993) and 7-165897 (1995)). Even in the latter polycarbonate resins, the free rotation of polyorganosiloxane chains are not enough to sufficiently improve the surface properties including moldability, releasability and water repellence.

In electrophotographic photoreceptor industries, the conventional inorganic photoreceptors used in copying machines, printers and facsimiles are being replaced by organic electrophotographic photoreceptors (OPC) which are superior in non-environmental pollution, productivity and the possibility of various modifications. Even in high-speed and highly durable machines, wherein inorganic photoreceptors have been unrivaled, there is a movement toward the use of organic electrophotographic photoreceptors. This movement, however, is retarded because the conventional organic electrophotographic photoreceptors are inferior to inorganic photoreceptors in durability and cause severe toner-filming, which is a defect in printed images caused by foreign matter (toner, paper powder, external additives, etc.) adhering to photoreceptors.

Our studies in the cause of the filming revealed that the filming is triggered by the weak adhesion of foreign matter to photoreceptors with intermolecular forces, and can be prevented effectively by photoreceptors of weak adhesion (intermolecular force) to foreign matter, particularly photoreceptors having a surface layer containing at least as resin ingredients copolymers of polysiloxanes with polycarbonates.

There have been proposed some electrophotographic photoreceptors produced by using copolymers of polysiloxanes with polycarbonates (e.g. Japanese Patent Application Unexamined Publication Nos. 61-132954 (1986) and 2-240655 (1990)). These copolymers however have poor compatibility with charge-transfer substances, and the coating fluid whitened or set to gel half a day to a few days after the preparation. To prevent the whitening and gelation, there were proposed copolymers of polycarbonates and polysiloxanes both ends of which are modified with phenol (Japanese Patent Application Unexamined Publication Nos. 5-72753 (1993) and 5-297620 (1993)), and terpolymers produced by incorporating specific bisphenol structures into polycarbonates of polysiloxanes both ends of which are modified with phenol (Japanese Patent Application Unexamined Publication No. 6-220181 (1994)). The improvement in the compatibility of the former copolymers with charge-transfer substances is insufficient, and the whitening or gelation of coating fluid occurs a few days to a month after the preparation. Even coating fluid yet to set to gel is suffered by the micro-phase-separation of charge-transfer substances and binder resins, and when used to produce photoreceptors, causes deterioration in the electric properties of the product photoreceptors, such as low sensitivity (half-value exposure) and increased residual potential. Though the latter terpolymers are so improved in compatibility with charge-transfer substances by the copolymerization of the specific third ingredient as to stabilize coating fluid for several months or more, the essential third ingredient restricts the control of the properties of the polycarbonates, and the reproduction of the same polymer is difficult because it is difficult to control the reactions of the three kinds of monomers evenly.

DISCLOSURE OF INVENTION

Based on the situation described above, the present invention has been made with a view to providing polycarbonates and moldings produced therefrom, which are modified with novel polyorganosiloxanes having two or more hydroxyphenyl groups at one end of the molecule.

Another object of the present invention is to provide electrophotographic photoreceptors maintaining high mechanical strength and good electrophotographic properties for a long term, by forming the surface layers of the photosensitive layers using polysiloxane-polycarbonate copolymers which are highly compatible with charge-transfer substances, and when dissolved in solvents, form solutions which do not whiten nor set to gel for a long term, and when used as resin ingredients in the surface layers of electrophotographic photoreceptors, prevent toner-filming.

That is, the present invention provides a polycarbonate containing repeating units (1) represented by the following general formula (1):

(1)

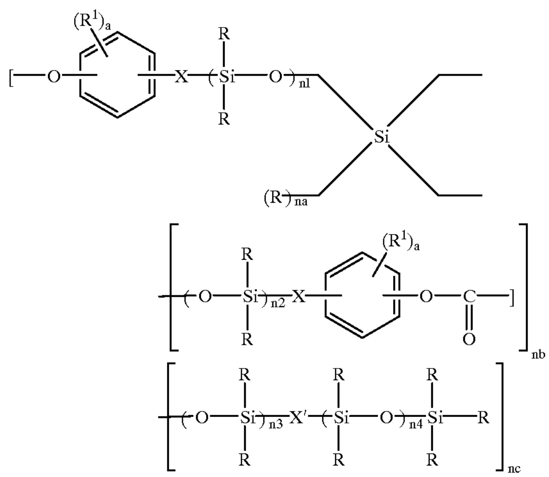

wherein each R is independently an aliphatic unsaturation-free monovalent hydrocarbon group, the R groups being identical with or different from each other, each $R^1$ is independently a halogen atom, a substituted or non-substituted alkyl group of 1 to 6 carbon atoms, a substituted or non-substituted alkoxy group of 1 to 6 carbon atoms or a substituted or non-substituted aryl group of 6 to 12 carbon atoms, each X is independently an alkylene group of 2 or more carbon atoms or an alkyleneoxyalkylene group of 2 or more carbon atoms, each X' is independently an alkylene group of 2 or more carbon atoms, an alkyleneoxyalkylene group of 2 or more carbon atoms or oxygen atom, each a is independently an integer of 0 to 4, na is 0 or 1, nb is 1 or 2, nc is 1 or 2, provided na+nb+nc=3, n1, n2, n3 and n4 are each independently 0 or an integer of 1 or more, provided n1+n2+n3+n4 is an integer of 0 to 450.

As an example of the polycarbonate described above, the present invention further provides a polycarbonate which comprises the repeating units (1) and repeating units (2) represented by the following general formula (2):

(2)

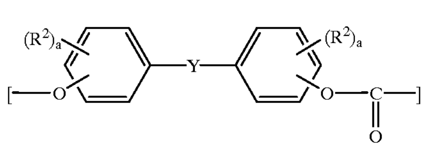

wherein each $R^2$ is independently a halogen atom, vinyl, allyl, a substituted or non-substituted alkyl group of 1 to 10 carbon atoms, a substituted or non-substituted aryl group of 6 to 12 carbon atoms, a substituted or non-substituted cycloalkyl group of 3 to 12 carbon atoms, a substituted or non-substituted alkoxy group of 1 to 6 carbon atoms, a substituted or non-substituted aryloxy group of 6 to 12 carbon atoms, each a is independently an integer of 0 to 4, Y is single bond, —O—, —CO—, —S—, —SO—, —$SO_2$—, —$CR^3R^4$—, a substituted or non-substituted cycloalkylidene group of 5 to 11 carbon atoms, a substituted or non-substituted α,ω-alkylene group of 2 to 12 carbon atoms, 9,9-fluorenylidene, 1,8-menthanediyl, 2,8-menthanediyl, a substituted or non-substituted pyrazinylidene group or a substituted or non-substituted arylene group of 6 to 24 carbon atoms, $R^3$ and $R^4$ are each independently hydrogen atom, a substituted or non-substituted alkyl group of 1 to 10 carbon atoms or a substituted or non-substituted aryl group of 6 to 12 carbon atoms.

As an example of the polymer described above, the present invention further provides a polycarbonate wherein the repeating units (1) are repeating units (A) represented by the following general formula (A), and which contains 0.01 to 100 mol % of the repeating units (A):

(A)

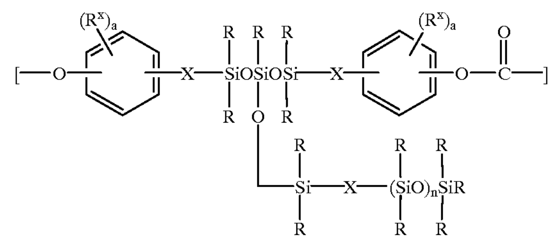

wherein each R is independently an aliphatic unsaturation-free monovalent hydrocarbon group, the R groups being identical with or different from each other, each $R^x$ is independently an alkyl group of 1 to 4 carbon atoms, an alkoxy group of 1 to 4 carbon atoms or a halogen atom, each X is independently an alkylene group of 2 or more carbon atoms or an alkyleneoxyalkylene group of 2 or more carbon atoms, n is an integer of 1 to 400, and each a is independently an integer of 0 to 4.

As an example of the polycarbonate described above, the present invention further provides a polycarbonate wherein the repeating units (1) are repeating units (A) represented by the following general formula (A), and which comprises 0.01 to 100 mol % of the repeating units (A) and 99.99 to 0 mol % of repeating units (B) represented by the following general formula (B).

General formula (A)

(A)

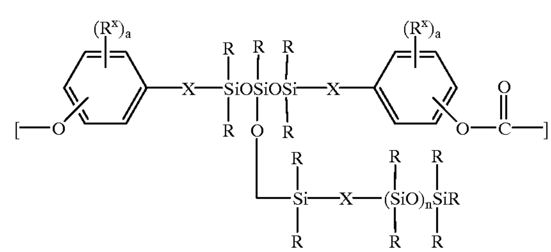

wherein each R is independently an aliphatic unsaturation-free monovalent hydrocarbon group, the R groups being identical with or different from each other, each $R^x$ is independently an alkyl group of 1 to 4 carbon atoms, an alkoxy group of 1 to 4 carbon atoms or a halogen atom, each X is independently an alkylene group of 2 or more carbon atoms or an alkyleneoxyalkylene group of 2 or more carbon atoms, n is an integer of 1 to 400, and each a is independently an integer of 0 to 4, General formula (B)

(B)

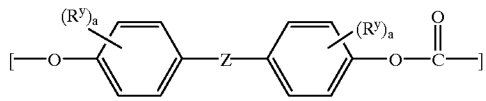

wherein each $R^y$ is independently a halogen atom or a monovalent hydrocarbon group of 1 to 4 carbon atoms, Z is selected from the group consisting of an alkylidene group of 1 to 10 carbon atoms, an aryl-substituted alkylidene group, an alkylene group, an arylene group, —O—, —S—, —CO— and —$SO_2$—, and a is an integer of 0 to 4.

The present invention further provides a polycarbonate molding which is produced by molding the polycarbonate described above.

We have further found that copolymers of polysiloxane monomers which are furnished with phenol groups at ends and branched via siloxane bonds are useful binder resins for electrophotographic photoreceptors, prevent the adhesion of foreign matter to electrophotographic photoreceptors, are highly compatible with charge-transfer substances, form coating fluid which is stable for several months or more and have good electric properties. Based on this finding, we have completed the present invention.

That is, the present invention provides an electrophotographic photoreceptor comprising a conductive substrate and a photosensitive layer disposed on the conductive substrate, the photosensitive layer having a surface layer which contains a polycarbonate containing the repeating units (1) represented by the general formula (1).

BEST MODE FOR CARRYING OUT THE INVENTION

The polycarbonate of the present invention may be linear, branched or cyclic, and may have specific ends or branching structures which are introduced by synthesis using end-cappers or branching agents.

The polycarbonate of the present invention preferably has a reduced viscosity of 0.1 to 10.0 dl/g, more preferably 0.3 to 5.0 dl/g, as measured at 20° C. at a concentration of 0.5 g/dl in methylene chloride. The moldings produced from polycarbonates of a reduced viscosity of less than 0.1 dl/g may have low surface hardness and are subject to abrasion. Polycarbonates of a reduced viscosity of more than 10.0 dl/g may have an increased melt viscosity, causing difficulties in the production of moldings. The layers formed by using polycarbonates of a reduced viscosity of less than 0.1 dl/g may have low surface hardness, making electrophotographic photoreceptors be subject to abrasion. Polycarbonates of a reduced viscosity of more than 10.0 dl/g may have an increased solution viscosity, which makes it difficult to produce electrophotographic photoreceptors by the application of coating fluid.

The polycarbonate of the present invention may have any structure that contains the repeating units (1) as a copolymerization ingredient, and preferably comprises the repeating units (1) and the repeating units (2) of the following general formula (2)

(2)

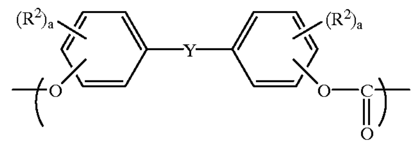

wherein each $R^2$ is independently a halogen atom, vinyl, allyl, a substituted or non-substituted alkyl group of 1 to 10 carbon atoms, a substituted or non-substituted aryl group of 6 to 12 carbon atoms, a substituted or non-substituted cycloalkyl group of 3 to 12 carbon atoms, a substituted or non-substituted alkoxy group of 1 to 6 carbon atoms, a substituted or non-substituted aryloxy group of 6 to 12 carbon atoms, each a is independently an integer of 0 to 4, Y is single bond, —O—, —CO—, —S—, —SO—, —$SO_2$—, —$CR^3R^4$—, a substituted or non-substituted cycloalkylidene group of 5 to 11 carbon atoms, a substituted or non-substituted α,ω-alkylene group of 2 to 12 carbon atoms, 9,9-fluorenylidene, 1,8-menthanediyl, 2,8-menthanediyl, a substituted or non-substituted pyrazinylidene group or a substituted or non-substituted arylene group of 6 to 24 carbon atoms, $R^3$ and $R^4$ are each independently hydrogen atom, a substituted or non-substituted alkyl group of 1 to 10 carbon atoms or a substituted or non-substituted aryl group of 6 to 12 carbon atoms.

In the polycarbonate comprising the repeating units (1) and (2), the molar ratio of the repeating units (1) to the total of the repeating units (1) and the repeating units (2), (1)/[(1)+(2)], is preferably 0.0001–1, more preferably 0.0003–0.5, particularly preferably 0.0005–0.3.

The polycarbonate of the present invention may contain one or more kinds of each of the repeating units (1) and (2). The polycarbonate may also contain other repeating units than the repeating units (1) and (2) as far as the object of the present invention is achieved.

In the general formula (1), R groups are an aliphatic unsaturation-free monovalent hydrocarbon groups which are identical with or different from each other, and examples of the monovalent hydrocarbon groups include substituted or non-substituted alkyl groups of 1 to 6 carbon atoms and substituted or non-substituted aryl groups of 6 to 12 carbon atoms.

Typical examples of R are as follows.

Examples of non-substituted alkyl groups of 1 to 6 carbon atoms include methyl, ethyl, propyl, isopropyl, butyl, 2-butyl, tert-butyl, isobutyl, pentyl and hexyl, with methyl, ethyl, propyl, isopropyl, butyl, 2-butyl and tert-butyl preferred.

Examples of non-substituted aryl groups of 6 to 12 carbon atoms include phenyl, naphthyl and biphenylyl, with phenyl preferred.

Typical examples of R in the general formula (1) are as follows.

Examples of non-substituted alkyl groups of 1 to 6 carbon atoms include methyl, ethyl, propyl, isopropyl, butyl, 2-butyl, tert-butyl, isobutyl, pentyl and hexyl, with methyl, ethyl, propyl, isopropyl, butyl, 2-butyl and tert-butyl preferred.

Halogen atoms include fluorine, chlorine, bromine and iodine, with fluorine, chlorine and bromine preferred.

Examples of non-substituted alkoxy groups of 1 to 6 carbon atoms include methyloxy, ethyloxy, propyloxy, isopropyloxy, butyloxy, 2-butyloxy, tert-butyloxy, isobutyloxy, pentyloxy and hexyloxy, with methyloxy, ethyloxy, propyloxy and isopropyloxy preferred.

Examples of non-substituted aryl groups of 6 to 12 carbon atoms include phenyl, naphthyl and biphenylyl, with phenyl preferred.

Examples of alkylene groups of 2 or more carbon atoms represented by X and X' in the general formula (1) include alkylene groups of 2 to 6 carbon atoms, such as ethylene, trimethylene, tetramethylene, pentamethylene and hexamethylene, with ethylene, trimethylene and tetramethylene preferred.

Examples of alkyleneoxyalkylene groups represented by X and X' in the general formula (1) include alkyleneoxyalkylene groups of 4 to 10 carbon atoms, with ethyleneoxypropylene and ethyleneoxybutylene preferred.

Examples of $R^2$, Y, $R^3$ and $R^4$ in the general formula (2) are as follows.

Halogen atoms represented by $R^2$ are fluorine, chlorine, bromine and iodine, with fluorine, chlorine and bromine preferred.

Examples of non-substituted alkyl groups of 1 to 10 carbon atoms represented by $R^2$, $R^3$ and $R^4$ include methyl, ethyl, propyl, isopropyl, butyl, 2-butyl, tert-butyl, isobutyl, pentyl, hexyl, heptyl, octyl, nonyl and decyl, with methyl, ethyl, propyl, isopropyl, butyl, 2-butyl and tert-butyl preferred.

Examples of non-substituted aryl groups of 6 to 12 carbon atoms represented by $R^2$, $R^3$ and $R^4$ include phenyl, naphthyl and biphenylyl, with phenyl preferred.

Examples of non-substituted cycloalkyl groups of 3 to 12 carbon atoms represented by $R^2$ include cyclopentyl, cyclohexyl and cycloheptyl, with cyclopentyl and cyclohexyl preferred.

Examples of non-substituted alkoxy groups of 1 to 6 carbon atoms represented by $R^2$ include methyloxy, ethyloxy, propyloxy, isopropyloxy, butyloxy, 2-butyloxy, tert-butyloxy, isobutyloxy, pentyloxy and hexyloxy, with methyloxy, ethyloxy, propyloxy and isopropyloxy preferred.

Examples of non-substituted aryloxy groups of 6 to 12 carbon atoms represented by $R^2$ include phenyloxy, naphthyloxy and biphenylyloxy, with phenyloxy preferred.

Examples of non-substituted arylene groups of 6 to 24 carbon atoms represented by Y include phenylene, naphthylene, biphenylylene, terphenylylene and quarterphenylylene, with phenylene preferred.

Examples of non-substituted cycloalkylidene groups of 5 to 11 carbon atoms represented by Y include cyclopentylidene, cyclohexylidene, cycloheptylidene, cyclooctylidene, cyclononylidene, cyclodecylidene and cycloundecylidene, with cyclohexylidene preferred.

Examples of non-substituted $\alpha,\omega$-alkylene groups of 2 to 12 carbon atoms represented by Y include ethylene, trimethylene, tetramethylene, pentamethylene, hexamethylene, heptamethylene, octamethylene, nonamethylene, decamethylene, undecamethylene and dodecamethylene, with ethylene and trimethylene preferred.

Preferred 1,8-menthanediyl represented by Y is 1,8-p-menthanediyl.

Preferred 2,8-menthanediyl represented by Y is 2,8-p-menthanediyl.

Substituted alkyl groups, substituted aryl groups, substituted alkoxy groups, substituted aryloxy groups, substituted cycloalkyl groups, substituted arylene groups, substituted $\alpha,\omega$-alkylene groups, substituted cycloalkylidene groups and substituted pyrazinylidene groups are derived from the above-described non-substituted alkyl groups, non-substituted aryl groups, non-substituted alkoxy groups, non-substituted aryloxy groups, non-substituted cycloalkyl groups, non-substituted arylene groups, non-substituted $\alpha,\omega$-alkylene groups and non-substituted cycloalkylidene groups and non-substituted pyrazinylidene groups, respectively, by substituting one or more hydrogen atoms on these groups with substituents. Examples of the substituents on substituted alkyl groups and substituted alkoxy groups include halogen atoms (fluorine, chlorine, bromine and iodine), aryl groups of 6 to 12 carbon atoms (phenyl, naphthyl and biphenylyl), alkoxy groups of 1 to 4 carbon atoms (methoxy, ethoxy, propoxy, isopropoxy, butoxy, sec-butoxy, tert-butoxy and isobutoxy), alkylthio groups of 1 to 4 carbon atoms (such as methylthio), and arylthio groups of 6 to 12 carbon atoms (such as phenylthio). Examples of the substituents on substituted aryl groups, substituted aryloxy groups and substituted arylene groups include halogen atoms (fluorine, chlorine, bromine and iodine), alkyl groups of 1 to 4 carbon atoms (methyl, ethyl, propyl, isopropyl, butyl, sec-butyl, tert-butyl and isobutyl), alkoxy groups of 1 to 4 carbon atoms (methoxy, ethoxy, propoxy, isopropoxy, butoxy, sec-butoxy, tert-butoxy and isobutoxy), alkylthio groups of 1 to 4 carbon atoms (such as methylthio) and arylthio groups of 6 to 12 carbon atoms (such as phenylthio). Examples of the substituents on substituted $\alpha,\omega$-alkylene groups, substituted cycloalkyl groups, substituted cycloalkylidene groups and substituted pyrazinylidene groups include halogen atoms (fluorine, chlorine, bromine and iodine), alkyl groups of 1 to 4 carbon atoms (methyl, ethyl, propyl, isopropyl, butyl, sec-butyl, tert-butyl and isobutyl), aryl groups of 6 to 12 carbon atoms (phenyl, naphthyl and biphenylyl), alkoxy groups of 1 to 4 carbon atoms (methoxy, ethoxy, propoxy, isopropoxy, butoxy, sec-butoxy, tert-butoxy and isobutoxy), alkylthio groups of 1 to 4 carbon atoms (such as methylthio) and arylthio groups of 6 to 12 carbon atoms (such as phenylthio). As to $R^2$, $R^3$ and $R^4$, the preferred example of halogen-substituted alkyl groups of 1 to 10 carbon atoms is trifluoromethyl, which is derived from methyl by substituting three hydrogen atoms with fluorine atoms.

In the general formula (1), n1 and n2 are, preferably, each independently an integer of 1 to 20, n3+n4 is preferably an integer of 0 to 100. n1+n2+n3+n4 is preferably an integer of 2 to 100.

The polycarbonate of the present invention may be synthesized, for example, by allowing a hydroxyphenyl-containing polyorganosiloxane (3) of the following general formula (3) and a dihydric phenol (4) of the following general formula (4) to react with a carbonate precursor. To synthesize the polycarbonate of the present invention, the hydroxyphenyl-containing polyorganosiloxanes (3) may be used individually or in combination of two or more, and the dihydric phenols (4) may be used individually or in combination of two or more.

(3)

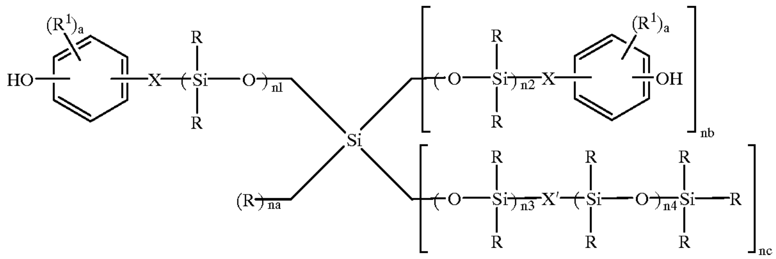

wherein R, $R^1$, X, X', a, na, nb, nc, n1, n2, n3 and n4 are as defined above.

(4)

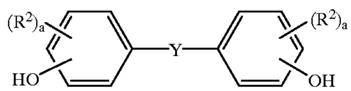

wherein $R^2$, a and Y are as defined above.

For example, when a hydroxyphenyl-containing polyorganosiloxane of the general formula:

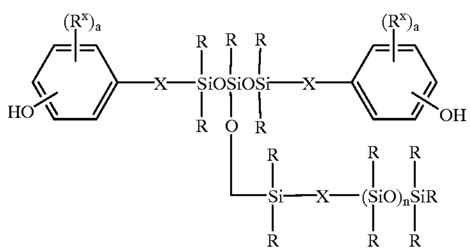

wherein R, $R^x$, X and n are as defined above, is used as the hydroxyphenyl-containing polyorganosiloxane (3), and the dihydric phenol of the general formula:

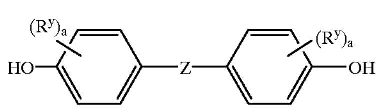

wherein $R^y$, Z and a are as defined above, is used as the dihydric phenol (4), a polycarbonate comprising the repeating units (A) of the following general formula (A) and the repeating units (B) of the following general formula is obtainable.

General formula (A)

(A)

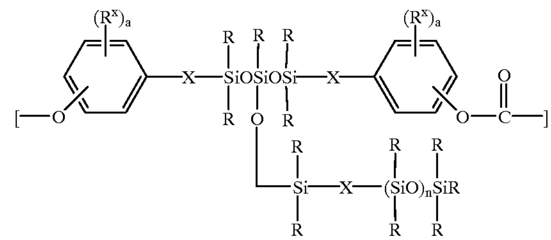

wherein R, $R^x$, X, n and a are as defined above.

General formula (B)

(B)

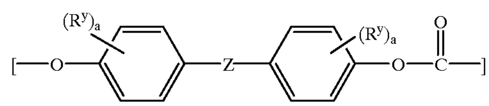

wherein $R^y$, Z and a are as defined above.

The aliphatic unsaturation-free monovalent hydrocarbon group represented by $R^x$ is an aliphatic unsaturation-free monovalent hydrocarbon group selected from the groups represented by $R^1$ in the general formula (1), and the monovalent hydrocarbon group of 1 to 4 carbon atoms represented by $R^y$ is a monovalent hydrocarbon group selected from the groups represented by $R^2$ in the general formula (2). The alkylidene group of 1 to 10 carbon atoms, the aryl-substituted alkylidene group, the alkylene group and the arylene group that are represented by Z are, respectively, an alkylidene group of 1 to 10 carbon atoms, an aryl-substituted alkylidene group, an alkylene group and an arylene group that are selected from the groups represented by Y in the general formula (2).

For example, phosgene or the like is used as the carbonate precursor and is polycondensed with the hydroxyphenyl-containing polyorganosiloxane (3) and the dihydric phenol (4) described above, in the presence of an acid acceptor, or a bisaryl carbonate is used as the carbonate precursor to carry out transesterification. These reactions are carried out in the optional presence of end-cappers and/or branching agents.

Examples of the hydroxyphenyl-containing polyorganosiloxanes (3) include the followings.

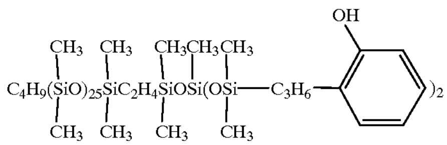
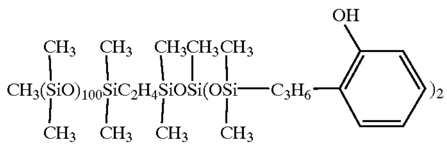
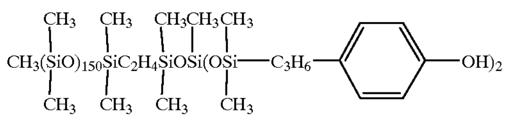
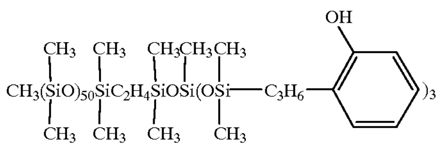
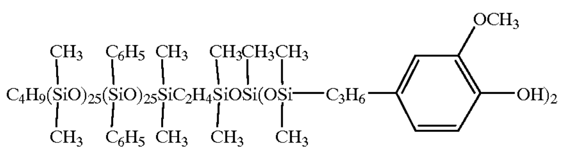
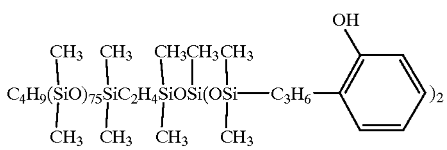
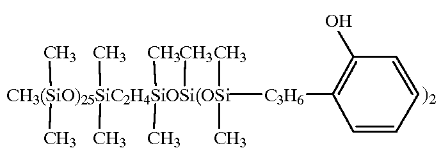
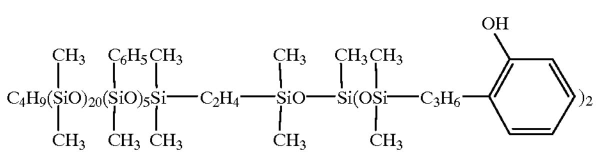
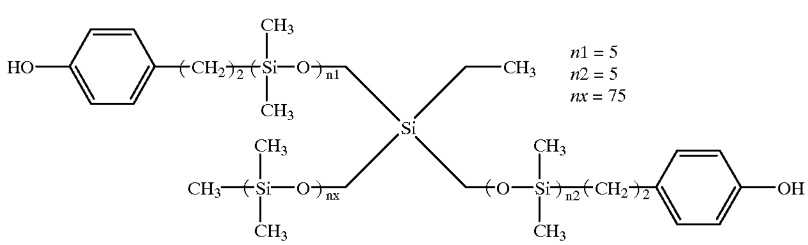
n1 = 5
n2 = 5
nx = 75
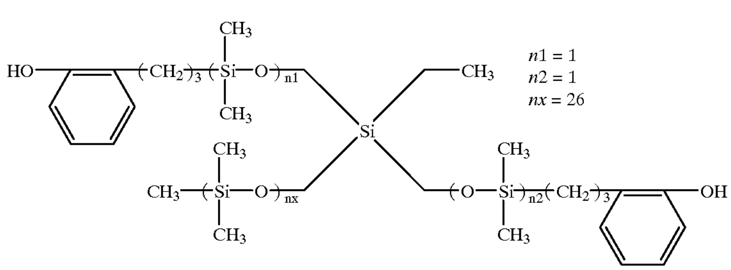
n1 = 1
n2 = 1
nx = 26

-continued
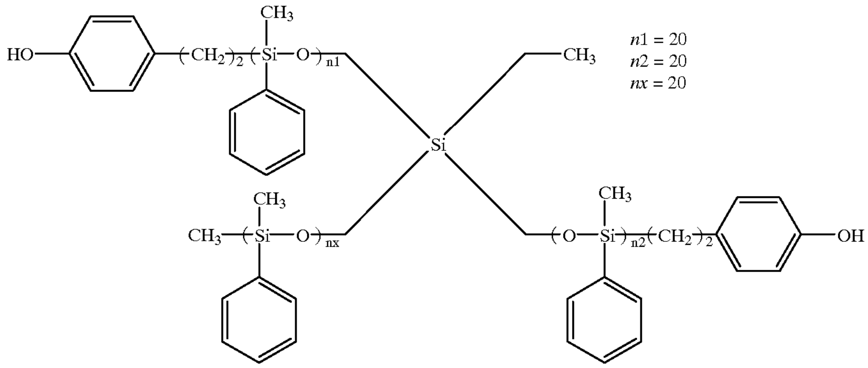
$n1 = 20$
$n2 = 20$
$nx = 20$
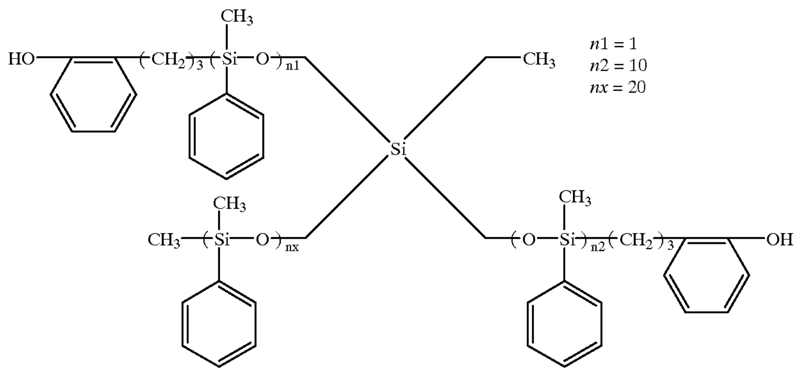
$n1 = 1$
$n2 = 10$
$nx = 20$
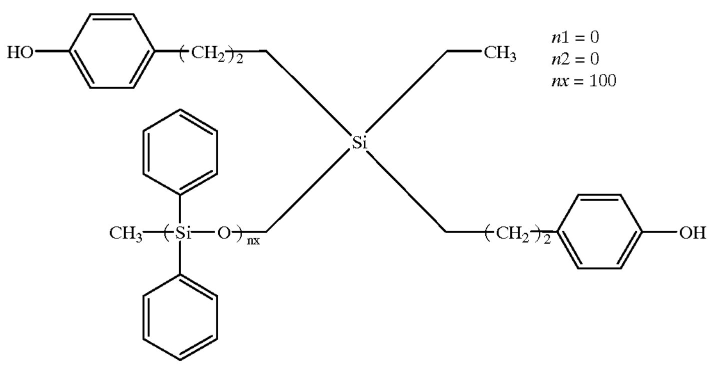
$n1 = 0$
$n2 = 0$
$nx = 100$
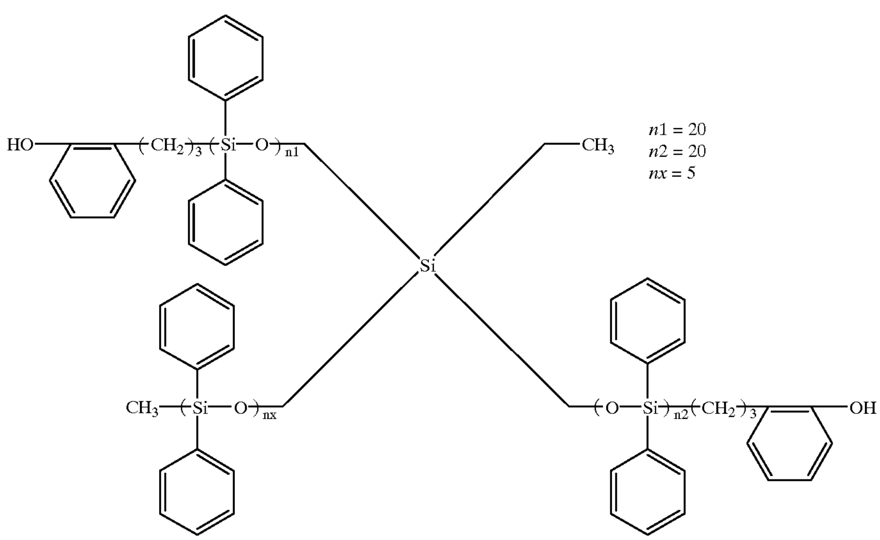
$n1 = 20$
$n2 = 20$
$nx = 5$ The hydroxyphenyl-containing polyorganosiloxane (3) may be synthesized, for example, by carrying out an addition reaction of a polyorganosiloxane of the following general formula (5):

(5)

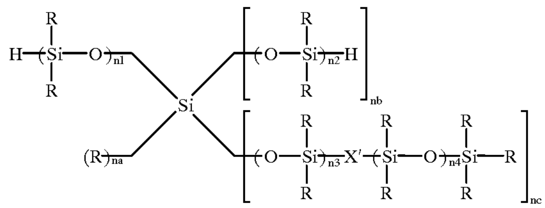

wherein R, X', na, nb, nc, n1, n2, n3 and n4 are as defined above, which has at least two hydrogen atoms bonded to silicon atoms, with an aliphatic unsaturation-containing hydrocarbon which contains in its molecule a phenol group having a hydroxyl group protected by a triorganosilyl group or the like, in the presence of a hydrosilylation catalyst, such as a platinum catalyst, and then releasing the protecting group, such as a triorganosilyl group, by adding-methanol or the like and heating in the presence of an acid catalyst. It is also possible to use an aliphatic unsaturation-containing hydrocarbon which contains a phenol group having a hydroxyl group not protected by a triorganosilyl group or the like.

For example, among the hydroxyphenyl-containing polyorganosiloxanes (3), the hydroxyphenyl-containing polyorganosiloxanes of the following general formula:

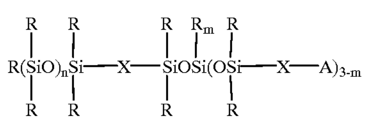

wherein R, X and n are as defined above, A is a non-substituted hydroxyphenyl or a hydroxyphenyl substituted with one to four $R^x$ groups, and m is 0 or 1, may be synthesized by the above-described method of producing hydroxyphenyl-containing polyorganosiloxanes, using a polyorganosiloxane of the following general formula (6):

(6)

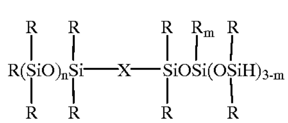

wherein R, X, m and n are as defined above, as the polyorganosiloxane of the general formula (5).

The polyorganosiloxane of the general formula (6) having at least two hydrogen atoms bonded to silicon atoms at one molecule end may be synthesized, for example, by condensing an organosilane or polyorganosiloxane of the following general formula:

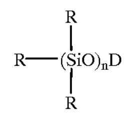

wherein R and n are as defined above, and D is hydrogen atom or lithium atom, with a siloxane of the following general formula:

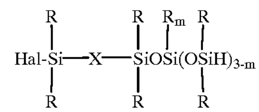

wherein R, X and m are as defined above, and Hal is a halogen atom (refer to Japanese Patent Application Unexamined Publication No. 4-353523 (1992)).

Among the polyorganosiloxanes of the general formula (5) having at least two hydrogen atoms bonded to silicon atoms, the polyorganosiloxanes wherein X' is an alkylene or an alkyleneoxyalkylene may be synthesized, for example, by condensing an organosilane or polyorganosiloxane (a) of the following general formula:

(a)

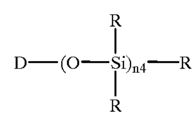

wherein R is as defined above, D is hydrogen atom or lithium atom, and n4 is an integer of 1 or more, with a siloxane (b) of the following general formula:

(b)

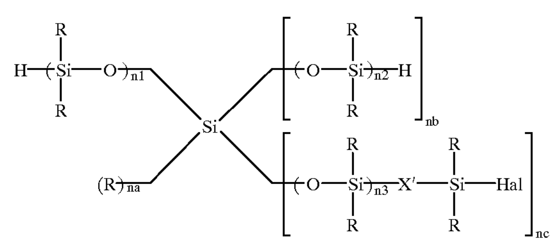

wherein R, X', na, nb, nc, na, n1 and n3 are as defined above, and Hal is a halogen atom.

Among the polyorganosiloxanes of the general formula (5) having at least two hydrogen atoms bonded to silicon atoms, the polyorganosiloxanes wherein X' is oxygen atom may be synthesized, for example, by condensing an organosilane or polyorganosiloxane (a') of the following general formula with a siloxane (b') of the following general formula:

(a')

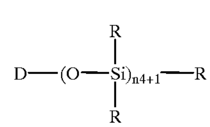

-continued (b')

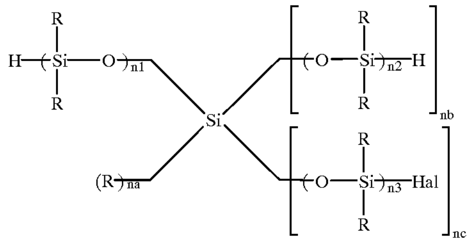

wherein D, Hal, R, na, nb, nc, n1, n2, n3 and n4 are as defined above.

Examples of the dihydric phenols (4) of the general formula (4) include 4,4'-dihydroxybiphenyls, such as 4,4'-dihydroxybiphenyl, 3,3'-difluoro-4,4'-dihydroxybiphenyl, 4,4'-dihydroxy-3,3'-dimethylbiphenyl, 4,4'-dihydroxy-2,2'-dimethylbiphenyl, 4,4'-dihydroxy-3,3'-dicyclohexylbiphenyl, 4,4'-dihydroxy-3,3'-divinylbiphenyl and 3,3'-diallyl-4,4'-dihydroxybiphenyl; bis(hydroxyphenyl)alkanes, such as bis(4-hydroxyphenyl)methane, 1,1-bis(4-hydroxyphenyl)-1,1-diphenylmethane, 1,1-bis(4-hydroxyphenyl)-1-phenylmethane, bis(4-hydroxy-3-methylphenyl)methane, bis(4-hydroxy-3-nonylphenyl)methane, bis(4-hydroxy-3,5-dimethylphenyl)methane, 1,1-bis(2-tert-butyl-4-hydroxy-5-methylphenyl)-1-phenylmethane, bis(3-chloro-4-hydroxyphenyl)methane, bis(3-fluoro-4-hydroxyphenyl)methane, bis(3,5-dibromo-4-hydroxyphenyl)methane, bis(4-hydroxy-3-vinylphenyl)methane, bis(3-allyl-4-hydroxyphenyl)methane, bis(4-hydroxy-5-methyl-3-vinylphenyl)methane, bis(3-allyl-4-hydroxy-5-methylphenyl)methane, bis(2-hydroxyphenyl)methane, 2-hydroxyphenyl-4-hydroxyphenylmethane, bis(2-hydroxy-4-methylphenyl)methane, bis(6-tert-butyl-2-hydroxy-4-methylphenyl)methane, bis(2-hydroxy-4,6-dimethylphenyl)methane, 1,1-bis(4-hydroxyphenyl)ethane, 1,2-bis(4-hydroxyphenyl)ethane, 1,1-bis(4-hydroxyphenyl)-1-phenylethane, 1,1-bis(4-hydroxy-3-methylphenyl)-1-phenylethane, 1,1-bis(4-hydroxy-3-phenylphenyl)-1-phenylethane, 2-(4-hydroxy-3-methylphenyl)-2-(4-hydroxyphenyl)-1-phenylethane, 1,1-bis(2-tert-butyl-4-hydroxy-3-methylphenyl)ethane, 1-phenyl-1,1-bis(3-fluoro-4-hydroxyphehyl)ethane, 1,1-bis(2-hydroxy-4-methylphenyl)ethane, 2,2-bis(4-hyroxyphenyl)propane (alias bisphenol A), 1,1-bis(4-hydroxyphenyl)propane, 2,2-bis(4-hydroxy-3-methylphenyl)propane, 2,2-bis(4-hydroxy-3,5-dimethylphenyl)propane, 2,2-bis(3-isopropyl-4-hydroxyphenylpropane, 2,2-bis(4-hydroxy-2-methyophenyl)propane, 1,1-bis(2-tert-butyl-4-hydroxy-5-methylphenyl)propane, 2,2-bis(3-sec-butyl-4-hydroxyphenyl)propane, 2,2-bis(3-chloro-4-hydroxyphenyl)propane, 2,2-bis(3-fluoro-4-hydroxyphenyl)propane, 2,2-bis(3-bromo-4-hydroxyphenyl)propane, 2,2-bis(3,5-difluoro-4-hydroxyphenyl)propane (alias tetrafluorobisphenol A), 2,2-bis(3,5-dichloro-4-hydroxyphenyl)propane (alias tetrachlorobisphenol A), 2,2-bis(3,5-dibromo-4-hydroxyphenyl)propane (alias tetrabromobisphenol A), 2,2-bis(3-bromo-5-chloro-4-hydroxyphenyl)propane, 2,2-bis(3-hydroxyphenyl)-1,1,1,3,3,3-hexafluoropropane, 2,2-bis(4-hydroxy-3-phenylphenyl)propane, 2,2-bis(4-hydroxy-3-vinylphenyl)propane, 2,2-bis(3-allyl-4-hydroxyphenyl)propane, 2,2-bis(4-hydroxy-5-methyl-3-vinylphenyl)propane, 2,2-bis(3-allyl-4-hydroxy-5-methylphenyl)propane, 2,2-bis(2-hydroxy-4,6-dimethylphenyl)propane, 2,2-bis(4-sec-butyl-2-hydroxyphenyl)propane, 1,1-bis(2-tert-butyl-5-methyl-4- hydroxyphenyl)-2-methylpropane, 1,1-bis(4-hydroxyphenyl)-2-methylpropane, 2,2-bis(4-hydroxy-3-methylphenyl)butane, 2,2-bis(4-hydroxyphenyl)butane, 1,1-bis(2-butyl-4-hydroxy-5-methylphenyl)butane, 1,1-bis(2-tert-butyl-4-hydroxy-5-methylphenyl)butane, 1,1-bis(4-hydroxy-2-methyl-5-tert-pentylphenyl)butane, 2,2-bis(3,5-dichloro-4-hydroxyphenyl)butane, 2,2-bis(3,5-dibromo-4-hydroxyphenyl)butane, 2,2-bis(4-hydroxyphenyl)-3-methylbutane, 1,1-bis(4-hydroxyphenyl)-3-methylbutane, 2,2-bis(4-hydroxyphenyl)pentane, 1,1-bis(4-hydroxyphenyl)cyclopentane, 2,2-bis(4-hydroxyphenyl)hexane, 2-ethyl-1,1-bis(4-hydroxyphenyl)hexane, 4,4-bis(4-hydroxyphenyl)heptane, 1,1-bis(2-tert-butyl-4-hdyroxy-5-methylphenyl)heptane, 2,2-bis(4-hydroxyphenyl)octane, 2,2-bis(4-hydroxyphehyl)nonane, 2,2-bis(4-hydroxyphenyl)decane, 1,1-bis(4-hydroxyphenyl)cyclohexane, 1,1-bis(4-hydroxy-3-methylphenyl)cyclohexane, 1,1-bis(4-hydroxy-3,5-dimethylphenyl)cyclohexane, 1,1-bis(4-hydroxy-3-cyclohexylphenyl)cyclohexane, 1,1-bis(4-hydroxy-3-vinylphenyl)cyclohexane, 1,1-bis(3-allyl-4-hydroxyphenyl)cyclohexane, 1,1-bis(4-hydroxy-5-methyl-3-vinylphenyl)cyclohexane, 1,1-bis(3-allyl-4-hydroxy-5-methylphenyl)cyclohexane and 1,1-bis(4-hydroxy-3-phenylphenyl)cyclohexane; bis(4-hydroxyphenyl) ethers, such as bis(4-hydroxyphenyl) ether and bis(3-fluoro-4-hydroxyphenyl) ether; bis(4-hydroxyphenyl) sulfides, such as bis(4-hydroxyphenyl) sulfide and bis(4-hydroxy-3-methylphenyl) sulfide; bis(4-hydroxyphenyl) sulfoxides, such as bis(4-hydroxyphenyl) sulfoxide and bis(4-hydroxy-3-methylphenyl) sulfoxide; bis(4-hydroxyphenyl) sulfones, such as bis(4-hydroxyphenyl) sulfone, bis(4-hydroxy-3-methylphenyl) sulfone and bis(4-hydroxy-3-phenylphenyl) sulfone; bis(hydroxyphenyl) ketones, such as 4,4'-dihydroxybenzophenone; bis(hydroxyphenyl)fluorenes, such as 9,9-bis(4-hydroxyphenyl)fluorene, 9,9-bis(4-hydroxy-3-methylphenyl)fluorene, 9,9-bis(3-ethyl-4-hydroxyphenyl)fluorene, 9,9-bis(4-hydroxy-3-phenylphenyl)fluorene, 9,9-bis(4-hydroxy-3-vinylphenyl)fluorene, 9,9-bis(3-allyl-4-hydroxyphenyl)fluorene, 9,9-bis(4-hydroxy-5-methyl-3-vinylphenyl)fluorene and 9,9-bis(3-allyl-4-hydroxy-5-methylphenyl)fluorene; dihydroxy-p-terphenyls, such as 4,4"-dihydroxy-p-terphenyl; dihydroxy-p-quarterphenyls, such as 4,4'"-dihydroxy-p-quarterphenyl; bis(hydroxyphenyl)pyrazines, such as 2,5-bis(4-hydroxyphenyl)pyrazine, 2,5-bis(4-hydroxyphenyl)-3,6-dimethylpyrazine and 2,5-bis(4-hydroxyphenyl)-2,6-diethylpyrazine; and bis(4-hydroxyphenyl)menthanes, such as 1,8-bis(4-hydroxyphenyl)menthane, 1,8-bis(4-hydroxy-3-methylphenyl)menthane and 1,8-bis(4-hydroxy-3,5-dimethylphenyl)menthane. Besides these dihydric phenols (4) of the general formula (4), dihydroxybenzenes, such as hydroquinone, resorcinol, catechol and methylhydroquinone; dihydroxynaphthalenes, such as 1,3-dihydroxynaphthalene, 1,4-dihydroxynaphthalene, 1,5-dihydroxynaphthalene, 2,6-dihydroxynaphthalene and 2,7-dihydroxynaphthalene; dihydroxybisindanes, such as 6,6'-dihydroxy-3,3,3',3'-tetramethylbisindane; 1,4-bis[2-(4-hydroxyphenyl)-2-propyl]benzene and 1,3-bis[2-(4-hydroxyphenyl)-2-propyl]benzene may also be used.

Preferred among these dihydric phenols are 2,2-bis(4-hydroxyphenyl)propane, 1,1-bis(4-hydroxyphenyl)cyclohexane, 1,1-bis(4-hydroxyphenyl)-1,1-diphenylmethane, 1,1-bis(4-hydroxyphenyl)-1-phenylethane, 2,2-bis(4-hydroxy-3-methylphenyl)propane, 2,2-bis(4-hydroxy-3-phenylphenyl)propane, 4,4'-dihydroxybiphenyl, bis(4-hydroxyphenyl) sulfone, 2,2-bis(3,5-dibromo-4-hydroxyphenyl)propane, 2,2-bis(4- hydroxyphenyl)pentane, 9,9-bis(4-hydroxy-3-methylphenyl)fluorene, bis(4-hydroxyphenyl) ether, 4,4'-dihydroxybenzophenone and 2,2-bis(4-hydroxy-3-methoxyphenyl)-1,1,1,3,3,3-hexafluoropropane, with 2,2-bis(4-hydroxyphenyl)propane particularly preferred.

End-cappers useful for the production of the polycarbonate of the present invention are monocarboxylic acids and derivatives thereof and monohydric phenols. Preferred examples of such end-cappers include p-(tert-butyl)phenol, p-cumylphenol, p-phenylphenol, p-(perfluorononylphenyl) phenol, p-(perfluorononylphenyl)phenol, p-tert-perfluorobutylphenol, 1-(p-hydroxybenzyl)perfluorodecane, p-(2-(1H,1H-perfluorotridecyloxy)-1,1,1,3,3,3-hexafluoropropyl)phenol, 3,5-bis (perfluorohexyloxycarbonyl)phenol, perfluorododecyl p-hydroxybenzoate, p-(1H,1H-perfluorooctyloxy)phenol and 2H,2H,9H-perfluorononanoic acid.

The copolymerization ratio of the total of the end-cappers is preferably 1 to 30 mol %, more preferably 1 to 10 mol %. If it is more than 30 mol %, photosensitive layers may be subject to abrasion due to poor surface hardness and have shorter printing life, and if less than 1 mol %, solution viscosity may become too high to produce photoreceptors by liquid-coating methods.

Useful branching agents are phenols or carboxylic acids of trivalence or more. Examples of such branching agents include phloroglucinol, pyrogallol, 4,6-dimethyl-2,4,6-tris (4-hydroxyphenyl)-2-heptene, 2,4-dimethyl-2,4,6-tris(4-hydroxyphenyl)heptane, 2,6-dimethyl-2,4,6-tris(4-hydroxyphenyl)-3-heptene, 1,3,5-tris(2-hydroxyphenyl) benzene, 1,3,5-tris(4-hydroxyphenyl)benzene, 1,1,1-tris(4-hydroxyphenyl)ethane, tris(4-hydroxyphenyl) phenylmethane, 2,2-bis(4,4-bis(4-hydroxyphenyl) cyclohexyl)propane, 2,4-bis{2-(4-hydroxyphenyl)-2-propyl}phenol, 2,6-bis(2-hydroxy-5-methylbenzyl)-4-methylphenol, 2-(4-hydroxyphenyl)-2-(2,4-dihydroxyphenyl)propane, tetrakis(4-hydroxyphenyl) methane, tetrakis(4-(4-hydroxyphenylisopropyl)phenoxy) methane, 1,4-bis(4',4"-dihydroxytriphenylmethyl)benzene, 2,4-dihydroxybenzoic acid, trimesic acid, cyanuric acid, 3,3-bis(3-methyl-4-hydroxyphenyl)-2-oxo-2,3-dihydroindole, 3,3-bis(4-hydroxyaryl)oxyindoles, 5-chloroisatin, 5,7-dichloroisatin and 5-bromisatin.

Preferred examples among these are phloroglucinol, 1,3,5-tris(4-hydroxyphenyl)benzene and 1,1,1-tris(4-hydroxyphenyl)ethane.

The copolymerization ratio of the branching agents is preferably 30 mol % or less, more preferably 5 mol % or less. If it is more than 30 mol %, solution viscosity may become too high to produce photoreceptors by liquid-coating methods.

The polycondensation in the presence of an acid acceptor by using a carbonate precursor, for example, a carbonyl dihalide such as phosgene, a haloformate, such as chloroformate, or a carbonate compound, is ordinarily carried out in a solvent. In cases where a gaseous carbonate precursor, such as phosgene, is used, it is preferable to blow it into the reaction system.

The amount of the carbonate precursor may be determined based on the stoichiometric ratio (equivalent) for the reaction.

Examples of usable acid acceptors are alkali metal hydroxides, such as sodium hydroxide, potassium hydroxide, lithium hydroxide and cesium hydroxide, alkali metal carbonates, such as sodium carbonate and potassium carbonate, metal hydroxides, such as aluminum hydroxide, organic bases, such as pyridine, and mixtures thereof.

The amount of acid acceptors may be determined based on the stoichiometric ratio (equivalent) for the reaction. That is, it is desirable to use at least one equivalent, preferably 1 to 5 equivalents of acid acceptors per mole of the phenolic hydroxyl groups of the starting materials.

Various organic solvents may be used, including the common solvents for the production of known polycarbonates, and may be used individually or as a solvent mixture. Typical solvents are hydrocarbons, such as toluene and xylene, and hydrocarbon halides, such as methylene chloride, chloroform, 1,1-dichloroethane, 1,2-dichloroethane, 1,1,1-trichloroethane, 1,1,2-trichloroethane, 1,1,1,2-tetrachloroethane, 1,1,2,2-tetrachloroethane, pentachloroethane and chlorobenzene, and acetophenone. These organic solvents may used individually or in combination of two or more. Interfacial polycondensation may also be carried out by using two solvents non-compatible with each other.

To accelerate the polycondensation, it is desirable to use catalysts. Preferred examples of the catalysts include quaternary ammonium salts, such as trimethylbenzylammonium chloride, triethylbenzylammonium chloride, tributylbenzylammonium chloride, trioctylmethylammonium chloride, tetrabutylammonium chloride and tetrabutylammonium bromide, quaternary phosphonium salts, such as tetrabutylphosphonium chloride and tetrabutylphosphonium bromide, and tertiary amines, such as trimethylamine, triethylamine, tributylamine, N,N-dimethylcyclohexylamine, pyridine and dimethylaniline.

A small amount of an antioxidant, such as sodium sulfite or hydrosulfide, may also be added according to demands. The reaction is generally carried out at a temperature of 0 to 150° C., preferably 5 to 40° C. The reaction may be carried out at a reduced pressure, atmospheric pressure or an applied pressure, and, generally, proceeds sufficiently at atmospheric pressure or at the pressure in the reaction system. The reaction time depends on the reaction temperature or the like, and is generally 0.5 minutes to 10 hours, preferably 1 minutes to 2 hours.

The reduced viscosity of the product polycarbonate can be adjusted within the above-described range by various methods, for example, by optimizing the above-described reaction conditions or the amounts of the branching agents and end-cappers. The product polycarbonate may optionally be treated mechanically (mixing, fractionation or the like) and/or chemically (polymer reactions, partial decomposition or the like), to obtain a polycarbonate of a directed reduced viscosity.

The synthesis described above may be carried out by various manners. For example, the polycarbonate of the present invention can be synthesized by allowing a dihydric phenol to react with phosgene (or a phosgene derivative) to give a polycarbonate oligomer, which is then allowed to react with the above-described hydroxyphenyl-containing polyorganosiloxane, or with the hydroxyphenyl-containing polyorganosiloxane and a dihydric phenol, in a solution mixture of an organic solvent and an aqueous alkali solution of the above-described acid acceptor. It also may be synthesized by allowing the above-described dihydric phenol, phosgene and hydroxyphenyl-containing polyorganosiloxane to react with each other in a solution mixture of an organic solvent and an aqueous alkali solution. Further, it may also be synthesized by allowing a hydroxyphenyl-containing polyorganosiloxane with phosgene (or a phosgene derivative) to give an oligomer, which is then allowed to react with a dihydric phenol and/or a hydroxyphenyl-containing polyorganosiloxane in a solution mixture of an organic solvent and an aqueous alkali solution. The first method, wherein first a polycarbonate oligomer is produced, is desirable to obtain a polycarbonate efficiently.

To produce a polycarbonate oligomer, first a dihydric phenol (and an optional branching agent) is dissolved in an aqueous alkali solution to prepare an aqueous alkaline solution of the dihydric phenol. Then reaction is carried out by introducing phosgene in a mixture of the aqueous alkaline solution and an organic solvent, such as methylene chloride, to synthesize a polycarbonate oligomer of the dihydric phenol. Then the reaction solution is separated into an aqueous phase and an organic phase containing the polycarbonate oligomer, to collect the organic phase. For these procedures, the alkali concentration in the aqueous alkali solution is preferably 1 to 15% by weight, and the volume ratio of the organic phase to the aqueous phase is preferably 10:1 to 1:10, more preferably 5:1 to 1:5. The reaction temperature is desirably kept to 0 to 70° C., preferably 5 to 65° C., under cooling, and the reaction time is generally 15 minutes to 4 hours, preferably about 30 minutes to 3 hours. The polycarbonate oligomer obtained thus has an average molecular weight of 2,000 or less and, generally, a polymerization degree of 20 or less, preferably 2 to 10. When the above dihydric phenol (4) is used as the dihydric phenol, the polycarbonate oligomer generally has the structure of the following general formula (7):

(7)

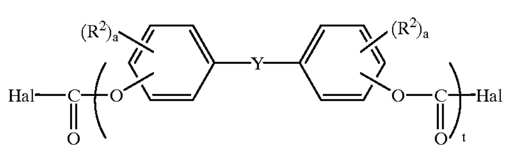

wherein $R^2$, a and Y are as defined above, Hal is a halogen atom, such as chlorine, and t is 2 to 20.

To the obtained organic phase containing the polycarbonate oligomer is added the above-described hydroxyphenyl-containing polyorganosiloxane (optionally, together with additional dihydric phenol), to carry out a reaction. The reaction temperature is generally 10 to 50° C., preferably 20 to 40° C., and the reaction time is generally about 30 minutes to 2 hours. To carry out the reaction, it is desirable to added the hydroxyphenyl-containing polyorganosiloxane as a solution dissolved in an organic solvent, the dihydric phenol as a solution dissolved in an aqueous alkali solution. Their order of addition is not limited, but the dihydric phenol is preferably added finally. Alternatively, a part or all of the hydroxyphenyl-containing polyorganosiloxane may be added in the course of the production of the polycarbonate oligomer from the dihydric phenol and phosgene. Thus, the polycarbonate of the present invention can be produced efficiently.

In the above-described method, catalysts, end-cappers and branching agents may be added during the production of the polycarbonate oligomer and/or during the following reaction for increasing molecular weight.

To the polycarbonate of the present invention comprising the above-described structural units may be added, depending on its use, additives, for example, other organic resins, antioxidants, photo-stabilizers, colorants, inorganic or organic fillers, reinforcing materials, such as carbon fibers or glass fibers, lubricants and antistatic agents.

Hereinafter the polycarbonate molding of the present invention will be described.

The molding of the present invention may be produced by melting the polycarbonate of the present invention with heat, molding and solidifying by cooling. In general, common methods for molding aromatic polycarbonate resins are applicable, particularly preferably injection molding. That is, polycarbonate pellets are dried enough, introduced and held in the hopper of an injection molding machine to prevent moisture adsorption, and then molded in a cylinder at 250 to 320° C.

The polycarbonate of the present invention is advantageously excellent in moldability. The molding of the present invention produced by curing the polycarbonate is advantageously excellent in releasability, water repellence and mechanical properties.

Hereinafter the electrophotographic photoreceptor of the present invention will be described. The electrophotographic photoreceptor of the present invention comprises a conductive substrate and a photosensitive layer that is disposed on the conductive substrate and has a surface layer containing the polycarbonate of the present invention.

The electrophotographic photoreceptor of the present invention may have any structure, such as a known single-layer-type or lamination-type, as far as it has such a photosensitive layer as described above on a conductive substrate. Generally preferred is a lamination-type electrophotographic photoreceptor which has a photosensitive layer comprising at least one charge-generating layer and at least one charge-transfer layer as a surface layer, and the charge-transfer layer preferably contains the polycarbonate as a binder resin and/or as an additive for modifying the surface layer and/or as an agent for improving the compatibility of polycarbonates with polysiloxanes.

When used as binder resins in the electrophotographic photoreceptor of the present invention, the polycarbonates of the present invention may be used individually or in combination of two or more, and may be used together with other resin ingredient, such as other polycarbonate resins, which do not hinder the effects of the present invention.

The conductive substrate to be used in the electrophotographic photoreceptor of the present invention may be made of any material, such as a known material, and examples of usable substrates include a plate, drum or sheet of aluminum, nickel, chromium, palladium, titanium, gold, silver, copper, zinc, stainless steel, molybdenum, indium, platinum, brass, lead oxide, tin oxide, indium oxide, ITO or graphite; glass, cloth, paper or film, sheet or seamless-belt of plastic, which are endowed with conductivity by evaporation, spattering or coating of the above-described materials; and a plastic film, sheet or seamless-belt bearing metal foil, such as aluminum foil, and a metal drum oxidized by, for example, electrode oxidation.

The charge-generating layer of lamination-type electrophotographic photoreceptors contains at least a charge-generating substance, and may be produced by, for example, forming a layer of the charge-generating substance on an underlying layer by a vacuum evaporation technique, spattering or CVD, or by forming, on an underlying layer, a layer wherein the charge-generating substance is fixed by a binder resin. Various methods, including known methods, may be used for the production of the charge-generating layer containing the binder resin, and a suitable method is to apply a coating fluid prepared by dispersing or dissolving both a charge-generating substance and a binder resin in an appropriate solvent, followed by drying.

Usable charge-generating substances are various ones including known ones, for example, various inorganic materials, for example, selenium single substances, such as amorphous selenium and trigonal selenium, tellurium single substances, selenium alloys, such as selenium-tellurium alloy and selenium-arsenic alloy, selenium compounds or selenium-containing compositions, such as $As_2Se_3$, zinc oxide, cadmium sulfide, antimony sulfide, zinc sulfide, alloys, such as CdS—Se, inorganic materials composed of the elements of the Groups 12 and 16, oxide semiconductors, such as titanium oxide, and silicon materials, such as amorphous silicon; metal-free-phthalocyanines pigments, such as τ-metal-free-phthalocyanine and χ-metal-free-phthalocyanine; metallo-phthalocyanine pigments, such as α-copper-phthalocyanine, β-copper-phthalocyanine, γ-copper-phthalocyanine, ε-copper-phthalocyanine, X-copper-phthalocyanine, A-titanyl-phthalocyanine, B-titanyl-phthalocyanine, C-titanyl-phthalocyanine, D-titanyl-phthalocyaine, E-titanyl-phthalocyanine, F-titanyl-phthalocyanine, H-titanyl-phthalocyanine, G-titanyl-phthalocyanine, K-titanyl-phthalocyanine, L-titanyl-phthalocyanine, M-titanyl-phthalocyanine, N-titanyl-phthalocyanine, Y-titanyl-phthalocyanine, oxotitanium phthalocyanine and titanyl-phthalocyanines exhibiting a strong X-ray diffraction peak at a Bragg angle 2θ of 27.3±0.2 degree; cyanine dyes, anthracene pigments, bisazo pigments, pyrene pigments, polycyclic quinone pigments, quinacridone pigments, indigo pigments, perylene pigments, pyrylium dyes, thiapyrylium dyes, polyvinylcarbazole, squalium pigments, anthoanthorone pigments, benzimidazole pigments, azo pigments, thioindigo pigments, bisbenzimidazole pigments, quinoline pigments, lake pigments, oxazine pigments, dioxazine pigments, triphenylmethane pigments, azulenium dyes, squalium dyes, triarylmethane dyes, xanthine dyes and thiazine dyes.

For example, the compounds represented by the following general formulae are suitable.

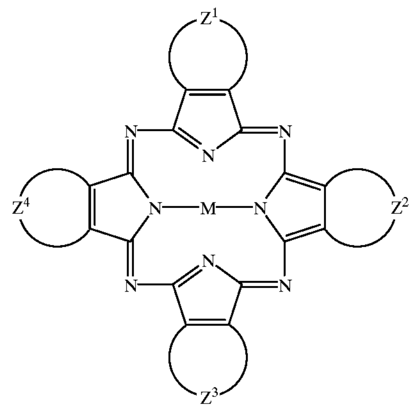

wherein $Z^1$, $Z^2$, $Z^3$ and $Z^4$ are each independently an atomic group which is linked to the two carbon atoms on each pyrrole ring to form an optionally substituted aromatic hydrocarbon ring or heterocyclic ring, and M is a metal atom or a metal compound containing optional two hydrogen atoms or ligands.

$$Ar^6\text{-}(N{=}N\text{-}Cp)_t$$

wherein $Ar^6$ is a t-valent residue containing a conjugated system and an optional aromatic hydrocarbon ring or heterocyclic ring, t is a positive number of not less than 1, Cp is a coupler residue having an aromatic hydroxyl, and, when t is two or more, Cp's are identical with or different from each other.

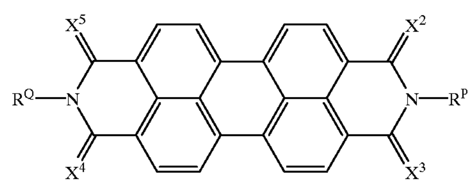

wherein $X^2$, $X^3$, $X^4$ and $X^5$ are each oxygen, sulfur or selenium, $R^P$ and $R^Q$ are each an alkyl group or an aryl group of 1 to 12 carbon atoms, $X^2$ or $X^3$ and $R^P$, or, $X^4$ or $X^5$ and $R^Q$ may optionally be linked to each other to form an optionally substituted heterocyclic ring.

Examples of fluorene disazo pigments are given bellow.

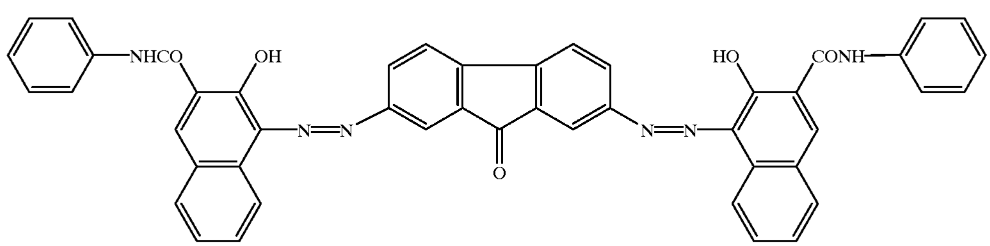

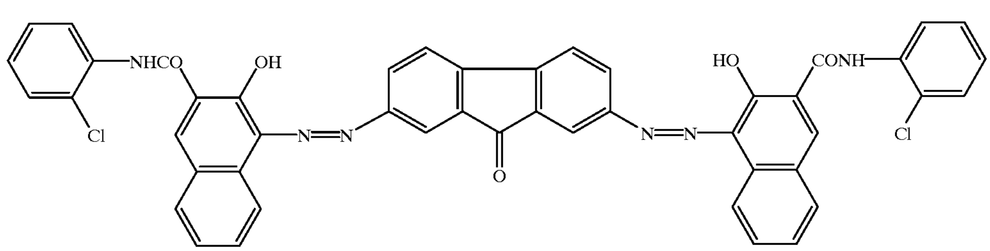

-continued
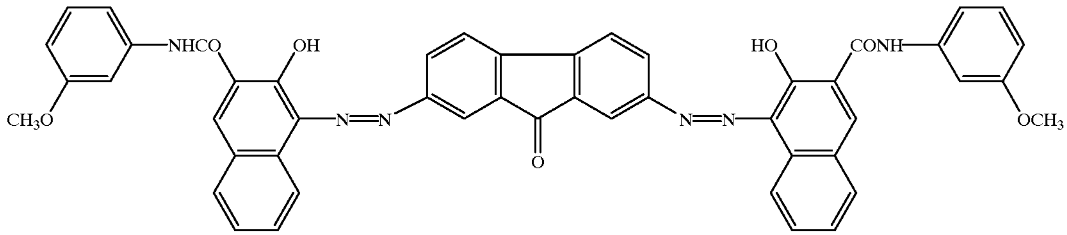
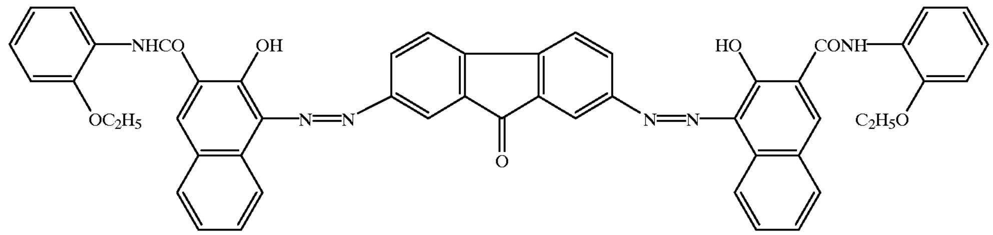
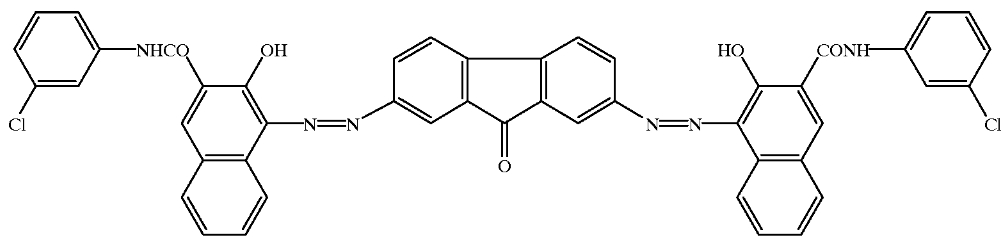
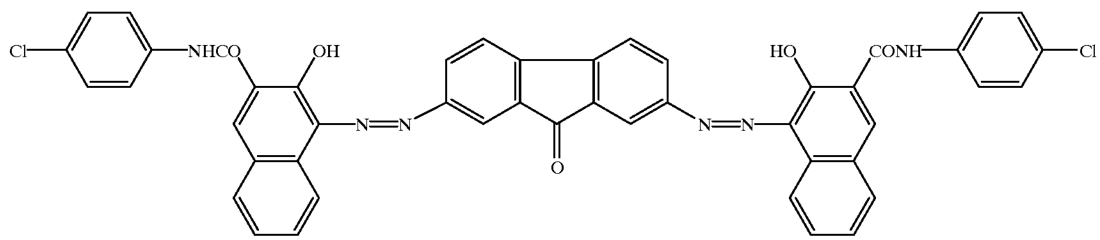
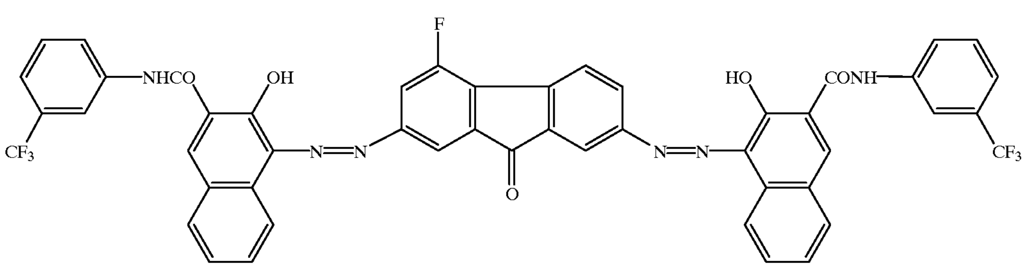
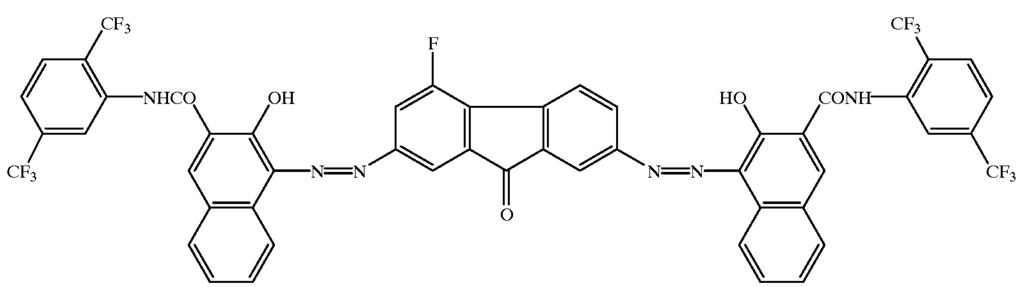

-continued
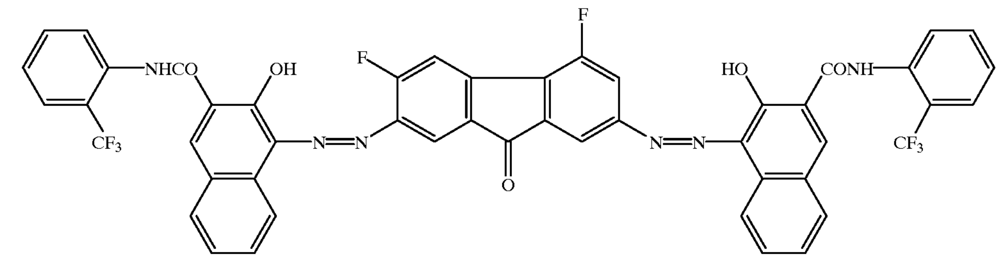
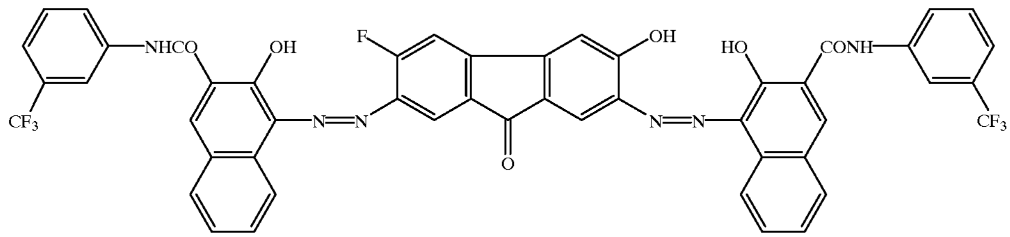
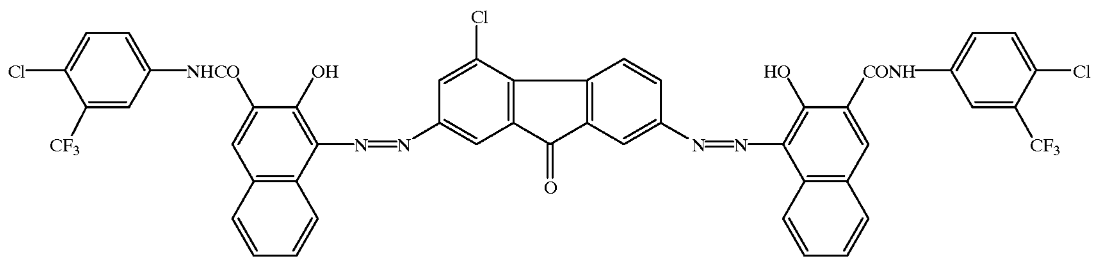
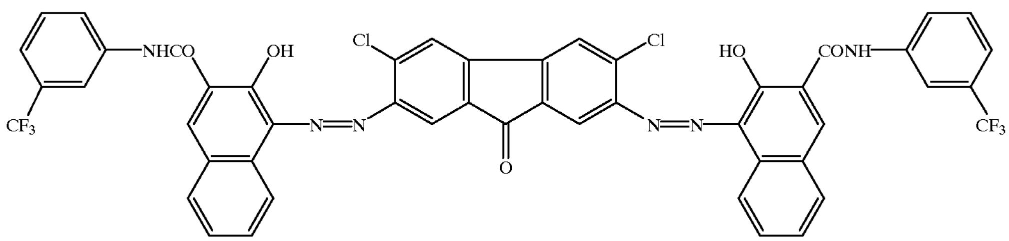
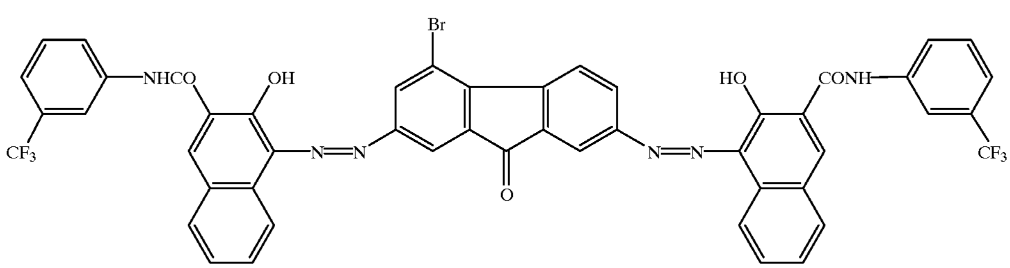
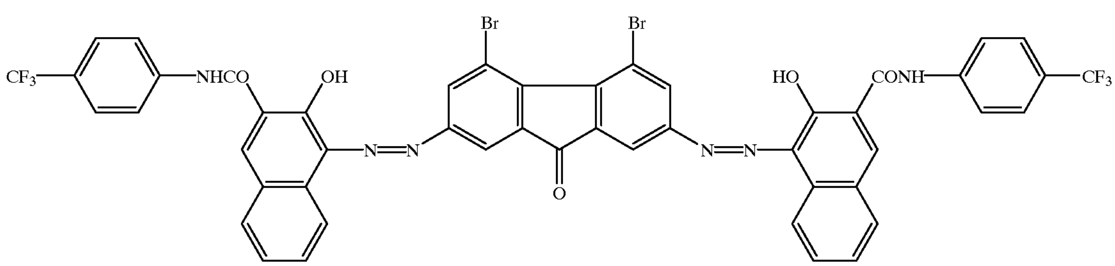

-continued
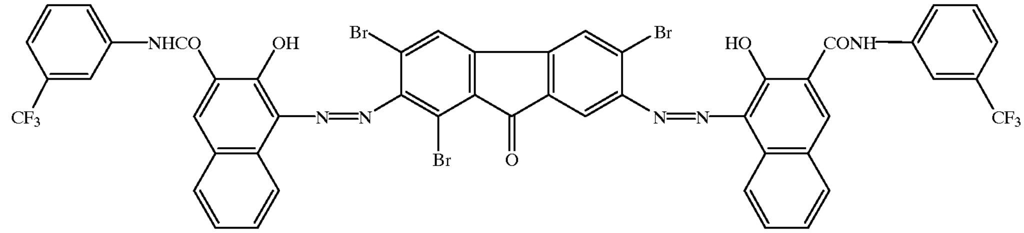
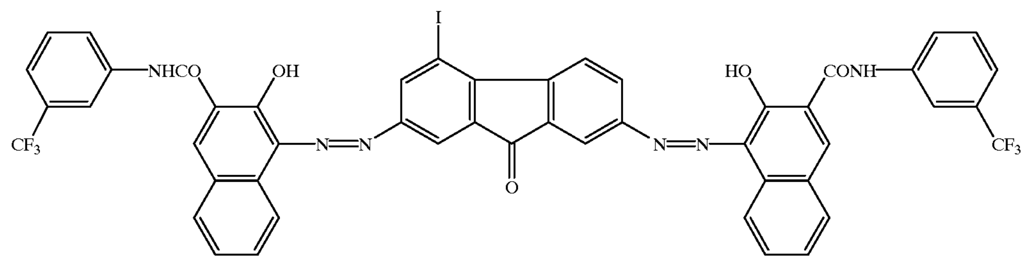
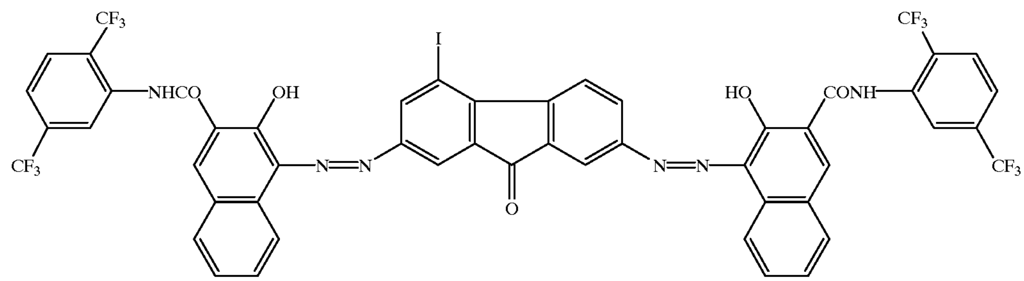
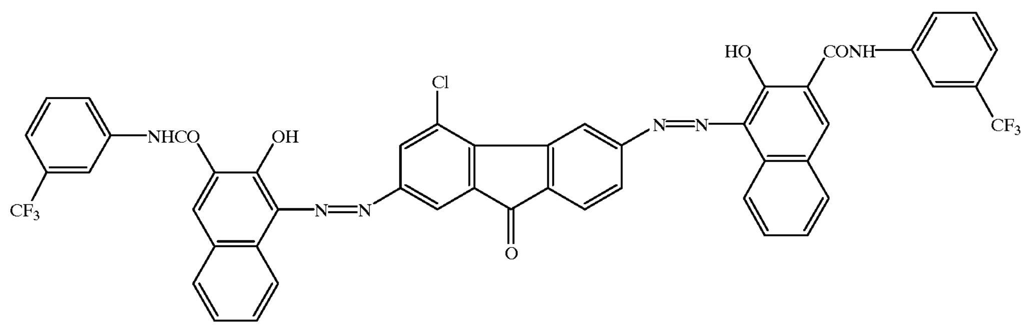
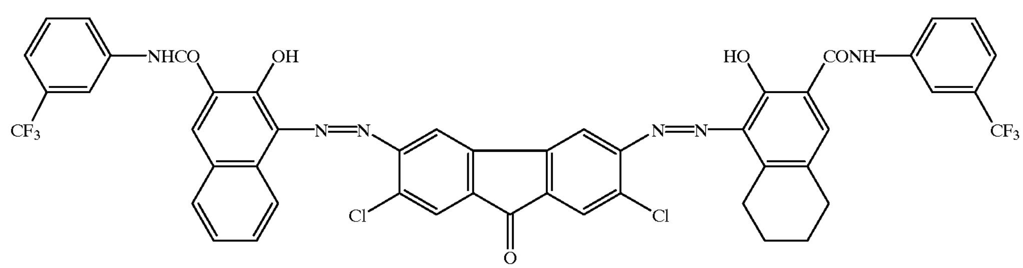
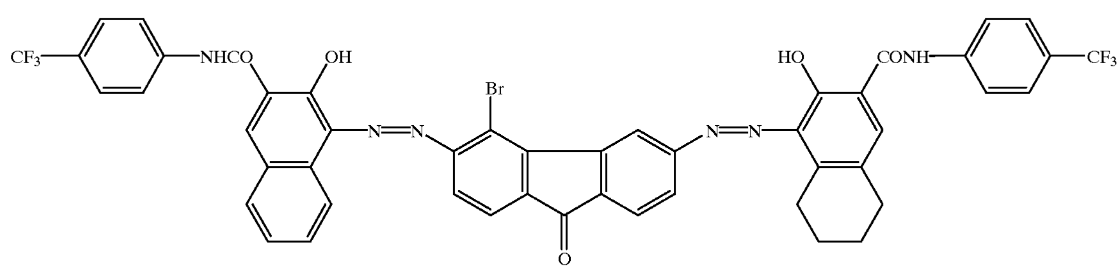

-continued
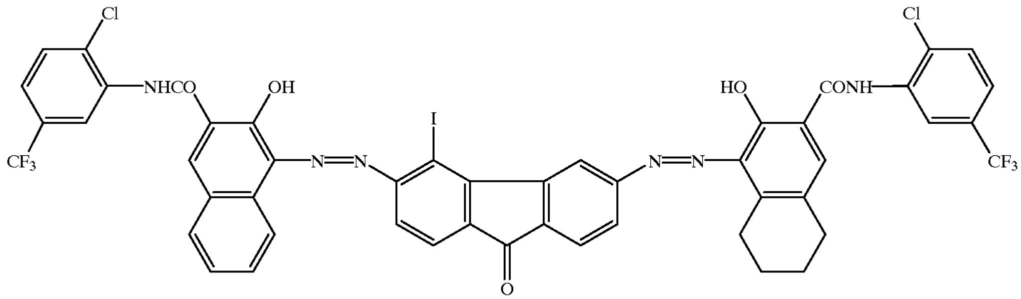
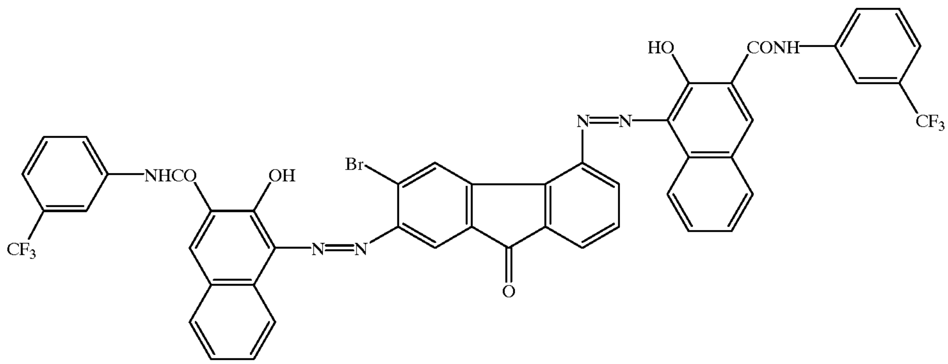
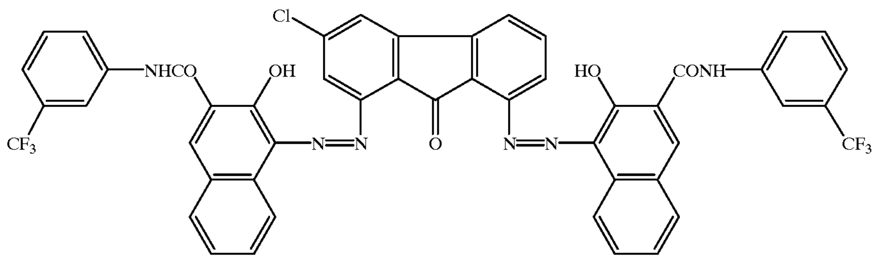
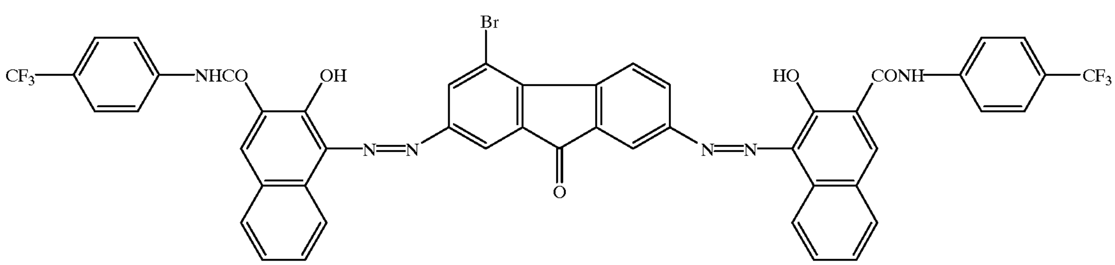
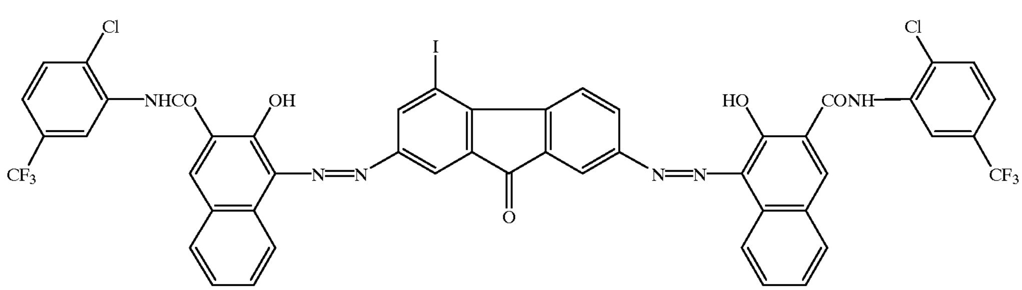

Examples of the perylene pigments are given bellow.
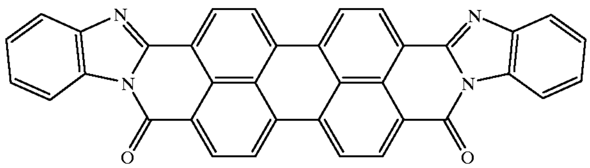
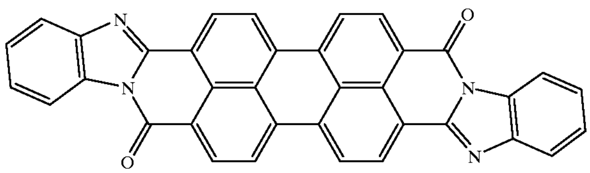
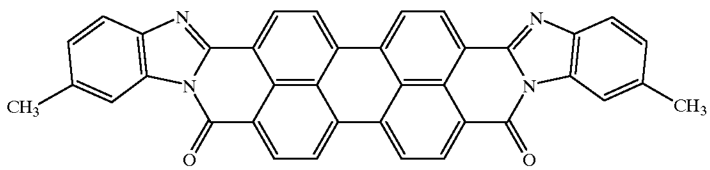
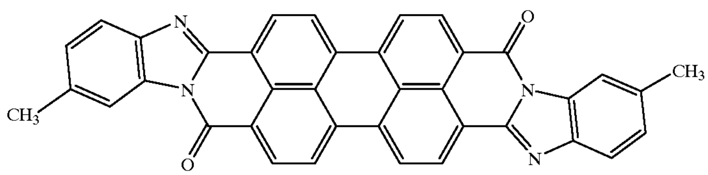
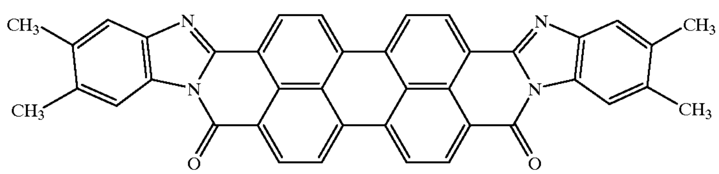
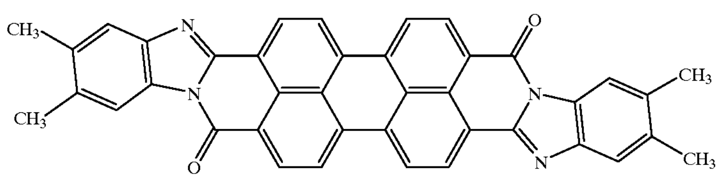
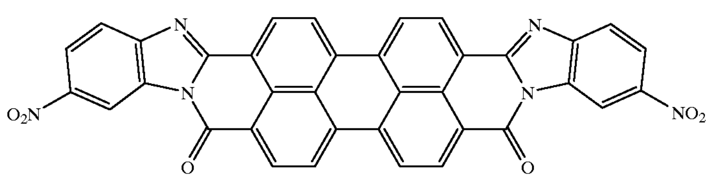
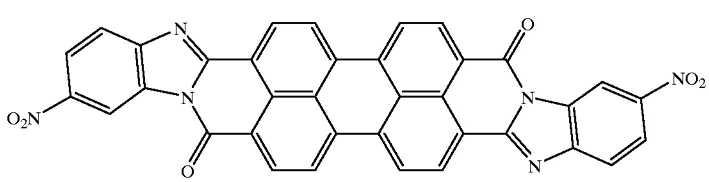
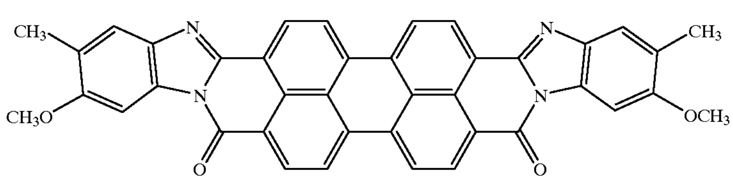

-continued
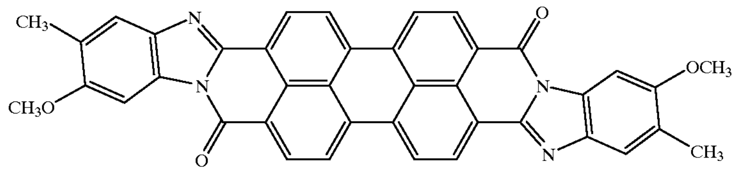
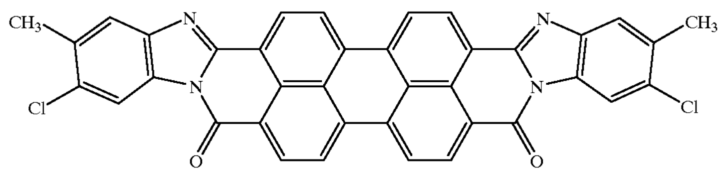
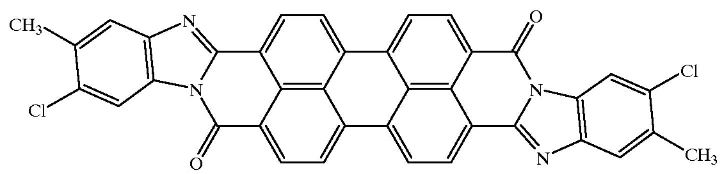
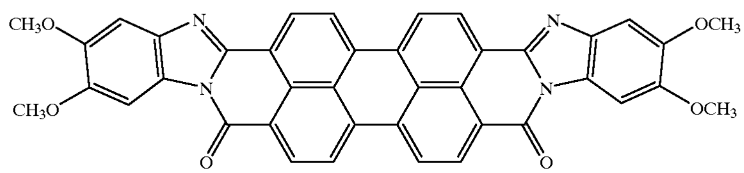
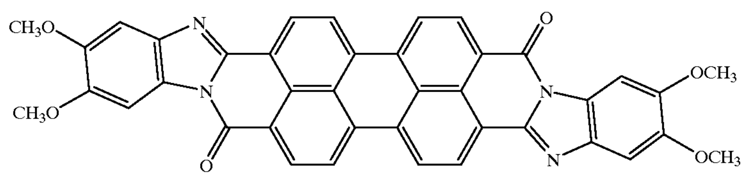
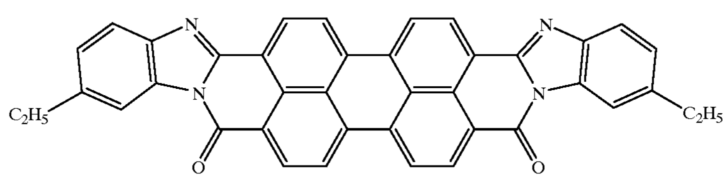
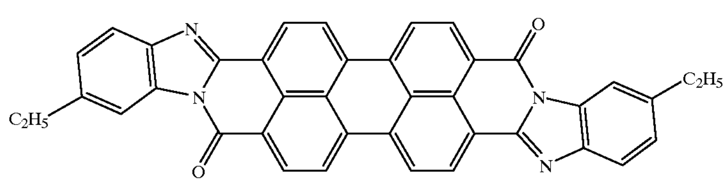
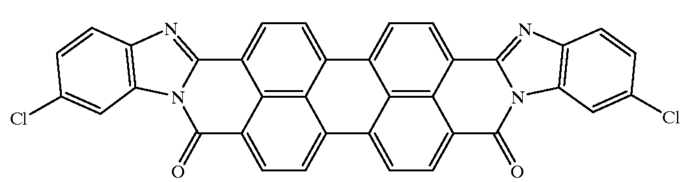
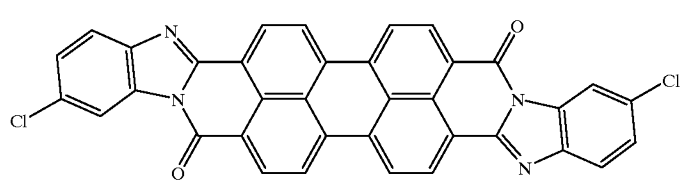

-continued
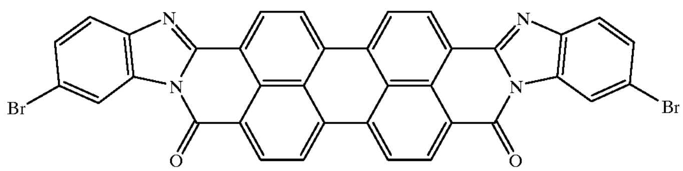
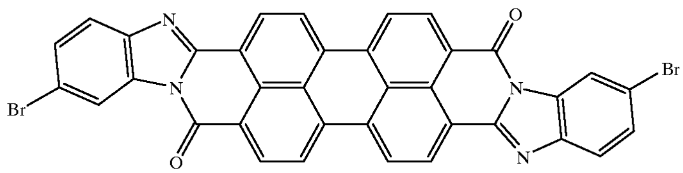
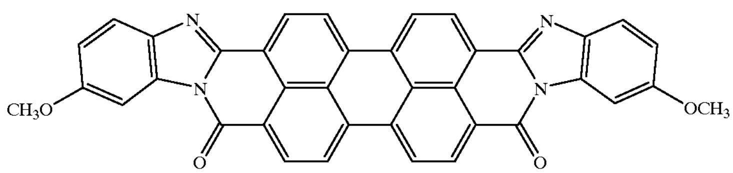
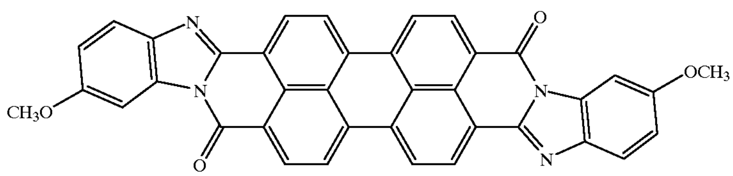
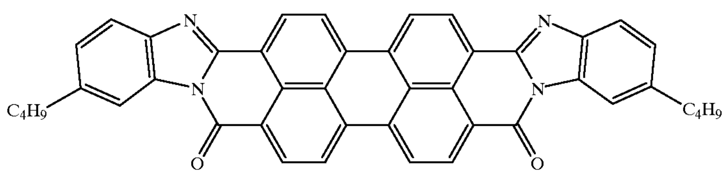
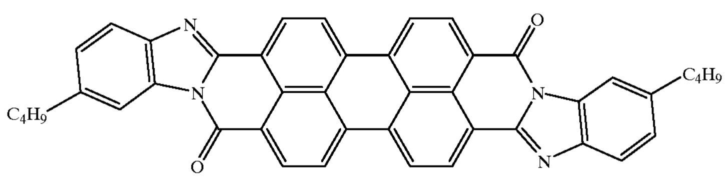
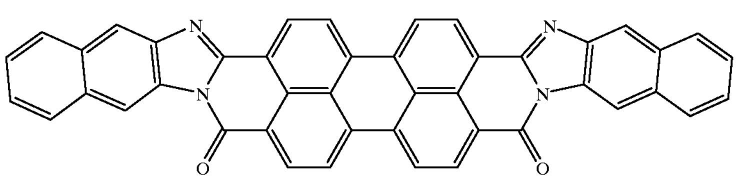
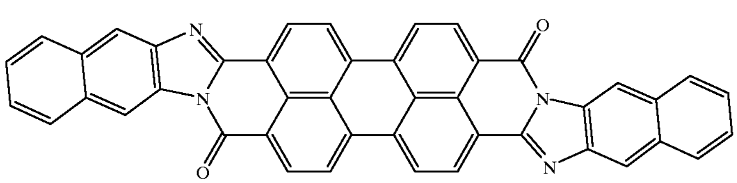
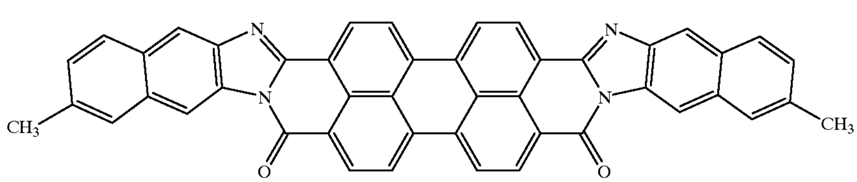

-continued
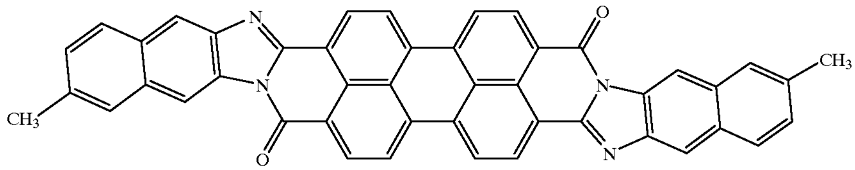
Examples of polycyclic quinone pigments are given bellow.
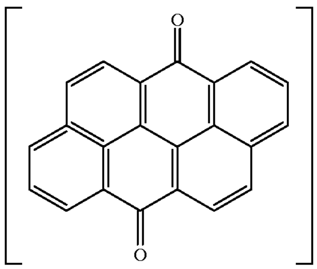
(X)n
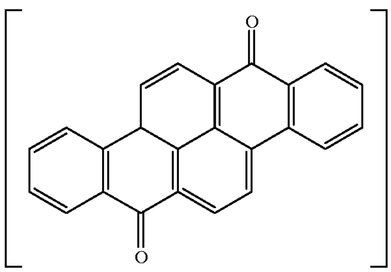
(X)n
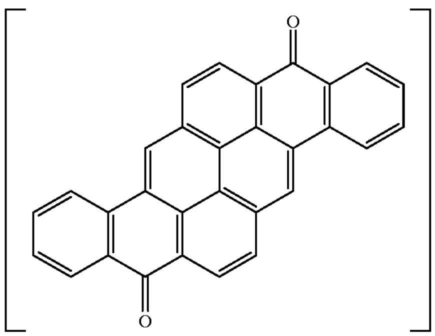
(X)n
X : a halogen atom, nitro cyano, an acyl group or carboxyl
*n* = an integer of 0 to 6
Examples of anthoanthrone pigments are given bellow.
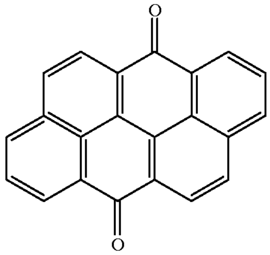
-continued
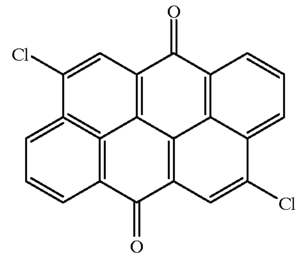
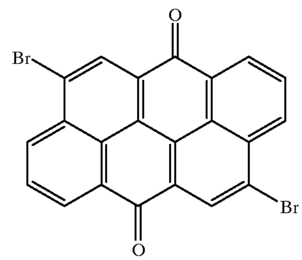
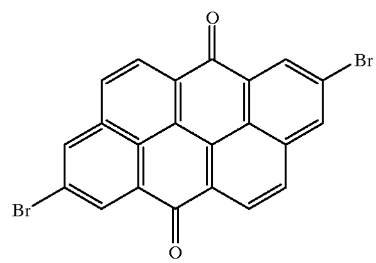
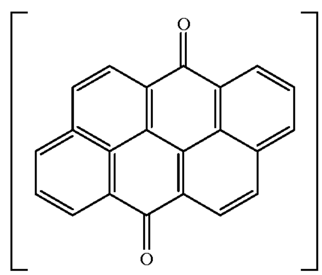
$(I)_3$
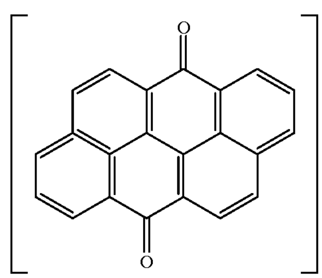
$(CN)_2$
Examples of dibenzpyrenequinone pigments are given bellow.

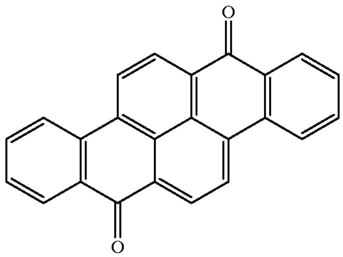
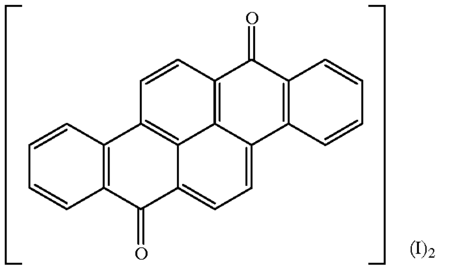
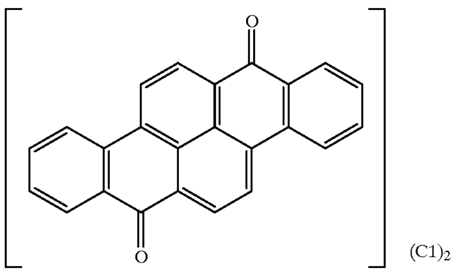
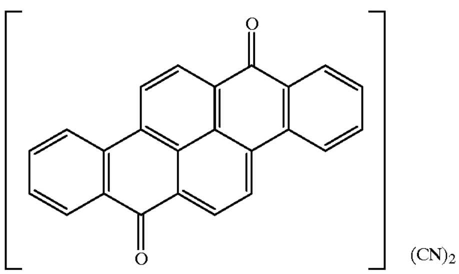
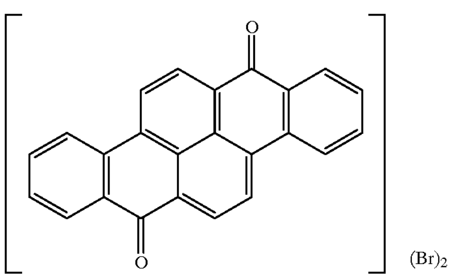
Examples of pyranthrone pigments are given bellow.
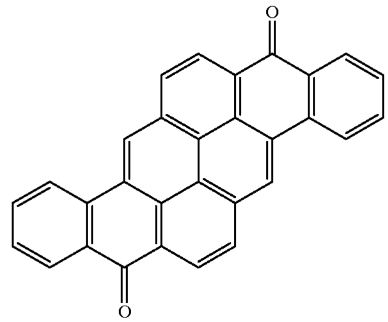
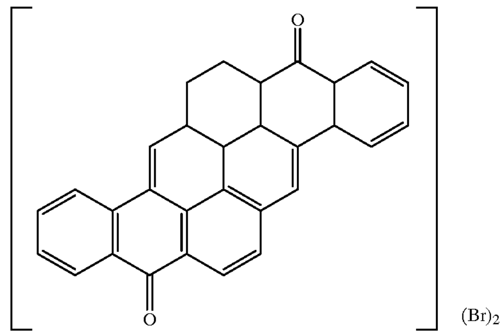
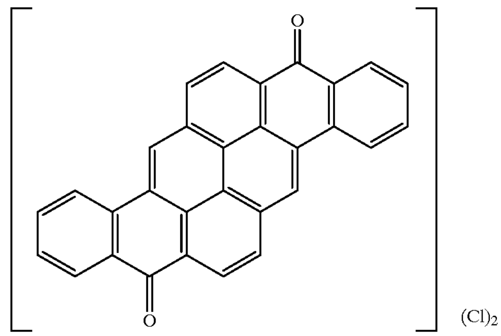
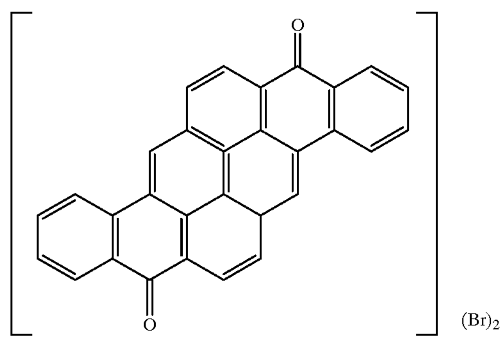
These pigments may be used individually or as a mixture of two or more.

The charge-generating layer is preferably 0.01 to 2.0 μm, more preferably 0.1 to 0.8 μm in thickness. A charge-generating layer of less than 0.01 μm is difficult to form evenly, and that of more than 2.0 μm tends to deteriorate the electrophotographic properties.

The binder resins that may be used in the charge-generating layer are not particularly limited, and may be various ones including known ones. Representative binder resins are thermosetting resins, such as polystyrene, polyvinyl chloride, polyvinyl acetate, vinyl chloride-vinyl acetate copolymer, polyvinyl acetal, alkyd resins, acrylic resins, polyacrylonitrile, polycarbonates, polyurethanes, epoxy resins, phenolic resins, polyamides, polyketones, polyacrylamides, butyral resins, polyesters, vinylidene chloride-vinyl chloride copolymer, methacrylic resins, polystyrene, styrene-butadiene copolymer, vinylidene chloride-acrylonitrile copolymer, vinyl chloride-vinyl acetate-maleic anhydride copolymer, silicone resins, silicone-alkyd resins, phenol-formaldehyde resins, styrene-alkyd resins, poly-N-vinylcarbazole, polyvinyl butyral, polyvinylformal, polysulfones, casein, gelatin, polyvinyl alcohol, ethyl cellulose, nitro cellulose, carboxy-methyl cellulose, vinylidene chloride-base polymer latex, acrylonitrile-butadiene copolymer, vinyltoluene-styrene copolymer, soybean oil-modified alkyd resins, nitrated polystyrene, polymethylstyrene, polyisoprene, polythiocarbonates, polyallylates, polyhaloallylates, polyallyl ethers, polyvinyl acrylate, melamine resins, polyether resins, benzoguanamine resin, epoxy acrylate resins, urethane acrylate resins and polyester acrylates.

The polycarbonate of the present invention may also be used as the binder resins in the charge-generating layer.

The charge-transfer layer may be produced by forming a layer wherein a charge-transfer substance is fixed by a binder resin on an underlying layer, for example, a charge-generating layer.

The charge-transfer layer can be produced by various methods including known methods, preferably by coating an underlying layer with a coating fluid prepared by dispersing or dissolving a charge-transfer substance and the polycarbonate of the present invention in an appropriate solvent, followed by drying. In the charge-transfer layer, the weight ratios of the charge-transfer substance to the polycarbonate of the present invention is preferably from 20:80 to 80:20, more preferably from 30:70 to 70:30.

In the charge-transfer layer, the polycarbonates of the present invention may be used individually or as a mixture of two or more. Other resins, such as the above-described binder resins for the charge-generating layer, may also be used along with the polycarbonate of the present invention, as far as the attainment of the object of the present invention is not hindered.

The charge-transfer substances that may be used are various ones including known ones. Typical examples are carbazole compounds, indole compounds, imidazole compounds, oxazole compounds, pyrazole compounds, oxadiazole compounds, pyrazoline compounds, thiadiazole compounds, aniline compounds, hydrazone compounds, aromatic amine compounds, aliphatic amine compounds, stilbene compounds, fluorenone compounds, quinone compounds, quinodimethane compounds, thiazole compounds, triazole compounds, imidazolone compounds, imidazolidine compounds, bisimidazolidine compounds, oxazolone compounds, benzothiazole compounds, benzimidazole compounds, quinazoline compounds, benzofuran compounds, acridine compounds, phenazine compounds, poly-N-vinylcarbazole, polyvinylpyrene, polyvinylanthracene, polyvinylacridine, poly-9-vinylphenylanthracene, pyrene-formaldehyde resin, ethylcarbazole resins, and polymers containing these structures in the main chain or side chains. Preferred are those represented by the following general formulae:

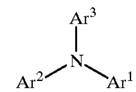

wherein $Ar^1$, $Ar^2$ and $Ar^3$ are each a substituted or non-substituted alkyl group of 1 to 10 carbon atoms, a substituted or non-substituted aralkyl group of 7 to 13 carbon atoms, a substituted or non-substituted aryl group of 6 to 12 carbon atoms, a polycyclic hydrocarbon group, a substituted or non-substituted condensed-polycyclic hydrocarbon group, a heterocyclic group, a polycyclic-heterocyclic group or a condensed-polycyclic-heterocyclic group, $Ar^1$ and $Ar^2$, $Ar^2$ and $Ar^3$, and $Ar^3$ and $Ar^1$ may optionally be linked to each other to form a ring, respectively.

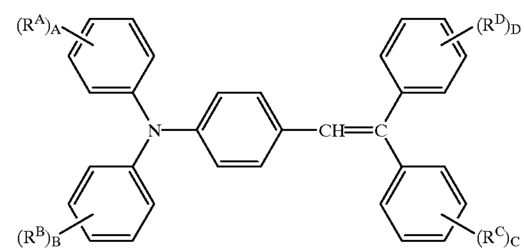

wherein $R^A$, $R^B$, $R^C$ and $R^D$ are each cyano, a halogen atom, carboxyl, an acyl group, hydroxyl, nitro, amino, an alkylamino group, an arylamino group, an aralkylamino group, a substituted or non-substituted alkyl group of 1 to 10 carbon atoms, a substituted or non-substituted aralkyl group of 7 to 13 carbon atoms, a substituted or non-substituted aryl group of 6 to 12 carbon atoms, a polycyclic hydrocarbon group, a substituted or non-substituted condensed-polycyclic hydrocarbon group, a heterocyclic group, a polycyclic-heterocyclic group or a condensed-polycyclic-heterocyclic group, and A, B, C and D are each an integer of 0 to 5.

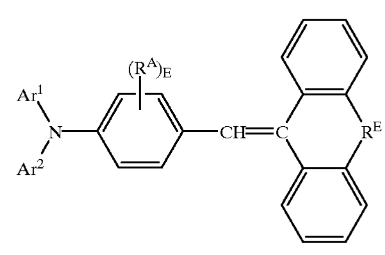

wherein $Ar^1$ and $Ar^2$ are each hydrogen, a substituted or non-substituted alkyl group of 1 to 10 carbon atoms, a substituted or non-substituted aralkyl group of 7 to 13 carbon atoms, a substituted or non-substituted aryl group of 6 to 12 carbon atoms, a polycyclic hydrocarbon group, a substituted or non-substituted condensed-polycyclic hydrocarbon group, a heterocyclic group, a polycyclic-heterocyclic group or a condensed-polycyclic-heterocyclic group, $Ar^1$ and $Ar^2$ may optionally be linked to form a ring, $R^A$ is cyano, a halogen atom, carboxyl, an acyl group, hydroxyl, nitro, amino, an alkylamino group, an arylamino group, an aralkylamino group, a substituted or non-substituted alkyl group of 1 to 10 carbon atoms, a substituted or non-substituted aralkyl group of 7 to 13 carbon atoms, a substituted or non-substituted aryl group of 6 to 12 carbon atoms, a polycyclic hydrocarbon group, a substituted or non-substituted condensed-polycyclic hydrocarbon group, a heterocyclic group, a polycyclic-heterocyclic group or a condensed-polycyclic-heterocyclic group, $R^E$ is ethylene or ethenylene, and E is an integer of 0 to 4.

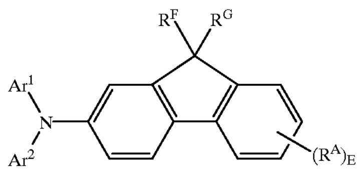

wherein $Ar^1$ and $Ar^2$ are each hydrogen, a substituted or non-substituted alkyl group of 1 to 10 carbon atoms, a substituted or non-substituted aralkyl group of 7 to 13 carbon atoms, a substituted or non-substituted aryl group of 6 to 12 carbon atoms, a polycyclic hydrocarbon group, a substituted or non-substituted condensed-polycyclic hydrocarbon group, a heterocyclic group, a polycyclic-heterocyclic group or a condensed-polycyclic-heterocyclic group, $Ar^1$ and $Ar^2$ may optionally be linked to form a ring, $R^A$ is cyano, a halogen atom, carboxyl, an acyl group, hydroxyl, nitro, amino, an alkylamino group, an arylamino group, an aralkylamino group, a substituted or non-substituted alkyl group of 1 to 10 carbon atoms, a substituted or non-substituted aralkyl group of 7 to 13 carbon atoms, a substituted or non-substituted aryl group of 6 to 12 carbon atoms, a polycyclic hydrocarbon group, a substituted or non-substituted condensed-polycyclic hydrocarbon group, a heterocyclic group, a polycyclic-heterocyclic group or a condensed-polycyclic-heterocyclic group, $R^F$ and $R^G$ are each hydrogen, an alkyl group of 1 to 6 carbon atoms or a halogen atom, and E is an integer of 0 to 4.

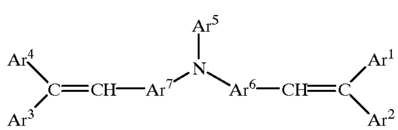

wherein $Ar^1$, $Ar^2$, $Ar^3$, $Ar^4$ and $Ar^5$ are each hydrogen, a substituted or non-substituted alkyl group of 1 to 10 carbon atoms, a substituted or non-substituted aralkyl group of 7 to 13 carbon atoms, a substituted or non-substituted aryl group of 6 to 12 carbon atoms, a polycyclic hydrocarbon group, a substituted or non-substituted condensed-polycyclic hydrocarbon group, a heterocyclic group, a polycyclic-heterocyclic group or a condensed-polycyclic-heterocyclic group, $Ar^6$ and $Ar^7$ are each a substituted or non-substituted alkylene group of 1 to 6 carbon atoms, or a divalent residue of a substituted or non-substituted aryl compound of 6 to 12 carbon atoms, a polycyclic hydrocarbon, a substituted or non-substituted condensed-polycyclic hydrocarbon, a heterocyclic compound, a polycyclic-heterocyclic compound or a condensed-polycyclic-heterocyclic compound, $Ar^1$ and $Ar^2$, and, $Ar^3$ and $Ar^4$ may optionally be linked to form a ring, respectively.

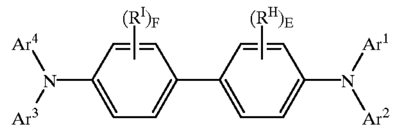

wherein $Ar^1$, $Ar^2$, $Ar^3$ and $Ar^4$ are each hydrogen, a substituted or non-substituted alkyl group of 1 to 10 carbon atoms, a substituted or non-substituted aralkyl group of 7 to 13 carbon atoms, a substituted or non-substituted aryl group of 6 to 12 carbon atoms, a polycyclic hydrocarbon group, a substituted or non-substituted condensed-polycyclic hydrocarbon group, a heterocyclic group, a polycyclic-heterocyclic group or a condensed-polycyclic-heterocyclic group, $Ar^1$ and $Ar^2$, and, $Ar^3$ and $Ar^4$ may optionally be linked to form a ring, respectively, $R^H$ and $R^I$ are each cyano, a halogen atom, carboxyl, an acyl group, hydroxyl, nitro, amino, an alkylamino group, an arylamino group, an aralkylamino group, a substituted or non-substituted alkyl group of 1 to 10 carbon atoms, a substituted or non-substituted aralkyl group of 7 to 13 carbon atoms, a substituted or non-substituted aryl group of 6 to 12 carbon atoms, a polycyclic hydrocarbon group, a substituted or non-substituted condensed-polycyclic hydrocarbon group, a heterocyclic group, a polycyclic-heterocyclic group or a condensed-polycyclic-heterocyclic group, E and F are each an integer of 0 to 4.

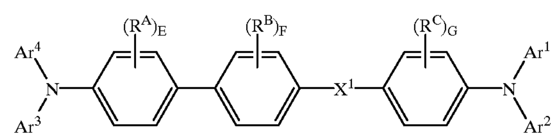

wherein $Ar^1$, $Ar^2$, $Ar^3$ and $Ar^4$ are each hydrogen, a substituted or non-substituted alkyl group of 1 to 10 carbon atoms, a substituted or non-substituted aralkyl group of 7 to 13 carbon atoms, a substituted or non-substituted aryl group of 6 to 12 carbon atoms, a polycyclic hydrocarbon group, a substituted or non-substituted condensed-polycyclic hydrocarbon group, a heterocyclic group, a polycyclic-heterocyclic group or a condensed-polycyclic-heterocyclic group, $Ar^1$ and $Ar^2$, and, $Ar^3$ and $Ar^4$ may optionally be linked to form a ring, respectively, $R^A$, $R^B$ and $R^C$ are each cyano, a halogen atom, carboxyl, an acyl group, hydroxyl, nitro, amino, an alkylamino group, an arylamino group, an aralkylamino group, a substituted or non-substituted alkyl group of 1 to 10 carbon atoms, a substituted or non-substituted aralkyl group of 7 to 13 carbon atoms, a substituted or non-substituted aryl group of 6 to 12 carbon atoms, a polycyclic hydrocarbon group, a substituted or non-substituted condensed-polycyclic hydrocarbon group, a heterocyclic group, a polycyclic-heterocyclic group or a condensed-polycyclic-heterocyclic group, E, F and G are each an integer of 0 to 4, $X^1$ is —O—, —S—, —Se—, —Te—, —$CR^JR^K$—, —$SiR^JR^K$—, —$NR^J$— or —$PR^J$— (wherein $R^J$ and $R^K$ are each hydrogen, a halogen atom, an alkylamino group, an arylamino group, an aralkylamino group, a substituted or non-substituted alkyl group of 1 to 10 carbon atoms, a substituted or non-substituted aralkyl group of 7 to 13 carbon atoms, a substituted or non-substituted aryl group of 6 to 12 carbon atoms, a polycyclic hydrocarbon group, a substituted or non-substituted condensed-polycyclic hydrocarbon group, a heterocyclic group, a polycyclic-heterocyclic group or a condensed-polycyclicheterocyclic group).

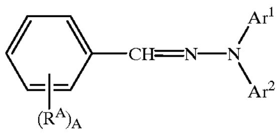

wherein $Ar^1$ and $Ar^2$ are each hydrogen, a substituted or non-substituted alkyl group of 1 to 10 carbon atoms, a substituted or non-substituted aralkyl group of 7 to 13 carbon atoms, a substituted or non-substituted aryl group of 6 to 12 carbon atoms, a polycyclic hydrocarbon group, a substituted or non-substituted condensed-polycyclic hydrocarbon group, a heterocyclic group, a polycyclic-heterocyclic group or a condensed-polycyclic-heterocyclic group, $Ar^1$ and $Ar^2$ may optionally be linked to form a ring, $R^A$ is cyano, a halogen atom, carboxyl, an acyl group, hydroxyl, nitro, amino, an alkylamino group, an arylamino group, an aralkylamino group, a substituted or non-substituted alkyl group of 1 to 10 carbon atoms, a substituted or non-substituted aralkyl group of 7 to 13 carbon atoms, a substituted or non-substituted aryl group of 6 to 12 carbon atoms, a polycyclic hydrocarbon group, a substituted or non-substituted condensed-polycyclic hydrocarbon group, a heterocyclic group, a polycyclic-heterocyclic group or a condensed-polycyclic-heterocyclic group, and A is an integer of 0 to 5.

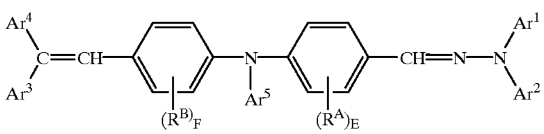

wherein $Ar^1$, $Ar^2$, $Ar^3$, $Ar^4$ and $Ar^5$ are each hydrogen, a substituted or non-substituted alkyl group of 1 to 10 carbon atoms, a substituted or non-substituted aralkyl group of 7 to 13 carbon atoms, a substituted or non-substituted aryl group of 6 to 12 carbon atoms, a polycyclic hydrocarbon group, a substituted or non-substituted condensed-polycyclic hydrocarbon group, a heterocyclic group, a polycyclic-heterocyclic group or a condensed-polycyclic-heterocyclic group, $R^A$ and $R^B$ are each cyano, a halogen atom, carboxyl, an acyl group, hydroxyl, nitro, amino, an alkylamino group, an arylamino group, an aralkylamino group, a substituted or non-substituted alkyl group of 1 to 10 carbon atoms, a substituted or non-substituted aralkyl group of 7 to 13 carbon atoms, a substituted or non-substituted aryl group of 6 to 12 carbon atoms, a polycyclic hydrocarbon group, a substituted or non-substituted condensed-polycyclic hydrocarbon group, a heterocyclic group, a polycyclic-heterocyclic group or a condensed-polycyclic-heterocyclic group, $Ar^1$ and $Ar^2$, and, $Ar^3$ and $Ar^4$ may optionally be linked to form a ring, respectively, and F and E are each independently an integer of 0 to 4.

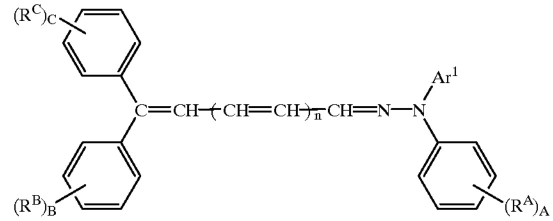

wherein $Ar^1$ is hydrogen, a substituted or non-substituted alkyl group of 1 to 10 carbon atoms, a substituted or non-substituted aralkyl group of 7 to 13 carbon atoms, a substituted or non-substituted aryl group of 6 to 12 carbon atoms, a polycyclic hydrocarbon group, a substituted or non-substituted condensed-polycyclic hydrocarbon group, a heterocyclic group, a polycyclic-heterocyclic group or a condensed-polycyclic-heterocyclic group, $R^A$, $R^B$ and $R^C$ are each cyano, a halogen atom, carboxyl, an acyl group, hydroxyl, nitro, amino, an alkylamino group, an arylamino group, an aralkylamino group, a substituted or non-substituted alkyl group of 1 to 10 carbon atoms, a substituted or non-substituted aralkyl group of 7 to 13 carbon atoms, a substituted or non-substituted aryl group of 6 to 12 carbon atoms, a polycyclic hydrocarbon group, a substituted or non-substituted condensed-polycyclic hydrocarbon group, a heterocyclic group, a polycyclic-heterocyclic group or a condensed-polycyclic-heterocyclic group, and n is 0 or 1, A, B and C are each an integer of 0 to 5.

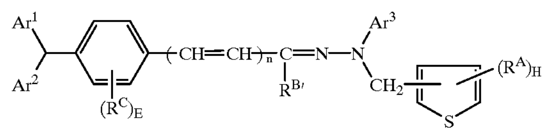

wherein $Ar^1$, $Ar^2$ and $Ar^3$ are each hydrogen, a substituted or non-substituted alkyl group of 1 to 10 carbon atoms, a substituted or non-substituted aralkyl group of 7 to 13 carbon atoms, a substituted or non-substituted aryl group of 6 to 12 carbon atoms, a polycyclic hydrocarbon group, a substituted or non-substituted condensed-polycyclic hydrocarbon group, a heterocyclic group, a polycyclic-heterocyclic group or a condensed-polycyclic-heterocyclic group, $R^A$ and $R^C$ are each cyano, a halogen atom, carboxyl, an acyl group, hydroxyl, nitro, amino, an alkylamino group, an arylamino group, an aralkylamino group, a substituted or non-substituted alkyl group of 1 to 10 carbon atoms, a substituted or non-substituted aralkyl group of 7 to 13 carbon atoms, a substituted or non-substituted aryl group of 6 to 12 carbon atoms, a polycyclic hydrocarbon group, a substituted or non-substituted condensed-polycyclic hydrocarbon group, a heterocyclic group, a polycyclic-heterocyclic group or a condensed-polycyclic-heterocyclic group, $R^{B'}$ is hydrogen, cyano, a halogen atom, carboxyl, an acyl group, hydroxyl, nitro, amino, an alkylamino group, an arylamino group, an aralkylamino group, a substituted or non-substituted alkyl group of 1 to 10 carbon atoms, a substituted or non-substituted aralkyl group of 7 to 13 carbon atoms, a substituted or non-substituted aryl group of 6 to 12 carbon atoms, a polycyclic hydrocarbon group, a substituted or non-substituted condensed-polycyclic hydrocarbon group, a heterocyclic group, a polycyclic-heterocyclic group or a condensed-polycyclic-heterocyclic group, n is 0 or 1, E is an integer of 0 to 4, and H is an integer of 0 to 3.

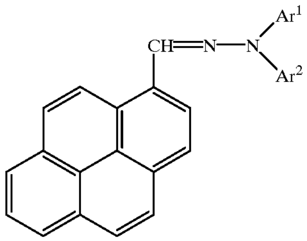

wherein $Ar^1$ and $Ar^2$ are each hydrogen, a substituted or non-substituted alkyl group of 1 to 10 carbon atoms, a substituted or non-substituted aralkyl group of 7 to 13 carbon atoms, a substituted or non-substituted aryl group of 6 to 12 carbon atoms, a polycyclic hydrocarbon group, a substituted or non-substituted condensed-polycyclic hydrocarbon group, a heterocyclic group, a polycyclic-heterocyclic group or a condensed-polycyclic-heterocyclic group, and $Ar^1$ and $Ar^2$ may optionally be linked to form a ring.

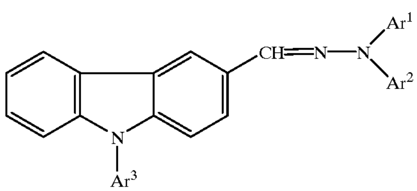

wherein $Ar^1$, $Ar^2$ and $Ar^3$ are each hydrogen, a substituted or non-substituted alkyl group of 1 to 10 carbon atoms, a substituted or non-substituted aralkyl group of 7 to 13 carbon atoms, a substituted or non-substituted aryl group of 6 to 12 carbon atoms, a polycyclic hydrocarbon group, a substituted or non-substituted condensed-polycyclic hydrocarbon group, a heterocyclic group, a polycyclic-heterocyclic group or a condensed-polycyclic-heterocyclic group, and $Ar^1$ and $Ar^2$ may optionally be linked to form a ring.

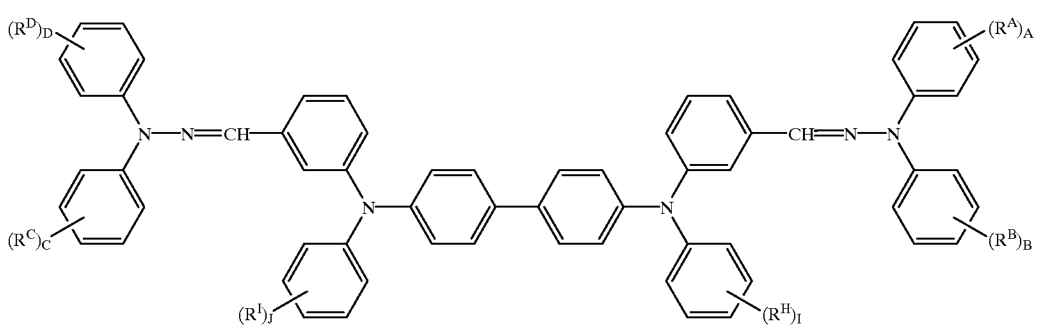

wherein $R^A$, $R^B$, $R^C$, $R^D$, $R^H$ and $R^I$ are each cyano, a halogen atom, carboxyl, an acyl group, hydroxyl, nitro, amino, an alkylamino group, an arylamino group, an aralkylamino group, a substituted or non-substituted alkyl group of 1 to 10 carbon atoms, a substituted or non-substituted aralkyl group of 7 to 13 carbon atoms, a substituted or non-substituted aryl group of 6 to 12 carbon atoms, a polycyclic hydrocarbon group, a substituted or non-substituted condensed-polycyclic hydrocarbon group, a heterocyclic group, a polycyclic-heterocyclic group or a condensed-polycyclic-heterocyclic group, and A, B, C, D, I and J are each an integer of 0 to 5.

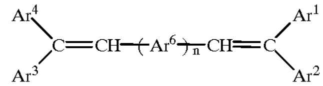

wherein $Ar^1$, $Ar^2$, $Ar^3$ and $Ar^4$ are each hydrogen, a substituted or non-substituted alkyl group of 1 to 10 carbon atoms, a substituted or non-substituted aralkyl group of 7 to 13 carbon atoms, a substituted or non-substituted aryl group of 6 to 12 carbon atoms, a polycyclic hydrocarbon group, a substituted or non-substituted condensed-polycyclic hydrocarbon group, a heterocyclic group, a polycyclic-heterocyclic group or a condensed-polycyclic-heterocyclic group, $Ar^6$ is a substituted or non-substituted alkylene group of 1 to 6 carbon atoms or a divalent residue of a substituted or non-substituted aryl compounds of 6 to 12 carbon atoms, a polycyclic hydrocarbon, a substituted or non-substituted condensed-polycyclic hydrocarbon, a heterocyclic compound, a polycyclic-heterocyclic compound or a condensed-polycyclic-heterocyclic compound, $Ar^1$ and $Ar^2$, and, $Ar^3$ and $Ar^4$ may optionally be linked to form a ring, respectively, and n is 0 or 1.

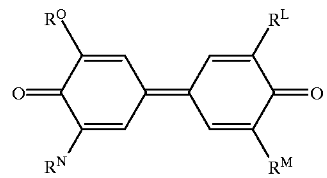

wherein $R^L$, $R^M$, $R^N$ and $R^O$ are each hydrogen, a substituted or non-substituted alkyl group of 1 to 10 carbon atoms, a substituted or non-substituted aralkyl group of 7 to 13 carbon atoms, a substituted or non-substituted aryl group of 6 to 12 carbon atoms, a polycyclic hydrocarbon group, a substituted or non-substituted condensed-polycyclic hydrocarbon group, a heterocyclic group, a polycyclic-heterocyclic group or a condensed-polycyclic-heterocyclic group.

Representative examples are the following compounds.
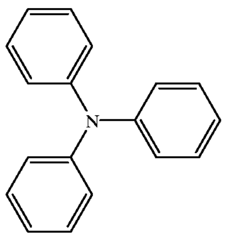
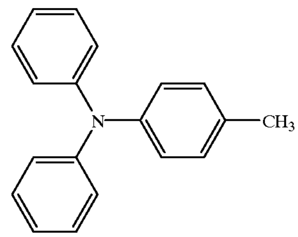
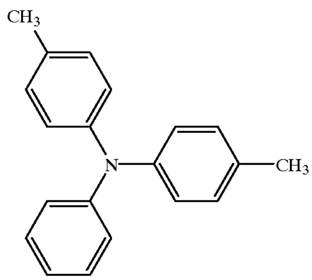
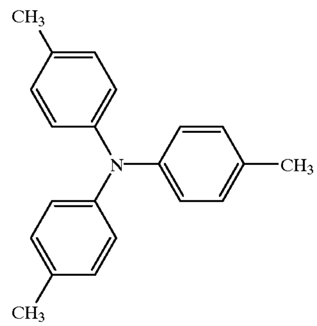
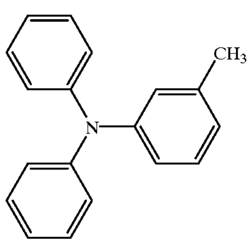
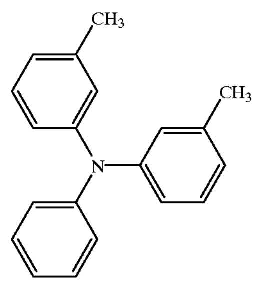
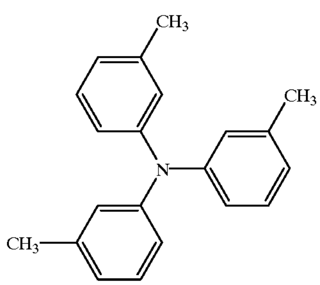
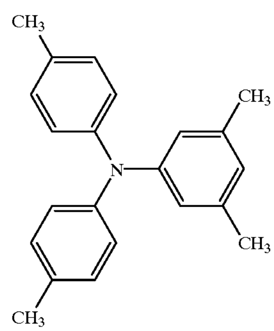
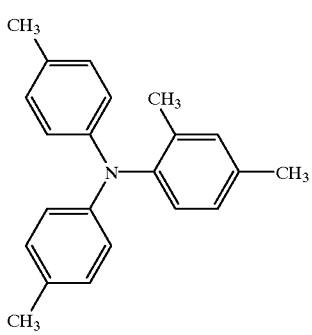
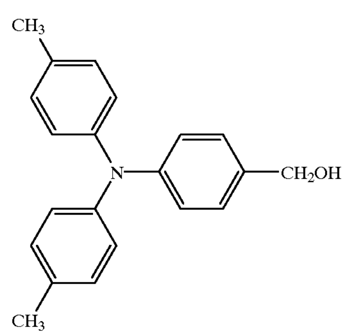

-continued
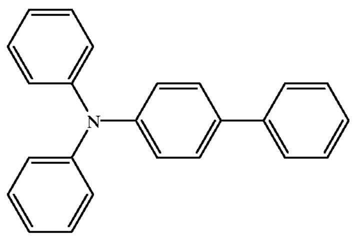
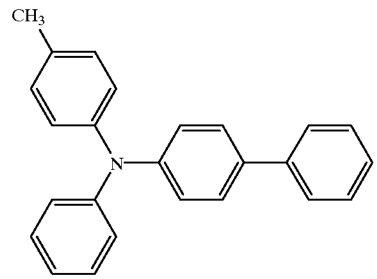
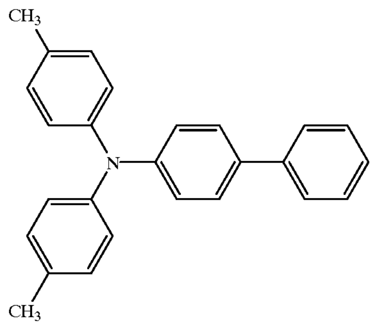
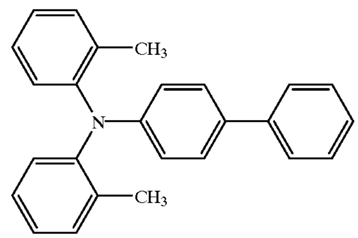
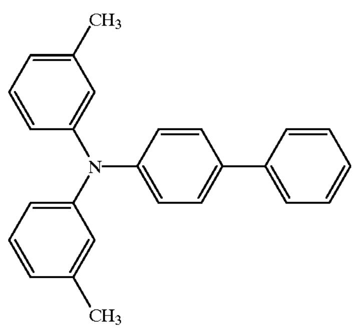
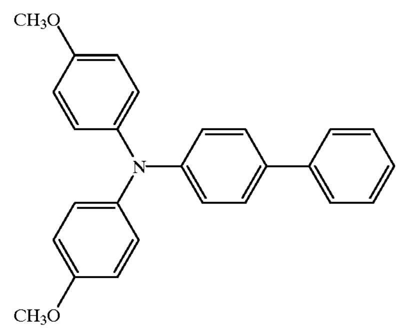
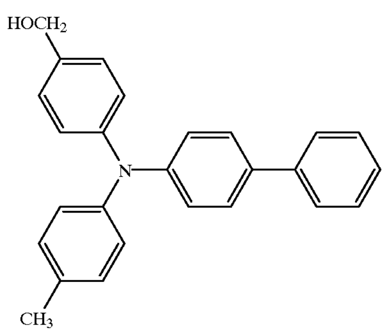
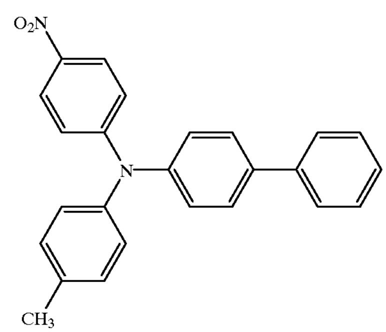
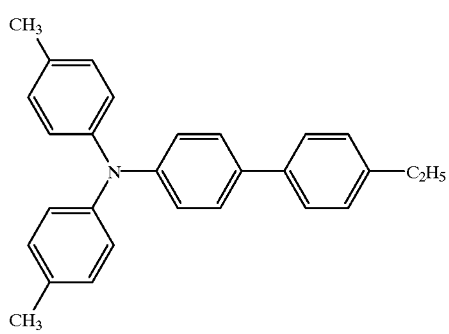
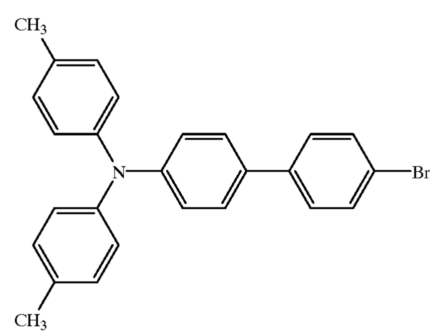

-continued
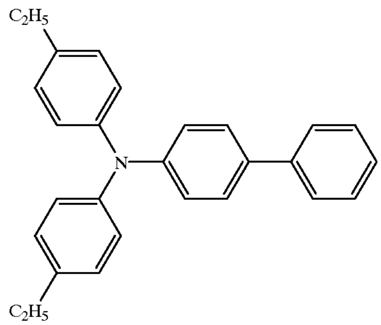
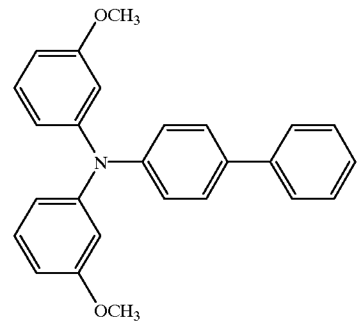
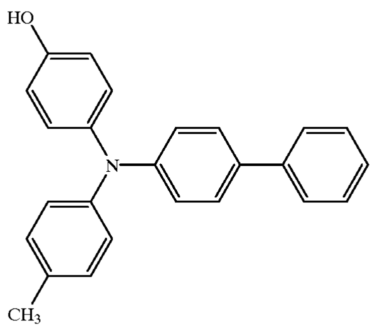
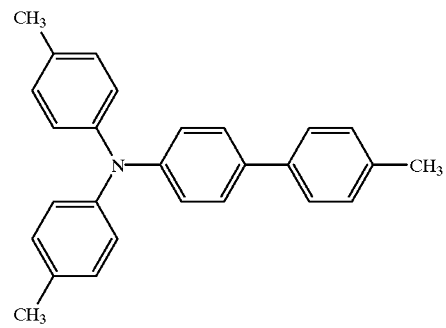
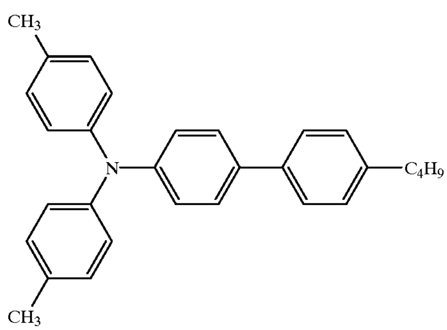
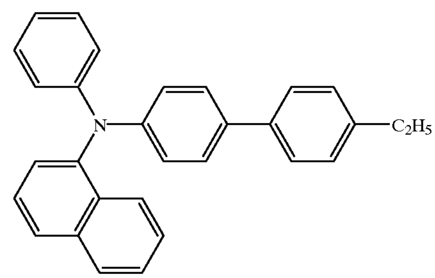
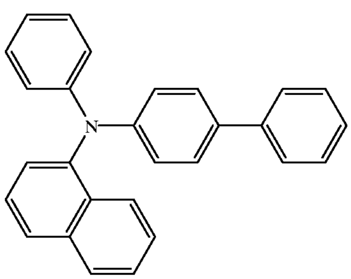
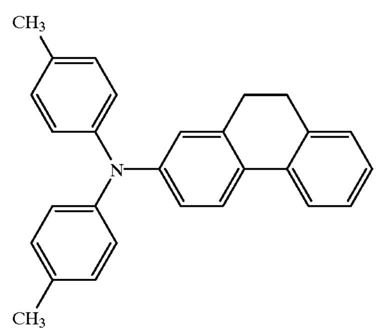
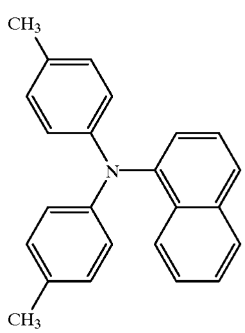
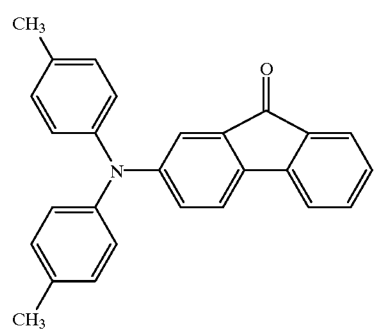

-continued
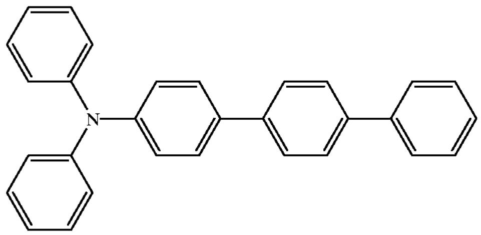
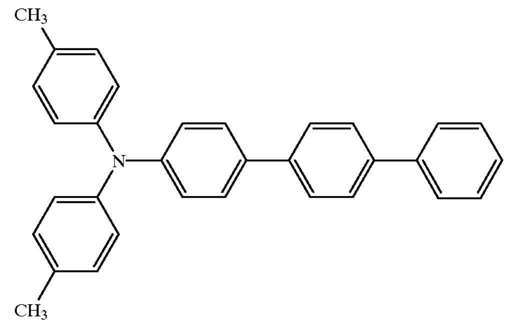
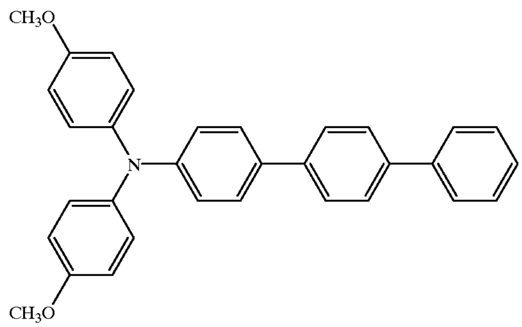
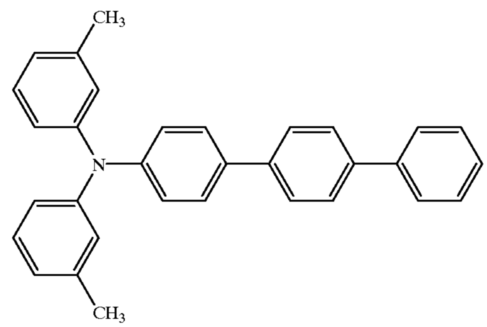
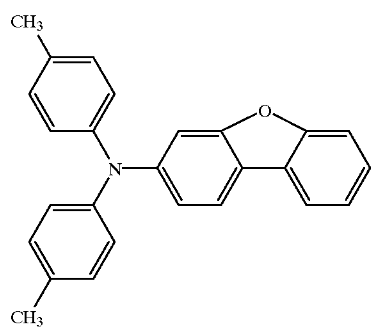
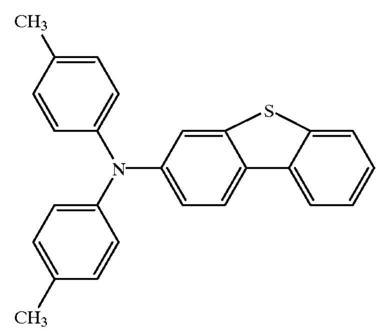
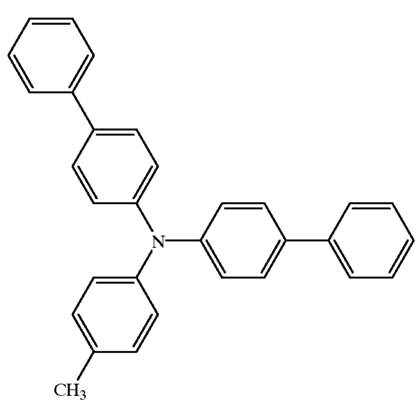
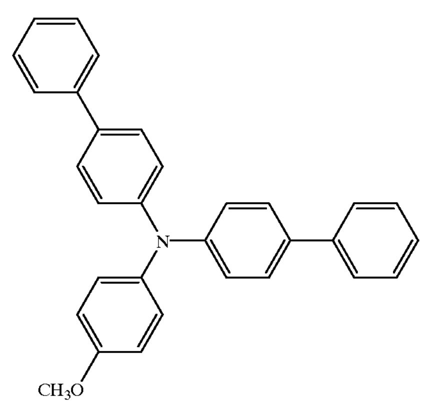
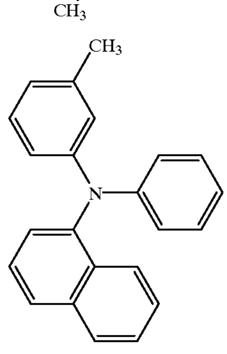
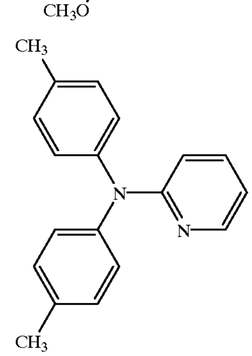

-continued
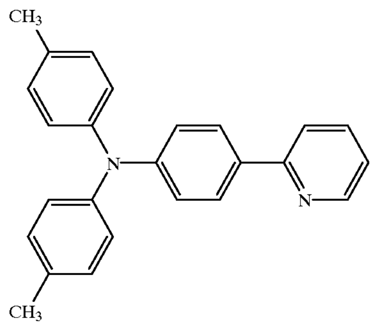
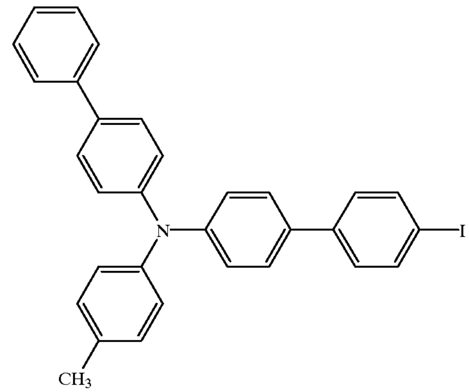
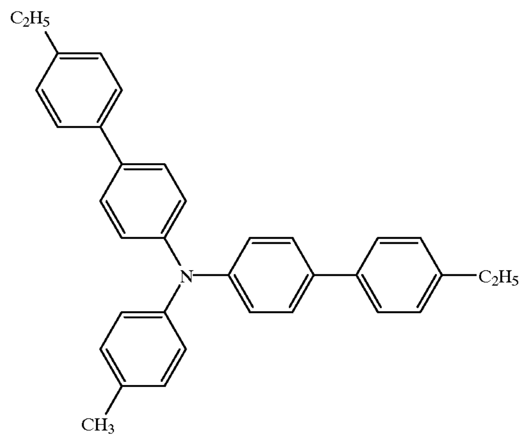
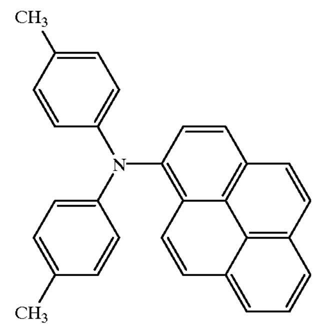
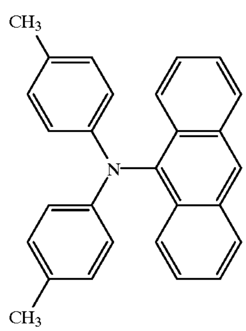
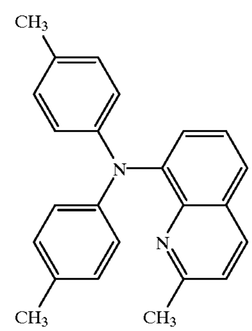
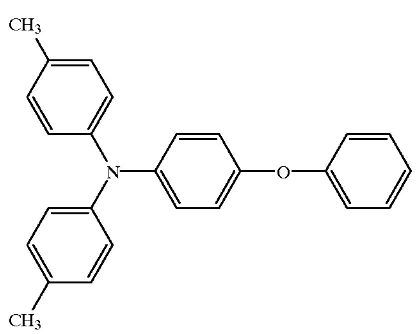
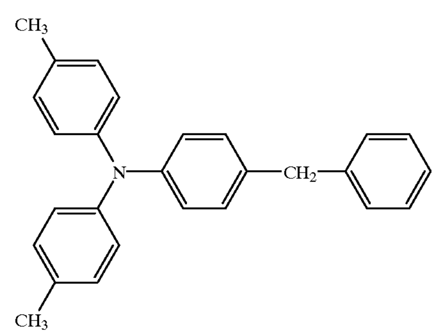

-continued
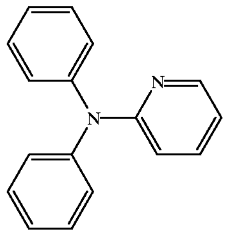
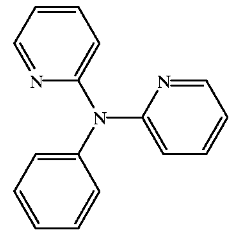
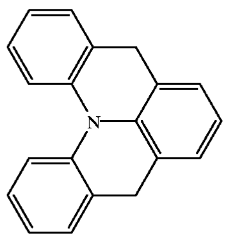
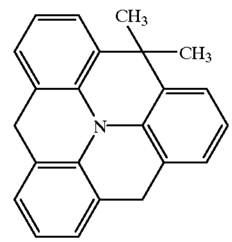
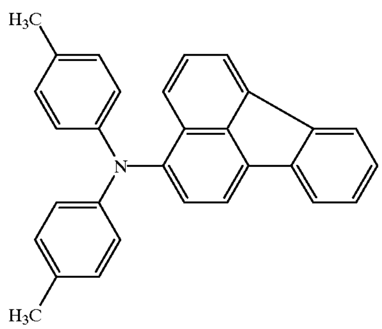
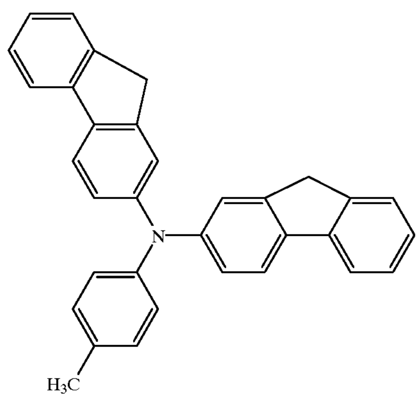
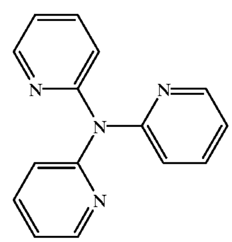
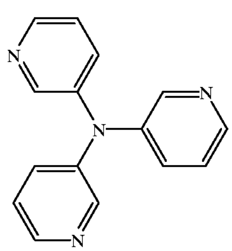
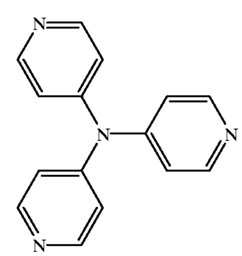
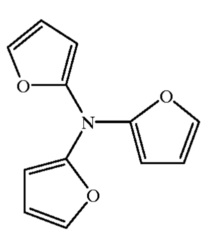
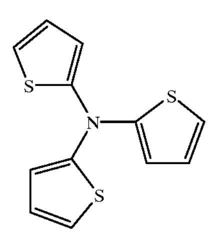

-continued
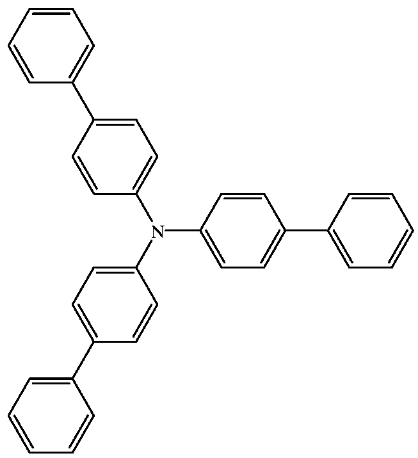
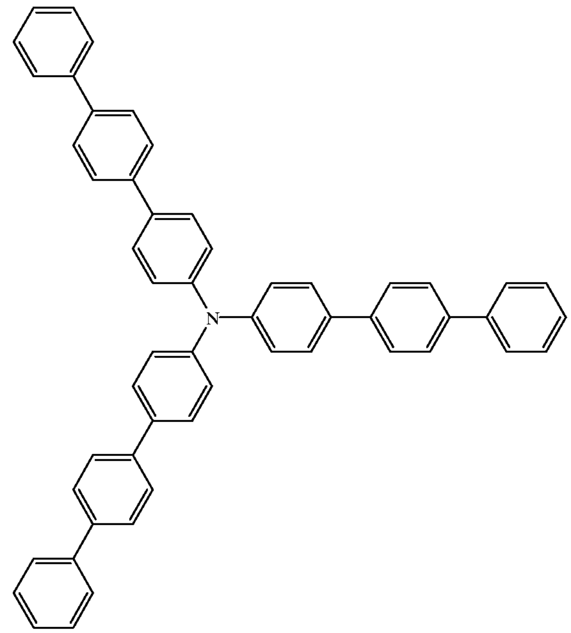
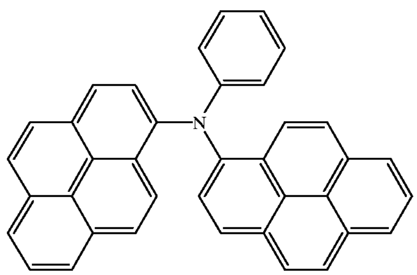
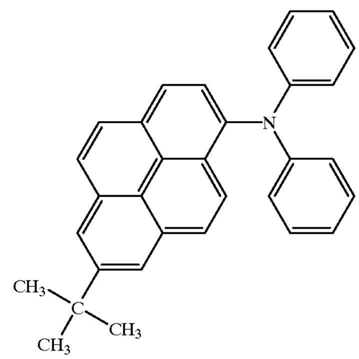
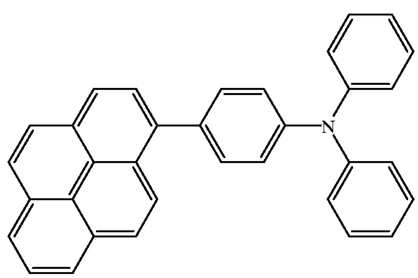
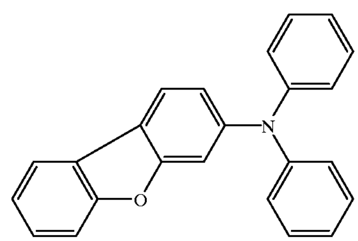
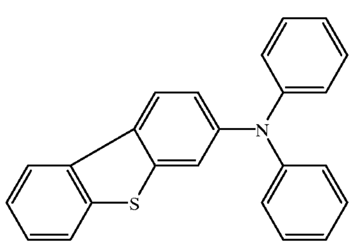
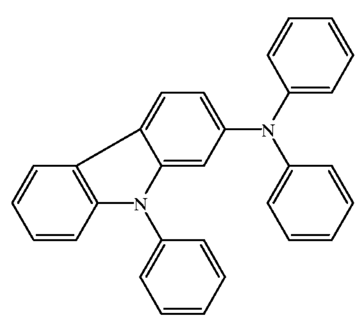

-continued
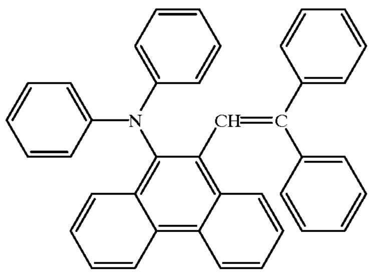
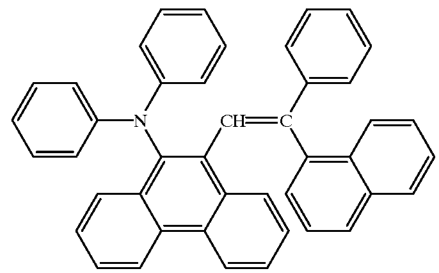
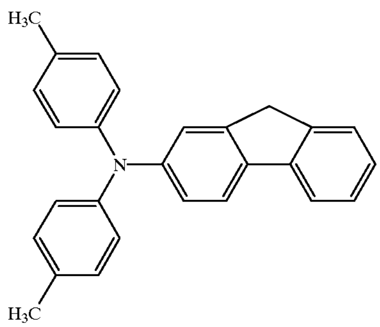
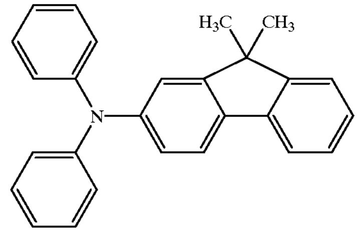
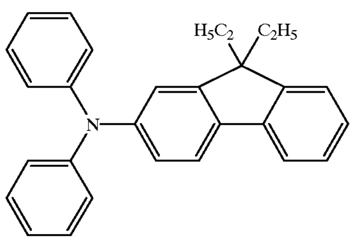
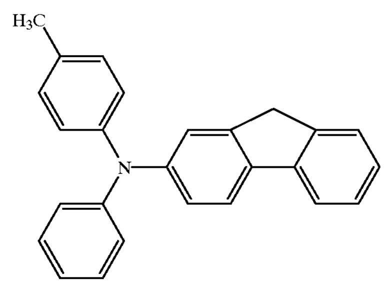
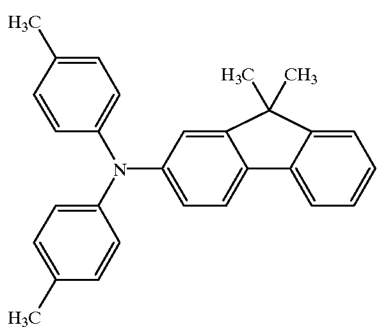
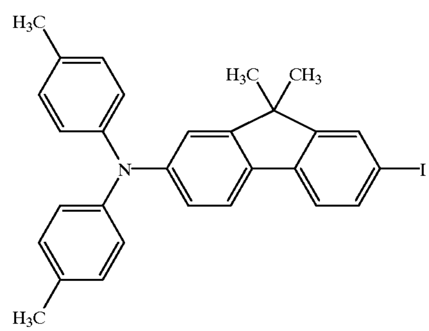
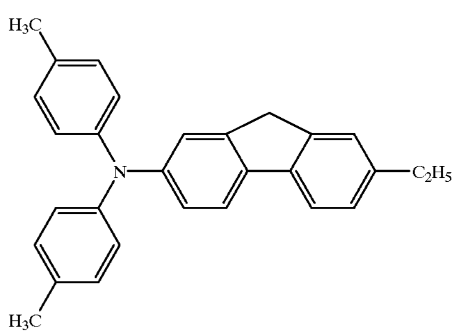
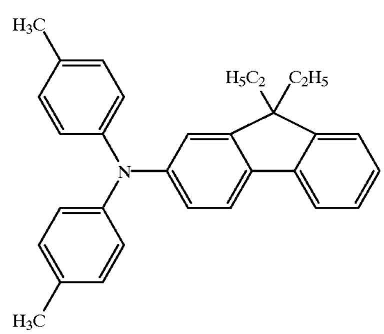

-continued
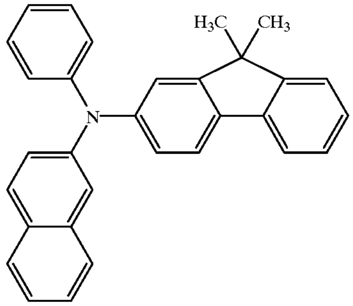
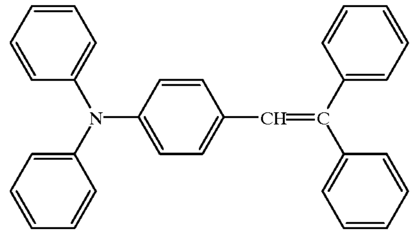
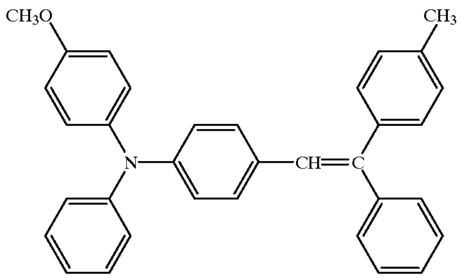
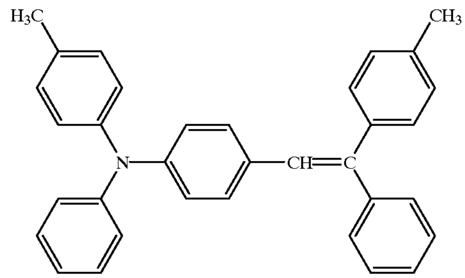
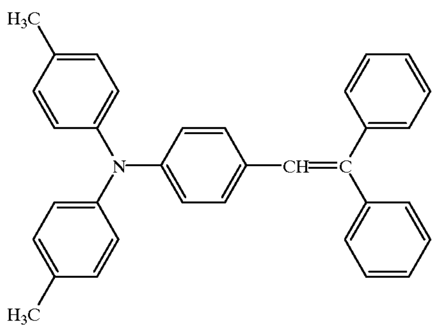
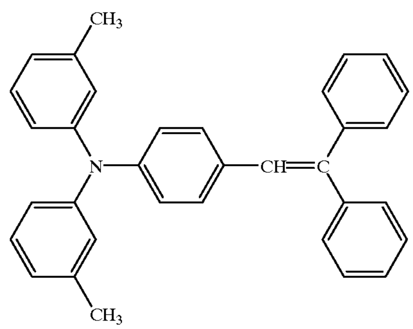
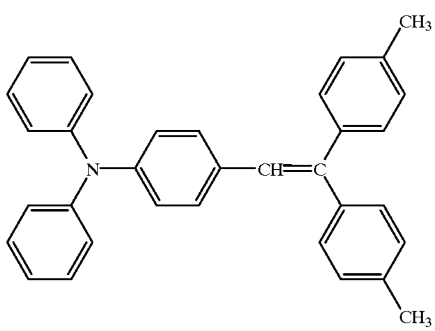
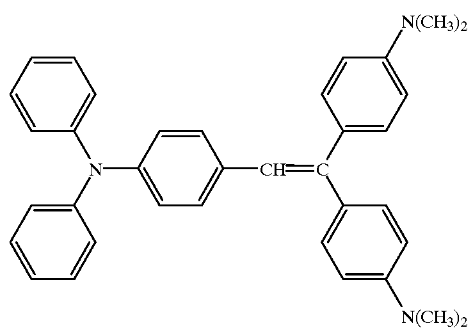
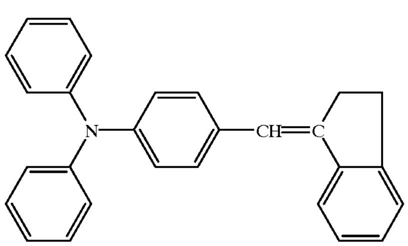
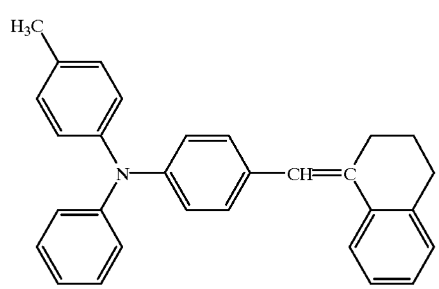

-continued
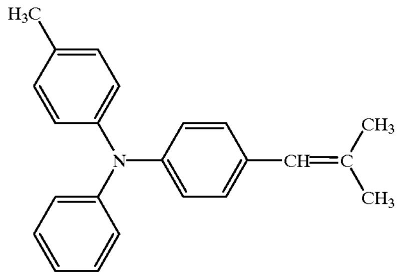
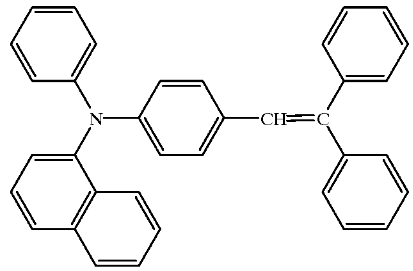
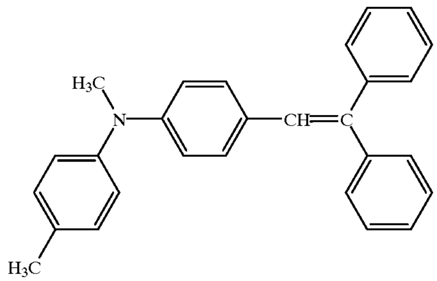
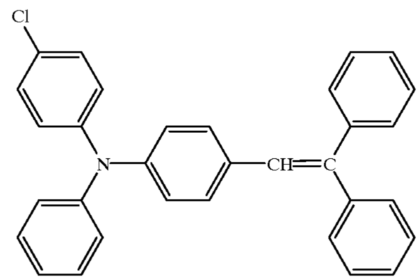
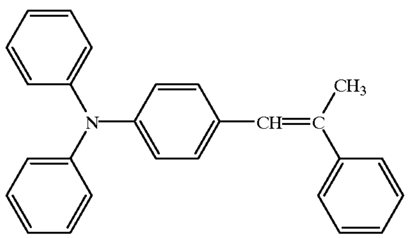
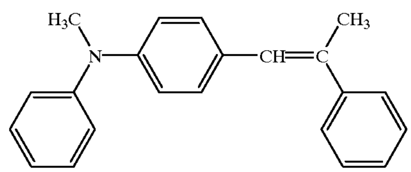
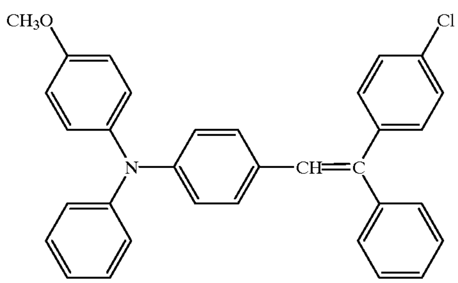
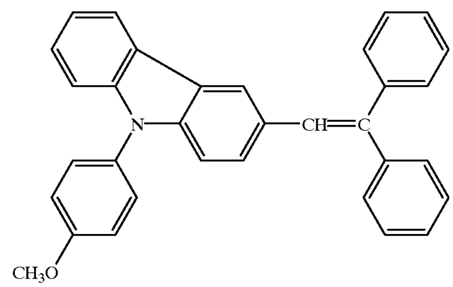
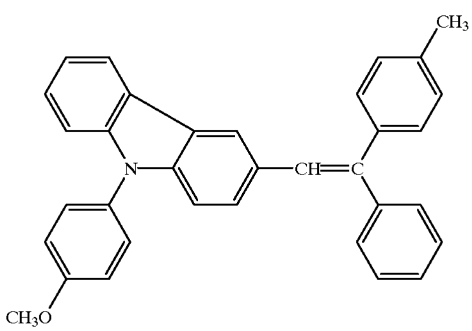
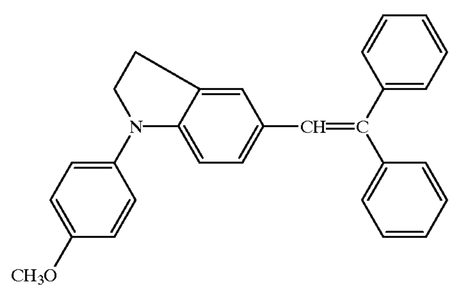
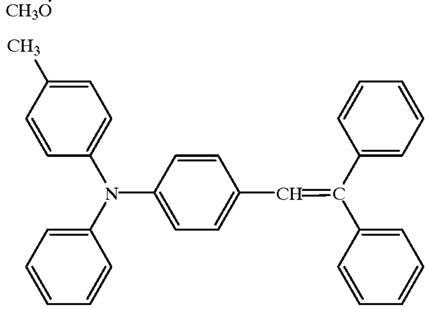
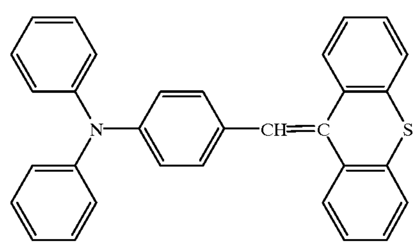

-continued
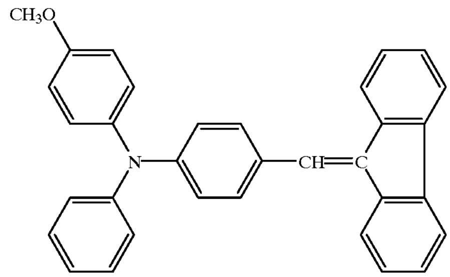
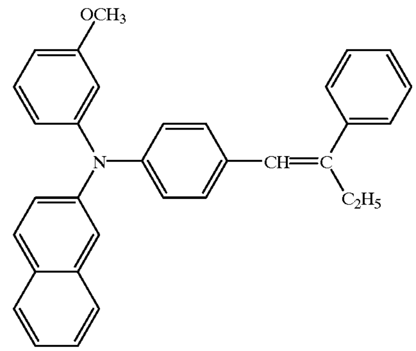
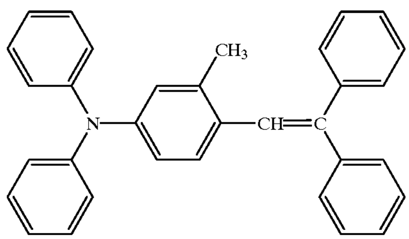
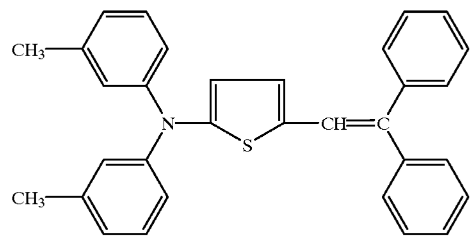
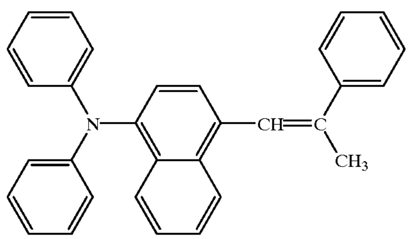
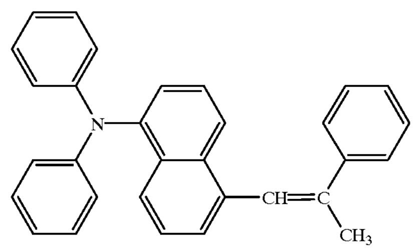
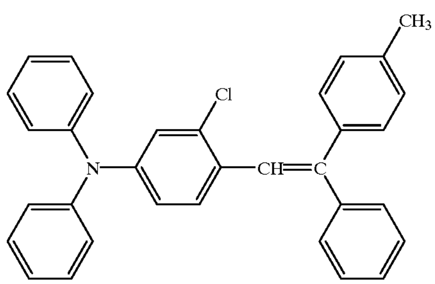
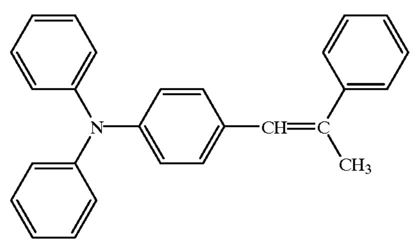
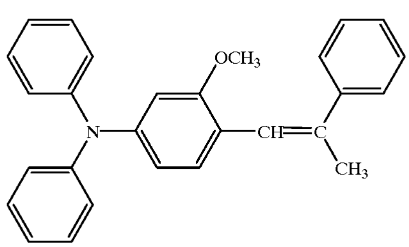
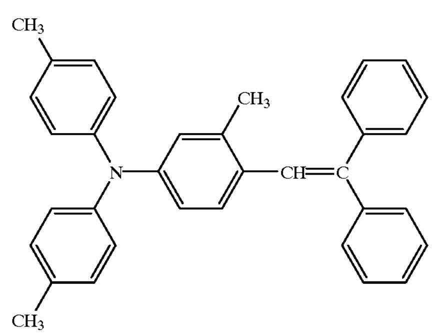
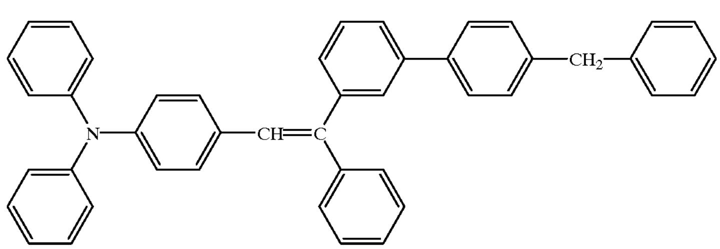

-continued
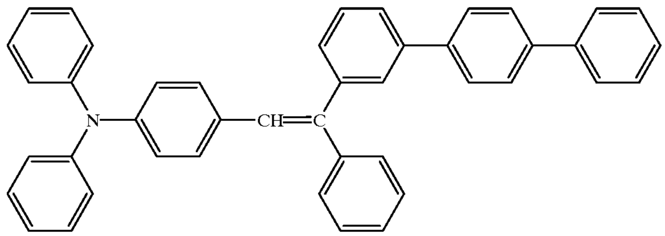
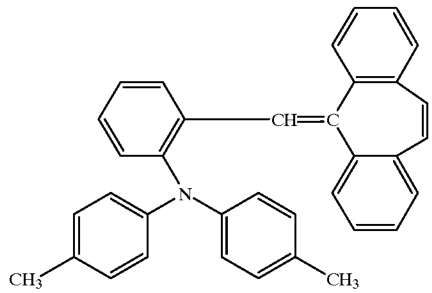
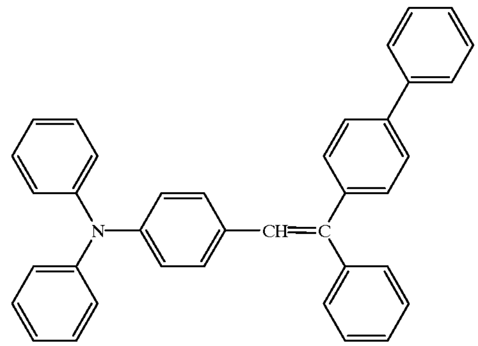
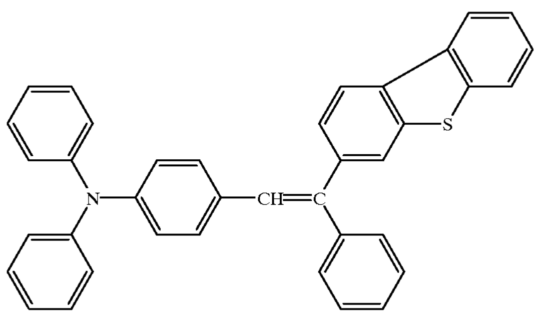
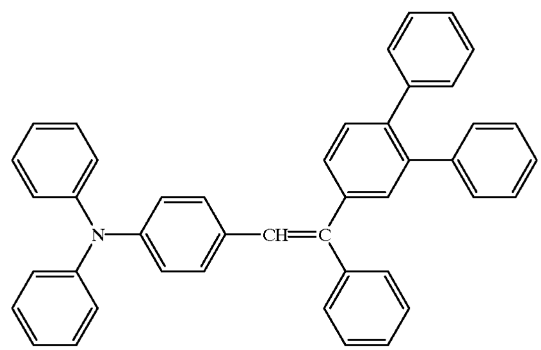
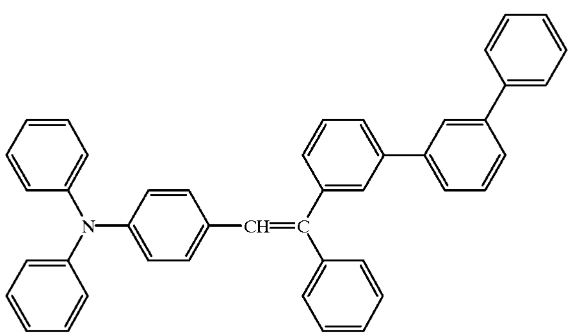
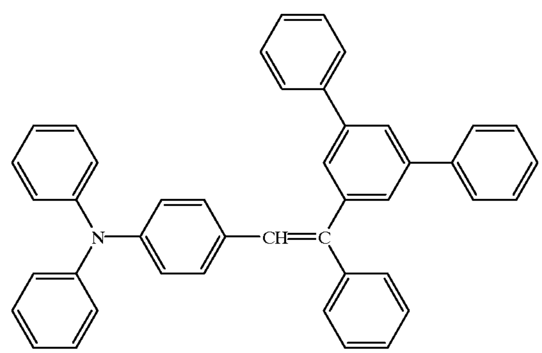
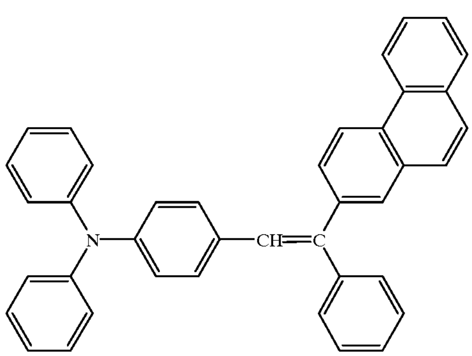

-continued
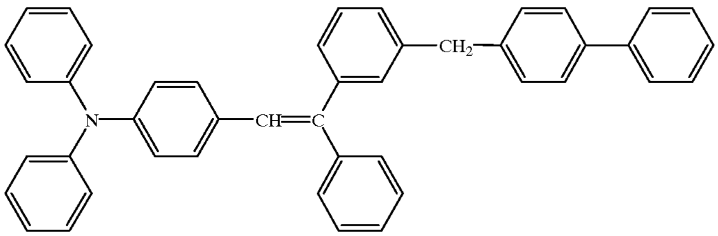
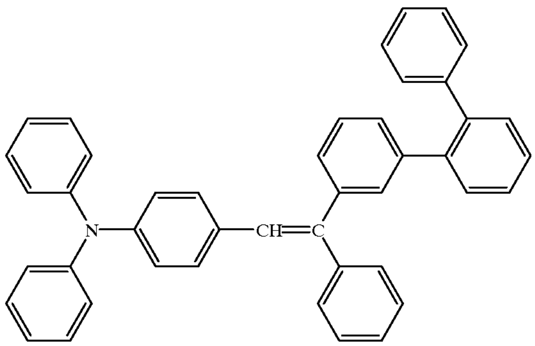
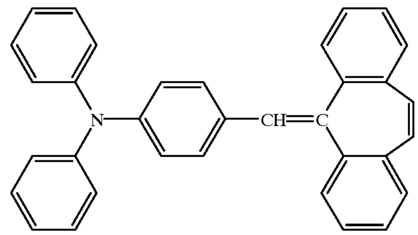
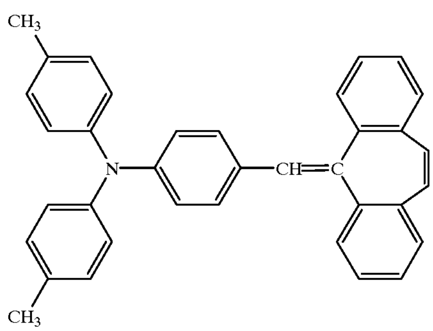
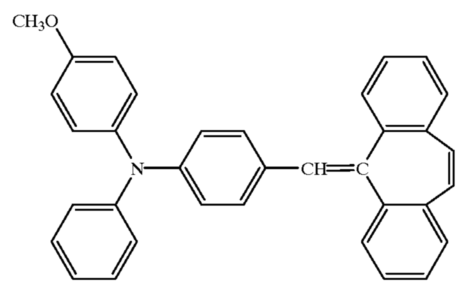
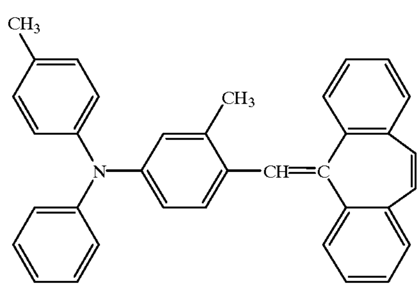
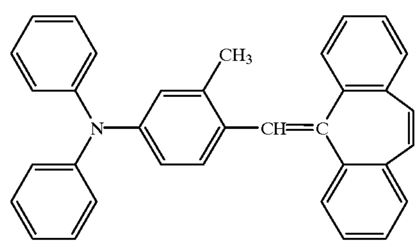
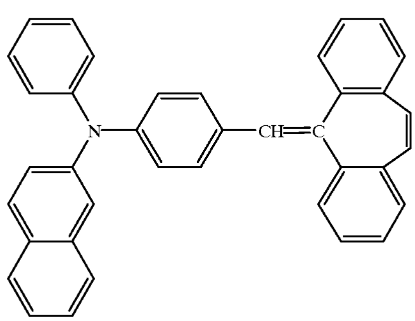
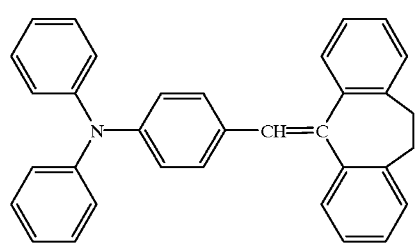

-continued
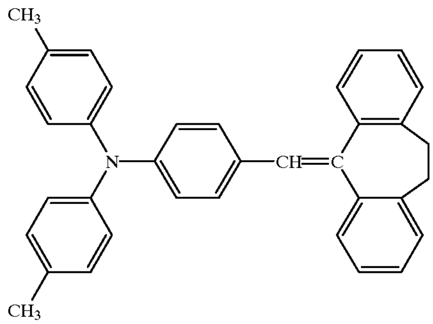
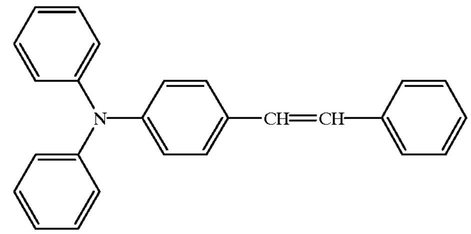
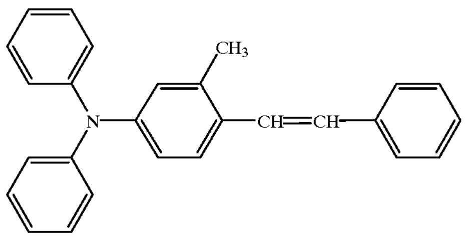
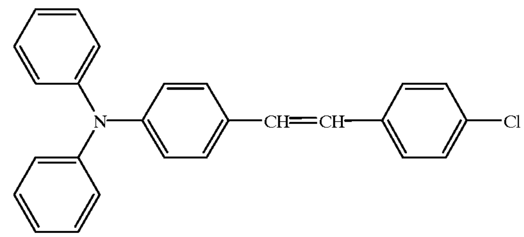
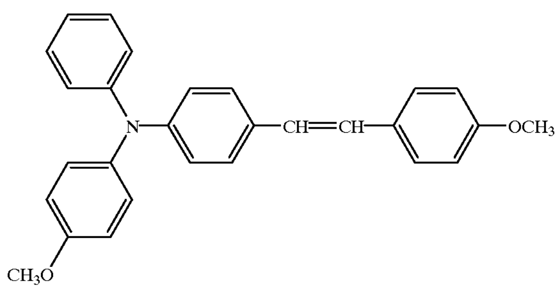
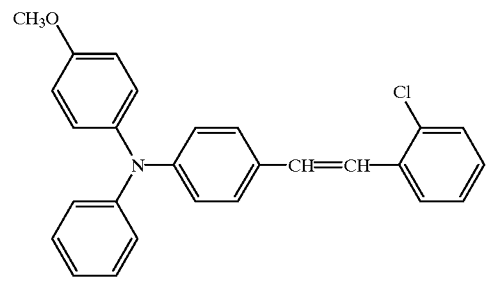
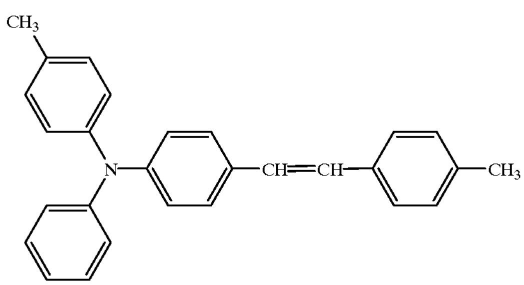
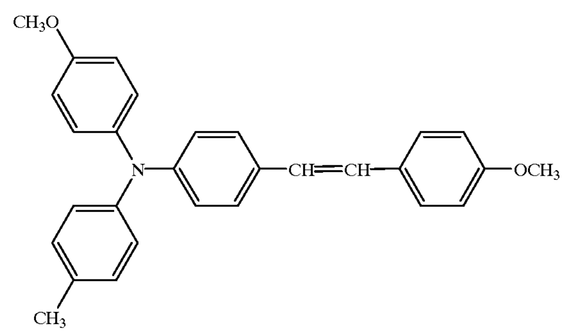
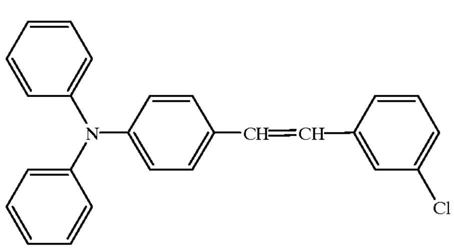
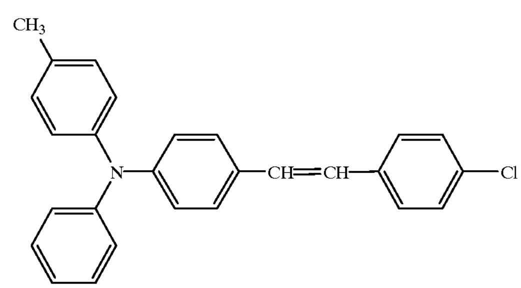

-continued
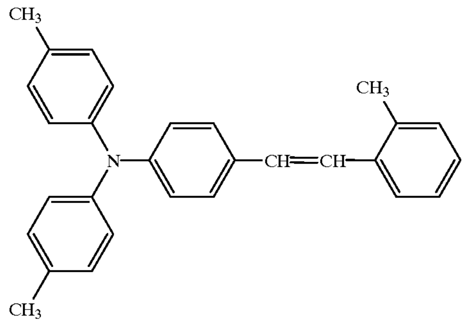
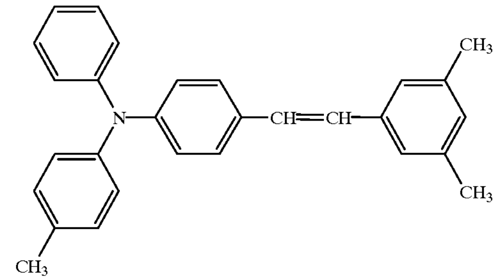
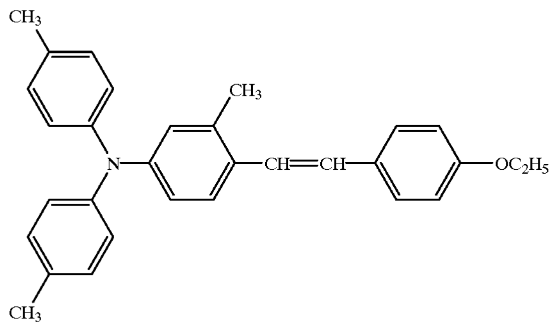
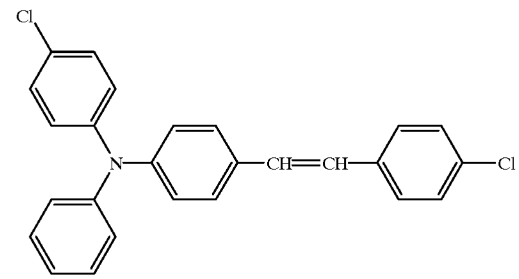
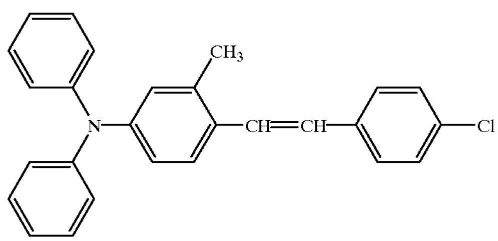
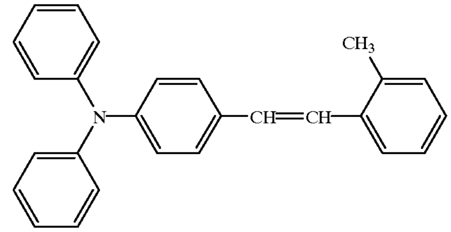
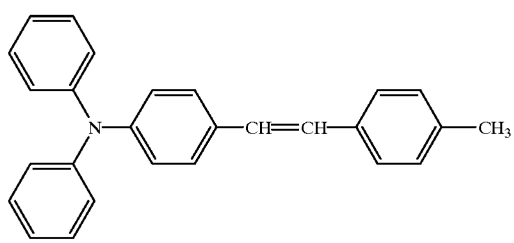
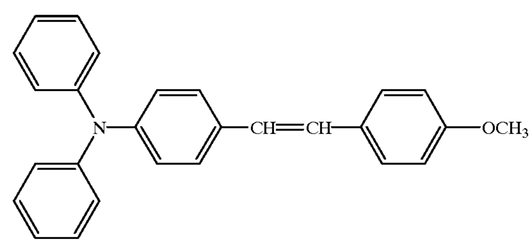
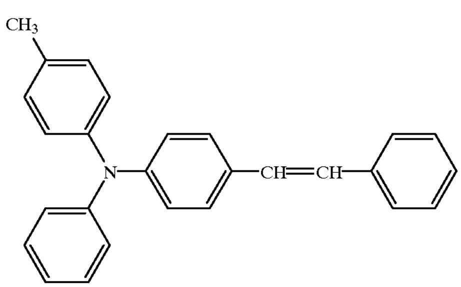
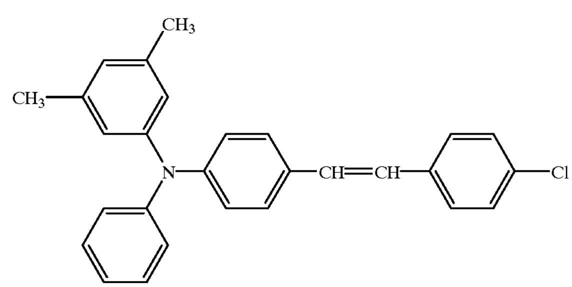
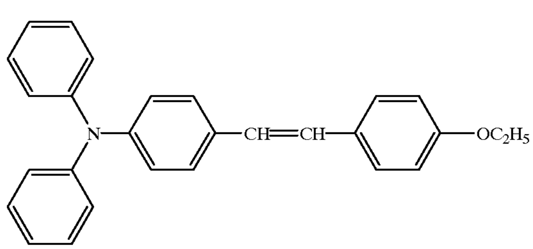
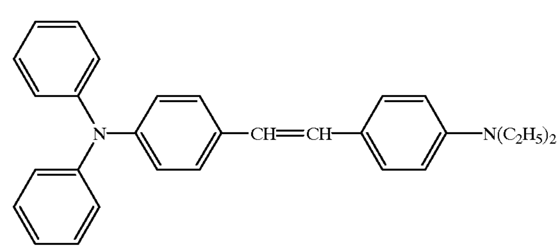

-continued
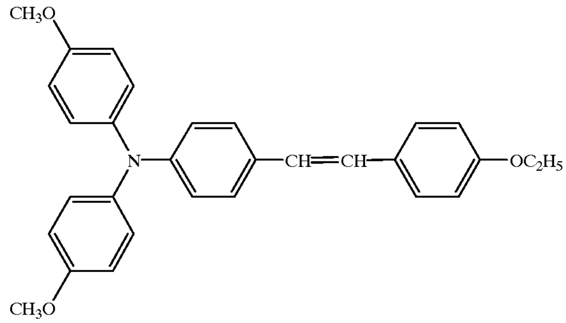
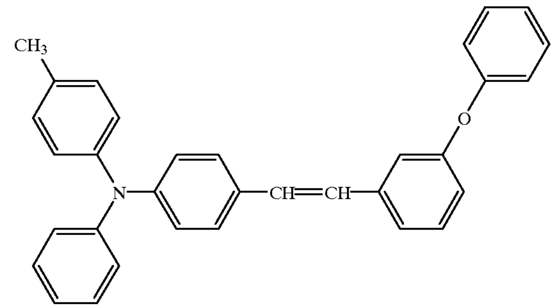
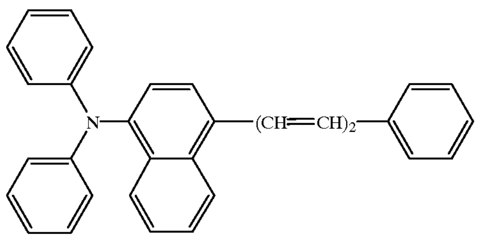
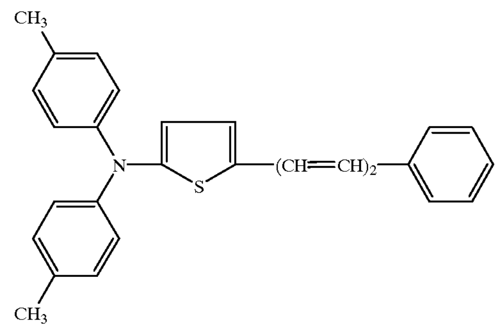
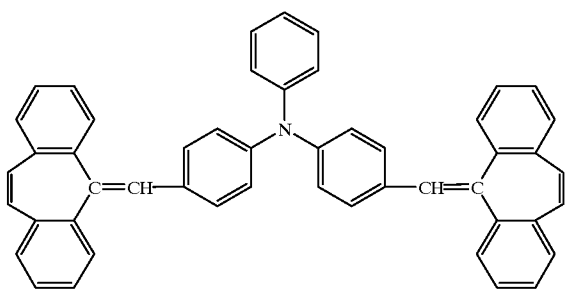
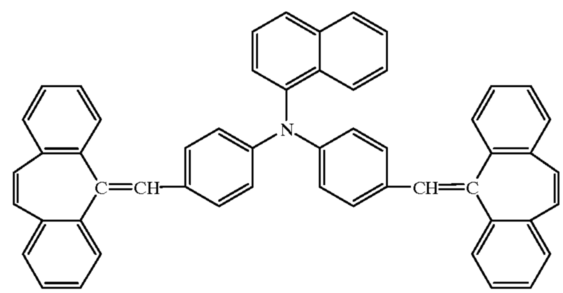
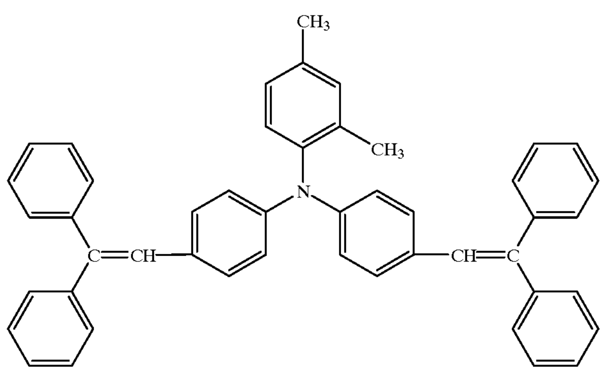
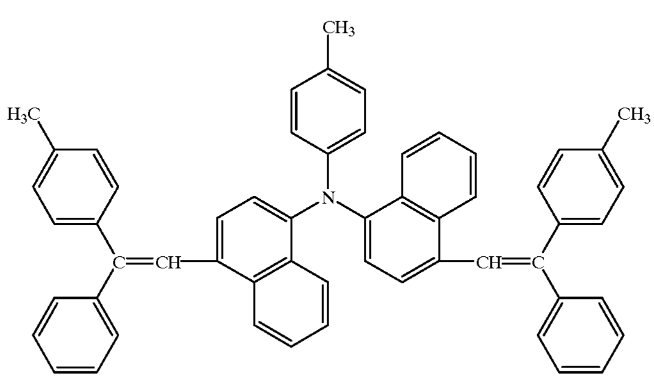

-continued
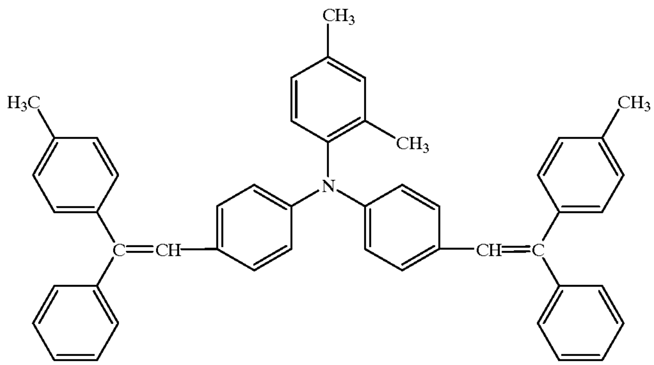
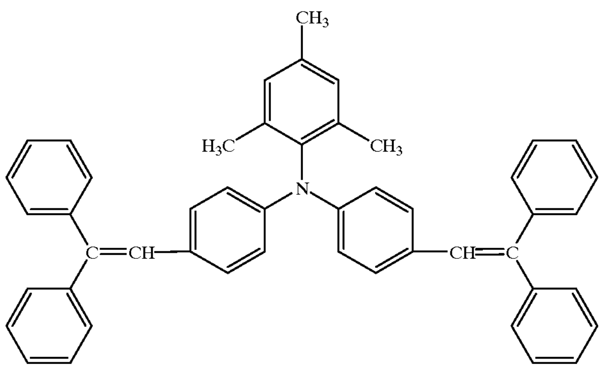
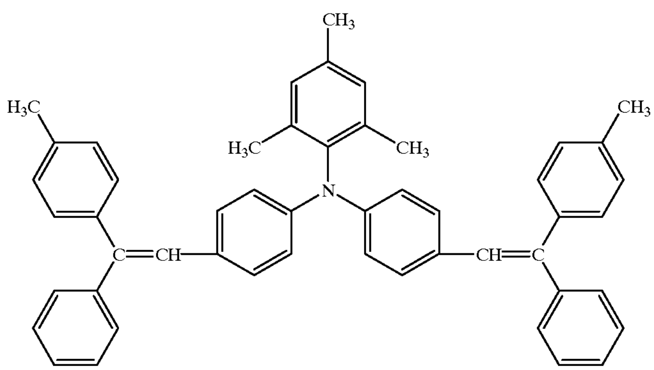
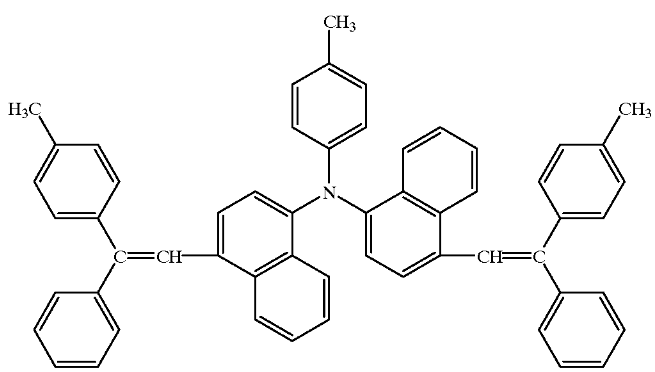

-continued
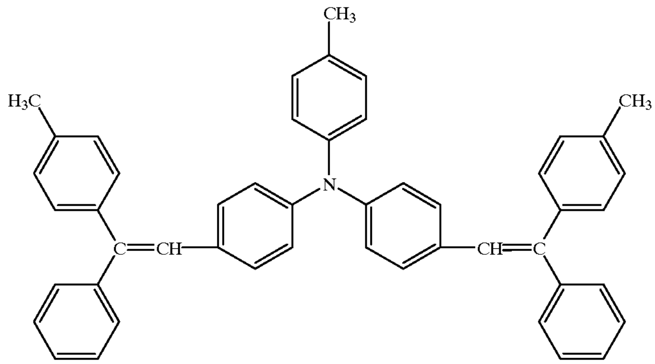
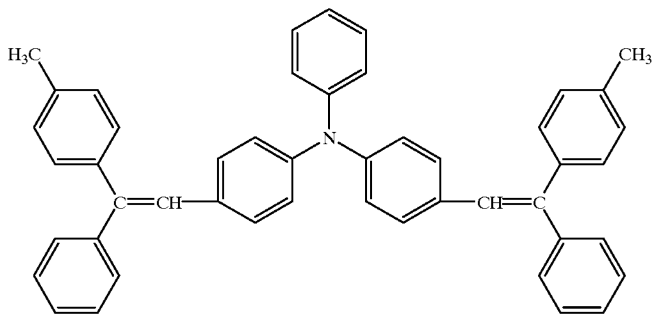
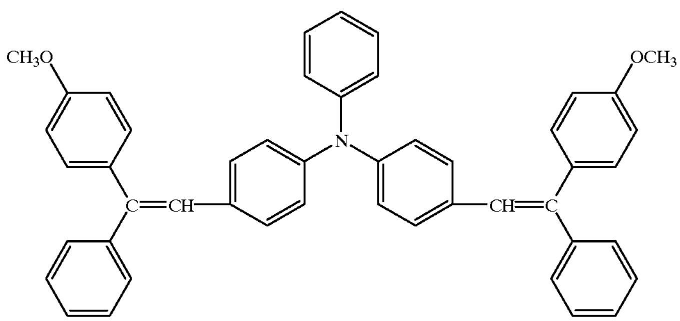
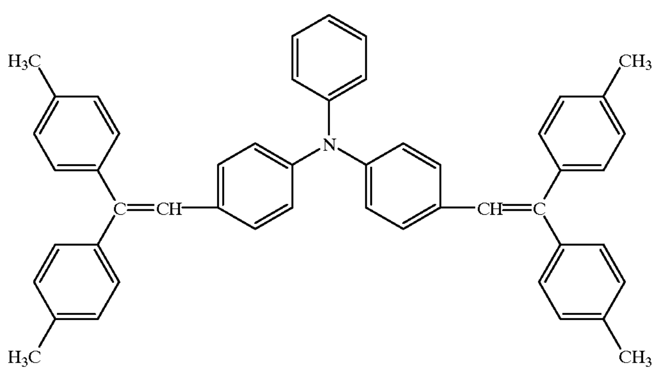

-continued
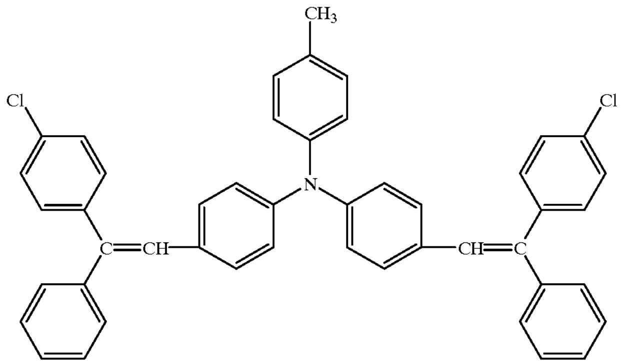
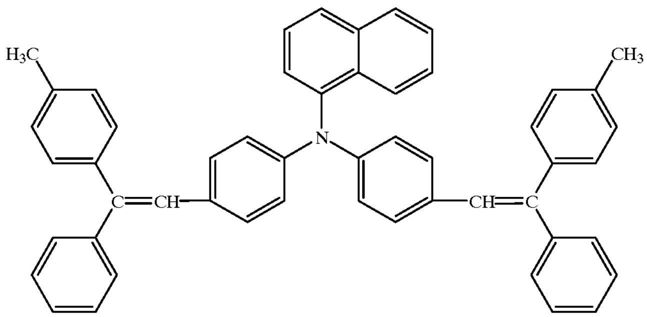
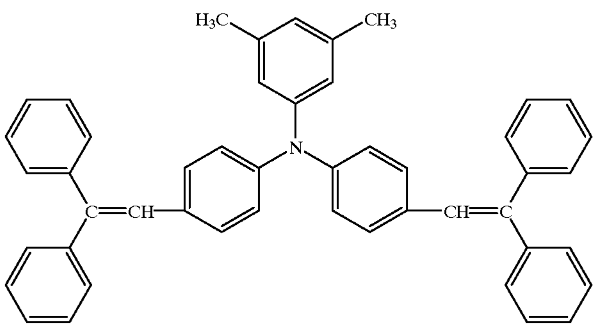
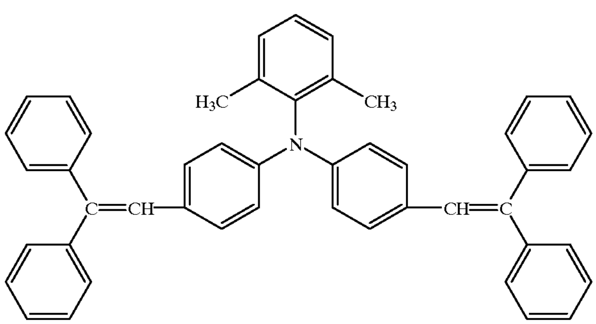
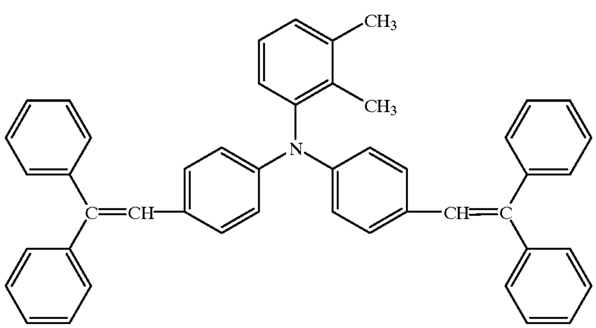

-continued
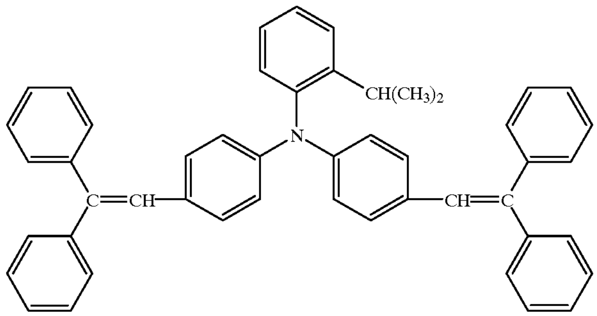
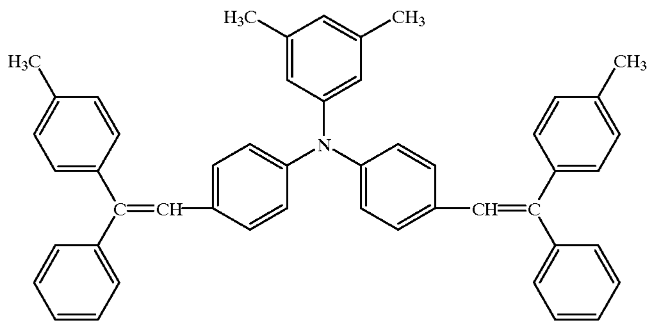
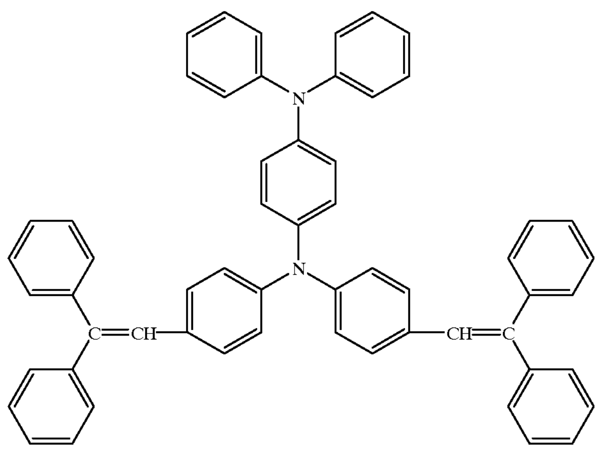
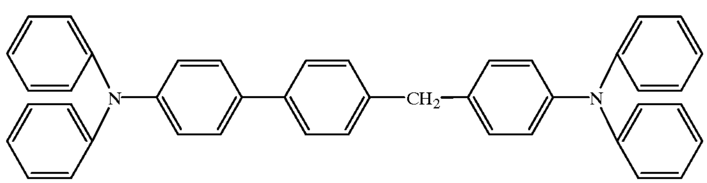
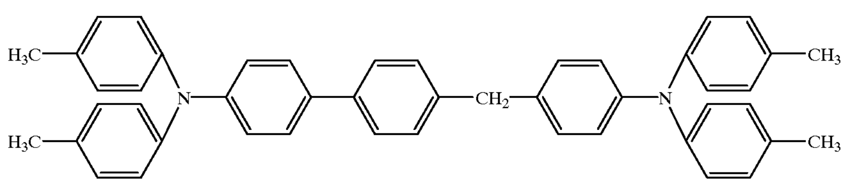
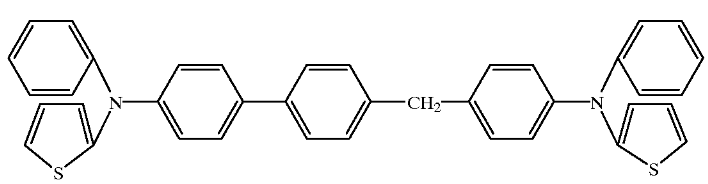

-continued
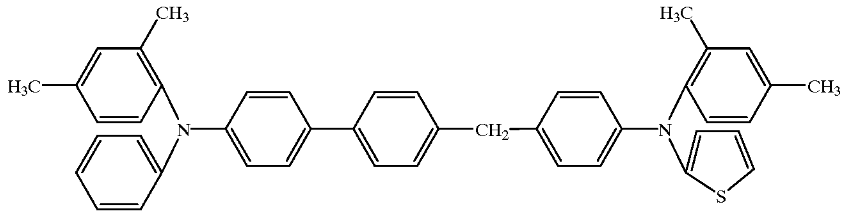
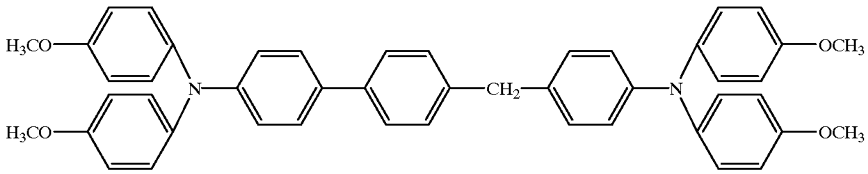
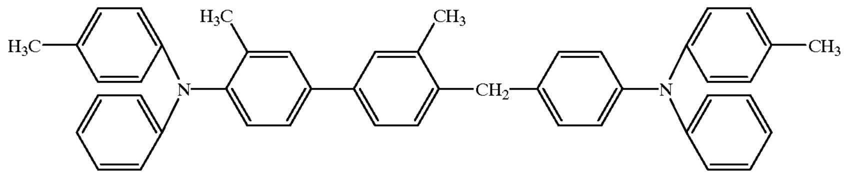
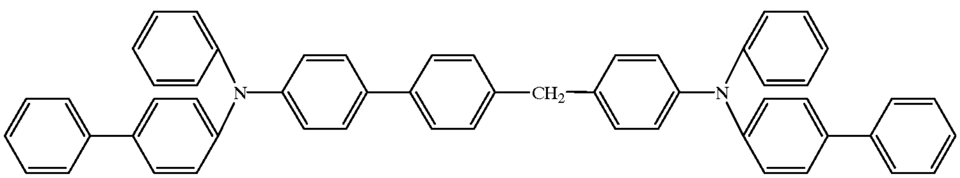
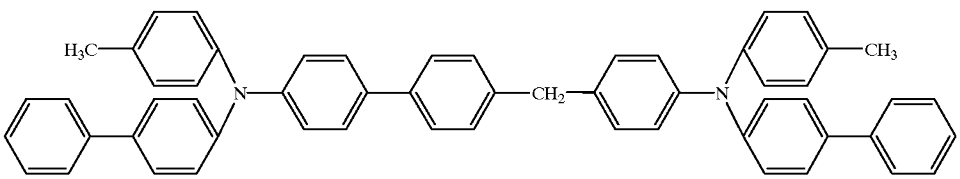
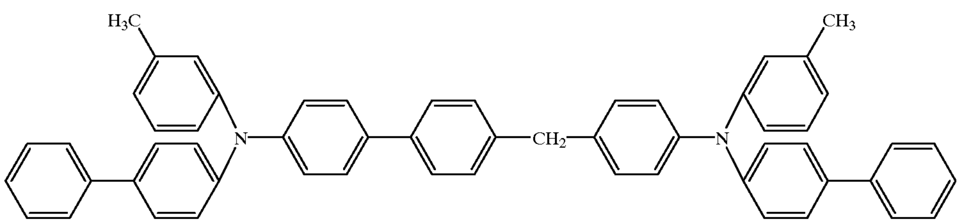
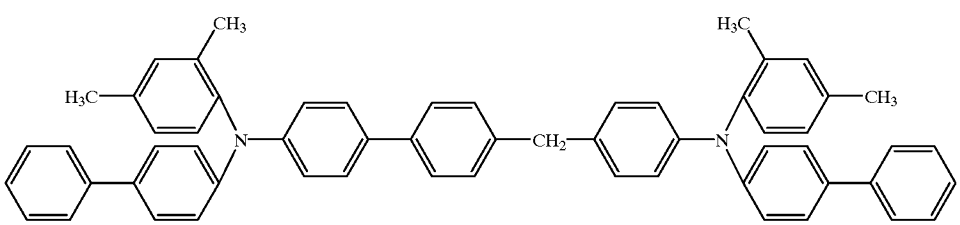
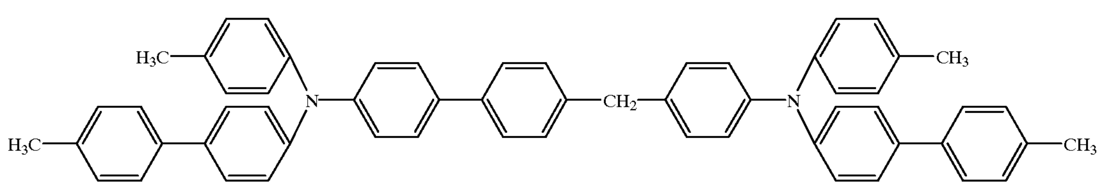

-continued
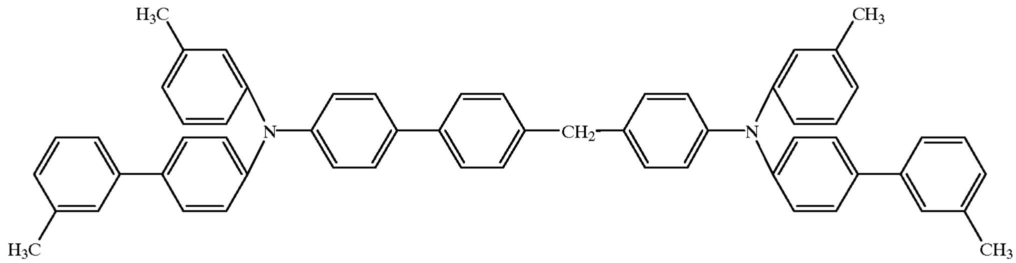
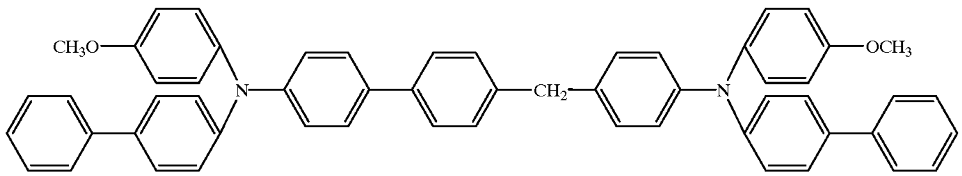
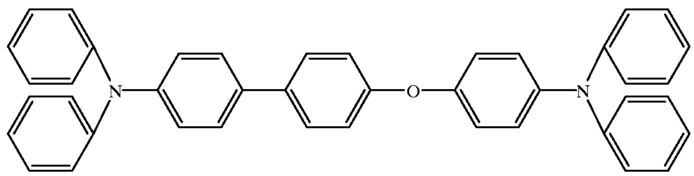
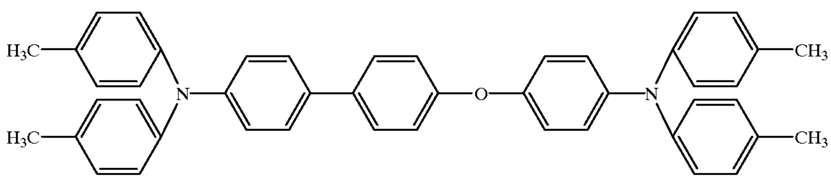
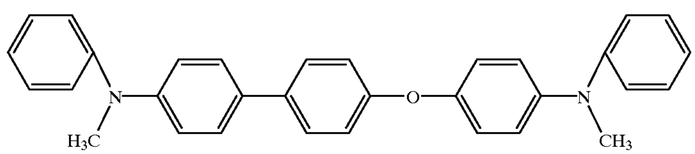
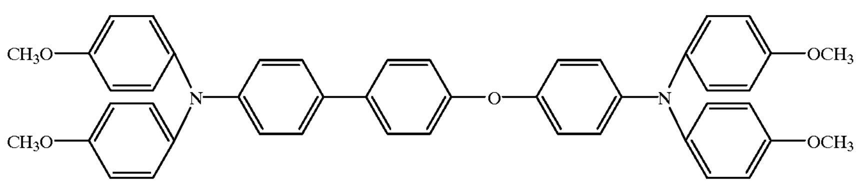
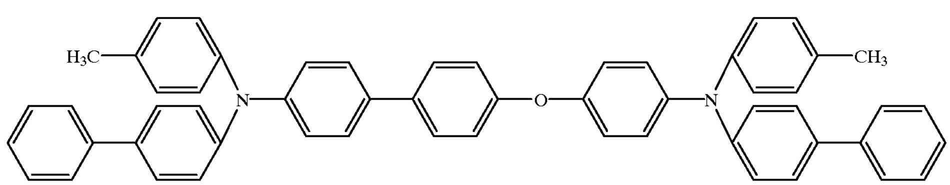
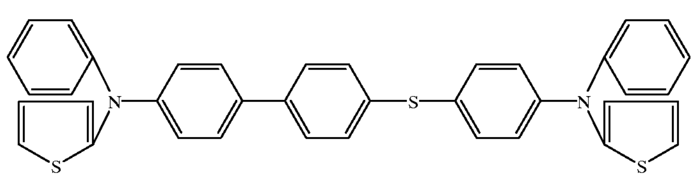
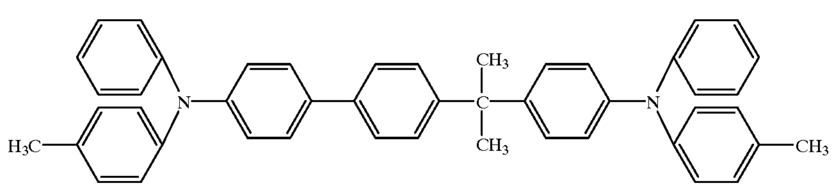

-continued
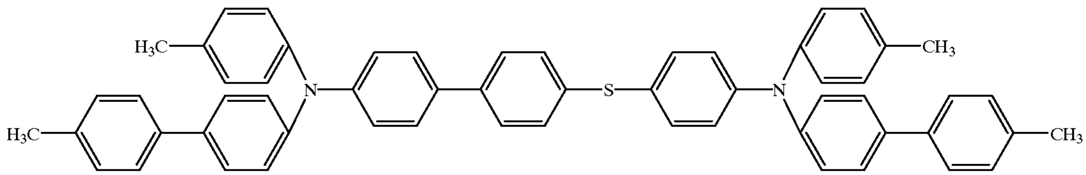
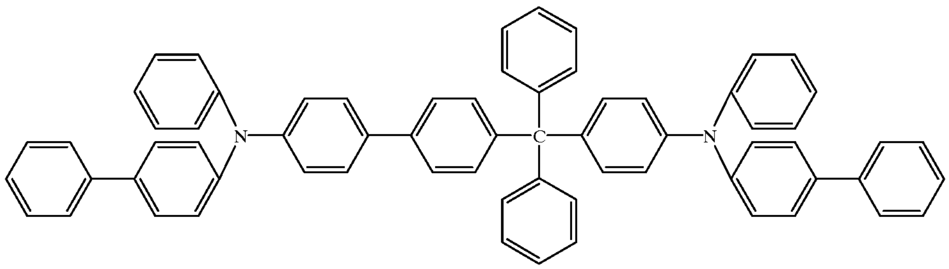
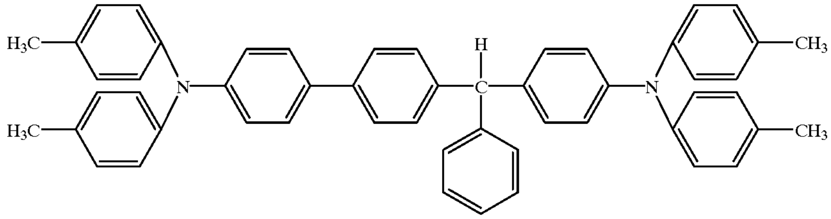
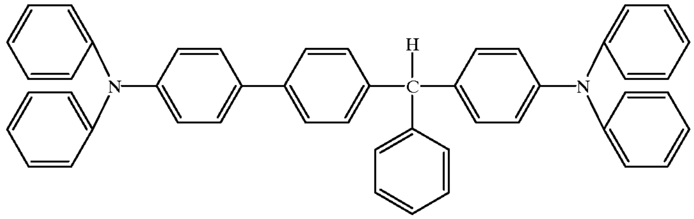
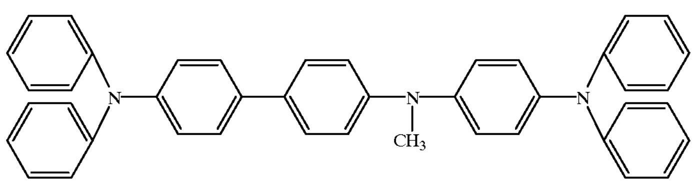
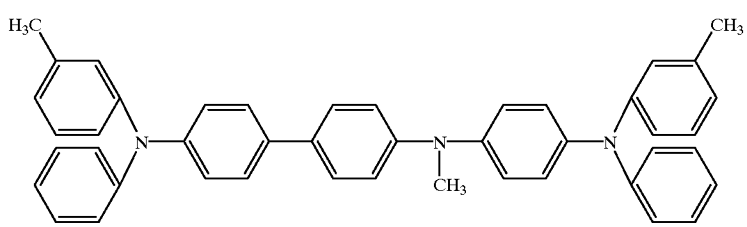
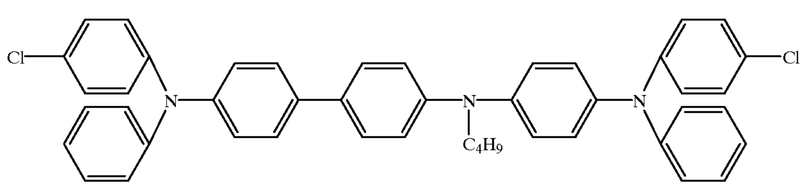
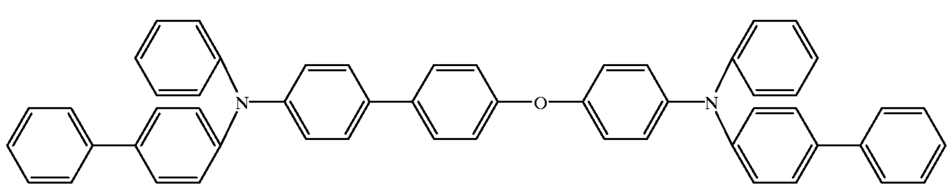

-continued
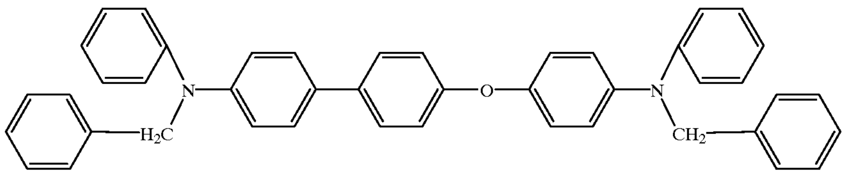
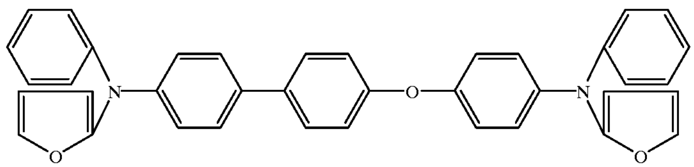
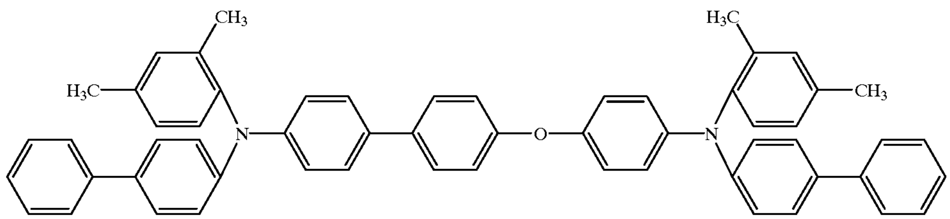
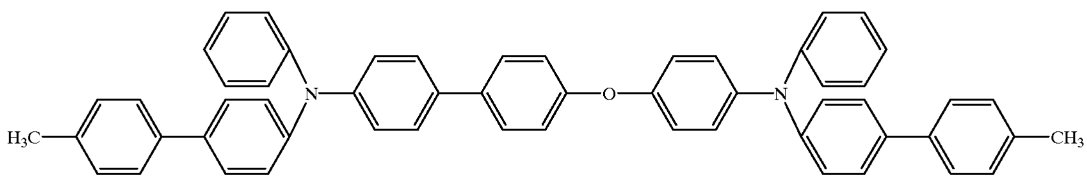
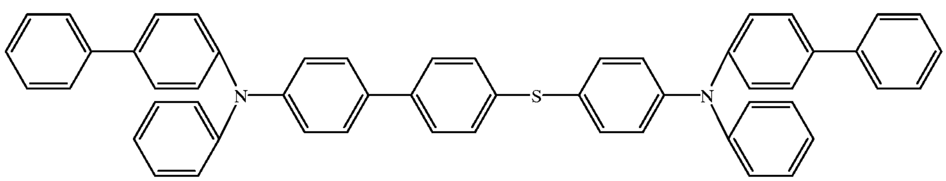
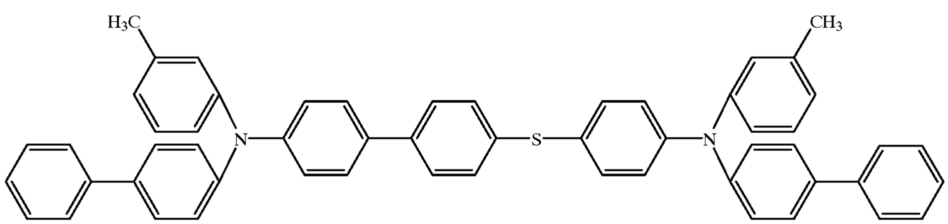
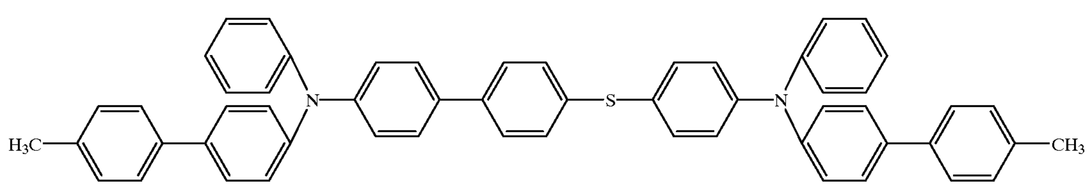
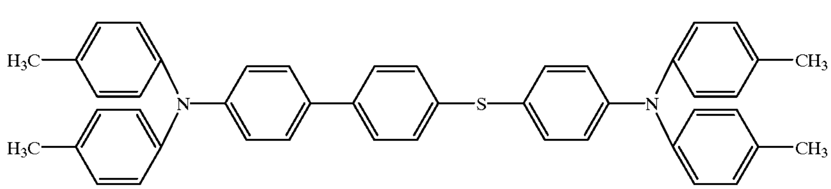

-continued
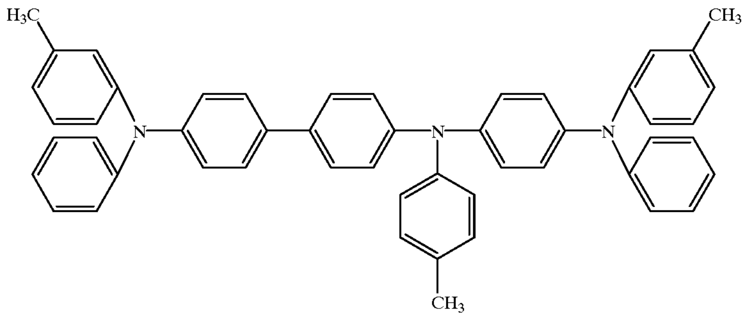
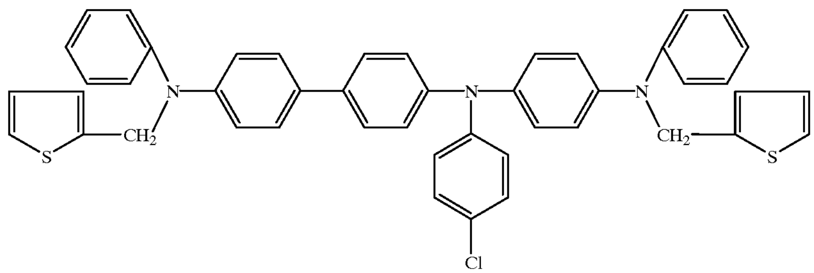
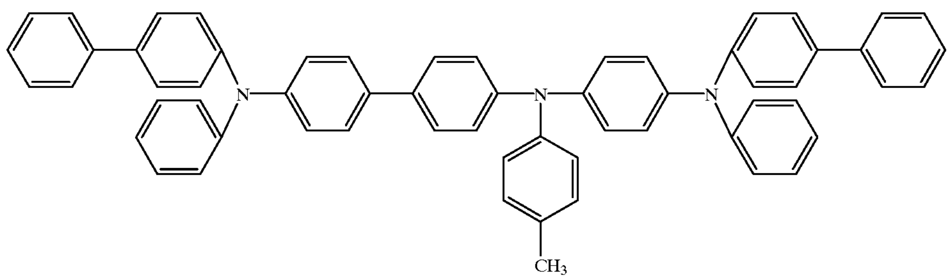
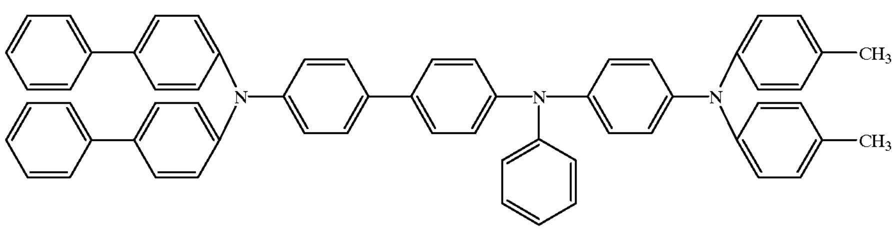
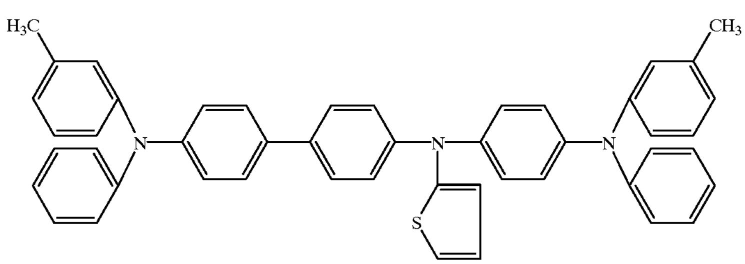
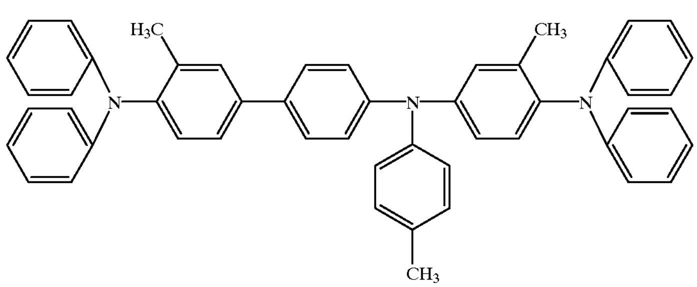

-continued
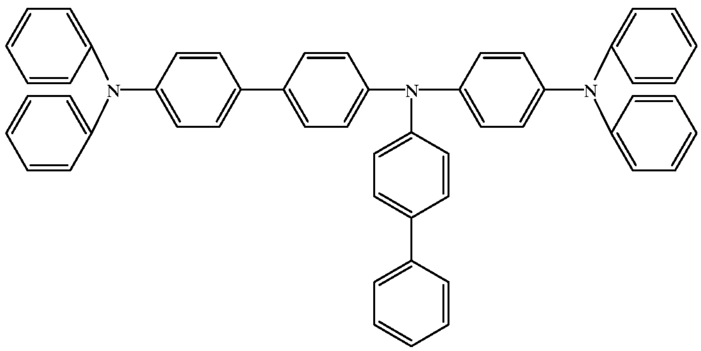
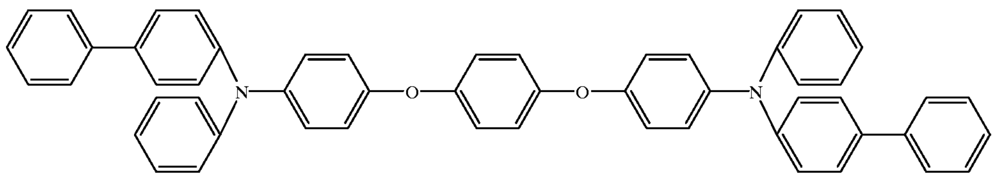
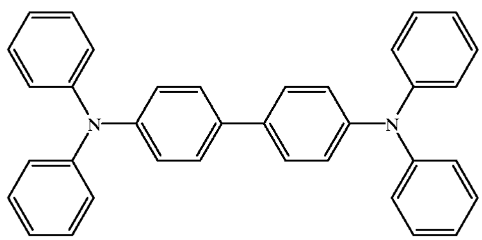
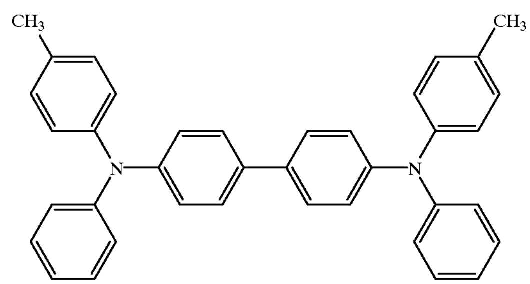
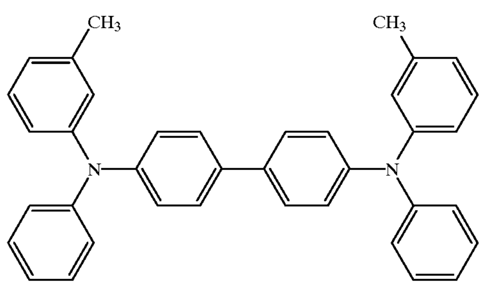
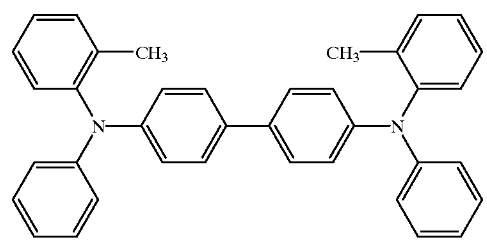
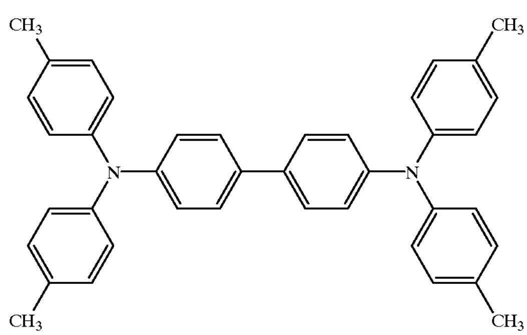
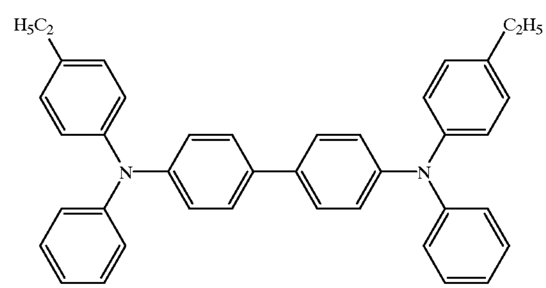

-continued
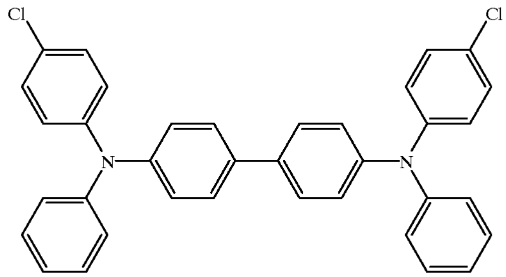
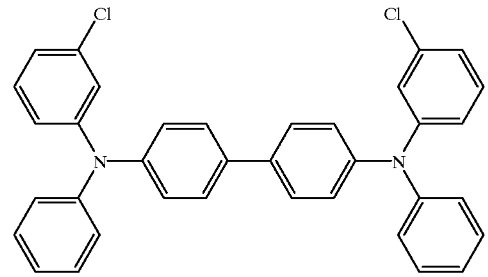
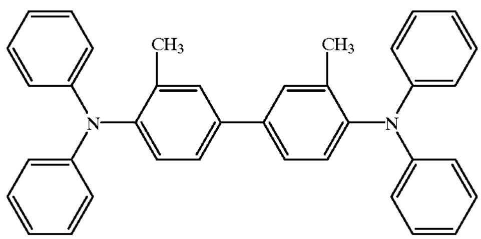
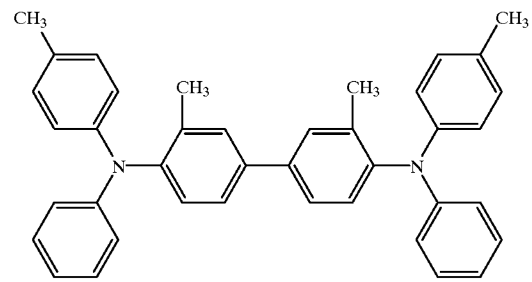
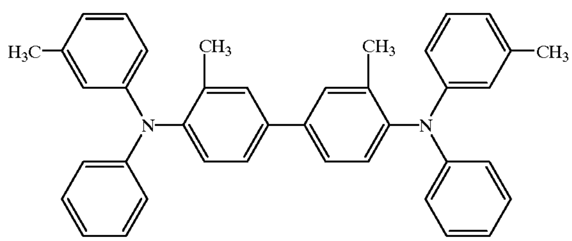
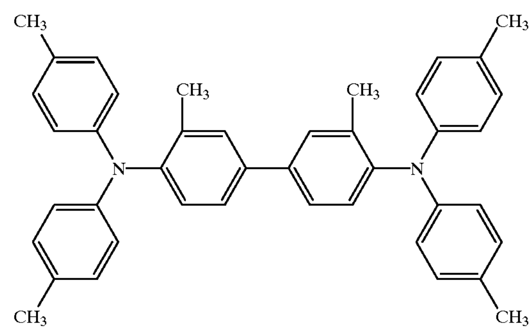
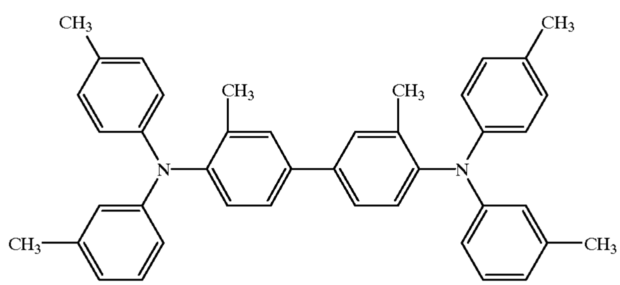
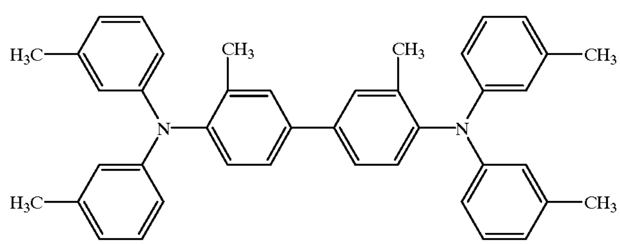

-continued
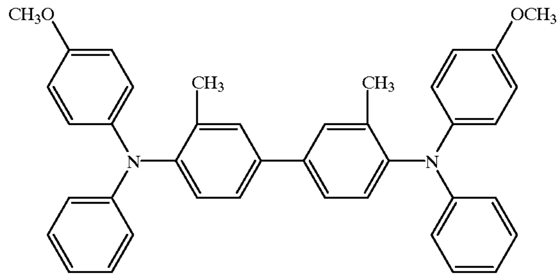
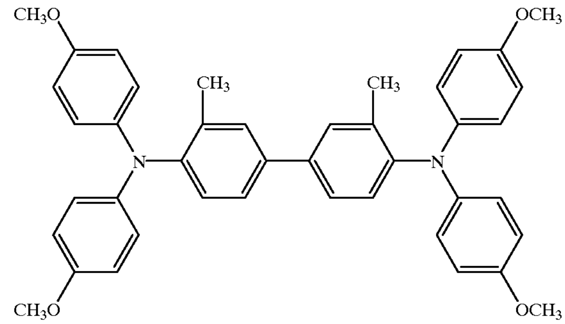
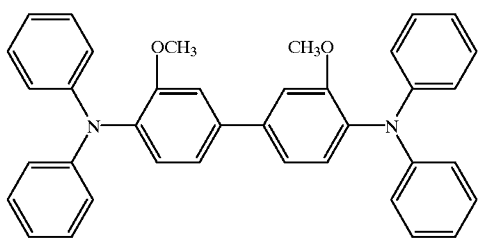
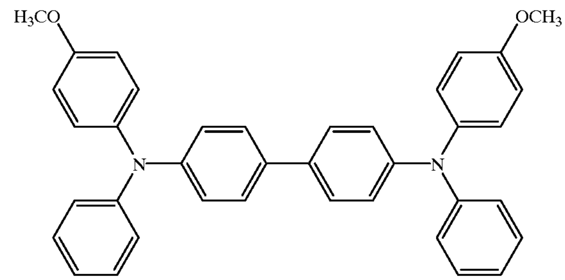
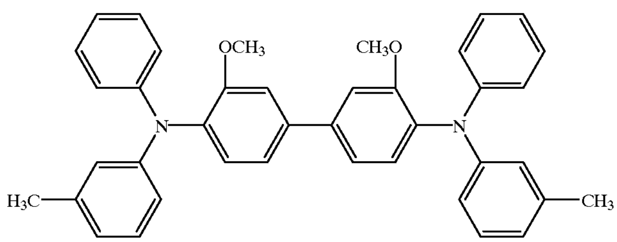
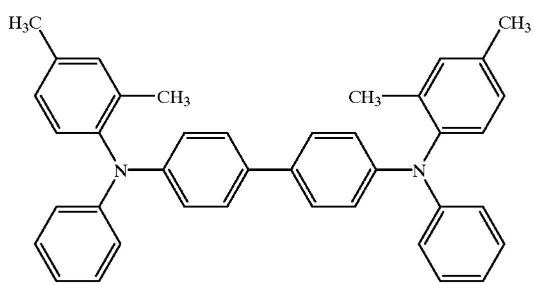
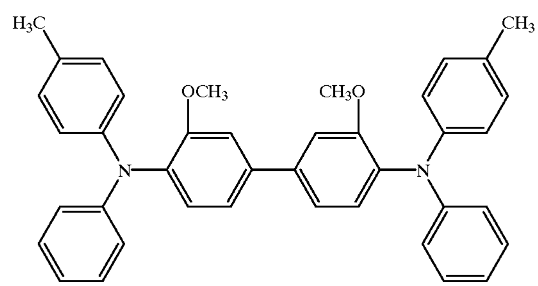
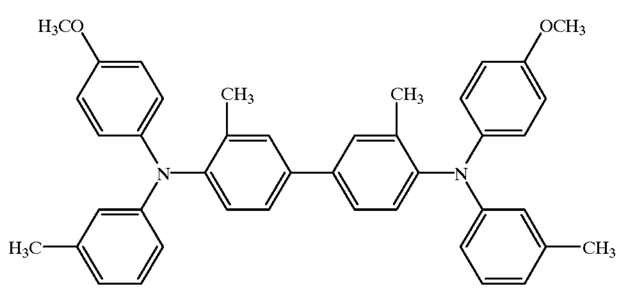

-continued
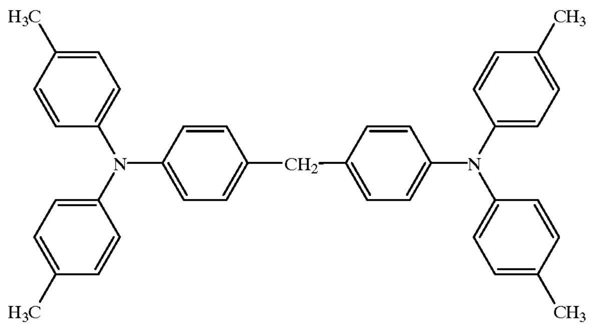
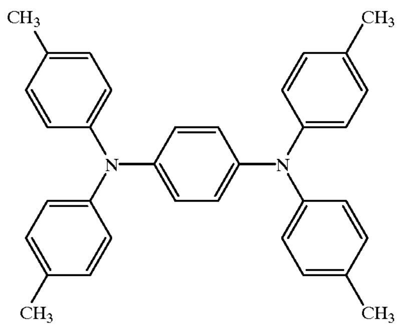
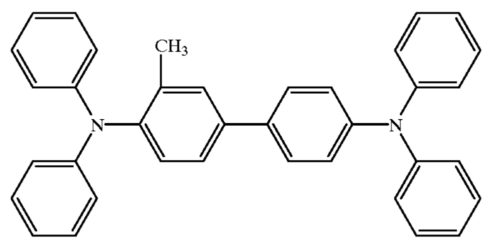
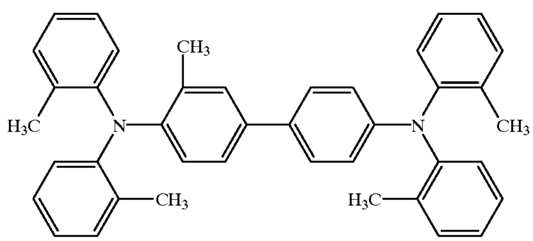
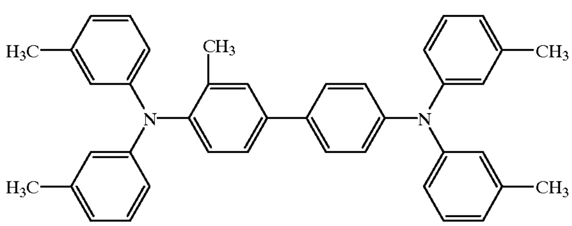
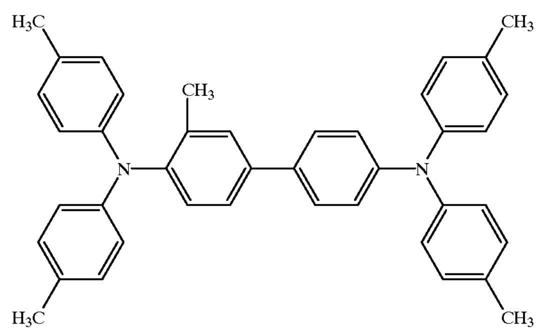
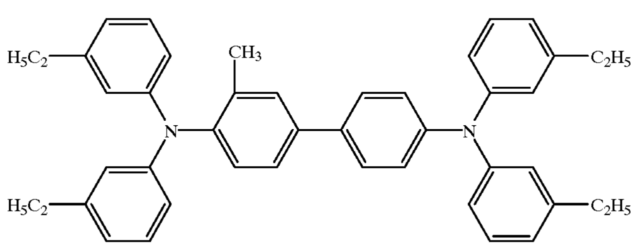

-continued
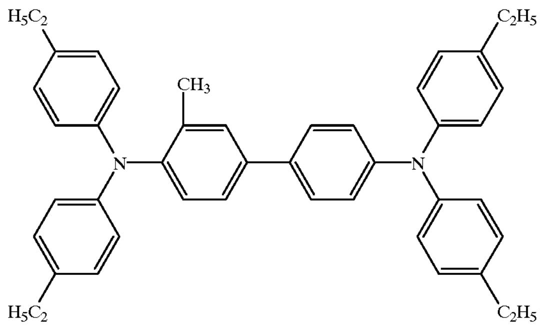
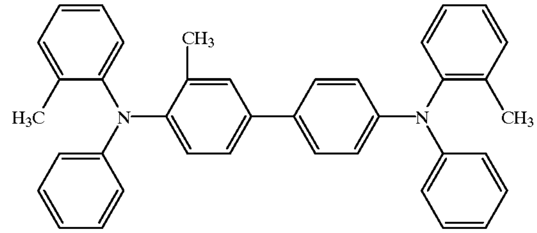
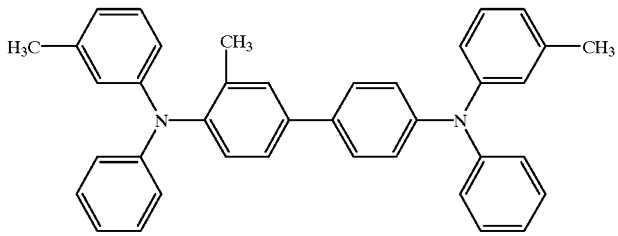
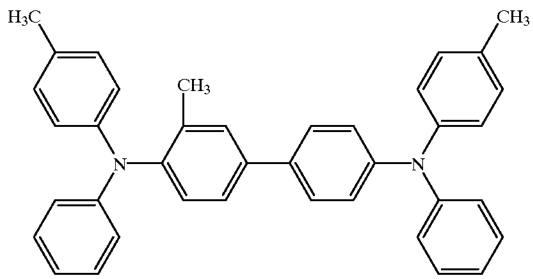
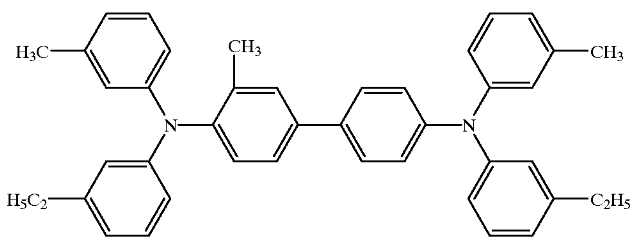
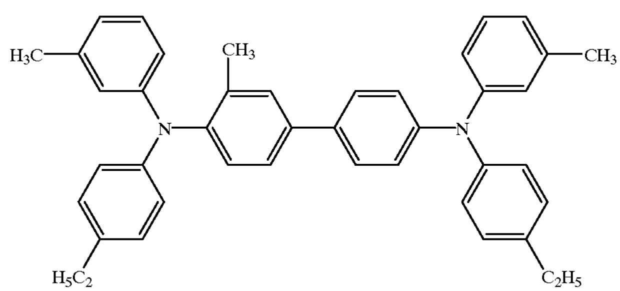
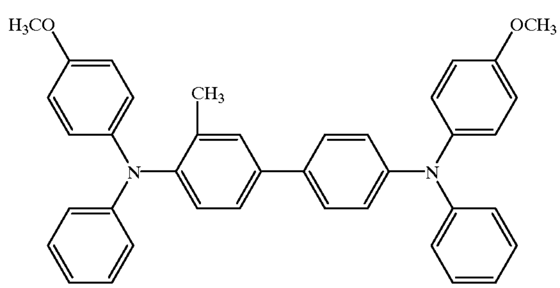

-continued
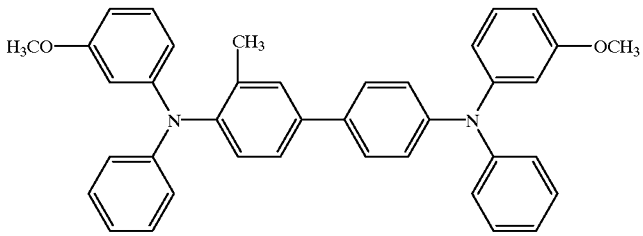
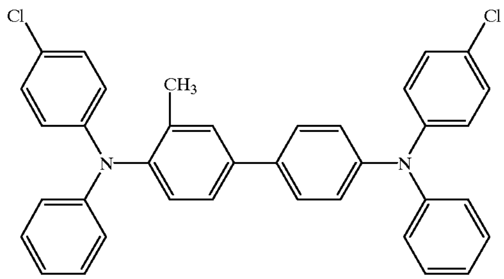
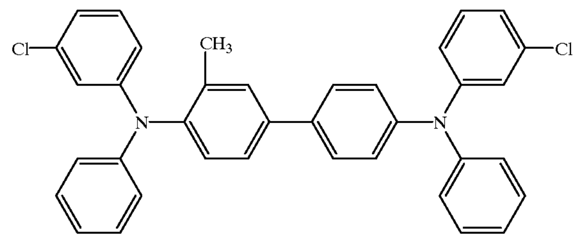
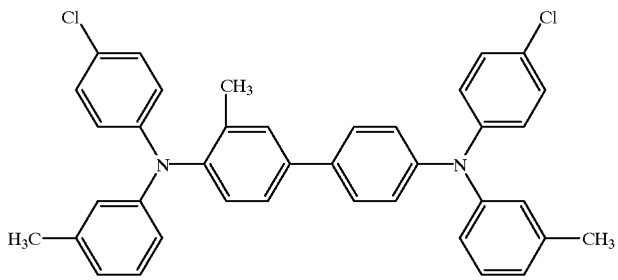
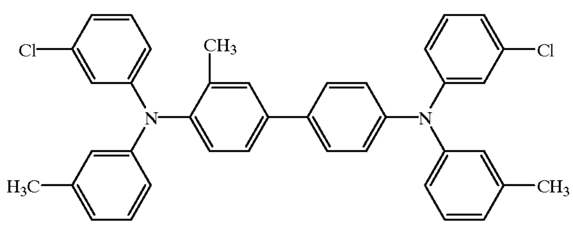
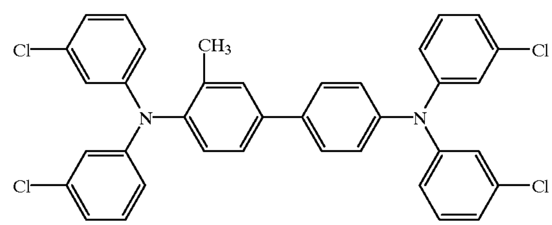
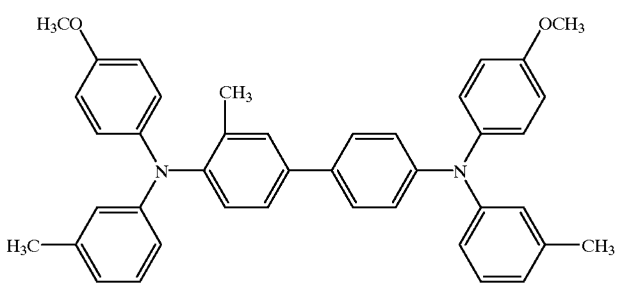
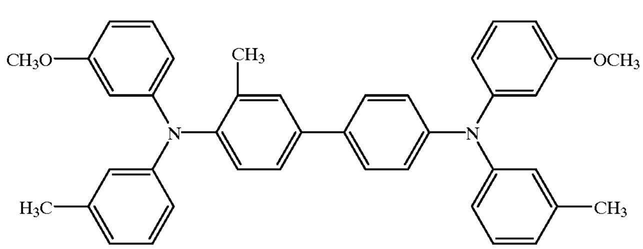

-continued
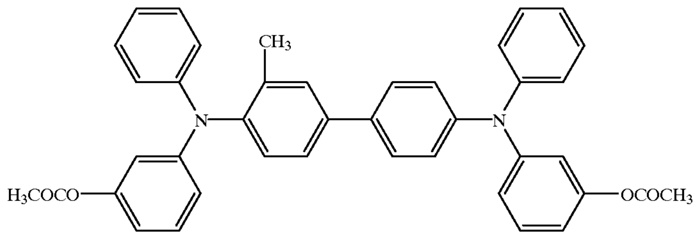
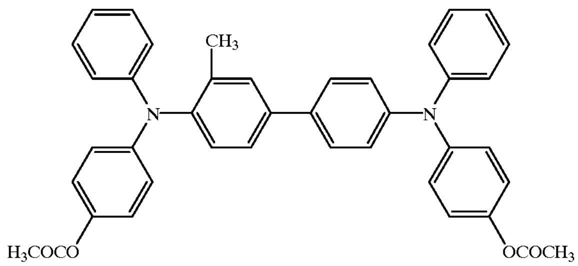
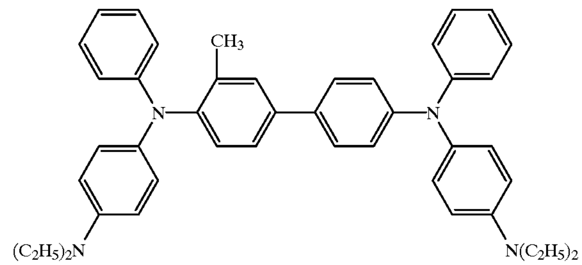
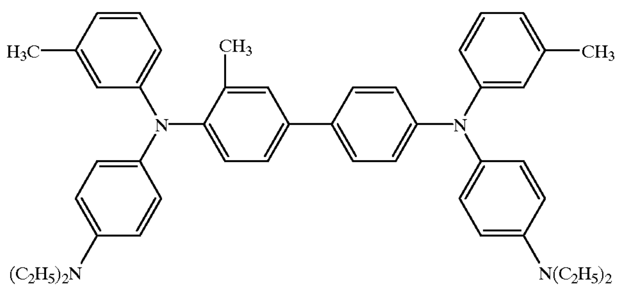
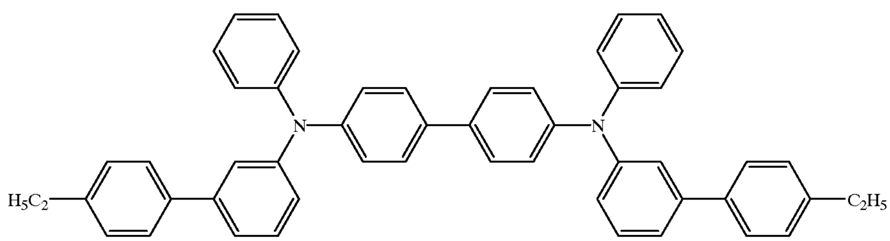
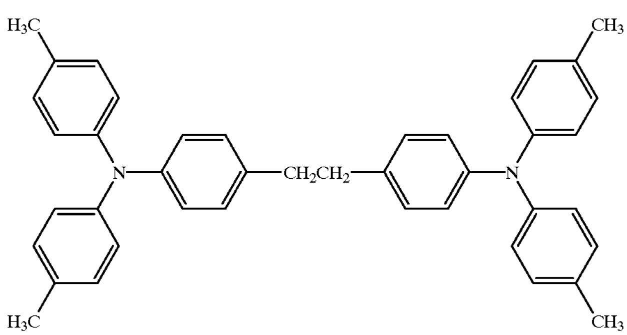
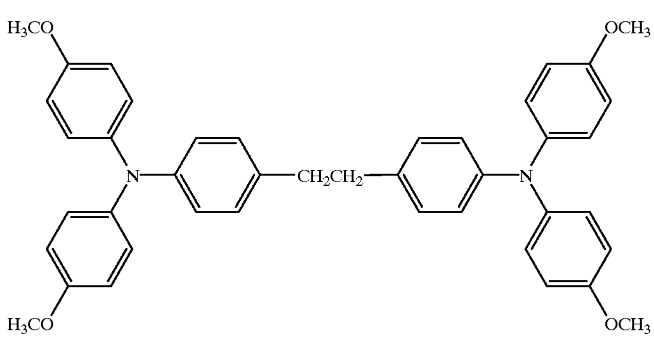

-continued
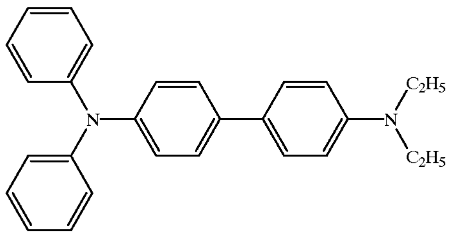
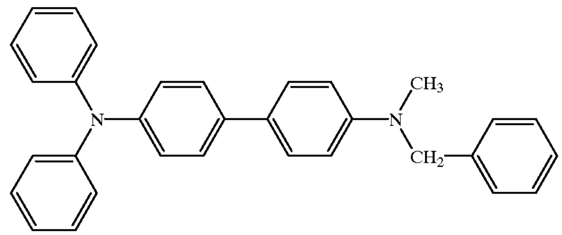
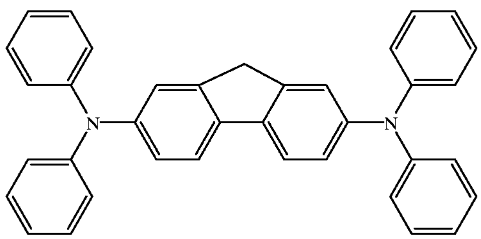
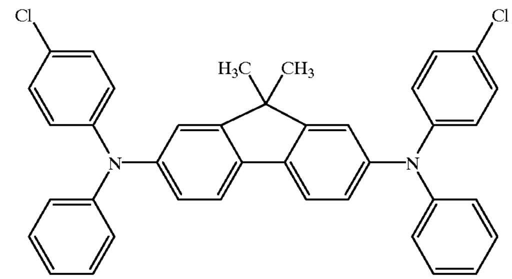
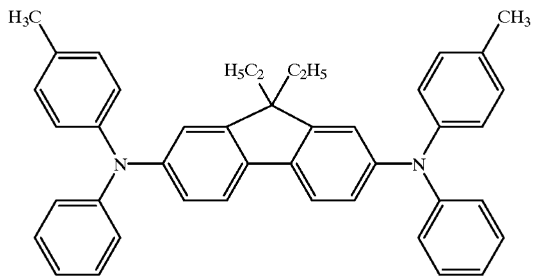
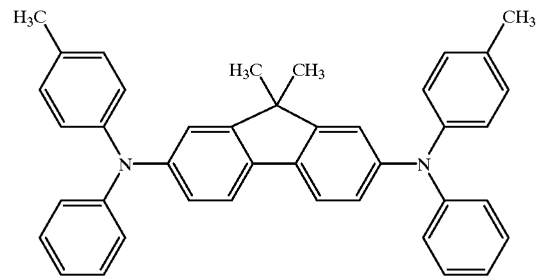
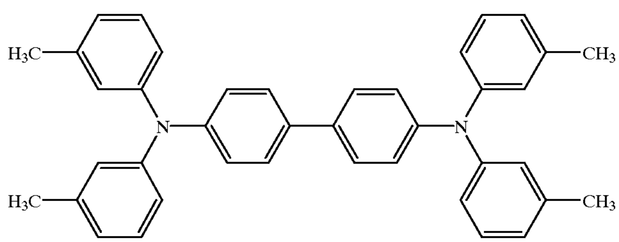
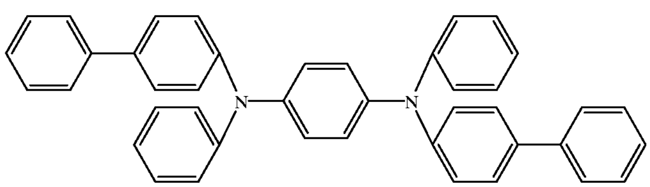
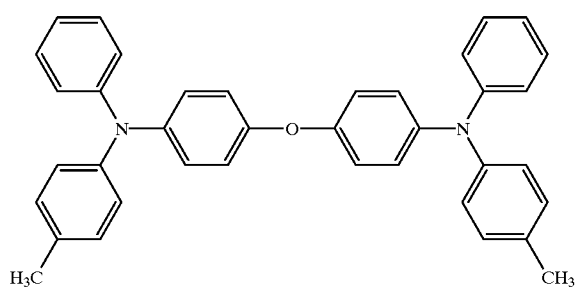

-continued
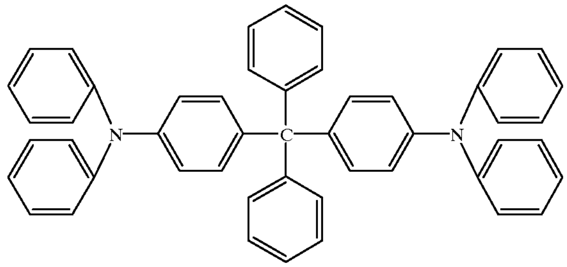
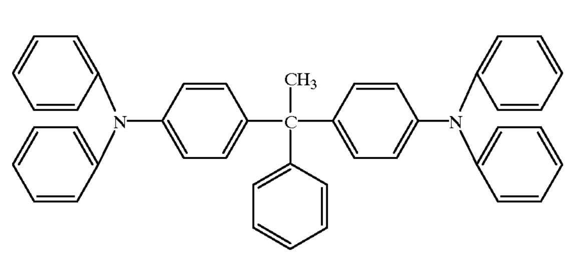
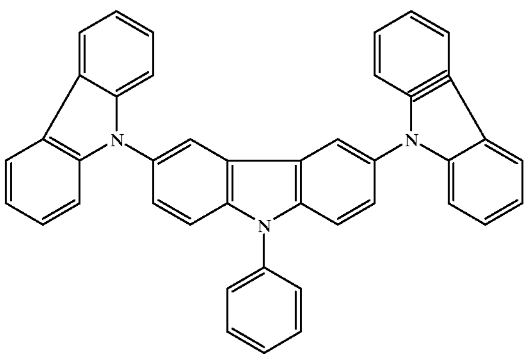
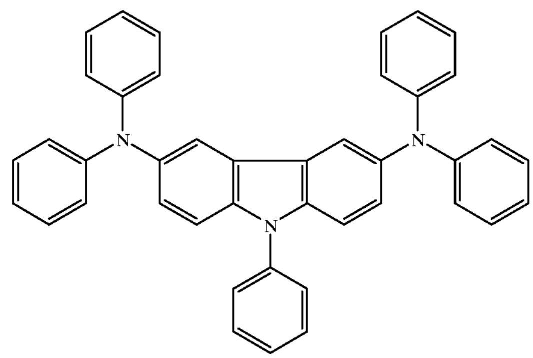
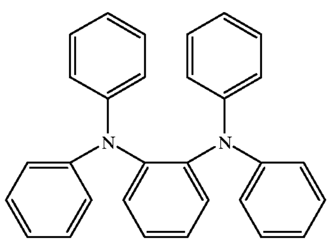
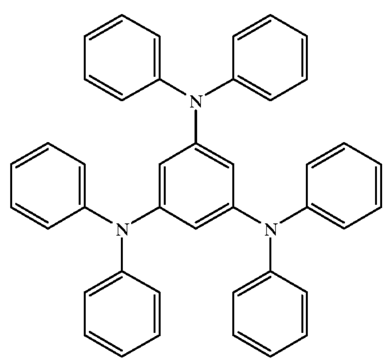
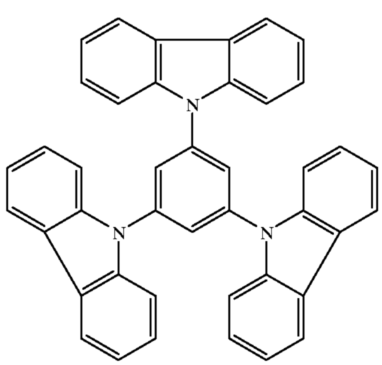
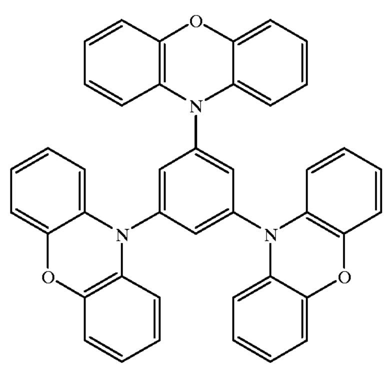

-continued
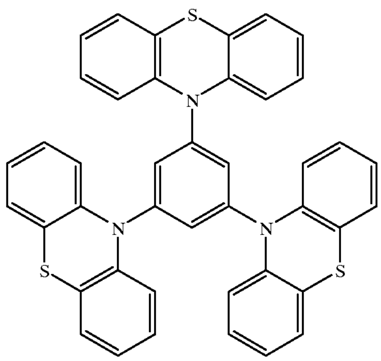
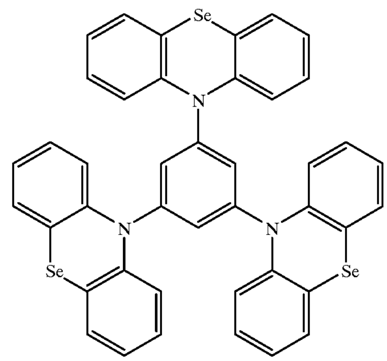
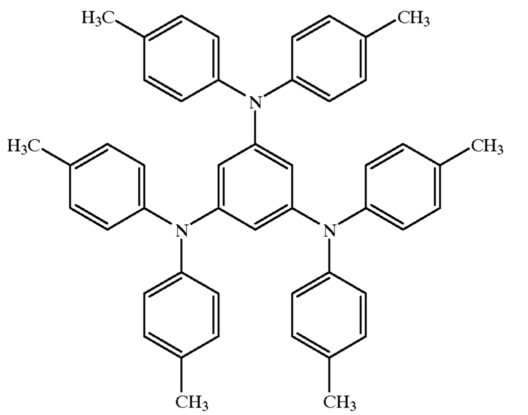
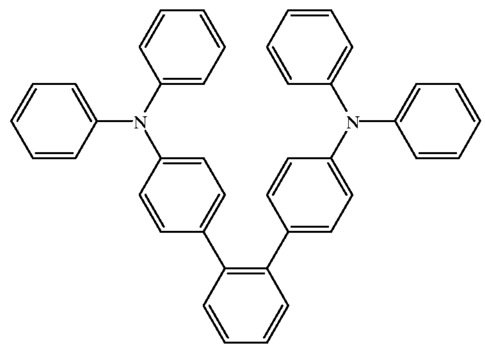
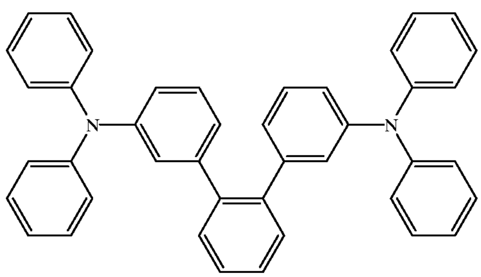
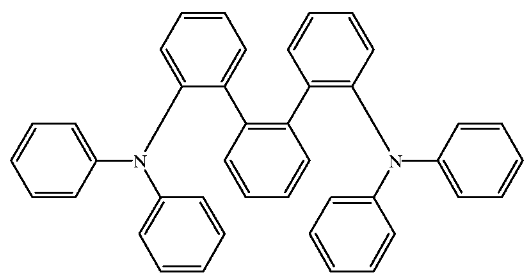
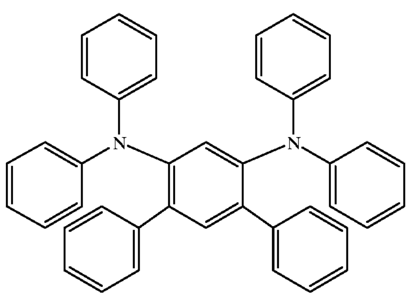
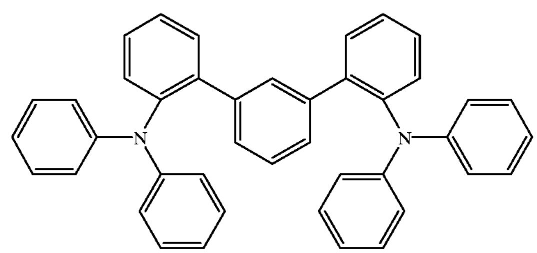
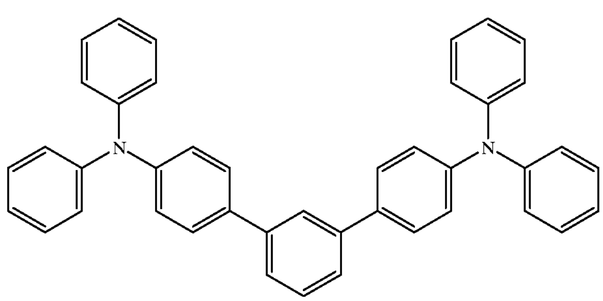

-continued
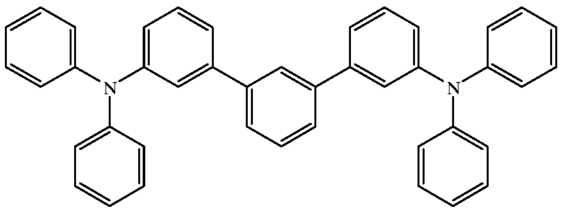
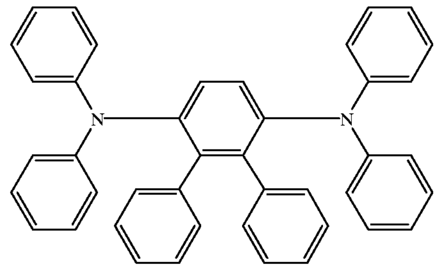
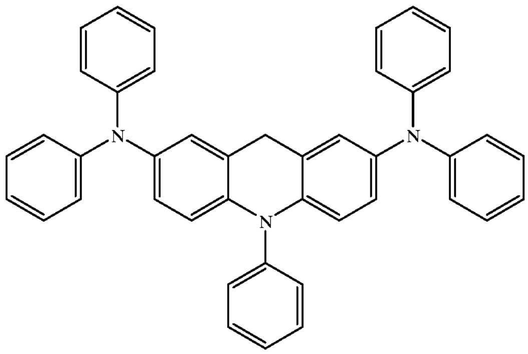
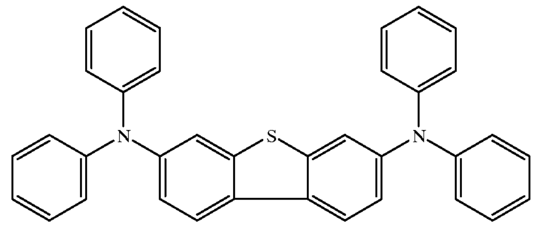
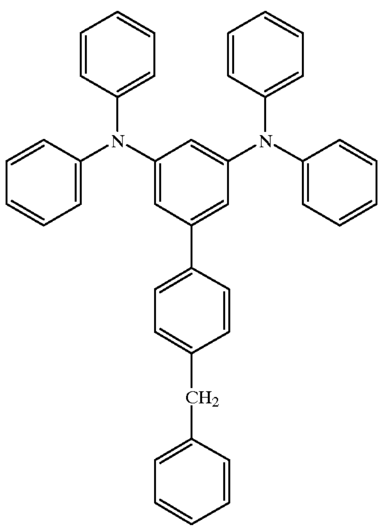
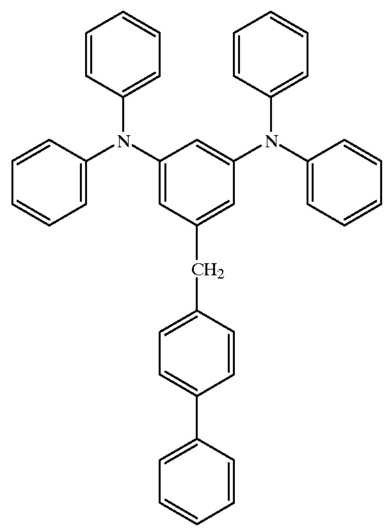
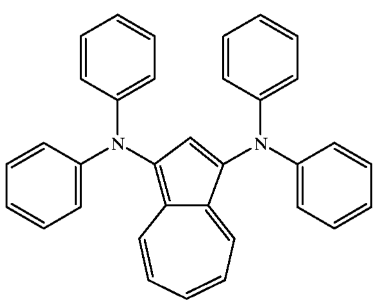
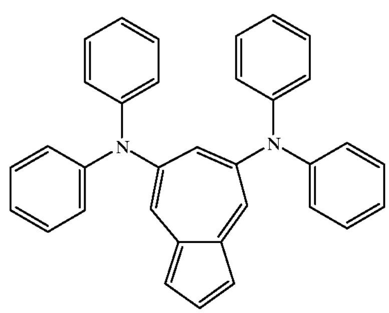

-continued
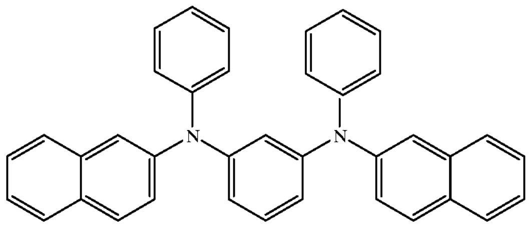
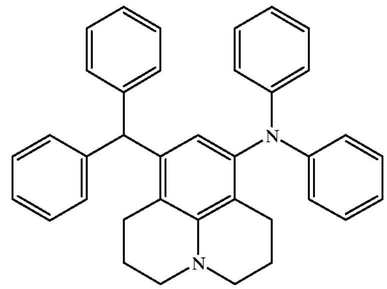
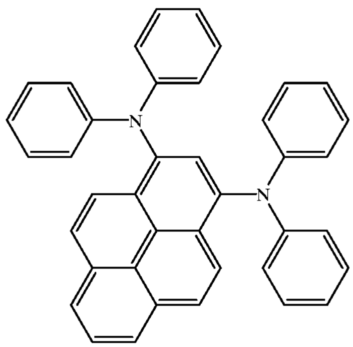
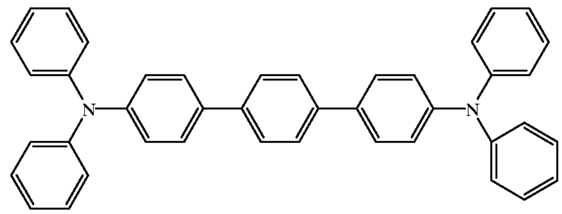
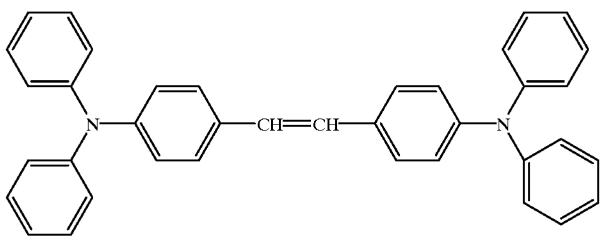
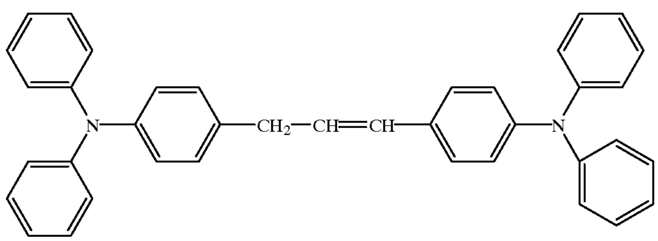
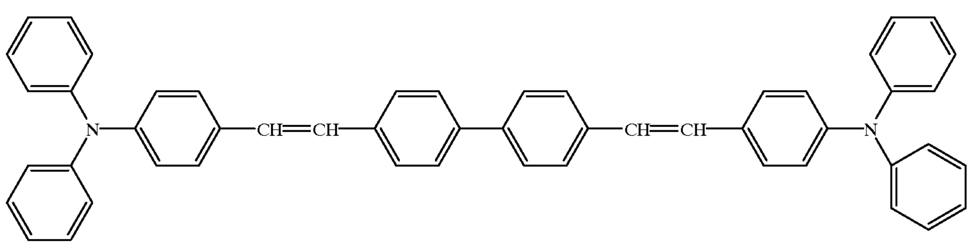

-continued
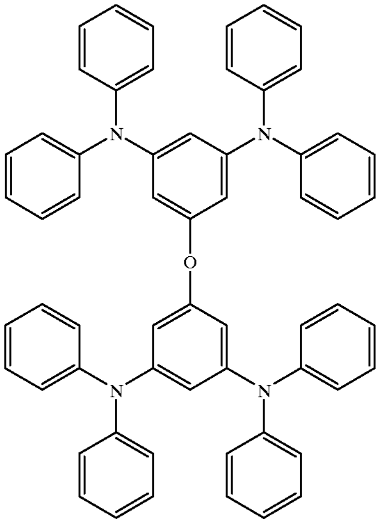
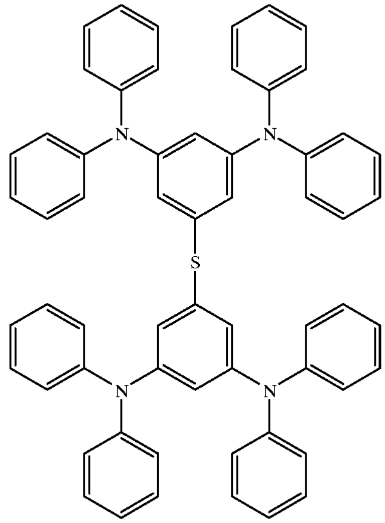
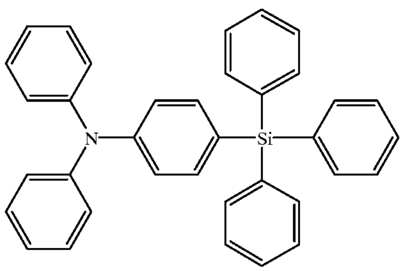
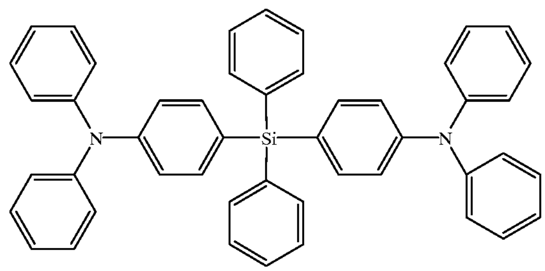
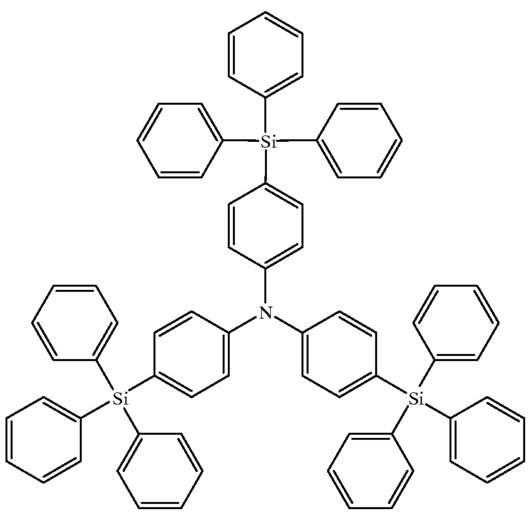

-continued
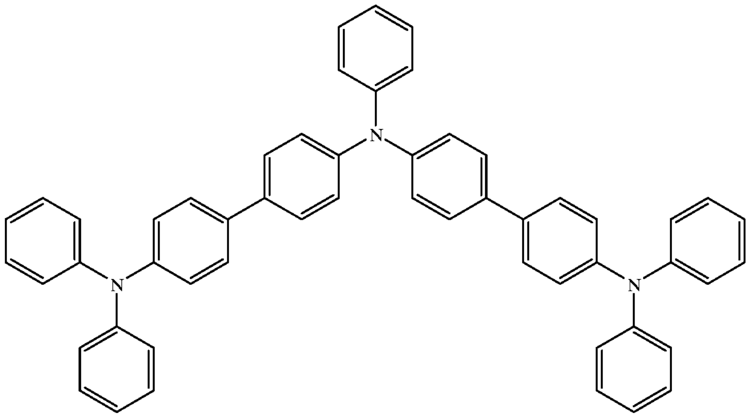
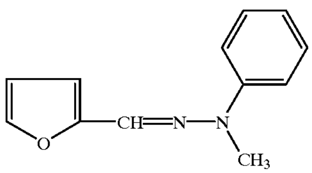
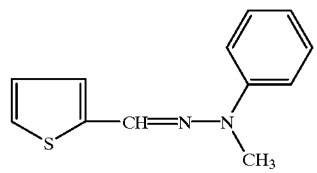
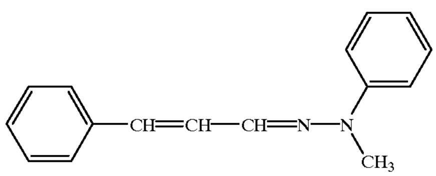
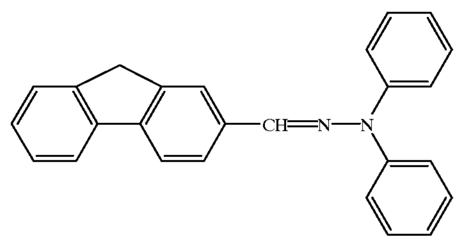
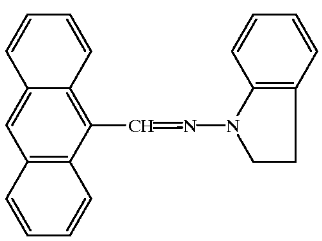
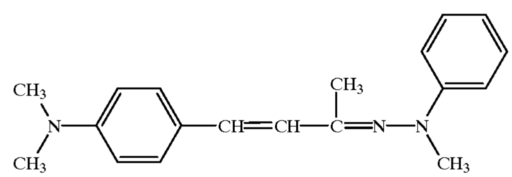
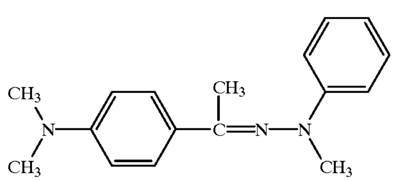
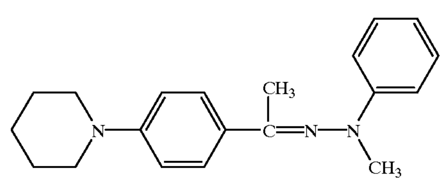
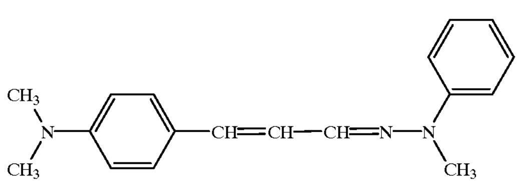
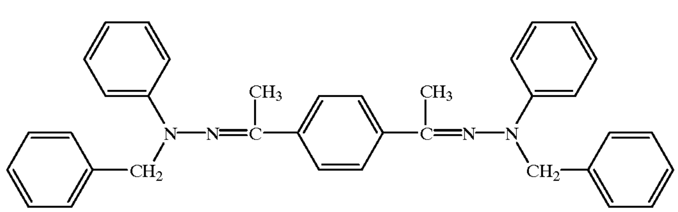

-continued
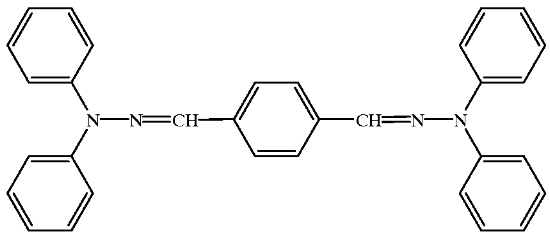
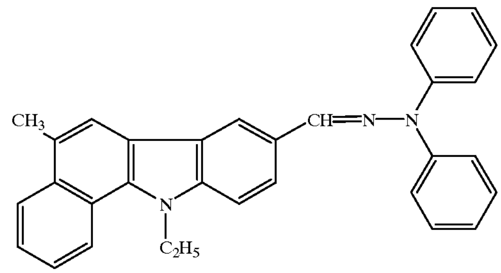
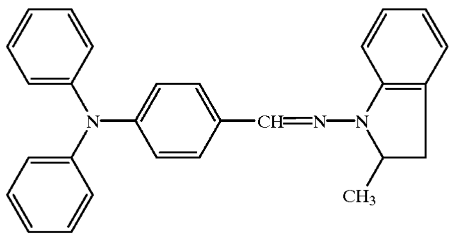
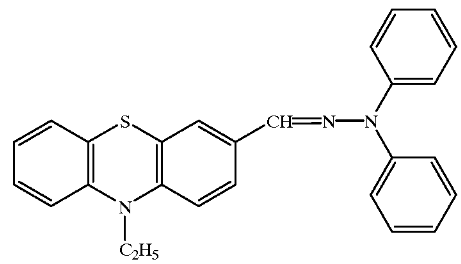
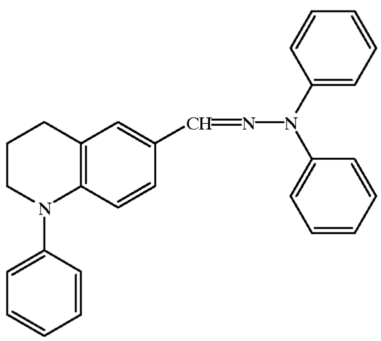
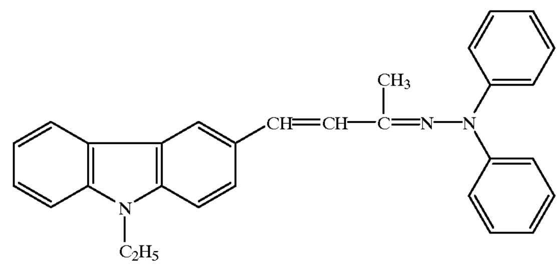
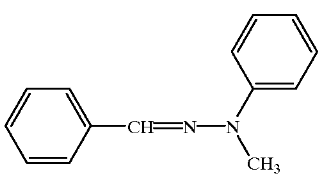
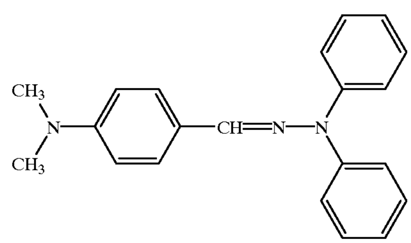
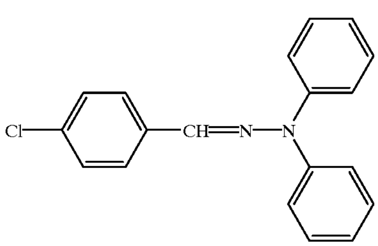
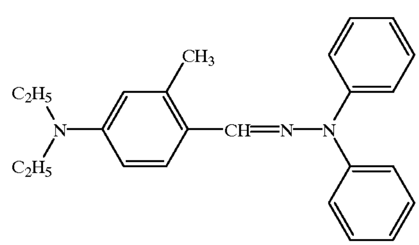
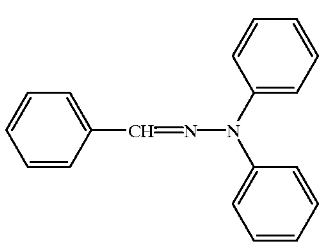
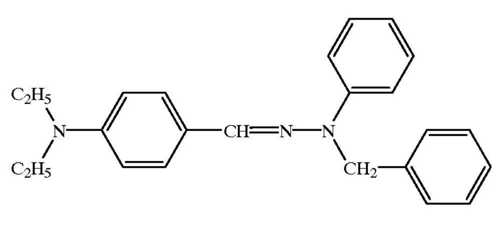

-continued
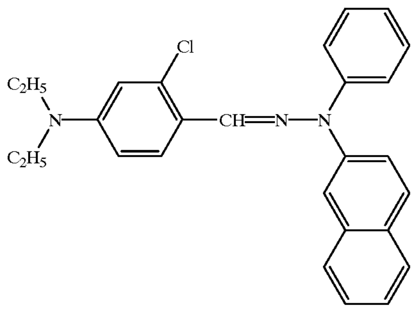
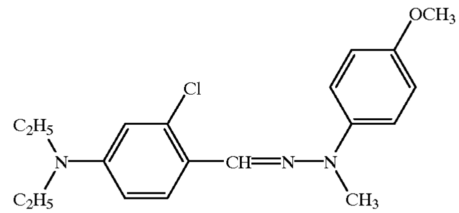
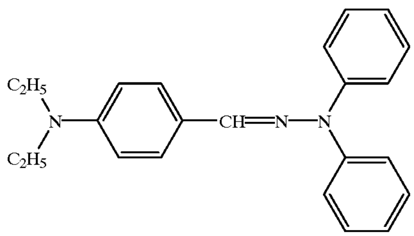
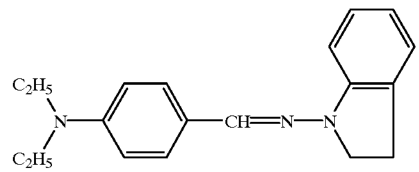
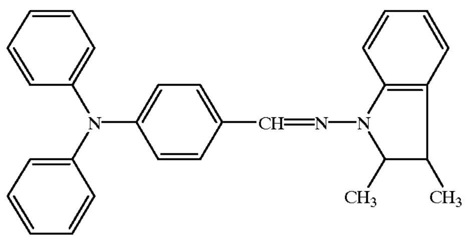
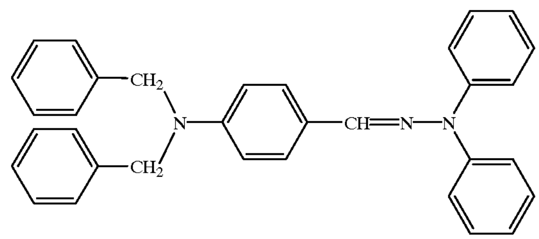
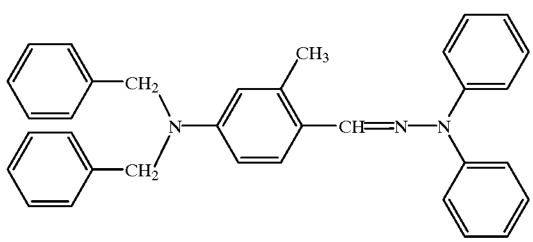
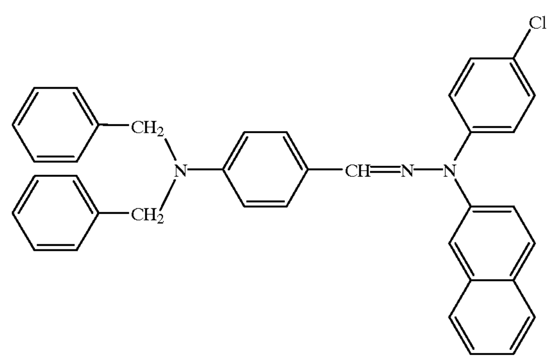
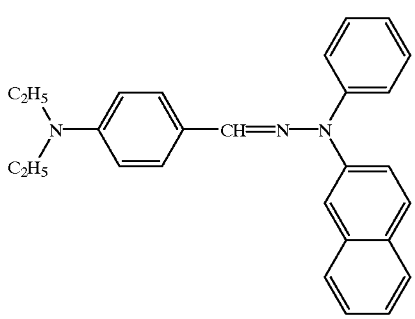
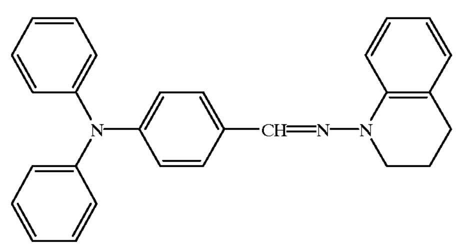

-continued
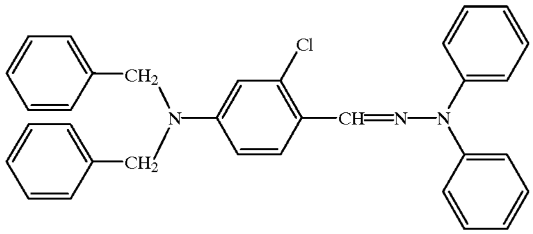
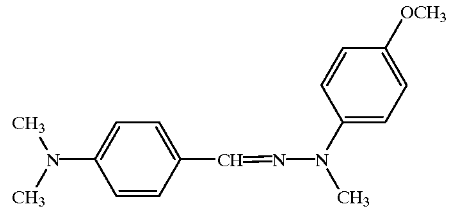
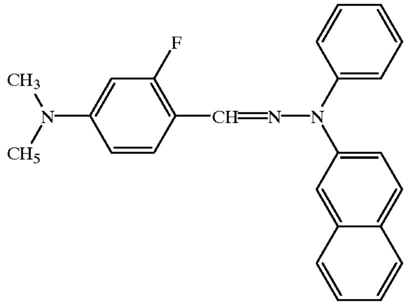
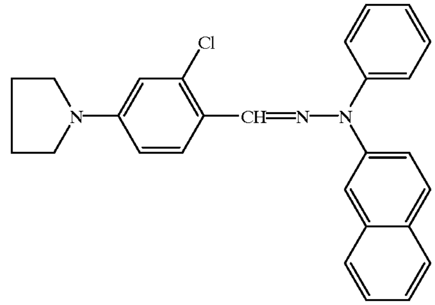
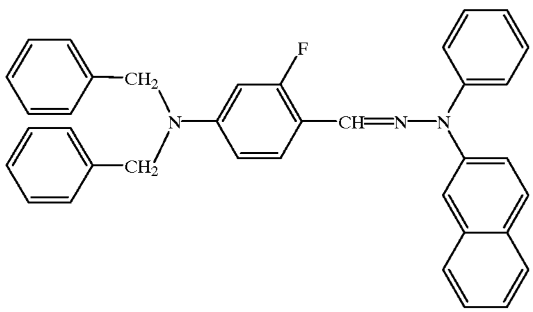
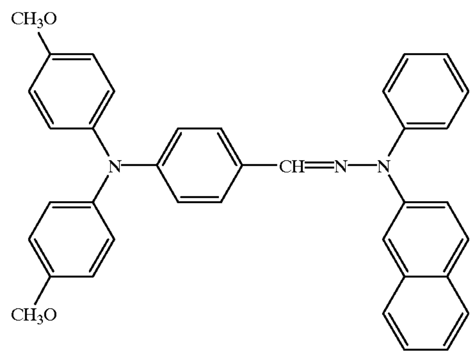
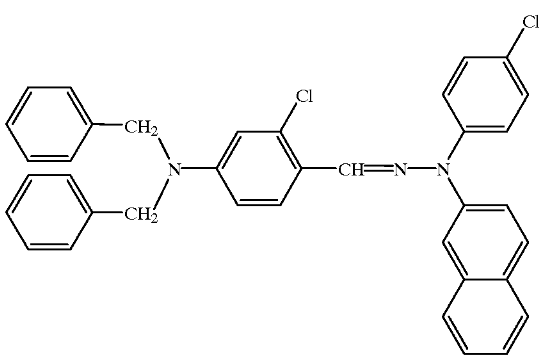
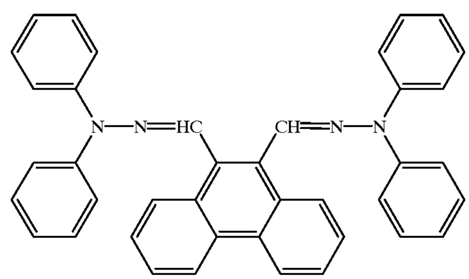
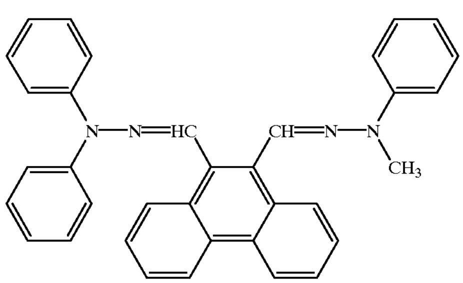
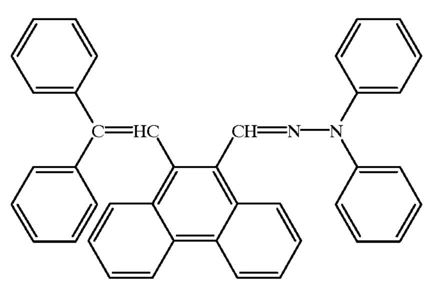

-continued
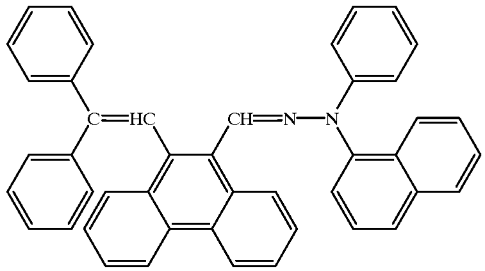
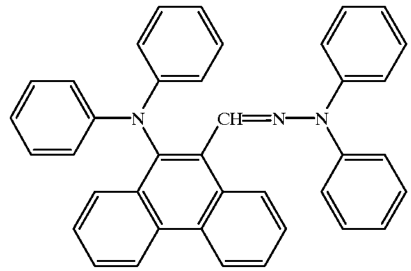
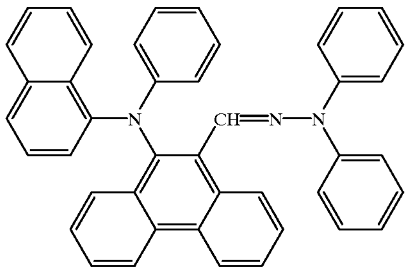
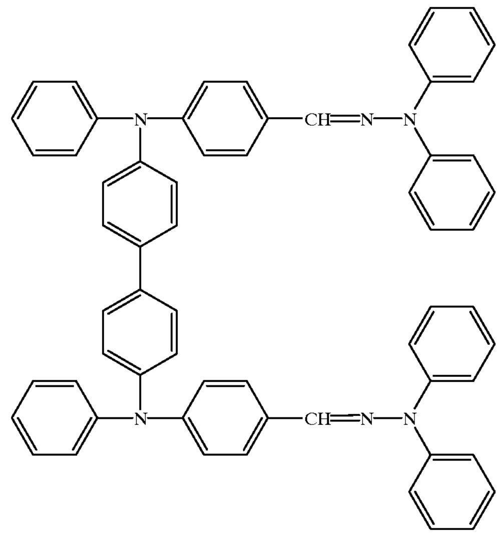
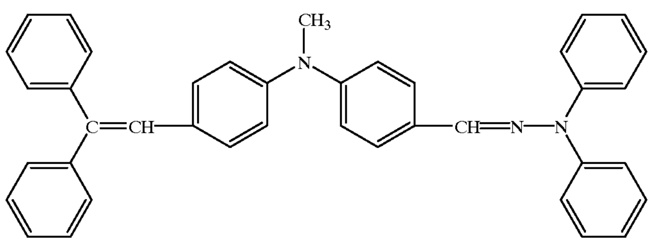
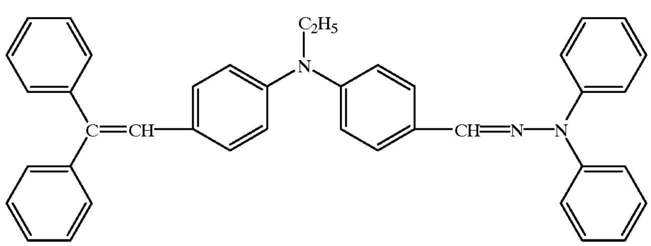
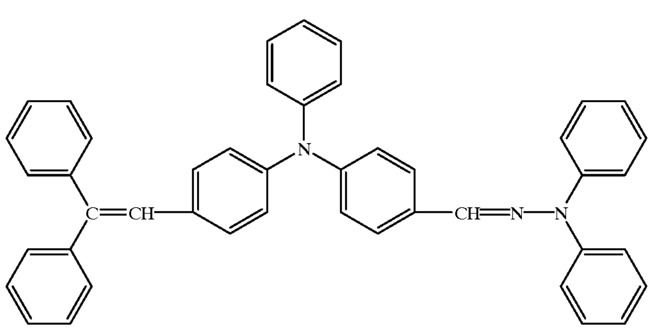

-continued
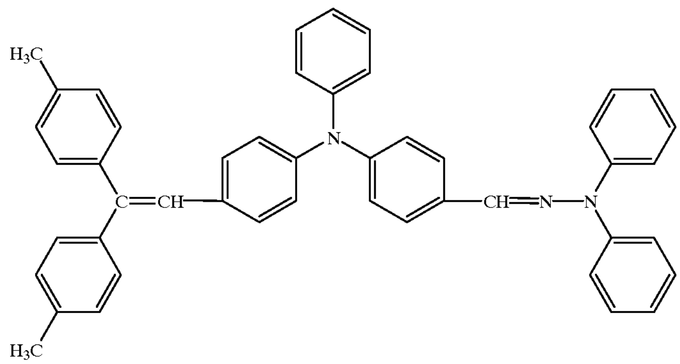
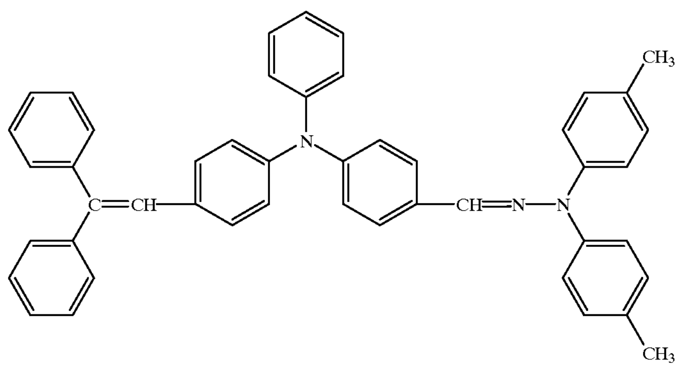
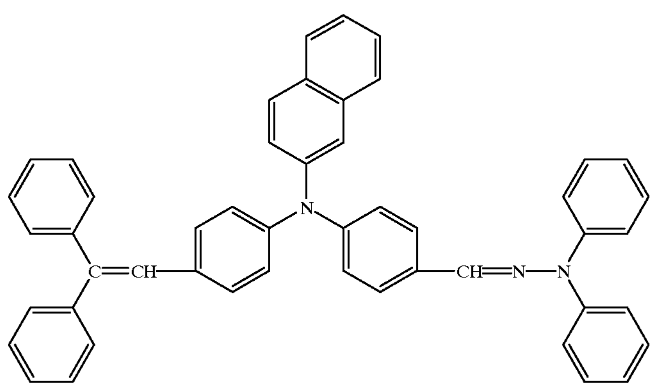
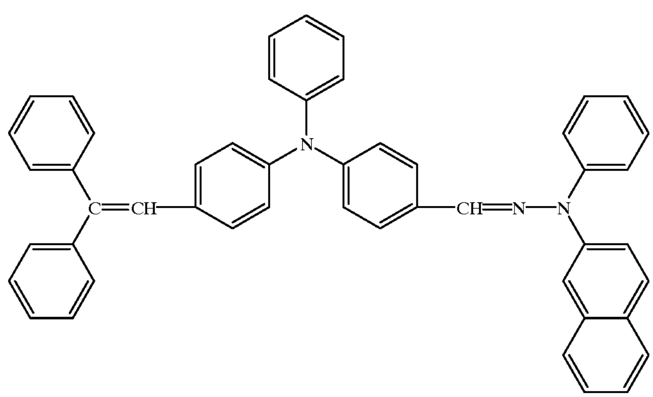

-continued
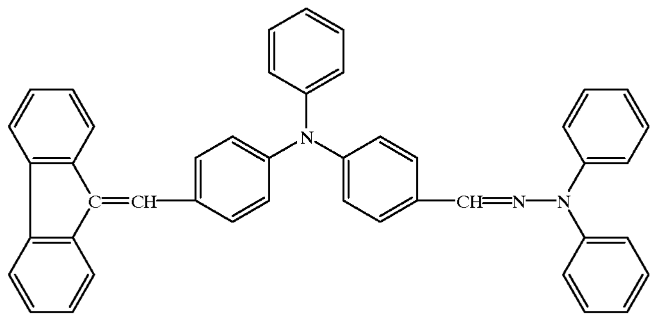
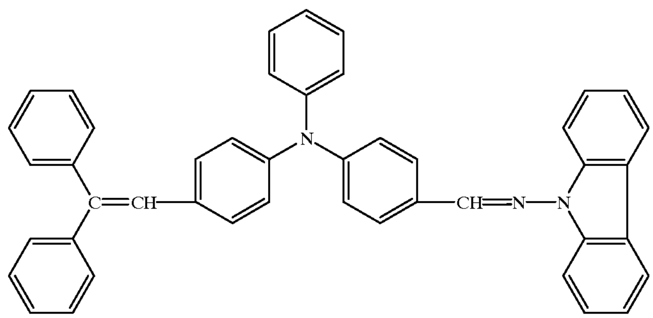
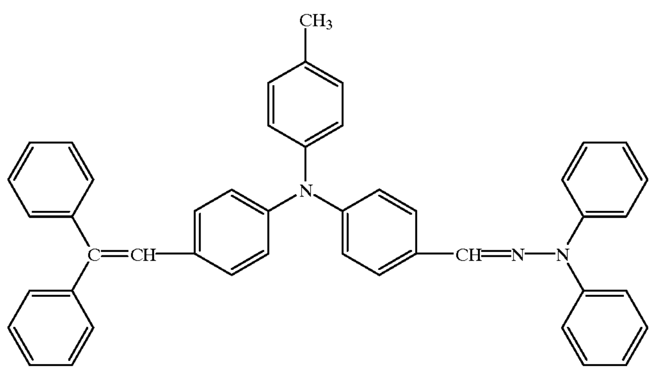
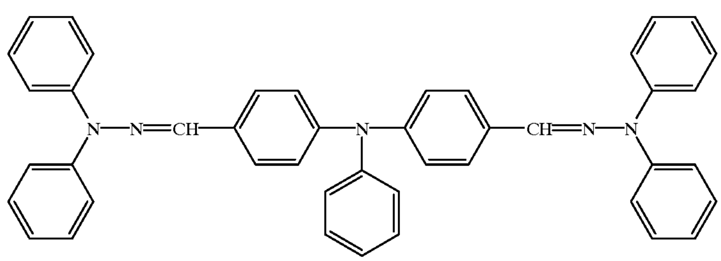
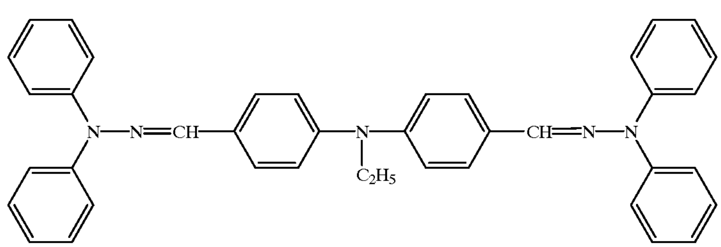

-continued
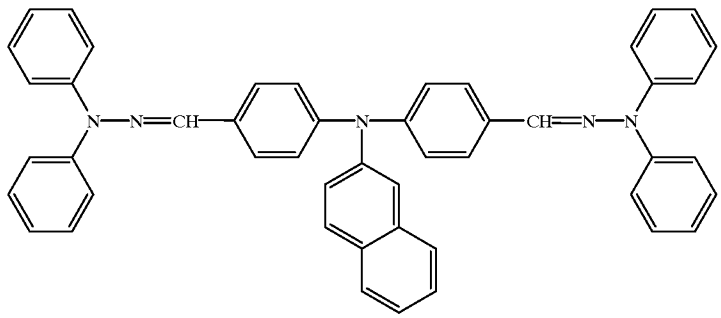
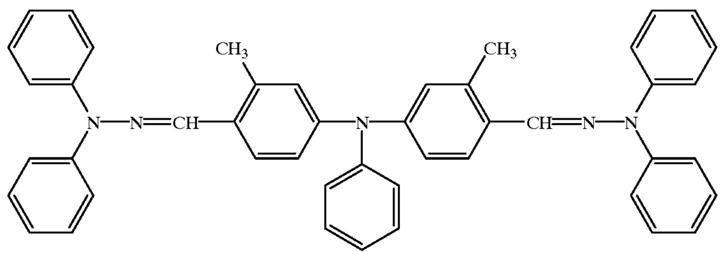
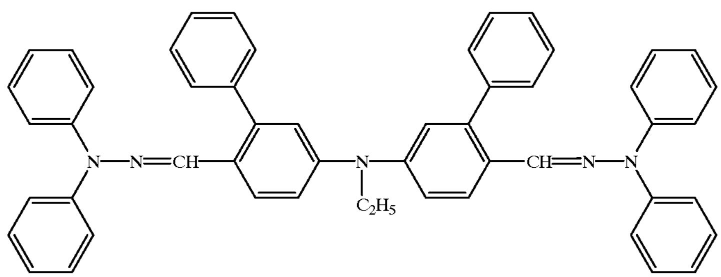
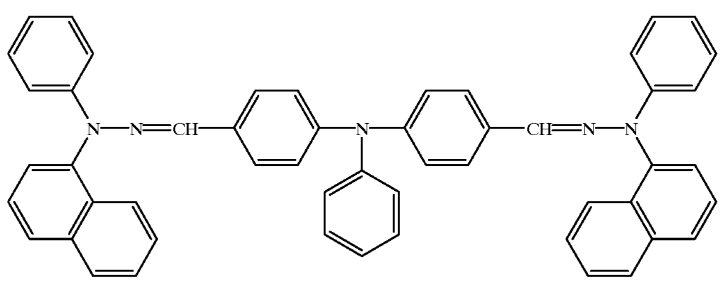
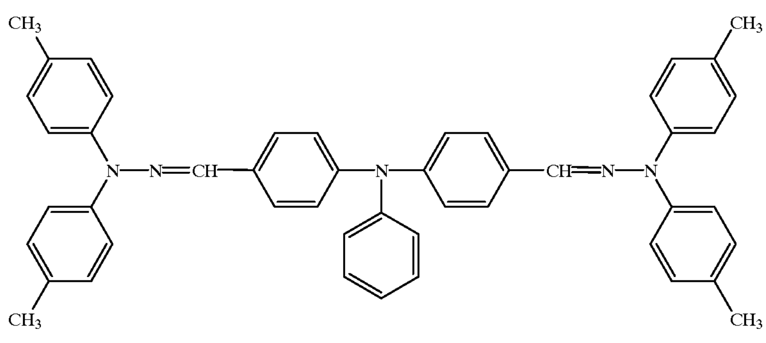

-continued
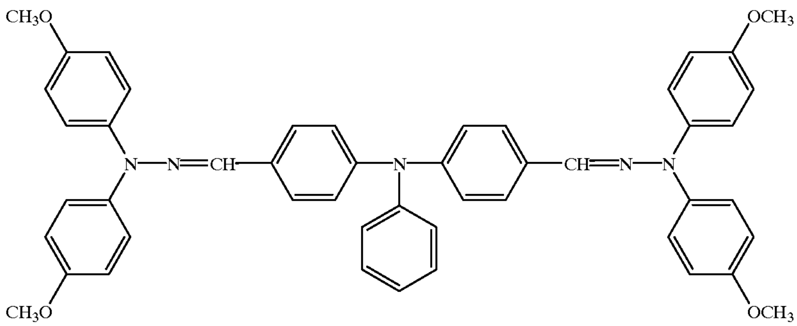
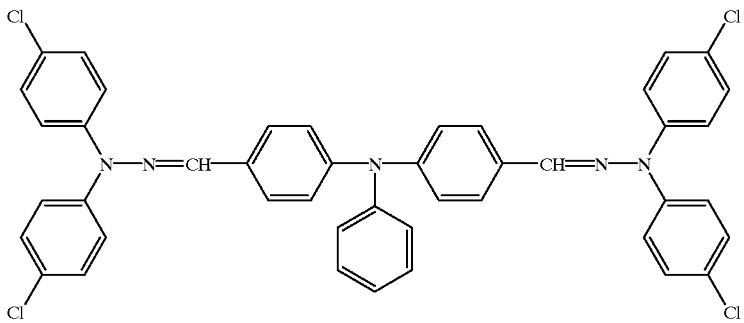
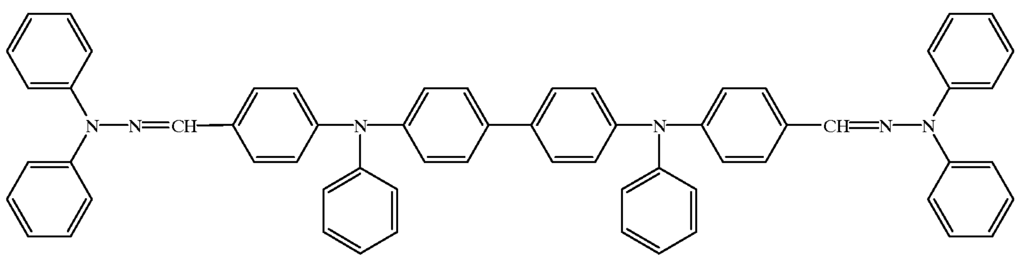
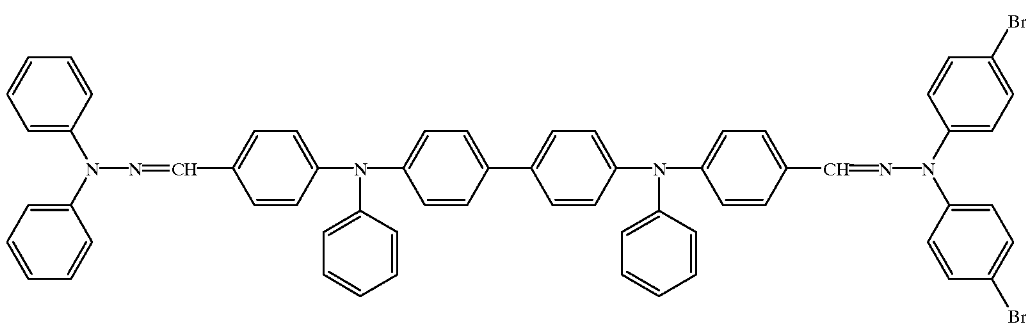
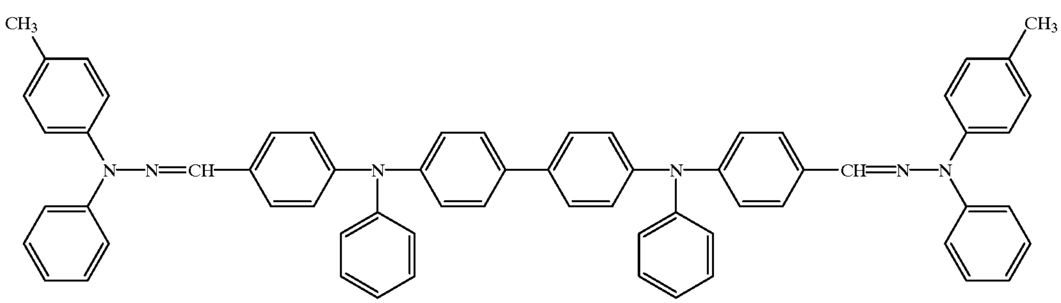

-continued
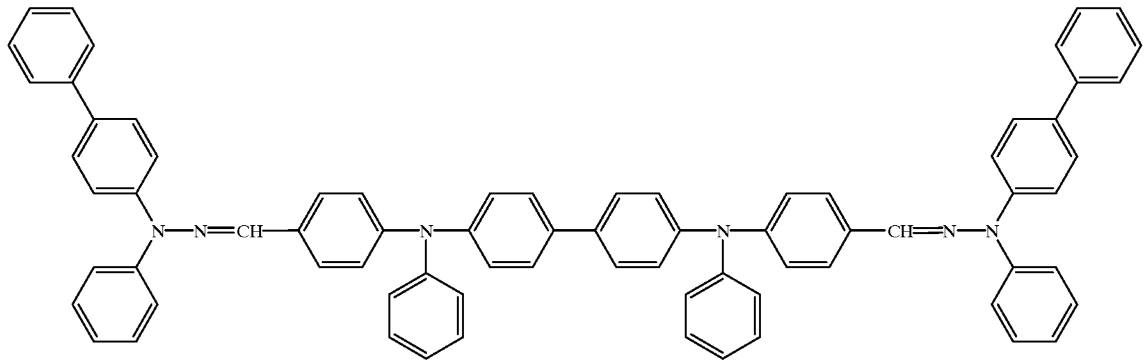
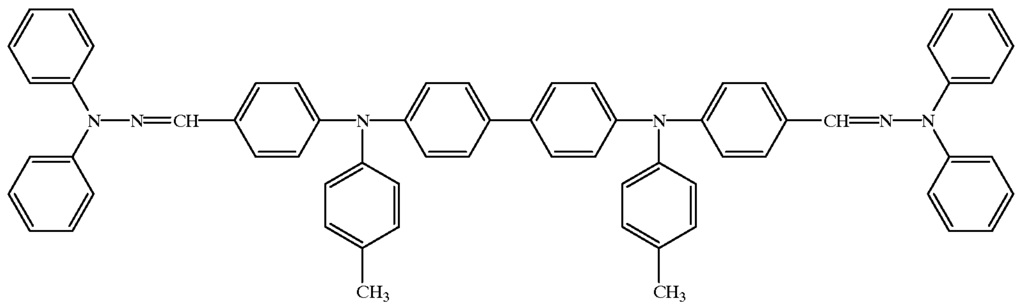
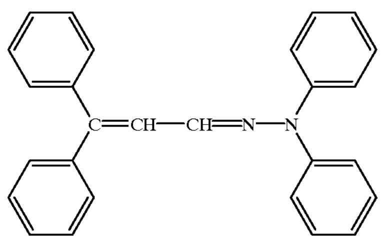
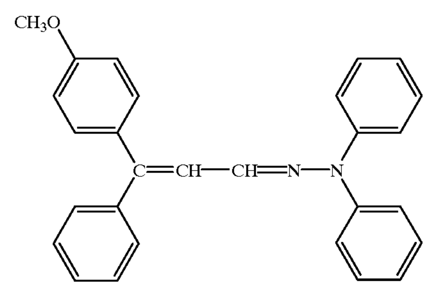
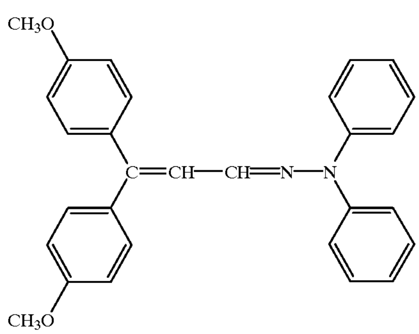
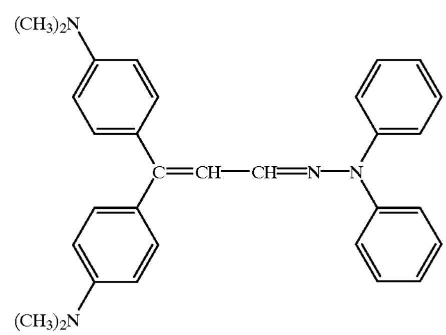
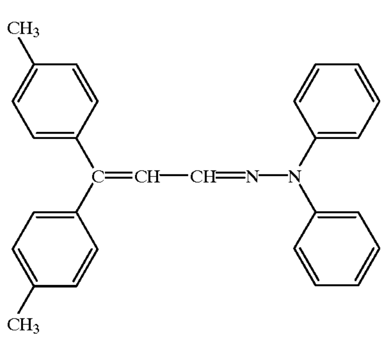
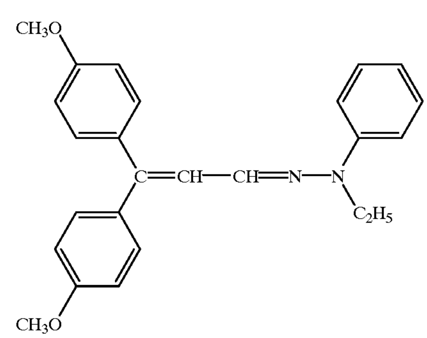

-continued
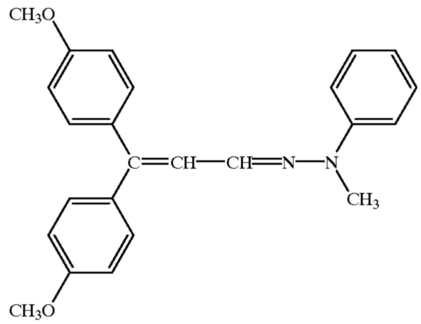
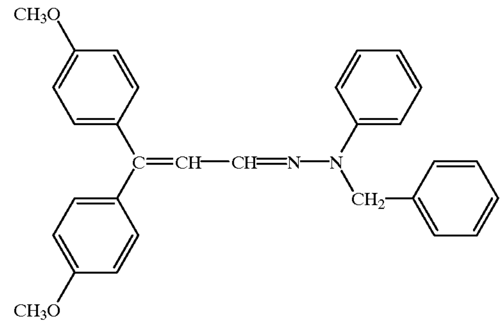
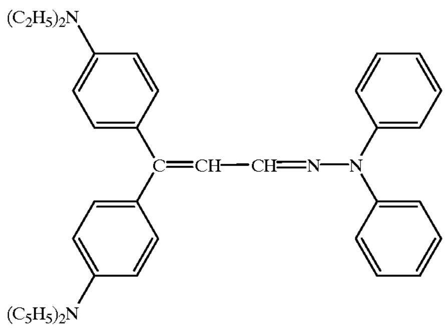
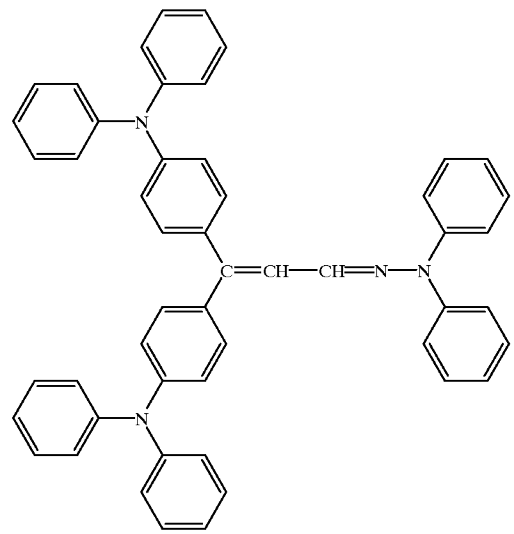
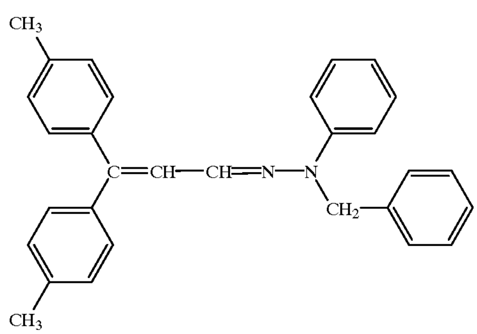
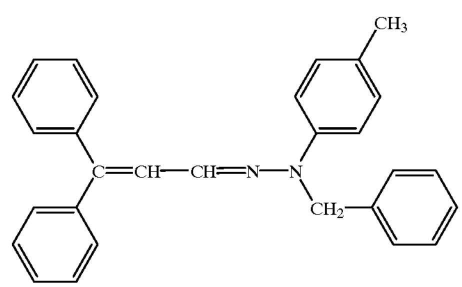
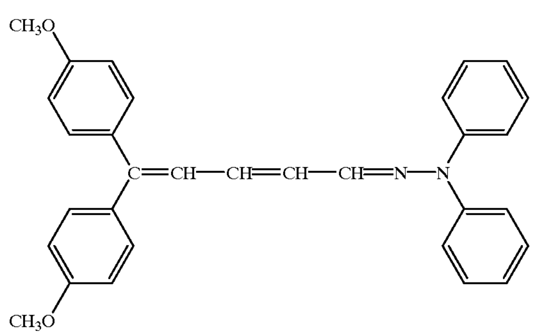
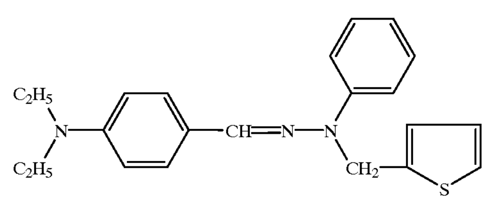

-continued
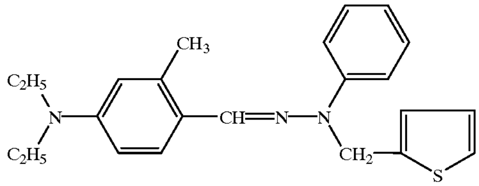
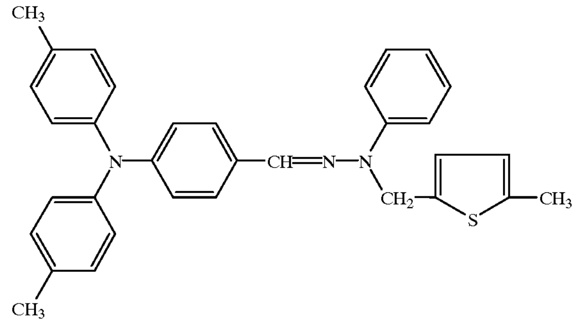
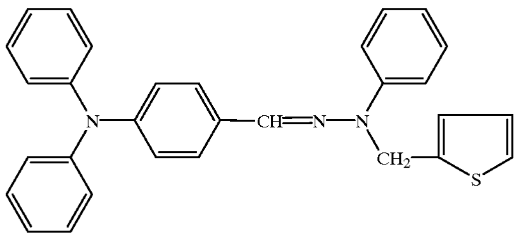
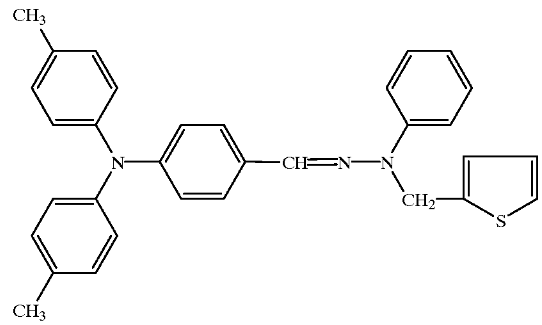
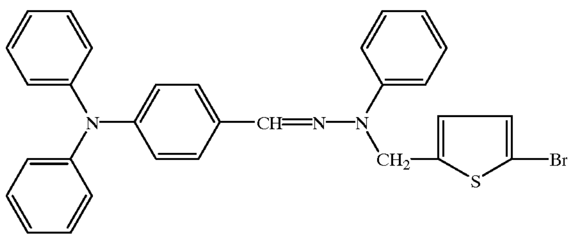
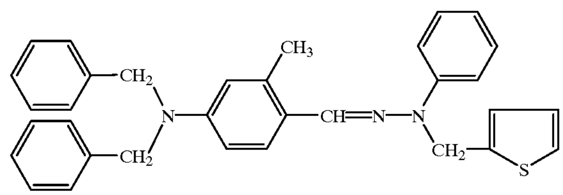
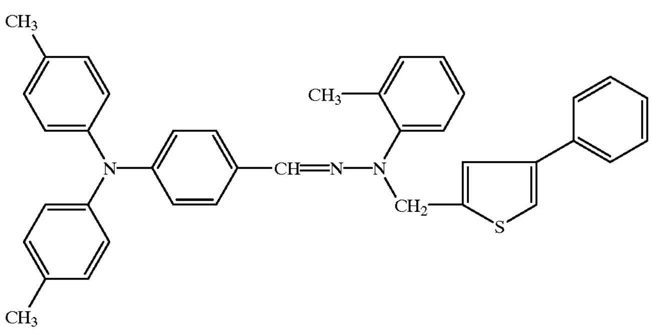
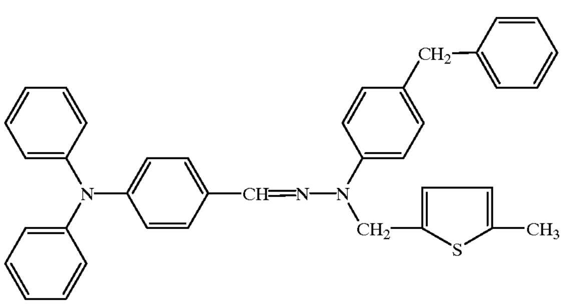
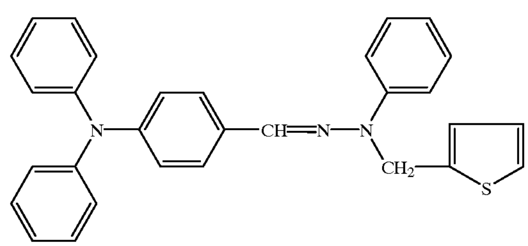

-continued
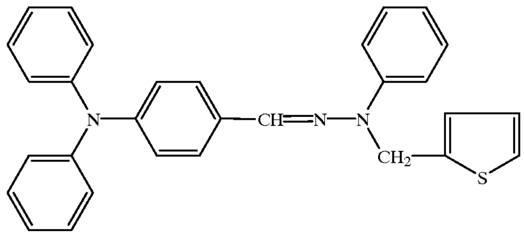
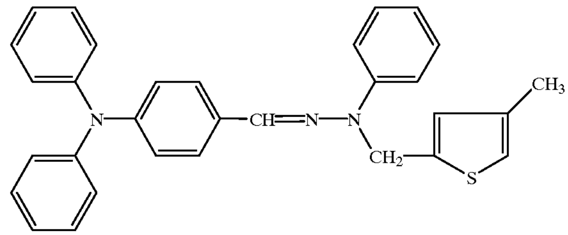
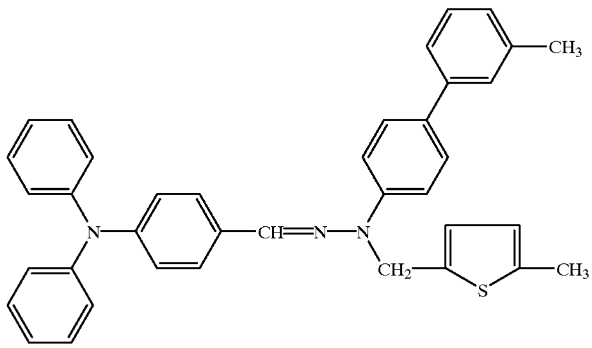
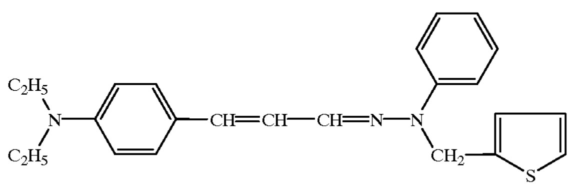
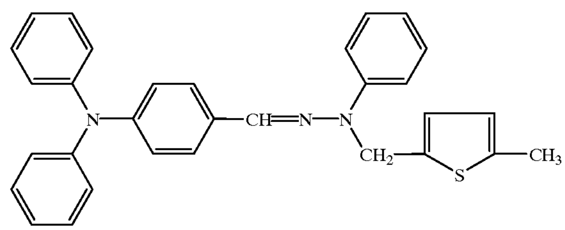
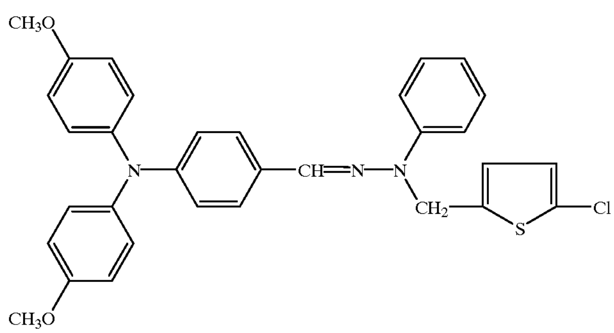
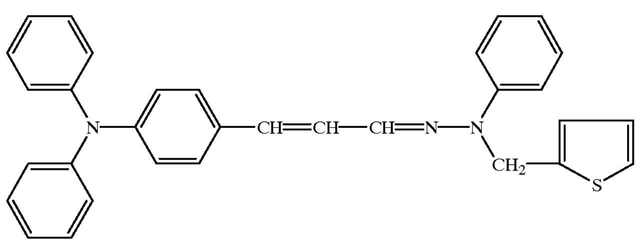

-continued
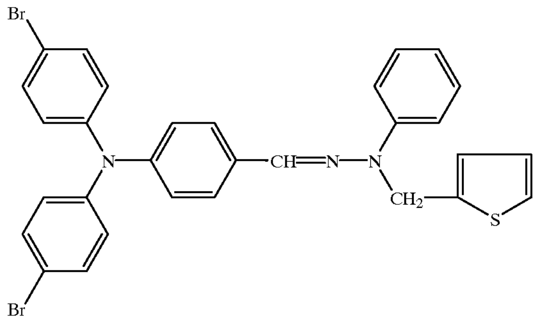
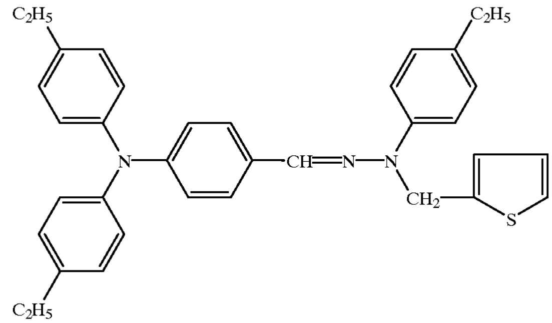
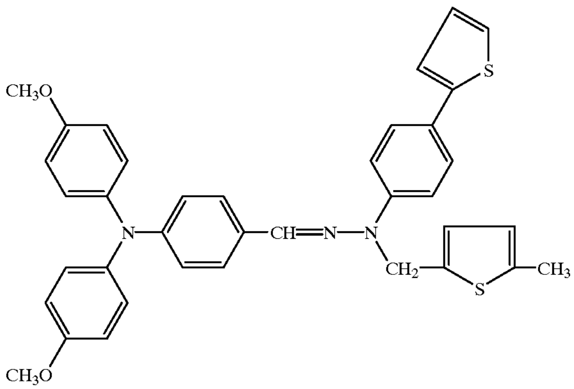
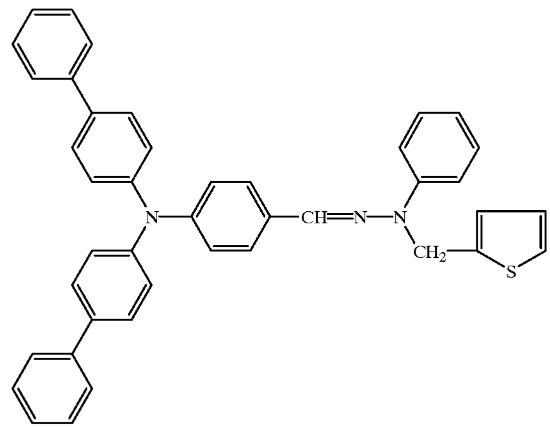
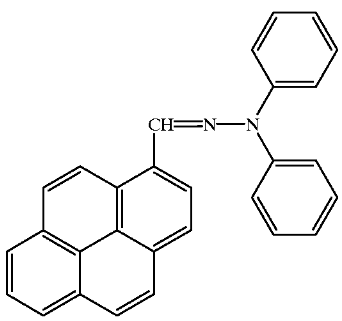
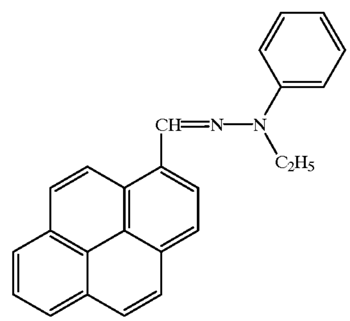
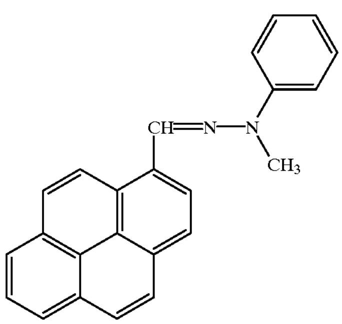
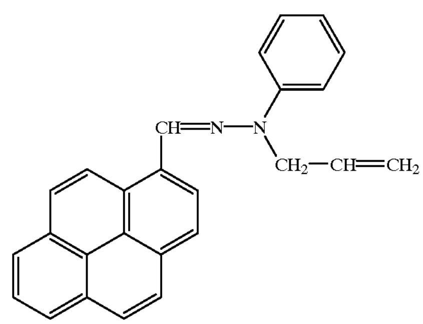

-continued
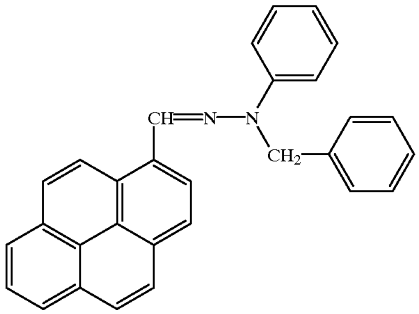
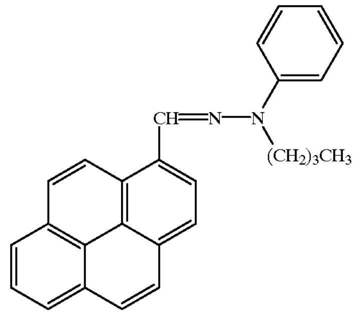
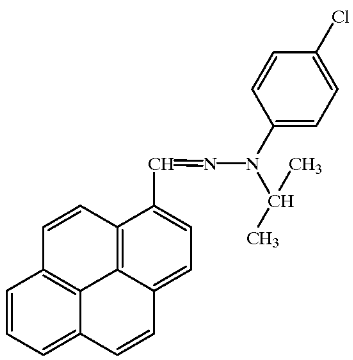
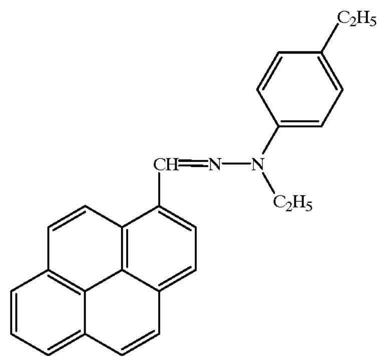
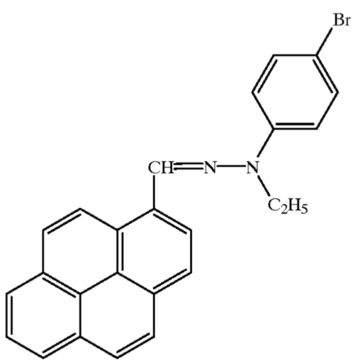
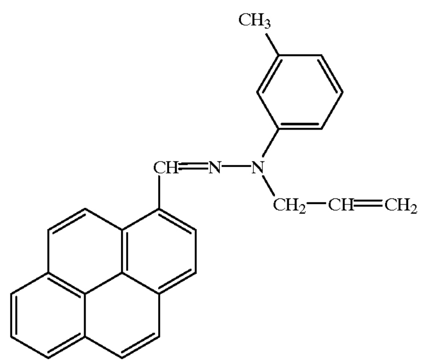
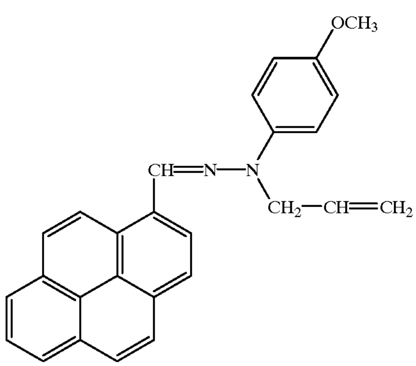
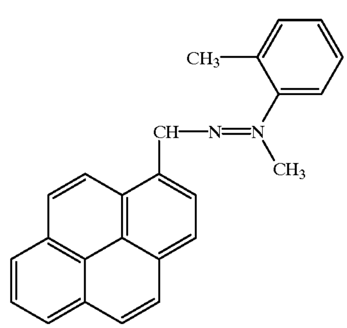

-continued
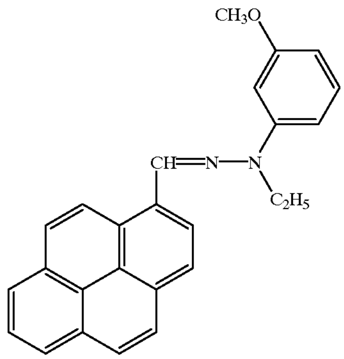
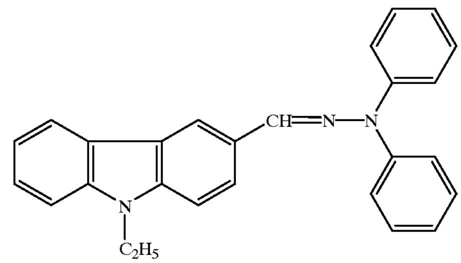
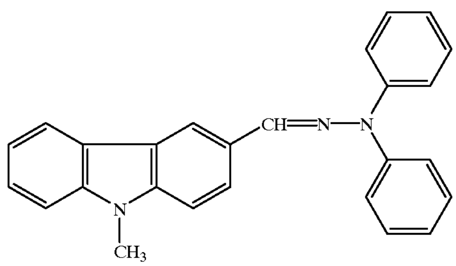
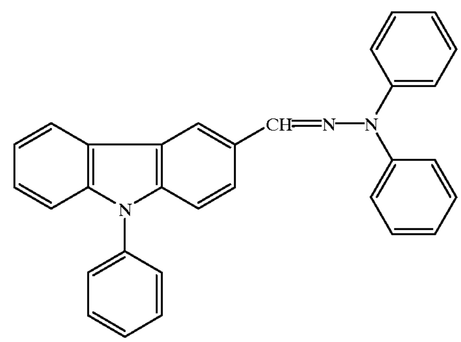
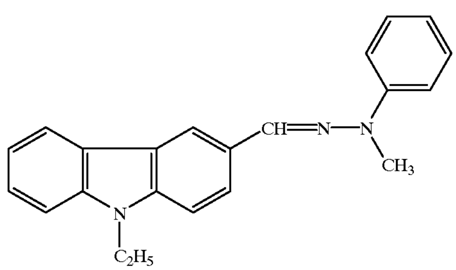
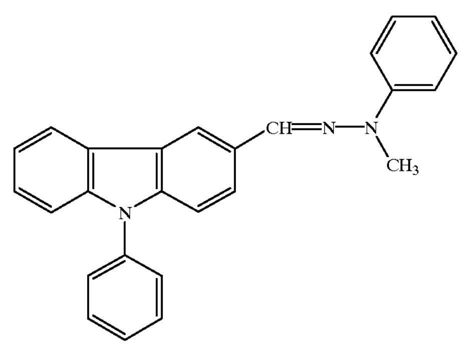
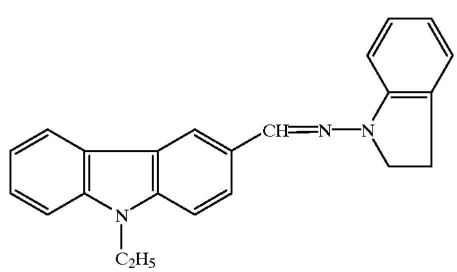
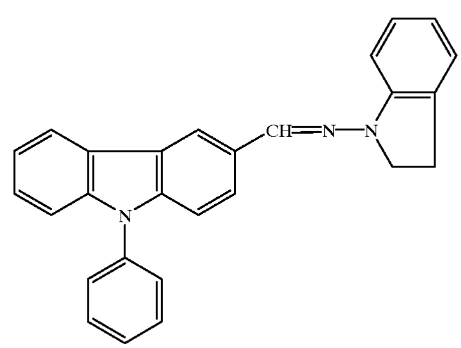

-continued
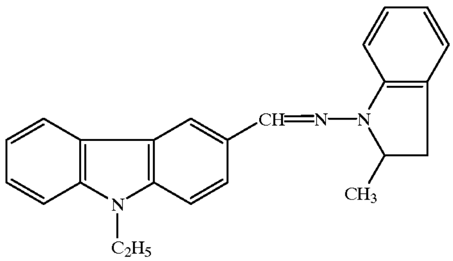
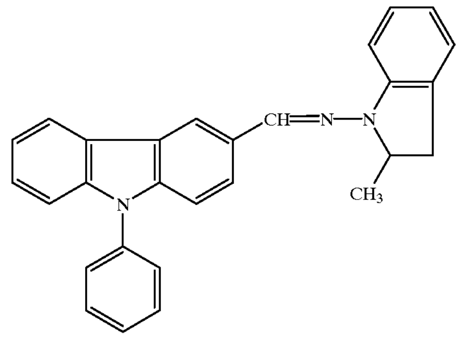
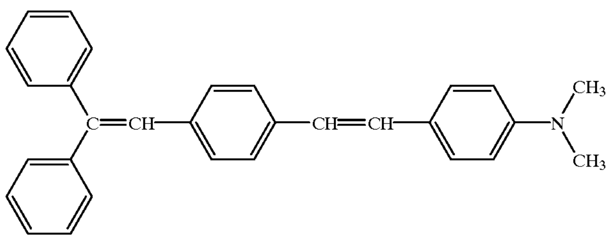
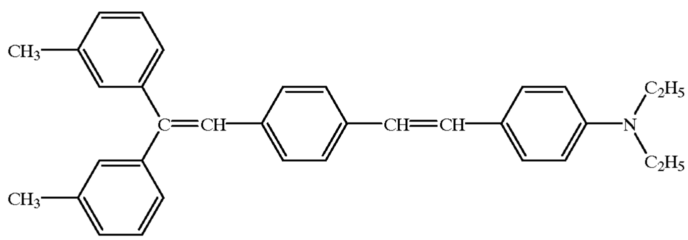
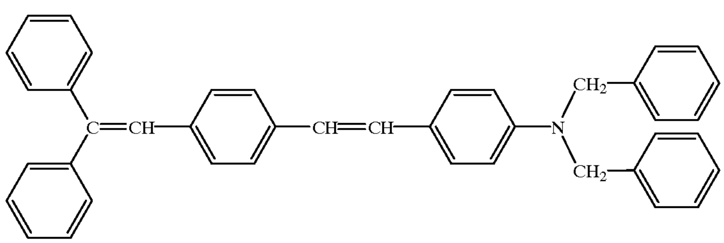
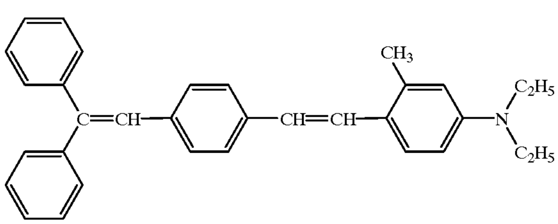
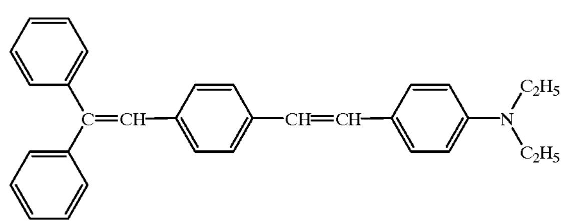
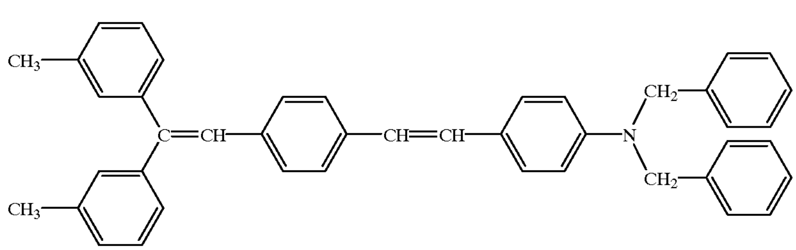

-continued
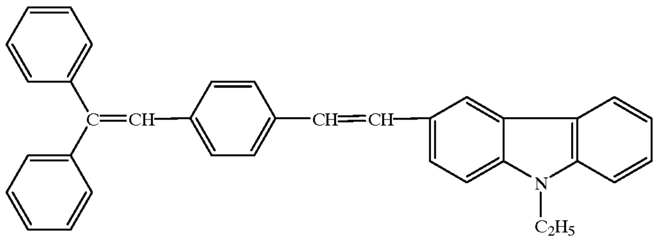
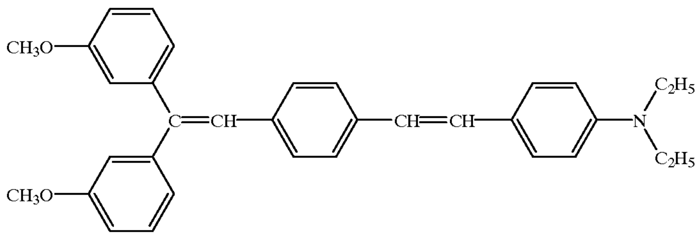
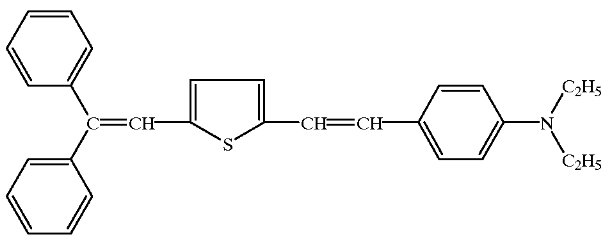
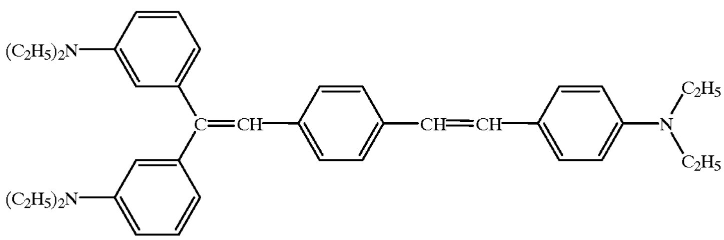
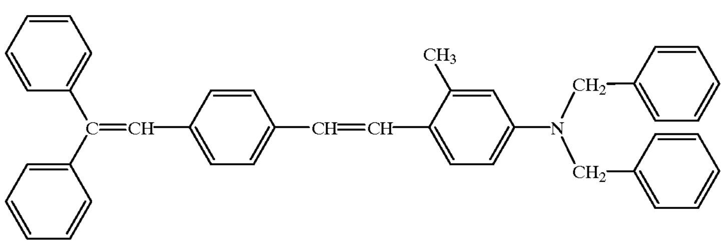
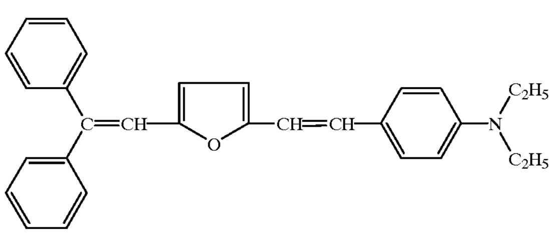
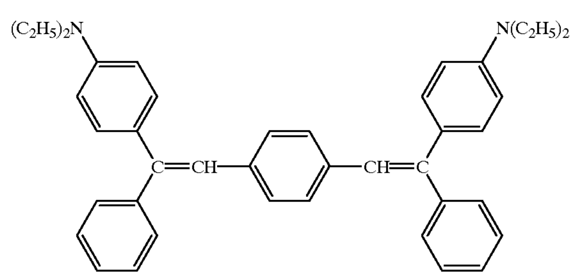

-continued
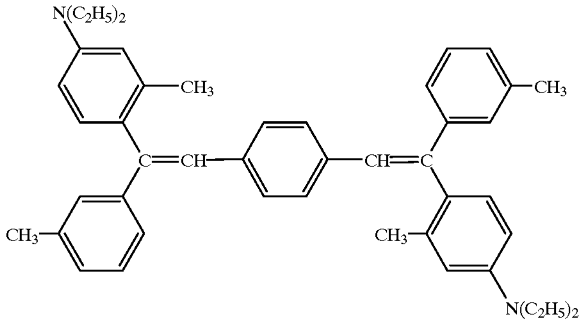
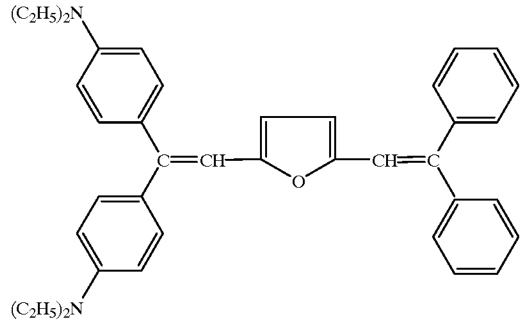
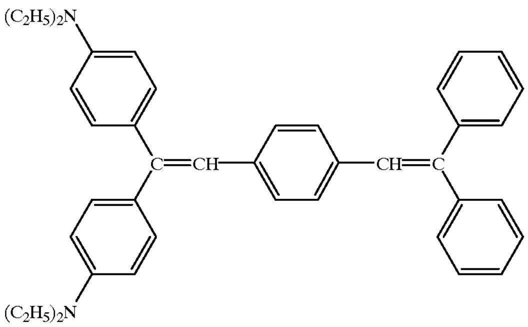
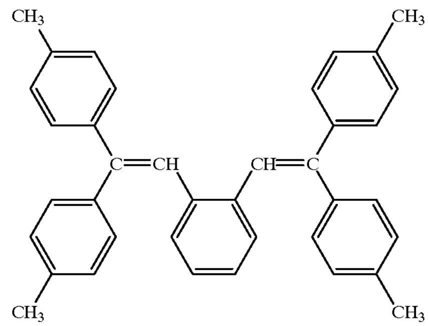
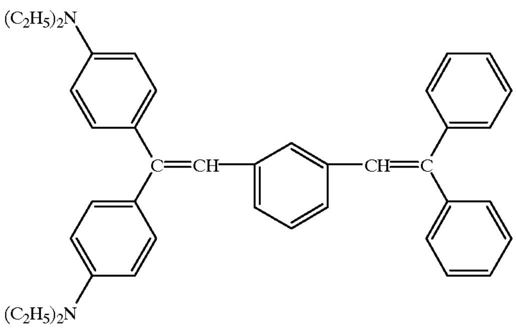
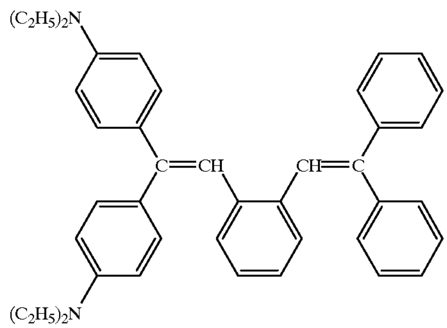
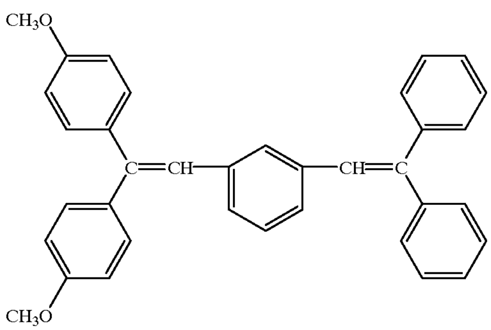
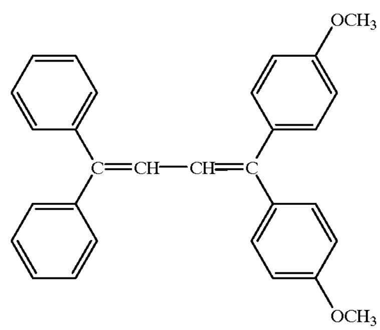
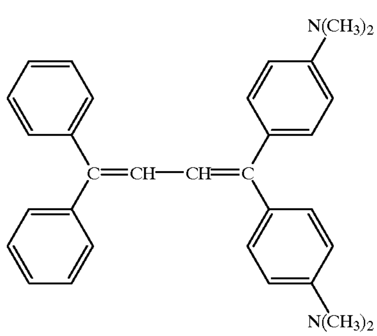
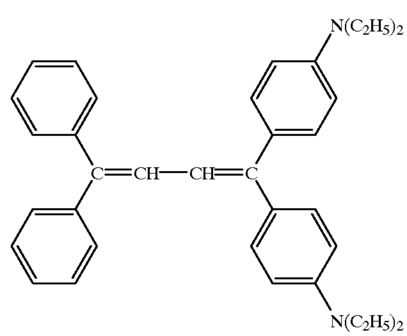

-continued
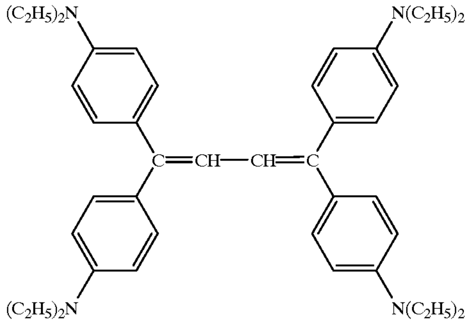
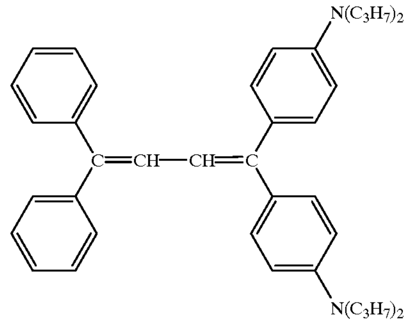
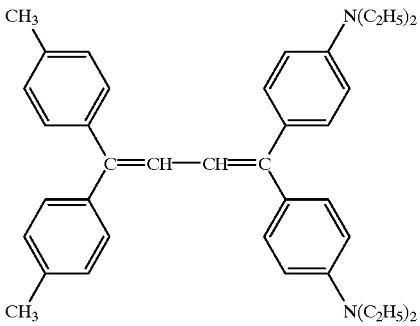
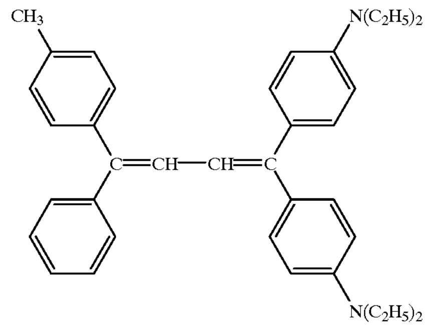
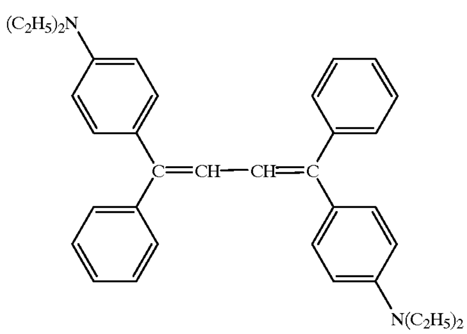
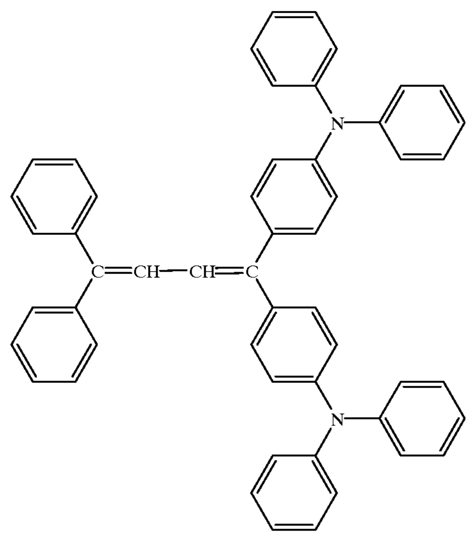
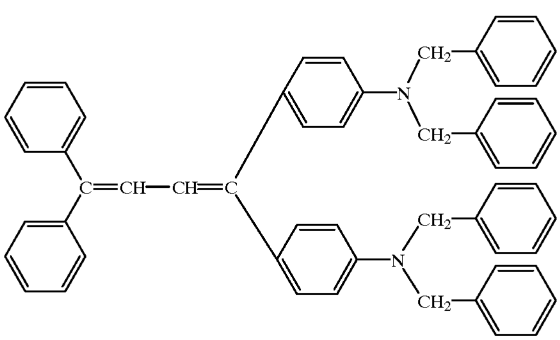
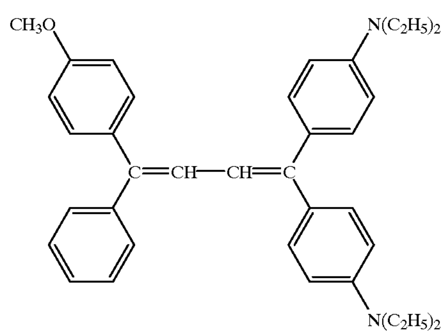

-continued
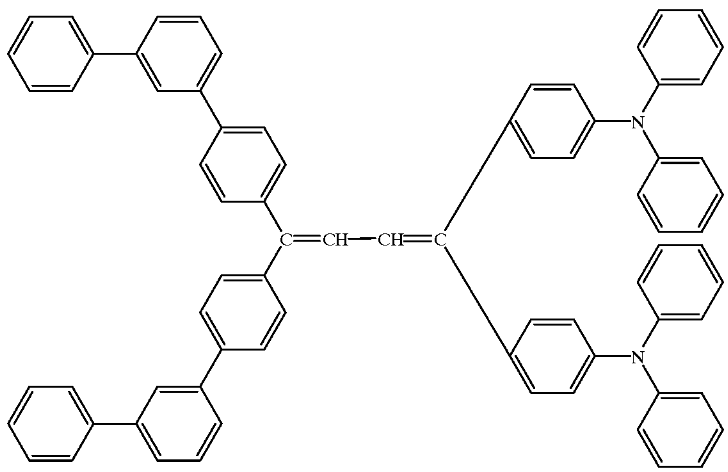
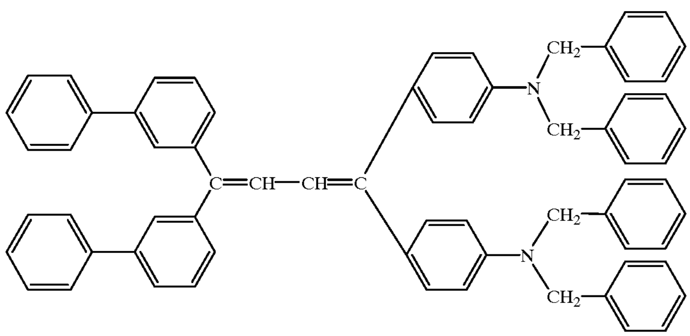
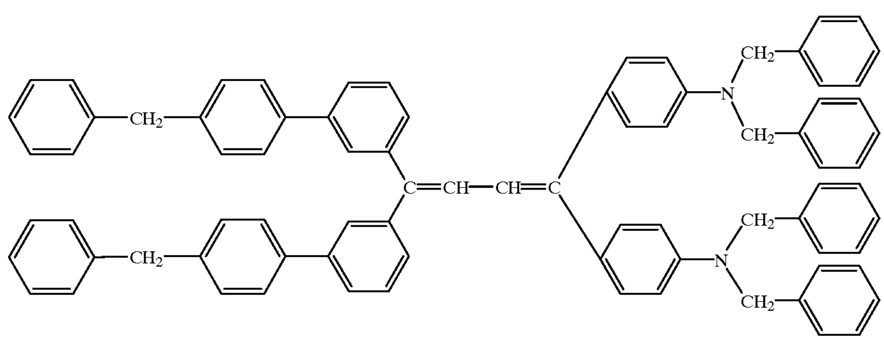
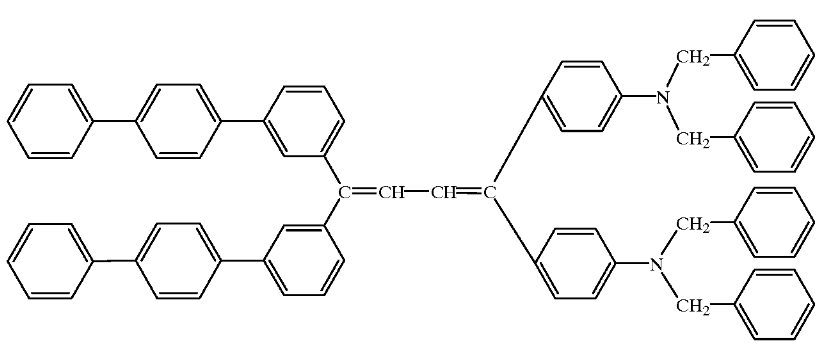

-continued
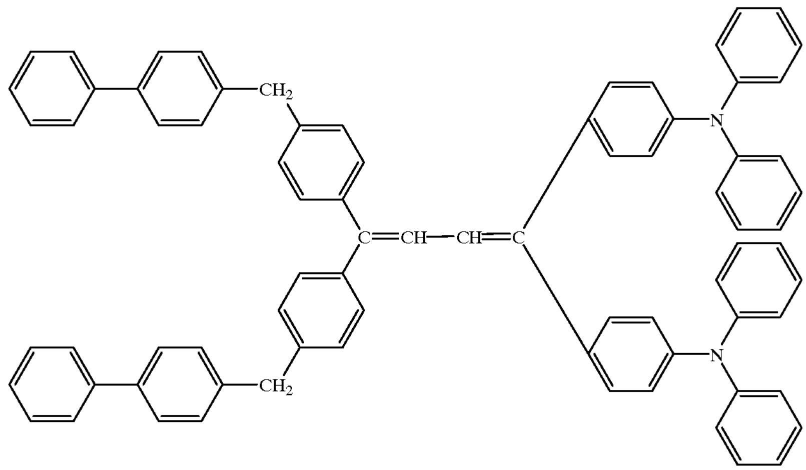
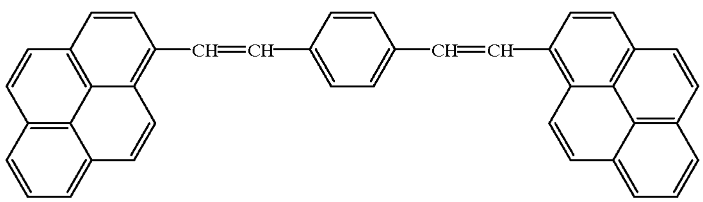
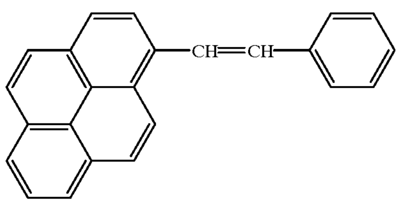
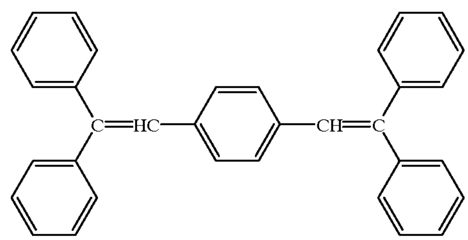
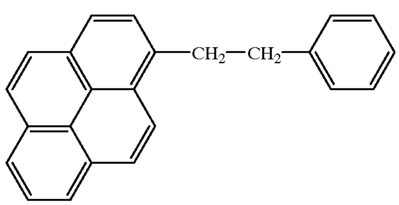
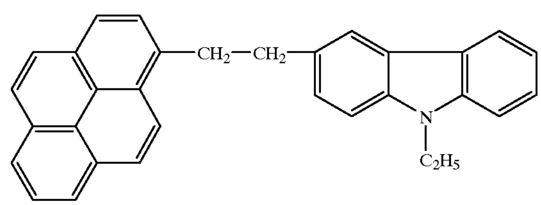
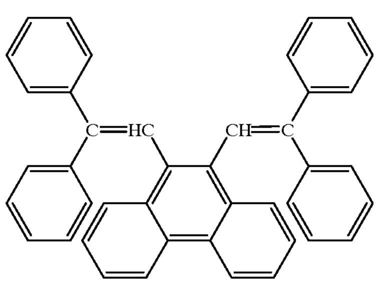
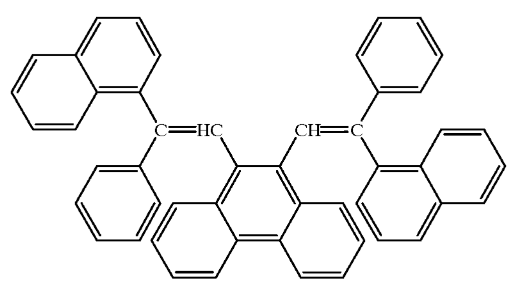

-continued
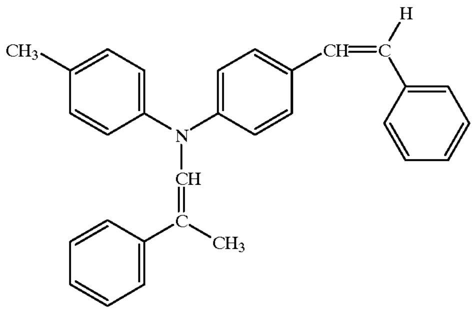
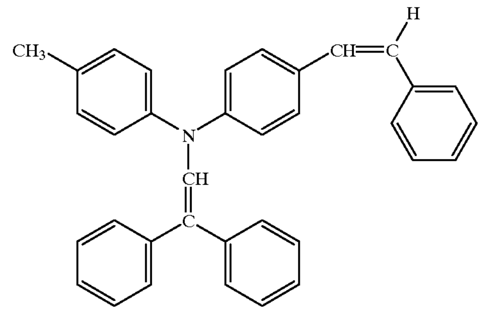
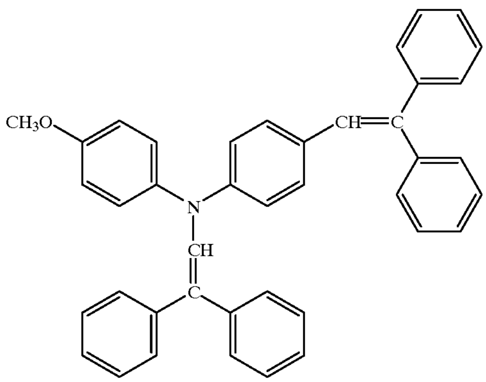
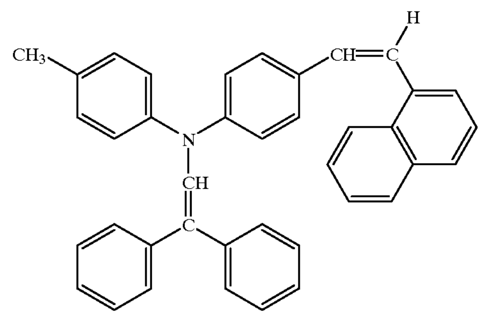
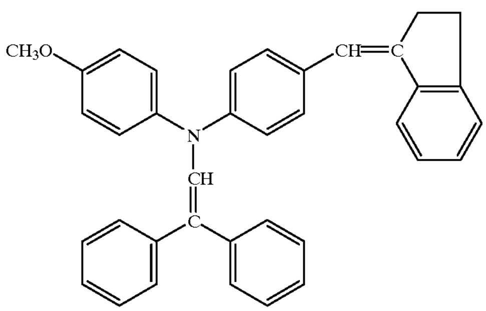
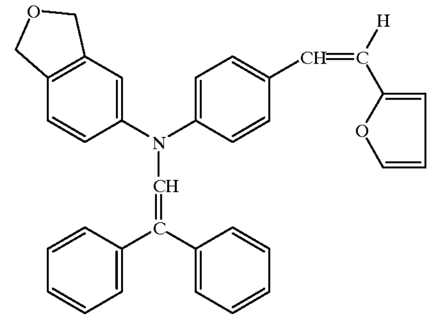
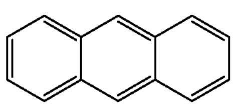
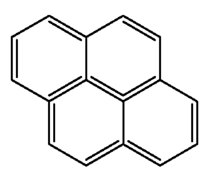
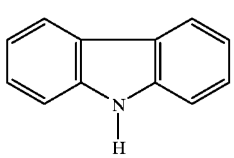
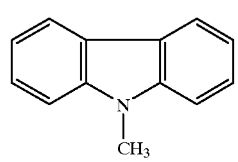
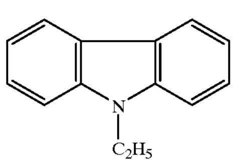
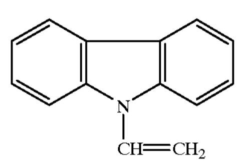

-continued
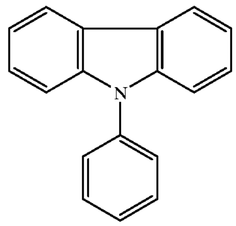
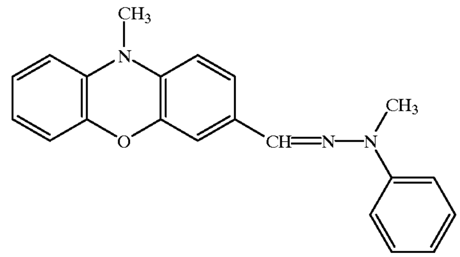
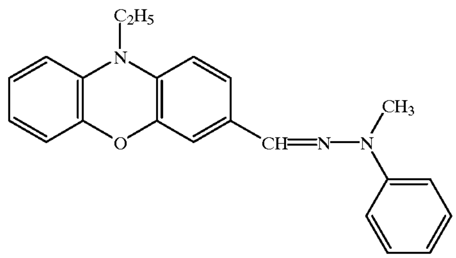
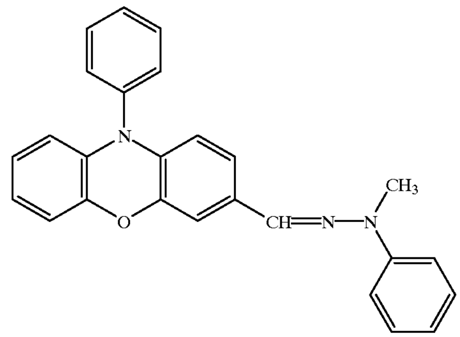
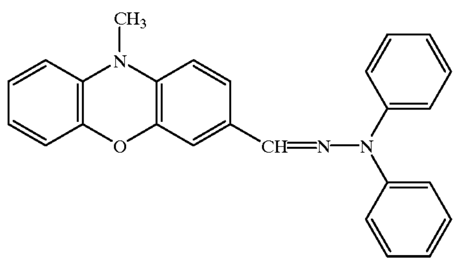
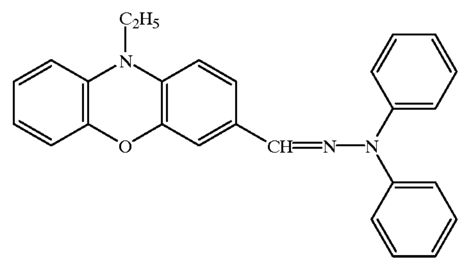
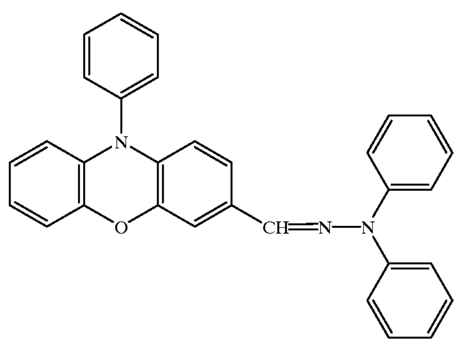
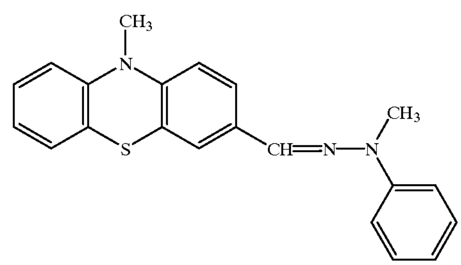
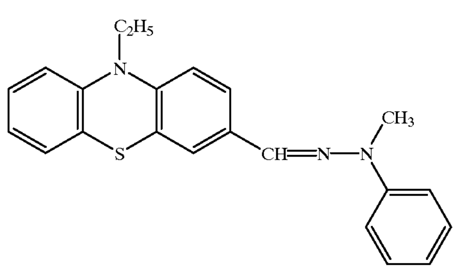
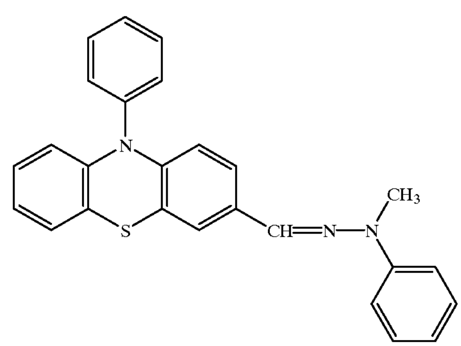

-continued
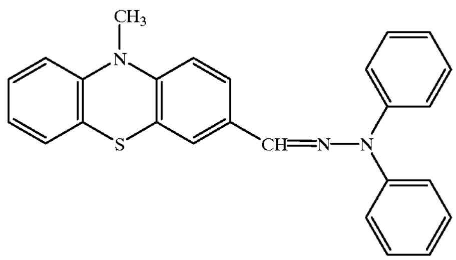
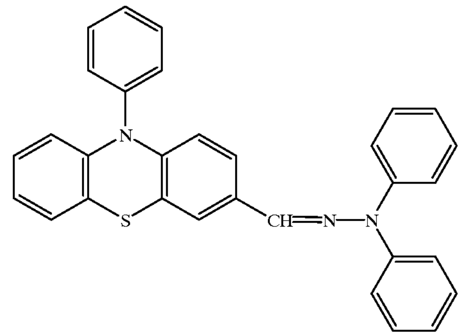
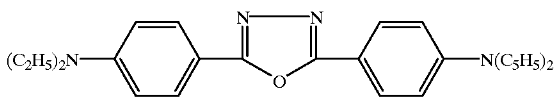
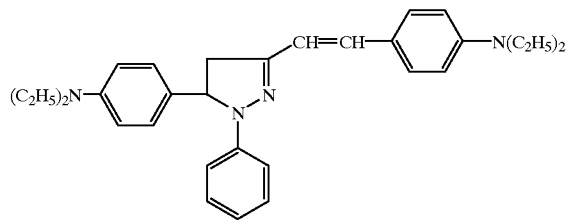
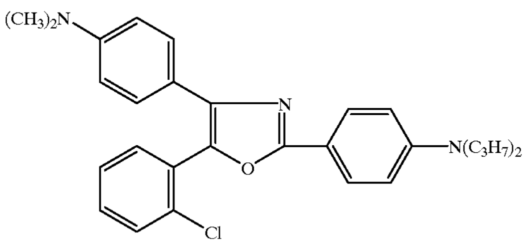
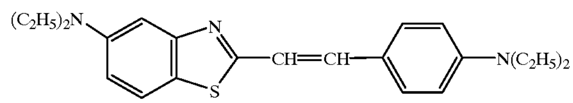
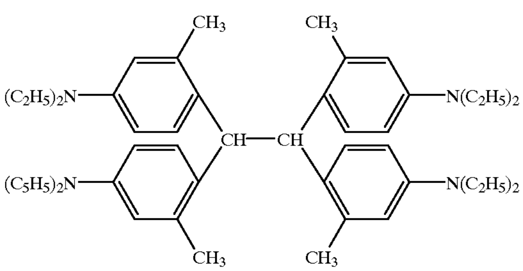
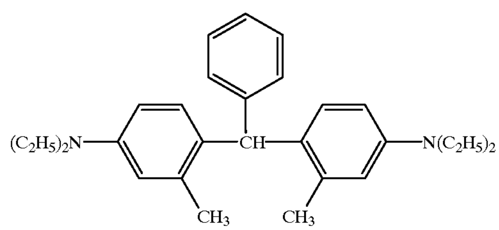
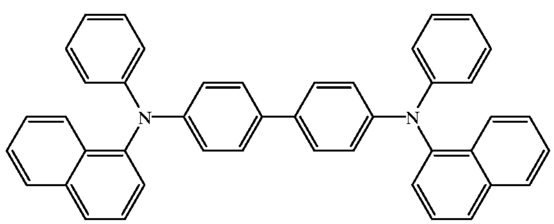
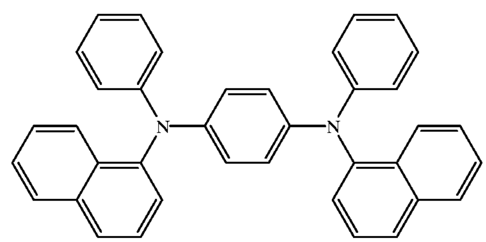

-continued
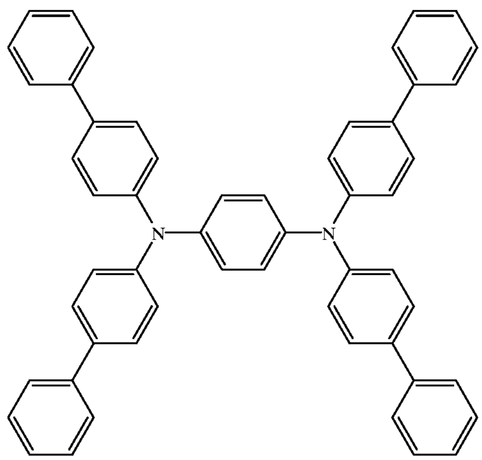
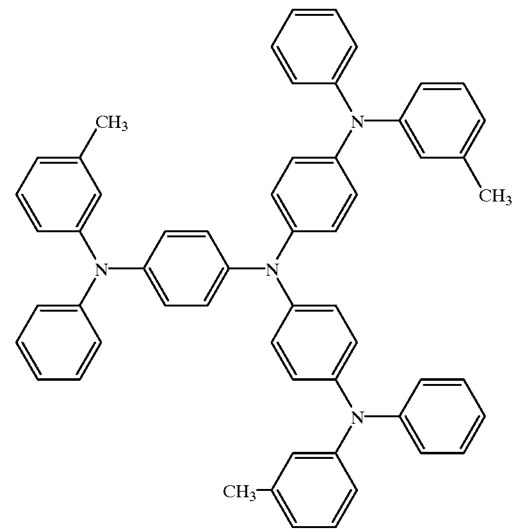
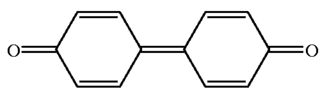
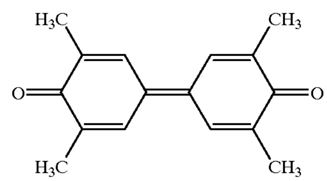
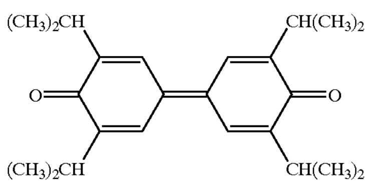
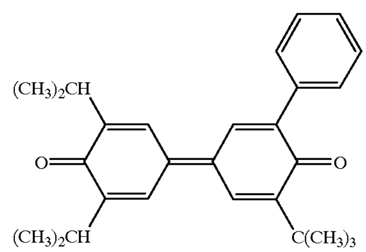
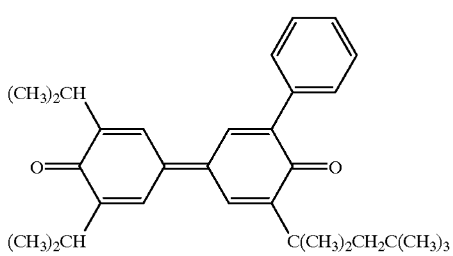
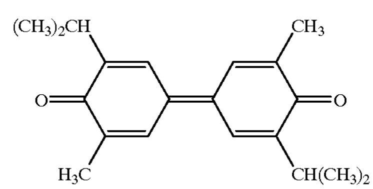
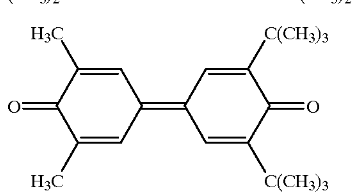
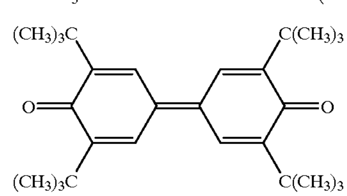
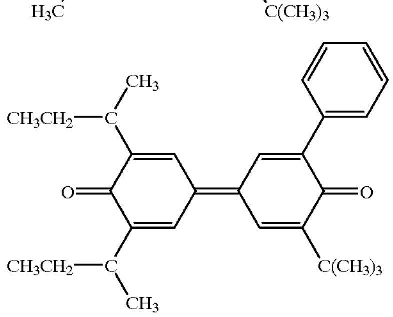
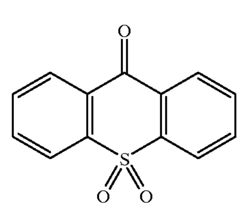

-continued
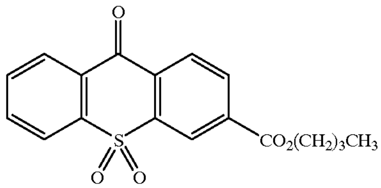
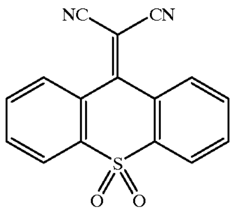
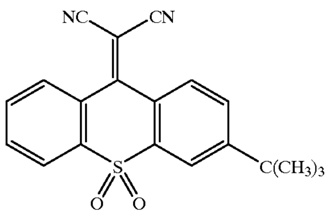
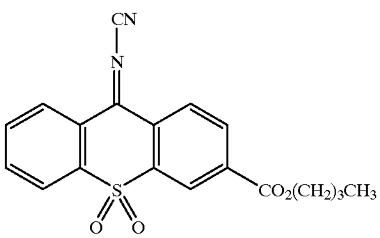
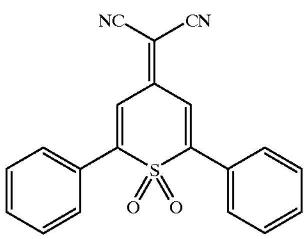
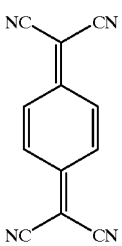
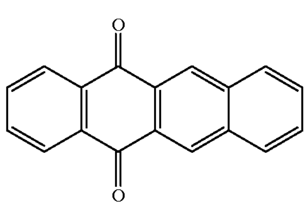
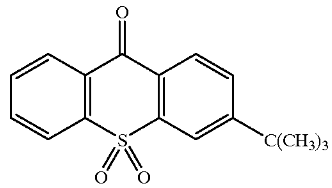
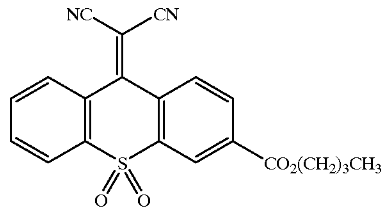
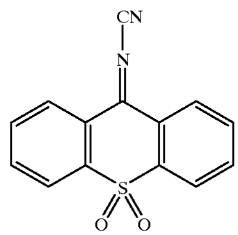
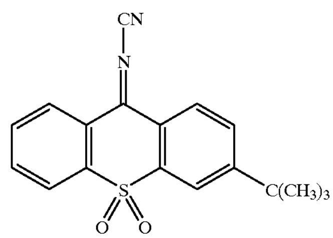
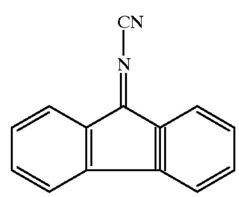
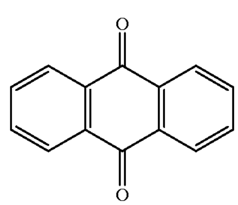
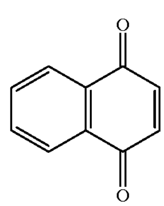

-continued

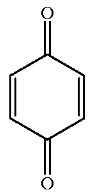
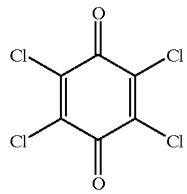
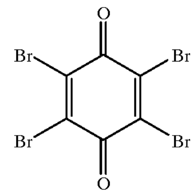
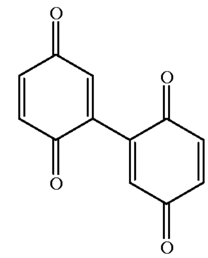
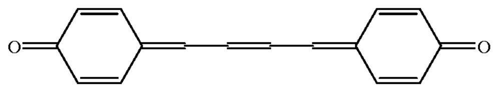
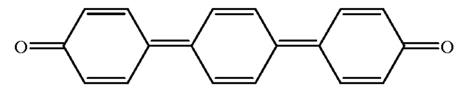
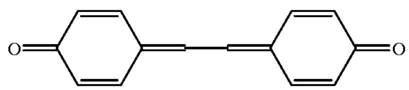
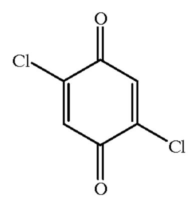
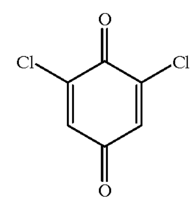
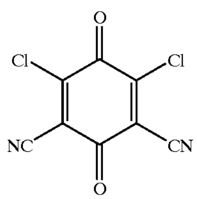
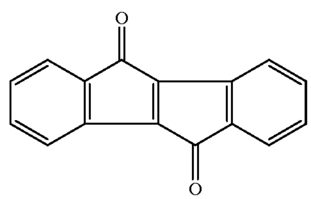
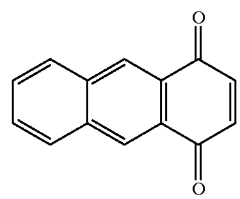
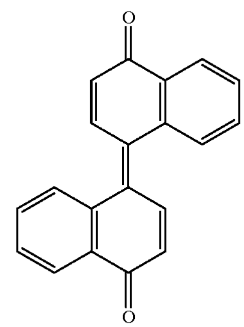
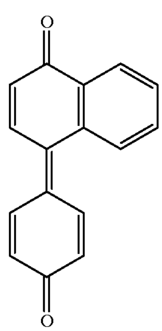
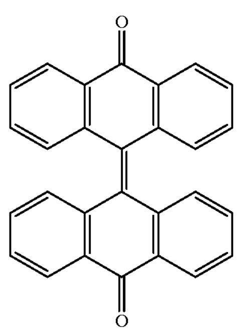
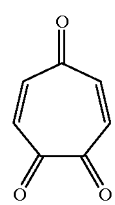
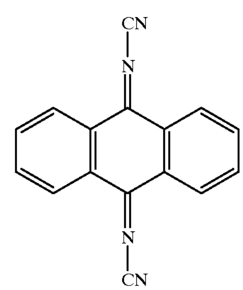
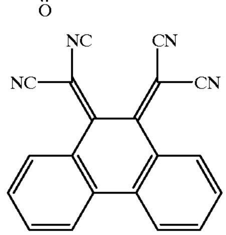
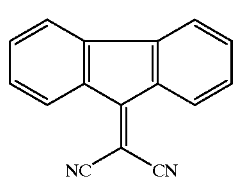
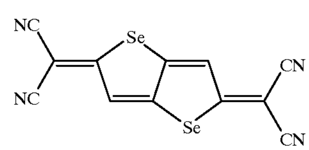
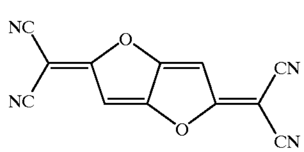
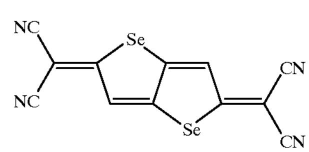

The charge-transfer substances may be used individually or as a mixture of two or more. The charge-transfer layer is preferably 5 to 100 μm, more preferably 10 to 30 μm, in thickness. If it is less than 5 μm, the initial surface potential may be low, and if it is more than 100 μm, the electrophotographic properties may be deteriorated.

Any conventional underlying layer may be interposed between the conductive substrate and the photosensitive layer. For example, the underlying layer may be composed of fine particles of titanium oxide, aluminum oxide, zirconia, titanic acid, zirconic acid, lanthanum lead, titanium black, silica, lead titanate, barium titanate, tin oxide, indium oxide or silicon oxide, polyamide resins, phenolic resins, casein, melamine resins, benzoguanamine resin, polyurethane resins, epoxy resins, cellulose, nitrocellulose, polyvinyl alcohol or polyvinyl butyral resin. These fine particles and resins may be used individually or as a mixture of two or more. It is desirable to use both the fine particles and the resins since the fine particles adsorb the resins to form uniform coating. The underlying layer may also contain the above-described binder resins. The polycarbonate of the present invention may also be used.

The underlying layer is generally 0.01 to 10.0 $\mu$m, preferably 0.01 to 1.0 $\mu$m, in thickness. If it is less than 0.01 $\mu$m, it may be difficult to form an even underlying layer, and if it is more than 10.0 $\mu$m, the electrophotographic properties may be deteriorated.

Any conventional blocking layer may also be interposed between the conductive substrate and the photosensitive layer. The blocking layer may be a layer of the above-described binder resins. The polycarbonate of the present invention may also be used. The blocking layer is generally 0.01 to 20.0 $\mu$m, preferably 0.1 to 10.0 $\mu$m, in thickness. If it is less than 0.01 $\mu$m, it may be difficult to form an even blocking layer, and if it is more than 20.0 $\mu$m, the electrophotographic properties may be deteriorated.

The electrophotographic photoreceptor of the present invention may have a protecting layer on the photosensitive layer. The protecting layer may be 0.01 to 20 $\mu$m, preferably 0.1 to 10 $\mu$m, in thickness. The protecting layer may be a layer of the above-described binder resins, particularly the polycarbonate of the present invention. The protecting layer may contain conductive substances, such as the above-described charge-generating substances and charge-transfer substances, additives, metals, oxides, nitrides, salts and alloys thereof, and carbon.

To improve the properties of the electrophotographic photoreceptor of the present invention, the charge-generating layer and the charge-transfer layer may contain additives, such as binders, plasticizers, curing catalysts, fluidizing agents, anti-pinhole agents, spectral sensitizers (sensitizing dyes) for improving the electrophotographic sensitivity, other various chemical substances for preventing the increase of residual potential and the decreases of charging potential and sensitivity during repeated uses, antioxidants, surfactants, anti-curling agents and leveling agents.

Examples of the binders are silicone resins, polyamide resins, polyurethane resins, polyester resins, epoxy resins, polyketone resins, polycarbonate resins, polystyrene resins, polymethacrylate resins, polyacrylamide resins, polybutadiene resins, polyisoprene resin, melamine resin, benzoguanamine resin, polychloroprene resin, polyacrylonitrile resin, ethyl cellulose resin, nitrocellulose resin, urea resins, phenolic resins, phenoxy resins, polyvinyl butyral resins, formal resins, vinyl acetate resins, vinyl acetate/vinyl chloride copolymer and polyestercarbonate resins. Thermo- or photosetting resins may also be used. That is, it is possible to use any resin which is an insulator and can form coating in ordinary conditions.

The binders are preferably 5 to 200% by weight, more preferably 10 to 100% by weight, based on the charge-transfer substance used. Photosensitive layers containing less than 5% by weight of binders may be so uneven as to deteriorate the image quality. Those containing more than 200% by weight of binders may have poor sensitivity to increase the residual potential.

Examples of the plasticizers are biphenyl, biphenyl chloride, o-terphenyl, paraffin halides, dimethylnaphthalene, dimethyl phthalate, dibutyl phthalate, dioctyl phthalate, diethyleneglycol phthalate, triphenyl phosphate, diisobutyl adipate, dimethyl sebacate, dibutyl sebacate, butyl laurate, methylphthalyl ethyl glycolate, dimethylglycol phthalate, methylnaphthalene, benzophenone, polypropylene, polystyrene and various fluorohydrocarbons.

Examples of the curing catalysts are methanesulfonic acid, dodecylbenzenesulfonic acid and dinonylnaphthalenesulfonic acid.

Examples of the fluidizing agents are Modaflow and Acronal 4F.

Examples of the anti-pinhole agents are benzoin and dimethyl phthalate.

The total amount of the plasticizers, curing catalysts, fluidizing agents and anti-pinhole agents is preferably 5% by weight or less, based on the charge-transfer substance.

Examples of the sensitizing dyes are triphenylmethane dyes, such as Methyl Violet, Crystal Violet, Night Blue and Victoria Blue, acridine dyes, such as Erythrosin, Rhodamine B, Rhodamine 3R, Acridine Orange and Flapeosin, thiazine dyes, such as Methylene Blue and Methylene Green, oxazine dyes, such as Capri Blue and Meldora Blue, cyanine dyes, merocyanine dyes, styryl dyes, pyrylium salt dyes and thiopyrylium salt dyes.

Electron acceptors may be added to the photosensitive layer to improve the sensitivity and to reduce the residual potential and fatigue during repeated uses.

Examples of the electron acceptors are compounds having high electron affinity, such as succinic anhydride, maleic anhydride, dibromomaleic anhydride, phthalic anhydride, tetrachlorophthalic anhydride, tetrabromophthalic anhydride, 3-nitrophthalic anhydride, 4-nitropyhthalic anhydride, pyromellitic anhydride, mellitic anhydride, tetracyanoethylene, tetracyanoquinodimethane, o-dinitrobenzene, m-dinitrobenzene, 1,3,5-trinitrobenzene, paranitrobenzonitrile, picryl chloride, quinonechloroimide, chloranyl, bromanyl, benzoquinone, 2,3-dichlorobenzoquinone, dichlorodicyanoparabenzoquinone, naphthoquinone, diphenoquinone, tropoquinone, anthraquinone, 1-chloroanthraquinone, dinitroanthraquinone, 4-nitrobenzophenone, 4,4-nitrobenzophenone, 4-nitrobenzalmalonodinitrile, ethyl α-cyano-β-(p-cyanophenyl)acrylate, 9-anthracenylmethylmalondinitrile, 1-cyano-(p-nitrophenyl)-2-(p-chlorophenyl)ethylene, 2,7-dinitrofluorenone, 2,4,7-trinitrofluorenone, 2,4,5,7-tetranitrofluorenone, 9-fluorenylidene-[dicyanomethylenemalononitrile], polynitro-9-fluorenylidene-[dicyanomethylenemalonodinitrile], picric acid, o-nitrobenzoic acid, p-nitrobenzoic acid, 3,5-dinitrobenzoic acid, pentafluorobenzoic acid, 5-nitrosalicylic acid, 3,5-dinitrosalicylic acid, phthalic acid and mellitic acid.

The electron acceptors may be added to either the charge-transfer layer or the charge-generating layer, and is generally 0.01 to 200% by weight, preferably 0.1 to 50% by weight, based on the charge-transfer substances or the charge-generating acceptors.

To improve the surface quality, tetrafluoroethylene resin, trifluoroethylene chloride resin, tetrafluoroethylene-hexafluoropropylene resin, fluorovinyl resins, fluorovinylidene resins, difluorodichloroethylene resin, copolymers thereof and fluorinated graft copolymers may also be used.

The amount of these surface modifiers is generally 0.1 to 60% by weight, preferably 5 to 40% by weight, based on the binder resin. If it is less than 0.1% by weight, surface modification will be insufficient for improving the abrasion resistance and surface durability and for decreasing the surface energy, and if it is more than 60% by weight, the electrophotographic properties may be deteriorated.

Examples of usable antioxidants are hindered phenol antioxidants, aromatic amine antioxidants, hindered amine antioxidants, sulfide antioxidants and organic phosphoric acid antioxidants.

These antioxidants are generally 0.01 to 10% by weight, preferably 0.1 to 2% by weight, based on the charge-transfer substances.

Examples of the hindered phenol antioxidants are given bellow.

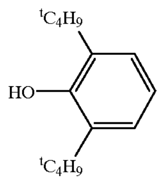
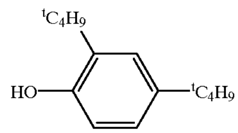
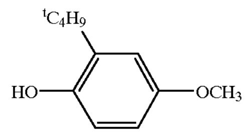
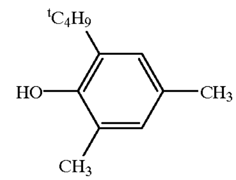
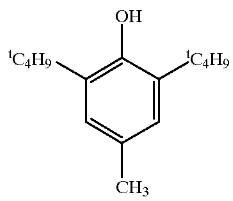
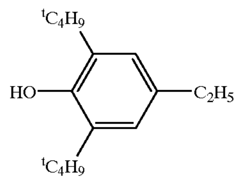
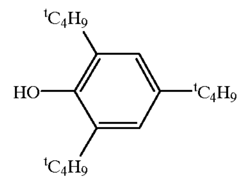
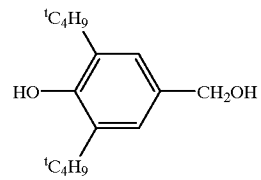
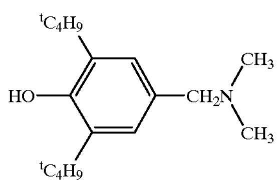
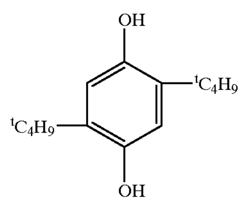
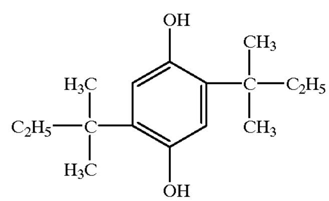
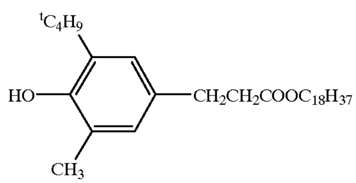
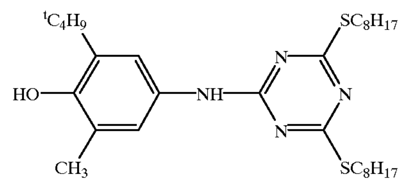
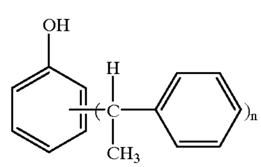
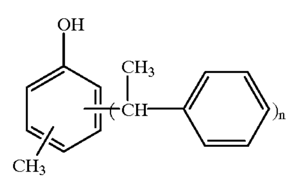
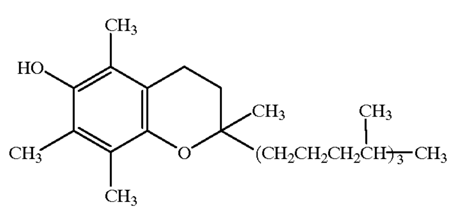
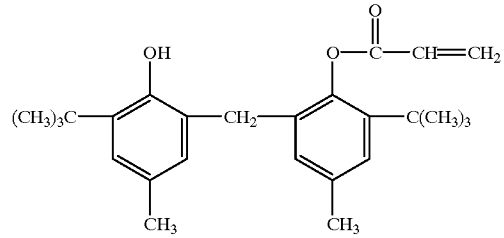

-continued
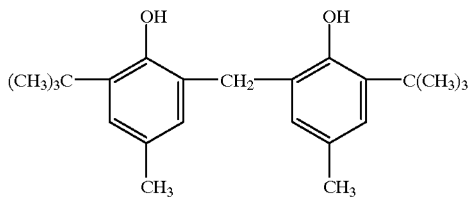
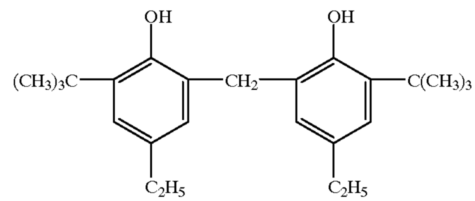
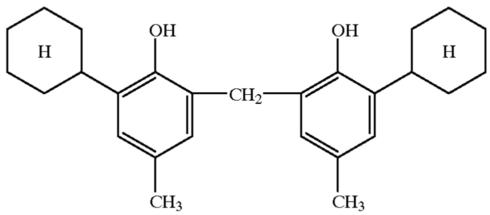
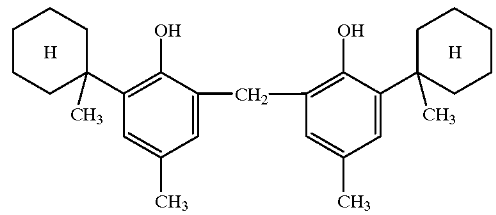
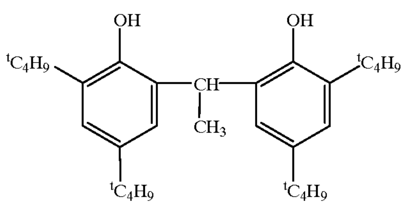
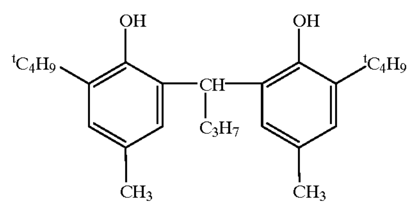
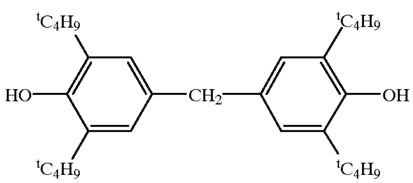
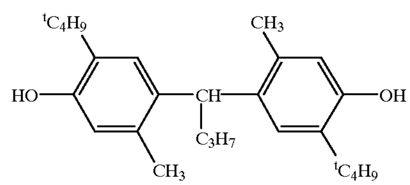
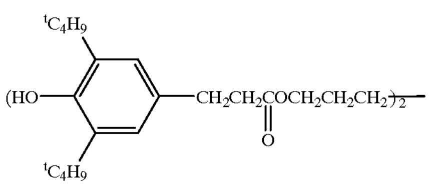
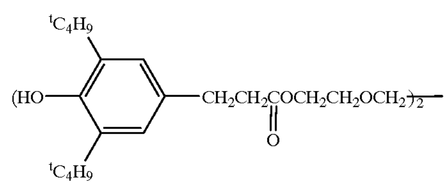
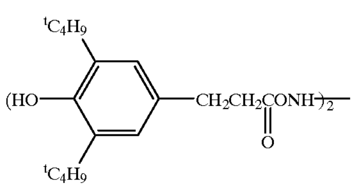
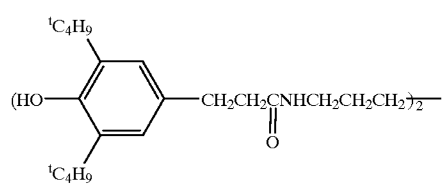
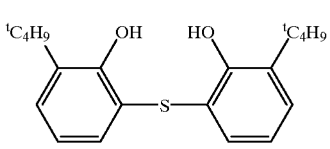
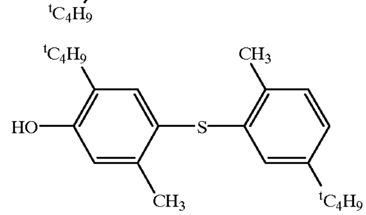
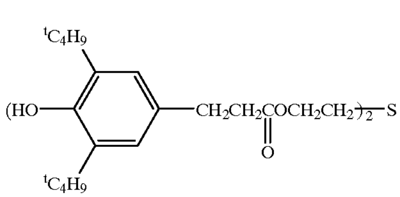

-continued
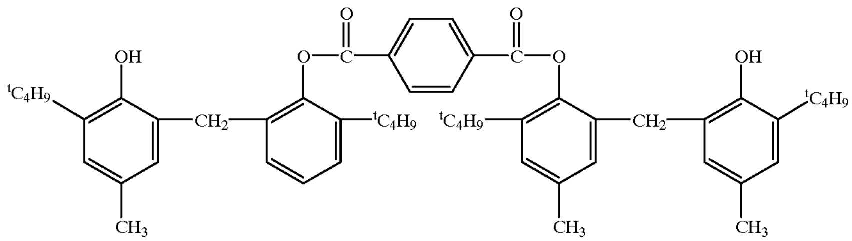
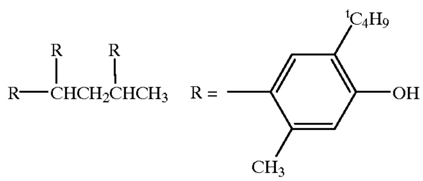
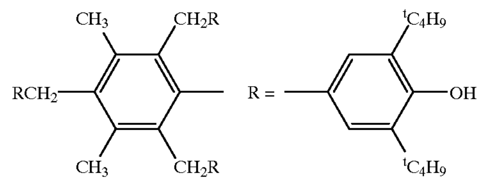
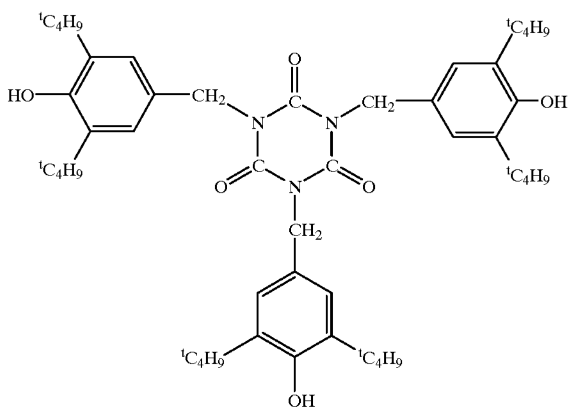
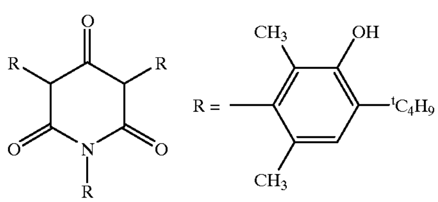
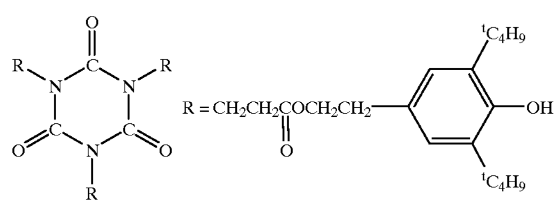
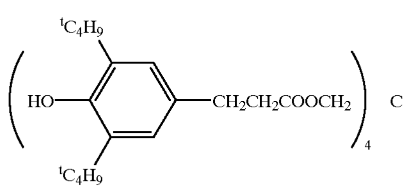
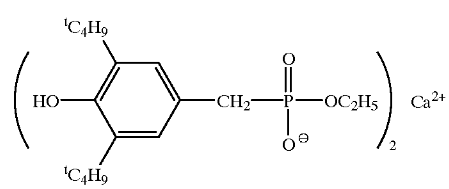
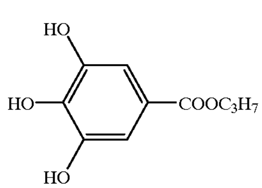
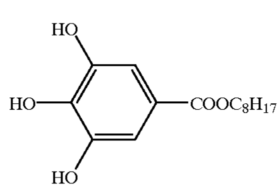
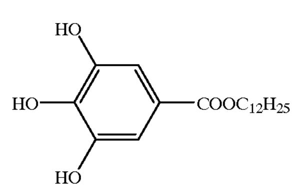
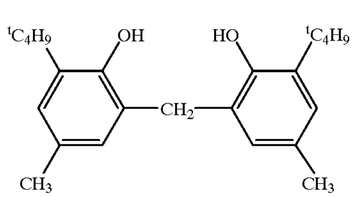
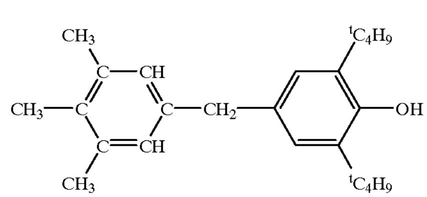

-continued
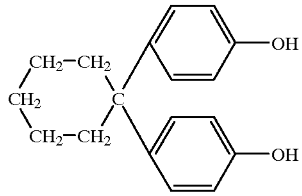
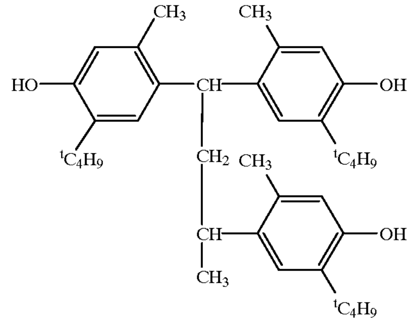
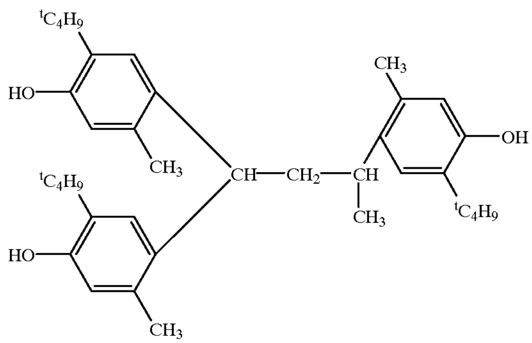
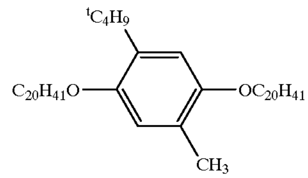
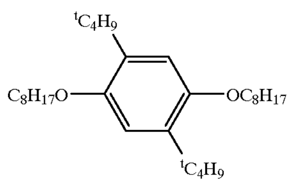
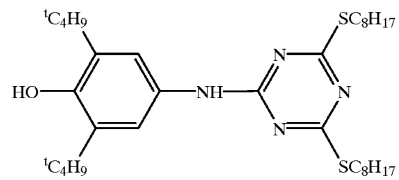
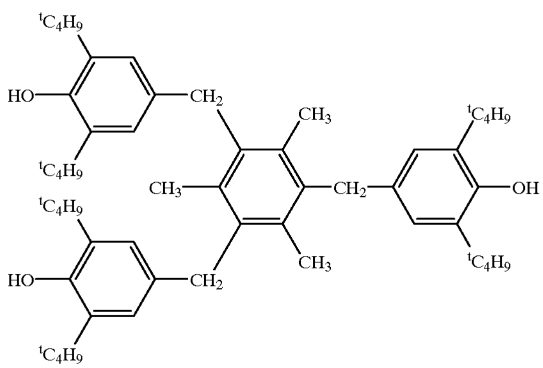
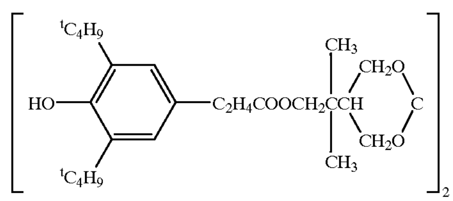
Examples of the aromatic amine antioxidants are given bellow.
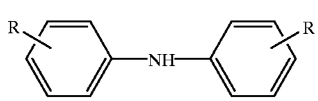
(R: an alkyl, such as methyl or ethyl)
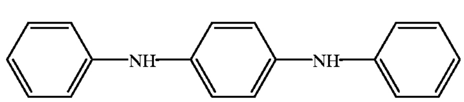
-continued
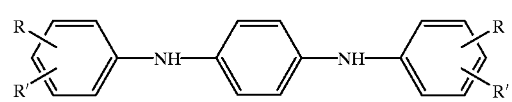
(R: an alkyl, such as methyl or ethyl)
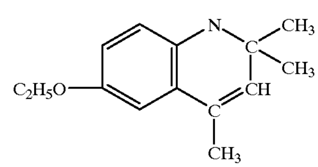

-continued
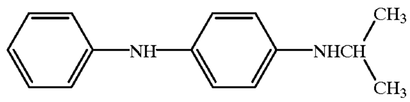
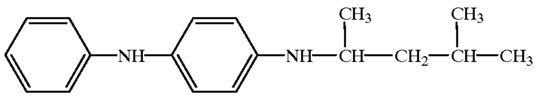
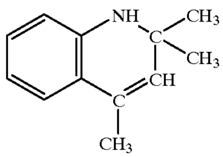
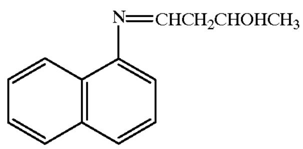
-continued
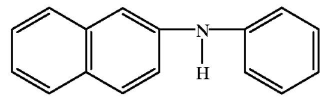
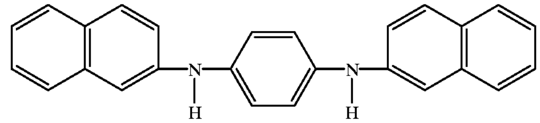
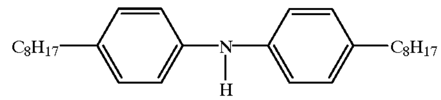
Examples of the hindered amine antioxidants are given bellow.
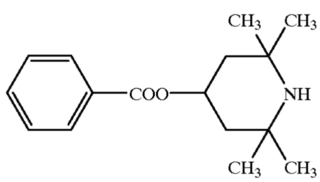
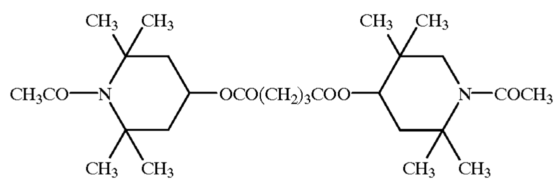
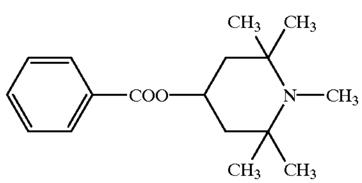
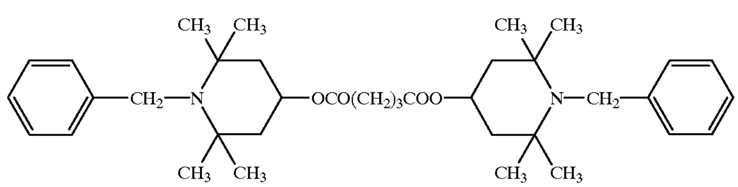
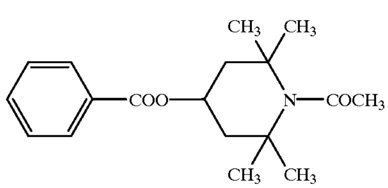
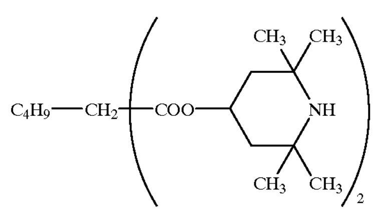
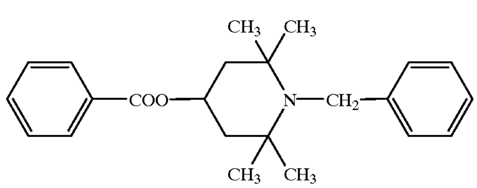
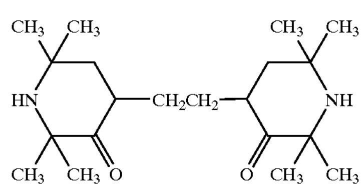

-continued
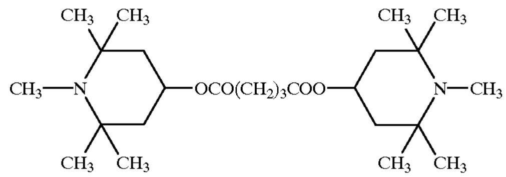
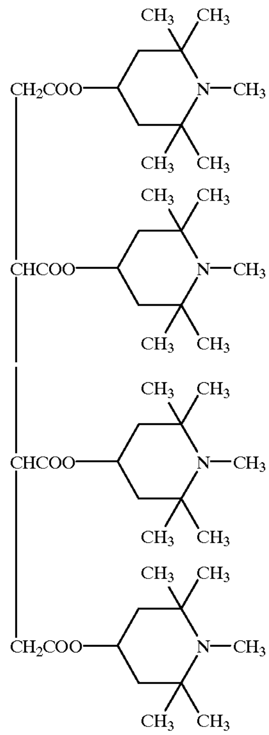
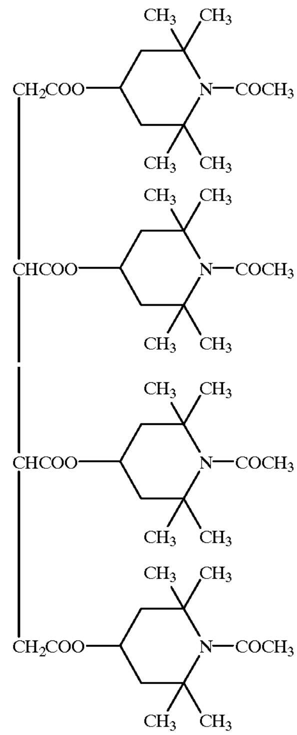
Examples of the sulfide antioxidants are given bellow.
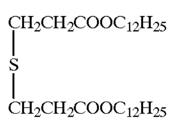
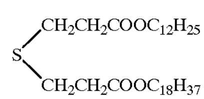
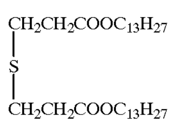
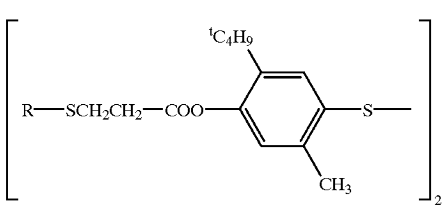
(R: $C_{12}$~$C_{14}$Alkyl)
-continued
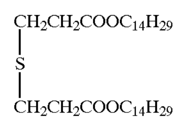
$(C_{12}H_{25}SCH_2CH_2COOCH_2)_4C$
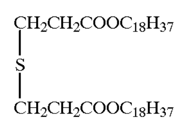
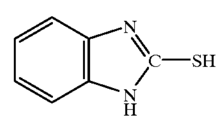
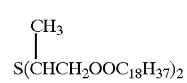
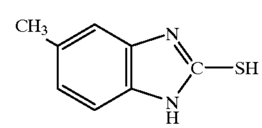
Examples of the organic phosphoric acid antioxidants are given bellow.

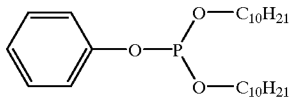
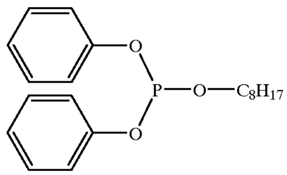
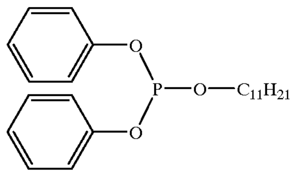
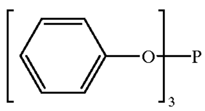
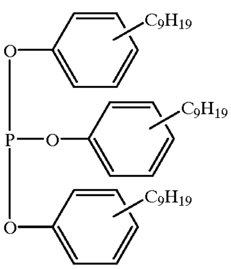
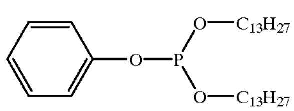
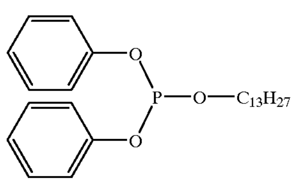
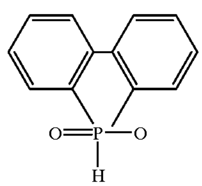
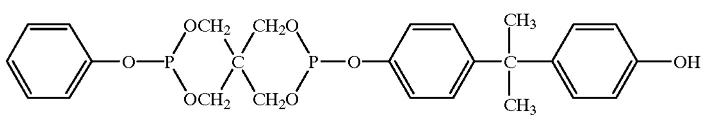
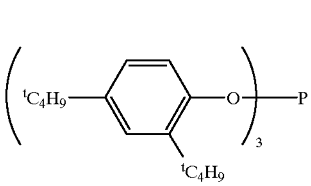
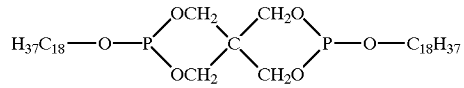
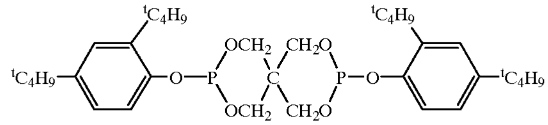
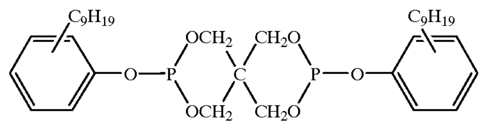
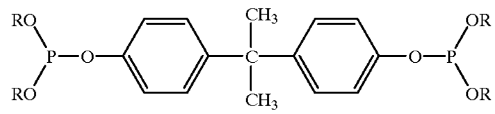
(R:$C_{12}$~$C_{15}$alkyl)
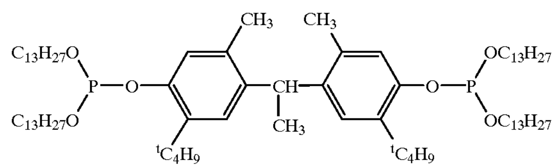
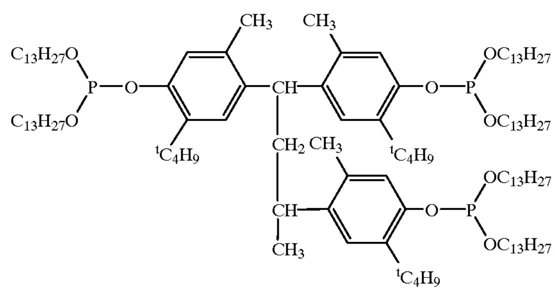
$P{(S—C_{12}H_{25})}_3$
$P{(S—C_{10}H_{21})}_3$
$P{(O—C_{13}H_{27})}_3$
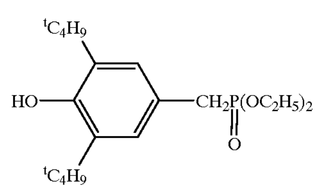

-continued
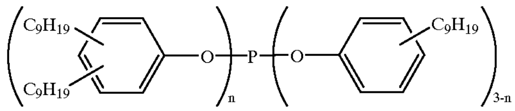
(n = 1 or 2)
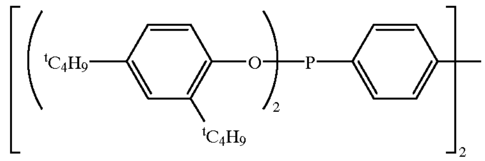
Examples of the antioxidants containing in molecules both hindered phenol structure units and hindered amine structure units are given bellow.
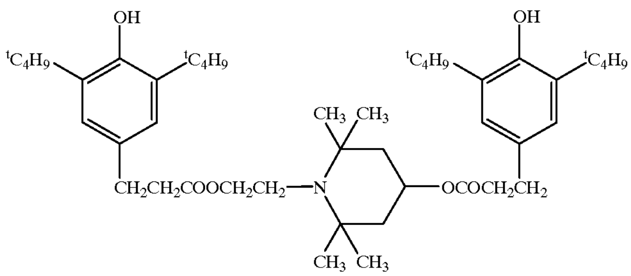
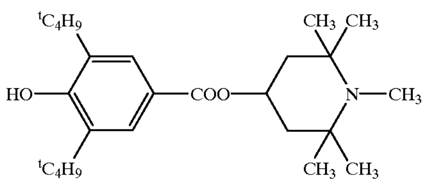
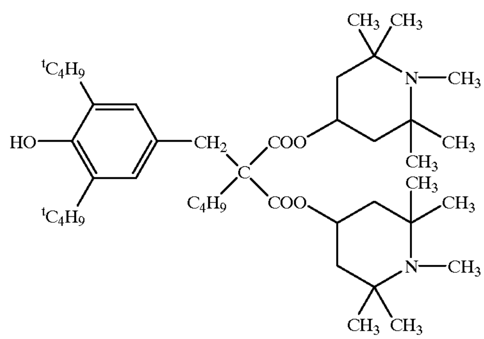
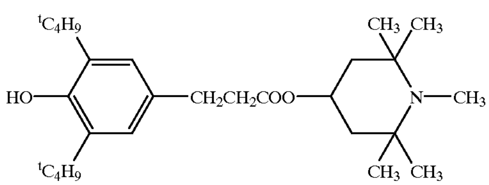
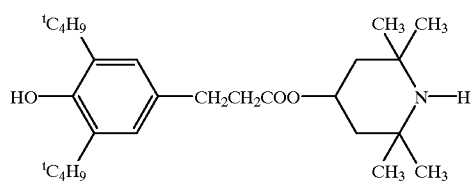
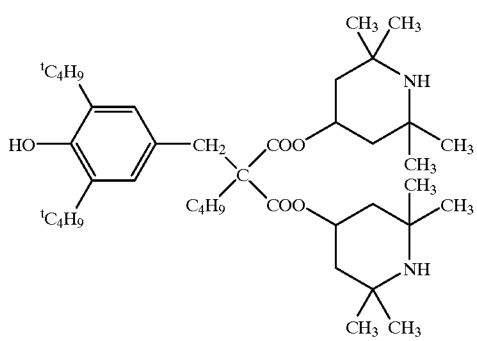
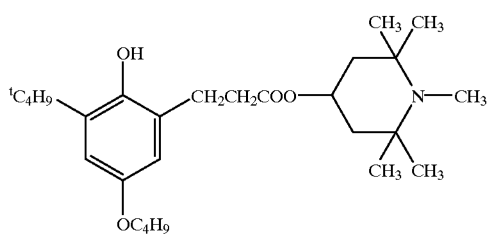

-continued

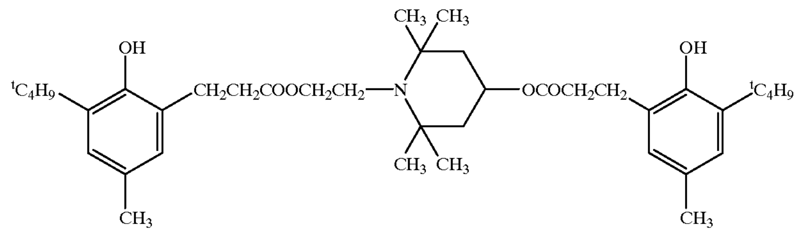

These additives may be used individually or in a combination thereof, for example, as a mixture of two or more. These additives may also be added to the protection layer, underlying layer and blocking layer.

Examples of the solvents, which may be used for the production of the charge-generating layer and charge-transfer layer, are aromatic solvents, such as benzene, toluene, xylene and chlorobenzene, ketones, such as acetone, methyl ethyl ketone and cyclohexanone, alcohols, such as methanol, ethanol and isopropanol, esters, such as ethyl acetate and ethyl cellosolve, hydrocarbon halides, such as carbon tetrachloride, chloroform, dichloromethane and tetrachloroethane, ethers, such as tetrahydrofuran and dioxane, dimethylformamide, dimethyl sulfoxide and diethylformamide.

These solvents may be used individually or as a solvent mixture of two or more.

The charge-transfer layer may be produced by coating an underlying substrate or layer with a solution wherein the above-described charge-transfer substance, additives and binder resin material are dispersed or dissolved in a solvent, by dipping, static coating, powder coating, spraying, roll coating, applicator coating, spray-coater coating, bar-coater coating, roll-coater coating, dip-coater coating, doctor-blade coating, wire-bar coating, knife-coater coating, attritor coating, spinner coating, bead coating, blade coating or curtain coating, followed by drying.

The dispersing or dissolving may be performed by using, for example, a ball mill, ultrasound, a paint shaker, a red devil, a sand mill, a mixer or an attritor.

The photosensitive layer of single-layer type electrophotographic photoreceptors may be produced by coating the underlying substrate with a solution wherein the above-described charge-generating substance, charge-transfer substance, additives and binder resin material are dispersed or dissolved in a solvent, followed by drying. The method of coating and additives are the same as those described above. In single-layer type electrophotographic photoreceptors, it is desirable to use the polycarbonate of the present invention as the binder resin. As described above, a protecting layer, underlying layer and blocking layer may also be formed. It is also desirable to use the polycarbonate of the present invention in these layers.

Single-layer type photoreceptors are preferably 5 to 100 μm, more preferably 8 to 50 μm thick. If the thickness is less than 5 μm, the initial surface potential may be low, and if it is more than 100 μm, the electrophotographic properties may be deteriorated.

In single-layer type electrophotographic photoreceptors, the weight ratio of [charge-generating substance]:[polycarbonate] is preferably from 1:99 to 30:70, more preferably from 3:97 to 15:85. The weight ratio of [charge-transfer substance]:[polycarbonate] is preferably from 10:90 to 80:20, more preferably from 30:70 to 70:30.

Other resins may be used along with the polycarbonate of the present invention as far as the attainment of the objects of the present invention is not hindered.

The electrophotographic photoreceptor of the present invention preferably has a layer structure wherein the photosensitive layer has a surface layer containing the polycarbonate of the present invention. Such an electrophotographic photoreceptor of the present invention has low surface energy, prevents filming due to the adhesion of foreign matter, such as toner, and maintains long printing life and excellent electrophotographic properties for a long term, and is applicable in various electrophotographic fields, such as copying machines (monochrome copying machines, multi-color copying machines, full-color copying machines; analog copying machines, digital copying machines), printers (laser printers, LED printers, liquid crystal shutter printers), FAX and plate making machines.

The electrophotographic photoreceptor of the present invention can be electrified by, for example, corona discharge (corotron or scotron), or contact electrification (electrification rollers, electrification brushes). Exposure is performed by, for example, a halogen lamp, a fluorescent lamp, laser (semiconductor, He—Ne), LED or an intra-photoreceptor exposure system. Development is performed by, for example, a dry development, such as cascade development, two-component magnetic brush development, one-component insulating toner development or one-component conductive toner development, or wet development. Image transfer is performed by, for example, electrostatic transfer, such as corona transfer, roller transfer or belt transfer, pressure transfer or adhesion transfer. Fixing is performed by, for example, hot-roller fixing, radiant-flash fixing, oven fixing or pressure fixing. Cleaning and discharging is performed by using, for example, a brush cleaner, a magnetic brush cleaner, a electrostatic brush cleaner, a magnetic roller cleaner or a blade cleaner.

The present invention will be described in detail referring to Examples of the present invention and Comparative Examples, which, however, should not be construed to limit the scope of the present invention.

REFERENCE EXAMPLE 1

A mixture of 240 ml of isopropyl alcohol, 120 ml of conc. hydrochloric acid and 240 ml of water was cooled to 10° C. or lower with iced water. After 120.6 g (898 mmol) of 1,1,3,3-tetramethyldisiloxane was added thereto, 54.5 g (400 mmol) of methyltrimethoxysilane was added dropwise. Subsequently, the iced water bath was removed, and the mixture was stirred for 1 hour. After the aqueous layer was removed, the organic layer was neutralized with sodium hydrogencarbonate. The organic layer was washed with water repeatedly until a neutral aqueous layer was obtained, and then dried by adding sodium sulfate. Then vacuum distillation was carried out to obtain 45.5 g of a distillate at 83 mmHg at 97–98° C. The distillate was identified as methyltris(dimethylsiloxy)silane by $^1$H-nuclear magnetic resonance spectrometry (hereinafter, NMR) and infrared spectrometry (hereinafter, IR).

120 g (446.15 mmol) of the methyltris(dimethylsiloxy) silane was placed in a four-necked flask equipped with a stirrer. A complex of platinum and tetramethyldivinyldisiloxane was added thereto in such an amount that platinum metal was 20 ppm based on the total weight of a reaction mixture (a reaction mixture of methyltris(dimethylsiloxy) silane and dimethylvinylchlorosilane), and the mixture was then heated to 80° C. After 21.5 g of dimethylvinylchlorosilane was added dropwise, the mixture was heated to 90–100° C. for 1 hour with stirring. On analyzing the resulting reaction mixture by gas chromatography (hereinafter, GLC), the peak of the starting dimethylvinylchlorosilane had disappeared, showing the completion of the reaction. Then vacuum distillation was carried out to obtain 47.6 g of a distillate at 1 mmHg at 89–91° C. The distillate was identified as a silicone compound of the following structural formula by NMR and IR. This polymer is named "polymer-T".

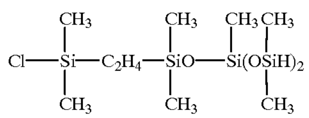

In a four-necked flask equipped with a stirrer were placed 60 g (270.3 mmol) of hexamethylcyclotrisiloxane and 60 g of tetrahydrofuran, and then cooled to 20° C. or lower with iced water. An n-hexane solution of 32.43 mmol of n-butyllithium was added thereto with stirring in an atmosphere of dry nitrogen, and the mixture was further stirred at room temperature. During the stirring, the polymerization was followed by taking the GLC of the reaction mixture. When the conversion of hexamethylcyclotrisiloxane reached 98.4% after 6 hours, 0.66 g (6.5 mmol) of triethylamine was added, and then 13.89 g (35.68 mmol) of the polymer-T was added to terminate the polymerization. After by-product salts were removed by filtration, the solvent and low-boiling substances were removed by vacuum distillation with heat, to obtain a colorless, transparent reaction product. The reaction product was identified as a polyorganosiloxane of the following average structural formula by NMR, IR, GPC and the determination of the % by weight of SiH groups by iodometry. This polymer is named "polymer-1".

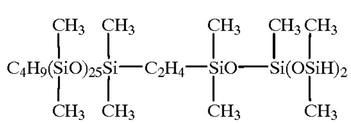

% by weight of SiH groups: 0.093%

Number average molecular weight by GPC: 2,288

Degree of dispersion: 1.13

REFERENCE EXAMPLE 2

In a four-necked flask equipped with a stirrer were placed 60 g (270.3 mmol) of hexamethylcyclotrisiloxane and 60 g of tetrahydrofuran, and then cooled to 20° C. or lower with iced water. An n-hexane solution of 10.81 mmol of n-butyllithium was added thereto with stirring in an atmosphere of dry nitrogen, and the mixture was further stirred at room temperature. During the stirring, the polymerization was followed by taking the GLC of the reaction mixture. When the conversion of hexamethylcyclotrisiloxane reached 98.6% after 6 hours, 0.22 g (2.17 mmol) of triethylamine was added, and then 4.63 g (11.89 mmol) of the polymer-T obtained in Reference Example 1 was added to terminate the polymerization. After by-product salts were removed by filtration, the solvent and low-boiling substances were removed by vacuum distillation with heat, to obtain a colorless, transparent reaction product. The reaction product was identified as a polyorganosiloxane of the following average structural formula by NMR, IR, GPC and the determination of the % by weight of SiH groups by iodometry. This polymer is named "polymer-2".

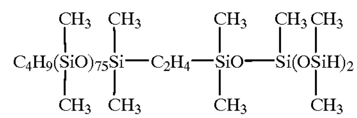

% by weight of SiH groups: 0.034%

Number average molecular weight by GPC: 7,218

Degree of dispersion: 1.08

REFERENCE EXAMPLE 3

In a four-necked flask equipped with a stirrer were placed 60 g (270.3 mmol) of hexamethylcyclotrisiloxane and 60 g of tetrahydrofuran, and then cooled to 20° C. or lower with iced water. An cyclohexane solution of 32.43 mmol of trimethylsilanol and an n-hexane solution of 0.65 mmol of n-butyllithium were added thereto successively with stirring in an atmosphere of dry nitrogen, and the mixture was further stirred at room temperature. The polymerization was followed by taking the GLC of the reaction mixture, and when the conversion reached 98.0% after 6 hours, 0.66 g (6.5 mmol) of triethylamine and 13.89 g (35.68 mmol) of the polymer-T were added successively to terminate the polymerization. After by-product salts were removed by filtration, the solvent and low-boiling substances were removed by vacuum distillation with heat, to obtain a colorless, transparent polymer. The polymer was identified as a polyorganosiloxane of the following average structural formula by NMR, IR, GPC and the determination of the % by weight of SiH groups by iodometry. This polymer is named "polymer-3".

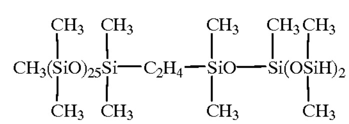

% by weight of SiH groups: 0.090%

Number average molecular weight by GPC: 2,240

Degree of dispersion: 1.14

REFERENCE EXAMPLE 4

In a four-necked flask equipped with a stirrer were placed 48 g (216.2 mmol) of hexamethylcyclotrisiloxane, 22.1 g (54.1 mmol) of 1,3,5-trimethyl-1,3,5-triphenylcyclotrisiloxane and 60 g of tetrahydrofuran, and then cooled to 20° C. or lower with iced water. An n-hexane solution of 32.43 mmol of n-butyllithium was added thereto with stirring in an atmosphere of dry nitrogen, and the mixture-was further stirred at room temperature. The polymerization was followed by GLC, and when the conversion reached 98.0% after 6 hours, 0.66 g (6.5 mmol) of triethylamine and 13.89 g (35.68 mmol) of the polymer-T were added successively, to terminate the polymerization. After by-product salts were removed by filtration, the solvent and low-boiling substances were removed by vacuum distillation with heat, to obtain a colorless, transparent polymer. The polymer was identified as a polyorganosiloxane of the following average structural formula by NMR, IR, GPC and the determination of the % by weight of SiH groups by iodometry. This polymer is named "polymer-4".

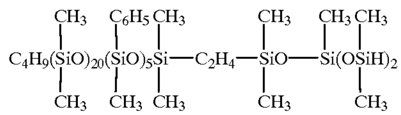

% by weight of SiH groups: 0.078%

Number average molecular weight by GPC: 2,570

Degree of dispersion: 1.14

REFERENCE EXAMPLE 5

To 120 g (446 mmol) of the methyltris(dimethylsiloxy) silane synthesized in Reference Example 1 being cooled in an ice bath with stirring was added 82.8 g (616 mmol) of powdery $CuCl_2$ (treated for 10 hours at 1 mmHg at 200° C.) gradually. After the completion of the addition, the ice bath was removed, and the mixture was heated up to 150° C. gradually and then heated continuously for 30 minutes with stirring. After the reaction mixture was cooled to room temperature, solids were removed by filtration, and the resulting organic layer was vacuum distilled to obtain 116 g of a distillate at 60 mmHg at 126 to 130° C. The distillate was identified as the following compound (compound-X) by NMR and IR.

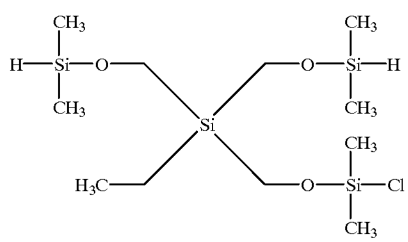

In a four-necked flask equipped with a stirrer were placed 60 g (270 mmol) of hexamethylcyclotrisiloxane and 60 g of tetrahydrofuran, and then cooled to 20° C. or lower with iced water. An n-hexane solution of 32.4 mmol of n-butyllithium was added thereto with stirring in an atmosphere of dry nitrogen, and the mixture was further stirred at room temperature. During the stirring, the polymerization was followed by GLC of the reaction mixture. When the conversion reached 98% after 6 hours, 0.66 g (6.5 mmol) of triethylamine and 10.8 g (35.7 mmol) of the Compound X were added successively, to terminate the polymerization. After by-product salts were removed by filtration, the solvent and low-boiling substances were removed by vacuum distillation with heat, to obtain a colorless, transparent reaction product. The reaction product was identified as a polyorganosiloxane of the following average structural formula by NMR, IR, GPC and the determination of the % by weight of SiH groups by iodometry. This polymer is named "polymer-5".

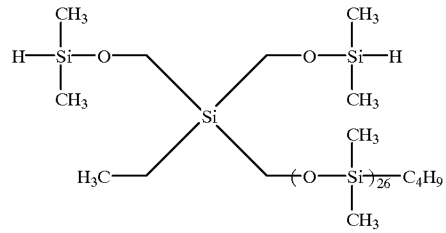

% by weight of SiH groups: 0.094%

Number average molecular weight by GPC: 2,170

Degree of dispersion: 1.13

SYNTHESIS 1

To 30 g (SiH: 27.9 milliequivalents) of the polymer-1 obtained in Reference Example 1 and 8.64 g (41.9 mmol) of trimethylsilyl-o-allylphenol was added a complex of platinum and tetramethyldivinyldisiloxane in such an amount that platinum metal was 10 ppm based on the total of the former two compounds. The mixture was heated to 100° C. for 2 hours. The IR analysis of the resulting reaction mixture showed the disappearance of the absorption due to SiH groups. The reaction mixture was heated to remove low-boiling substances by vacuum distillation and to obtain a transparent liquid. The liquid was identified as a polyorganosiloxane of the following structural formula by NMR and IR.

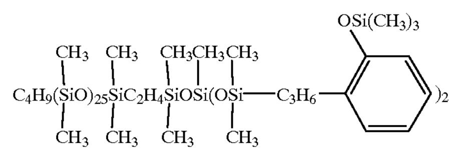

30 g of the polyorganosiloxane and 7.97 g of methanol were mixed, stirred for 3 hours at 50° C., and then heated to remove low-boiling substances by vacuum distillation and to obtain a transparent liquid. The liquid was identified as a polyorganosiloxane (polysiloxane-1) by NMR, IR and the determination of the % by weight of phenolic hydroxyl groups by titration.

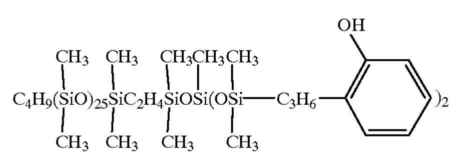

% by weight of OH groups: 1.42%

SYNTHESIS 2

To 30 g (SiH: 10.2 milliequivalents) of the polymer-2 obtained in Reference Example 2 and 3.16 g (15.3 mmol) of trimethylsilyl-o-allylphenol was added a complex of platinum and tetramethyldivinyldisiloxane in such an amount that platinum metal was 10 ppm based on the total of the former two compounds. The mixture was heated to 100° C. for 2 hours. The IR analysis of the resulting reaction mixture showed the disappearance of the absorption due to SiH groups. The reaction mixture was heated to remove low-boiling substances by vacuum distillation and to obtain a transparent liquid. The liquid was identified as a polyorganosiloxane of the following structural formula by NMR and IR.

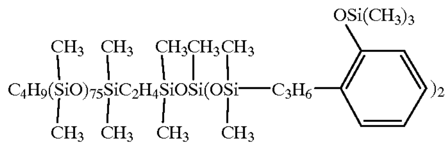

30 g of the polyorganosiloxane and 7.97 g of methanol were mixed, stirred for 3 hours at 50° C., and then heated to remove low-boiling substances by vacuum distillation, to obtain a transparent liquid. The liquid was identified as a polyorganosiloxane (polysiloxane-2) by NMR, IR and the determination of the % by weight of phenolic hydroxyl groups by titration.

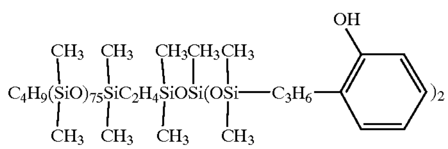

% by weight of OH groups: 0.56%

SYNTHESIS 3

To 30 g (SiH: 27.0 milliequivalents) of the polymer-3 obtained in Reference Example 3 and 8.36 g (40.5 mmol) of trimethylsilyl-o-allylphenol was added a complex of platinum and tetramethyldivinyldisiloxane in such an amount that platinum metal was 10 ppm based on the total of the former two compounds. After heating to 100° C. for 2 hours, the infrared spectrometry of a sample showed the disappearance of the absorption due to SiH groups. Low-boiling substances were removed by vacuum distillation with heat, to obtain a transparent liquid. It was identified as a polyorganosiloxane of the following structural formula by NMR and IR.

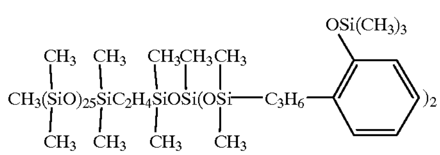

30 g of the polyorganosiloxane and 7.97 g of methanol were mixed, stirred for 3 hours at 50° C., and then heated to remove low-boiling substances by vacuum distillation, to obtain a transparent liquid. It was identified as a polyorganosiloxane (polysiloxane-3) by NMR, IR and the determination of the % by weight of phenolic hydroxyl groups by titration.

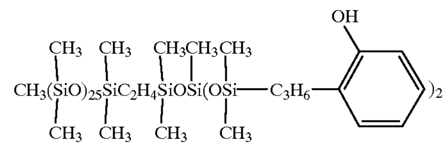

% by weight of OH groups: Found 1.36%

SYNTHESIS 4

The procedure of Synthesis 1 was repeated by using 30 g (SiH: 23.4 milliequivalents) of the polymer 4 obtained in Reference Example 4 and 7.83 g (35.1 mmol) of trimethylsilyl-o-allylphenol, to obtain a polyorganosiloxane (polysiloxane-4) of the following structural formula.

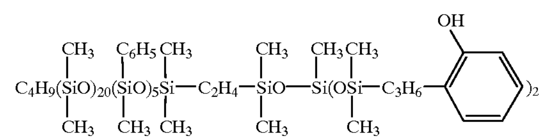

% by weight of OH groups: Found 1.20%

SYNTHESIS 5

To 30 g (SiH: 28.2 milliequivalents) of the polymer-5 obtained in Reference Example 5 and 8.72 g (42.3 mmol) of trimethylsilyl-o-allylphenol was added a complex of platinum and tetramethyldivinyldisiloxane in such an amount that platinum metal was 10 ppm based on the total of the former two compounds. The mixture was heated to 100° C. for 2 hours. The IR analysis of the resulting reaction mixture showed the disappearance of the absorption due to SiH groups. The reaction mixture was heated to remove low-boiling substances by vacuum distillation and to obtain a transparent liquid. The liquid was identified as a polyorganosiloxane of the following structural formula by NMR and IR.

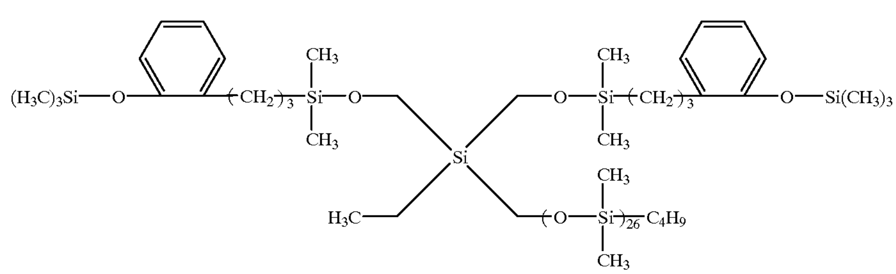

30 g of the polyorganosiloxane and 14.4 g of methanol were mixed, stirred for 3 hours at 50° C., and then heated to remove low-boiling substances by vacuum distillation, to obtain a transparent liquid. The liquid was identified as a polyorganosiloxane (polysiloxane-5) by NMR, IR and the determination of the % by weight of phenolic hydroxyl groups by titration.

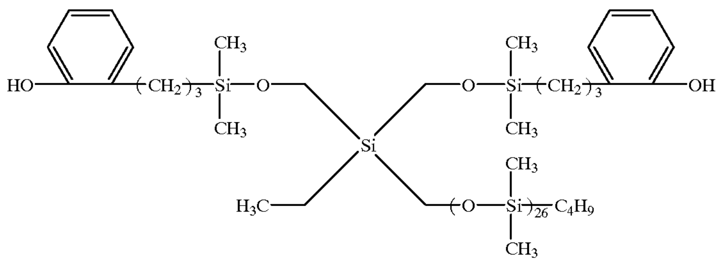

% by weight of OH groups: 1.43%

EXAMPLE 1

114.4 g of sodium hydroxide was dissolved in 1370 ml of water, and 225.1 g of 2,2-bis(4-hydroxyphenyl)propane, 39.7 g of the hydroxyphenyl-containing polyorganosiloxane (polysiloxane-1) obtained in Synthesis 1 and 0.46 g of hydrosulfite were added thereto and dissolved while the mixture was maintained at 20° C. After 910 ml of methylene chloride was added thereto, 3.00 g of p-t-butylphenol was added with stirring, and then 108.8 g of phosgene was blown in over 60 minutes. Thereafter, the reaction solution was emulsified by vigorous stirring. After the emulsification, 0.46 g of triethylamine was added, and polymerization was carried out for about 1 hour with stirring. The resulting polymerization solution was separated into an aqueous layer and an organic layer. The organic layer was then neutralized with phosphoric acid and washed repeatedly with water until the pH of washings became neutral. Large excess of isopropanol was added to the organic layer, to precipitate the polymerized product. The precipitate was filtered and dried, to obtain a white powdery polycarbonate (PC-1). The polycarbonate was identified by NMR as a compound comprising the repeating units of the following structural formulae (A-1) and (B-1). The copolymerization ratio (in mol %) of these repeating units was (A-1):(B:1)=2:98.

The polycarbonate had a reduced viscosity [$\eta_{sp}$/c] (as measured in methylene chloride at a concentration of 0.5 g/dl at 20° C., the same will be applied hereinafter) of 0.63 dl/g. Reduced viscosity was measured by an automatic Ubbelohde's improved viscometer (RM-Model) using an automatic viscometer VMR-042 (produced by Rigosha).

Structural formula (A-1)

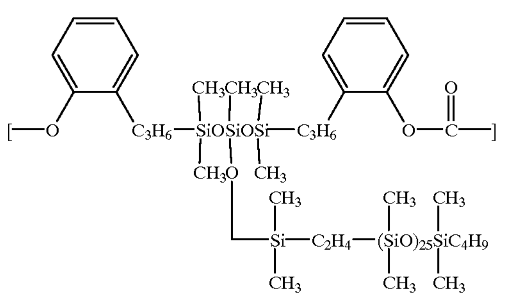

Structural formula (B-1)

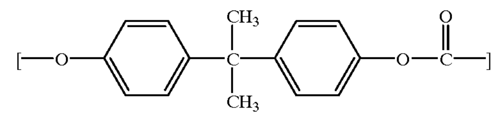

The polycarbonate was pelletized by extrusion at 280° C. using a vent-type extruder. The pellets were dried in a hot blast drier at 120° C. for 8 hours or more, and molded with an molding machine at a molding temperature of 280° C. and at a die temperature of 100° C., to give plate moldings of 2 mm thick. Releasability was judged by the feel of the moldings being pulled out from the injection molding machine. The contact angle of water to the surface of the molding was also measured with a contact angle meter. The results are listed in Table 1.

EXAMPLE 2

The procedure of Example 1 was repeated except that the amount of 2.2-bis(4-hydroxyphenyl)propane was changed to 226.8 g, and that 40.0 g of the hydroxyphenyl-containing polyorganosiloxane (polysiloxane-2) obtained in Synthesis 2 was used in place of the hydroxyphenyl-containing polyorganosiloxane (polysiloxane-1) obtained in Synthesis 1, to obtain a white powdery polycarbonate (PC-2). The polycarbonate was identified by NMR as a compound comprising the repeating units of the following structural formulae (A-2) and (B-1). The copolymerization ratio (in mol %) of these repeating units was (A-2):(B:1)=1:99. The reduced viscosity of the polycarbonate was determined in the same manner as in Example 1 to be 0.60 dl/g.

Structural formula (A-2)

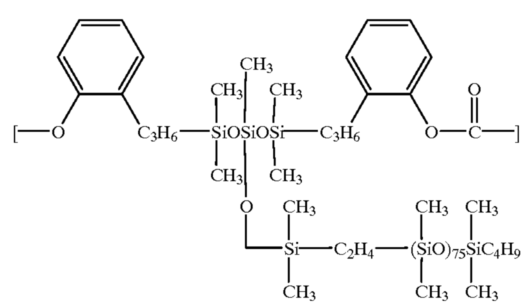

Structural formula (B-1)

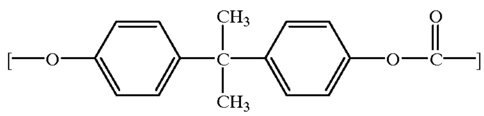

The polycarbonate was pelletized and molded into plate moldings in the same manner as in Example 1. The releasability of the moldings and the contact angle of water were measured in the same manner as in Example 1. The results are listed in Table 1.

EXAMPLE 3

A solution of 74 g of 2,2-bis(4-hydroxyphenyl)propane (bisphenol A) in 550 ml of a 6 wt % Conc. of aqueous sodium hydroxide solution was mixed with 250 ml of methylene chloride, and while the mixture was being stirred and maintained at 20° C. by cooling, phosgene gas was blown into the mixture at a rate of 950 ml/sec for 15 minutes. The reaction fluid was then allowed to stand to separate the organic layer, which was a methylene chloride solution of an bisphenol A polycarbonate oligomer of a polymerization degree of 2 to 5 having chloroformate groups at molecule ends. The structure, polymerization degree and end groups of the oligomer were determined by $^1$H-NMR, MS and GPC.

450 ml of a solution prepared by adding balance of methylene chloride to the methylene chloride solution of the oligomer was mixed with 150 ml of a 8 wt % Conc. of aqueous sodium hydroxide solution, and the polysiloxane-3 (144.7 g) and 3.0 g of p-tert-butylphenol as molecular weight regulator were added thereto. While the solution mixture was stirred vigorously, 2 ml of a 7 wt % Conc. of aqueous triethylamine solution was added thereto as a catalyst, and reaction was carried out by stirring the mixture for 1.5 hours at 28° C. After the completion of the reaction, the reaction product was diluted with 1 liter of methylene chloride, washed twice with 1.5 liter of water, once with 1 liter of 0.01N-hydrochloric acid, and twice with 1 liter of water, in this order. The organic layer was poured into methanol to precipitate a polymer, which was filtered and dried to obtain 218 g of a polycarbonate (PC-3). The polycarbonate had a reduced viscosity [$\eta_{sp}$/c] of 0.51 dl/g.

The structure of and the copolymerization ratios in the polycarbonate (PC-3) were determined by $^1$H-NMR and $^{29}$Si-NMR spectra. The $^1$H-NMR spectrum indicated peaks due to the polysiloxane-3 (a peak at 0–0.1 ppm due to methyl on the siloxane main chain, a peak at 0.6 ppm due to the ends of siloxane parts, a peak at 0.87 ppm due to the branched siloxane structure) and peaks (1.7 ppm, 7.1–7.3 ppm) due to bisphenol A. The $^{29}$Si-NMR spectrum indicated peaks (−21 ppm and 7.8 ppm as chemical shifts with tetramethylsilane as a standard) due to general dimethylsiloxane and a peak (−64 ppm) due to the silicon atom with three oxygen atoms bonded thereto. From these analytical results, the polycarbonate (PC-3) was found to contain the following repeating units in the following ratios.

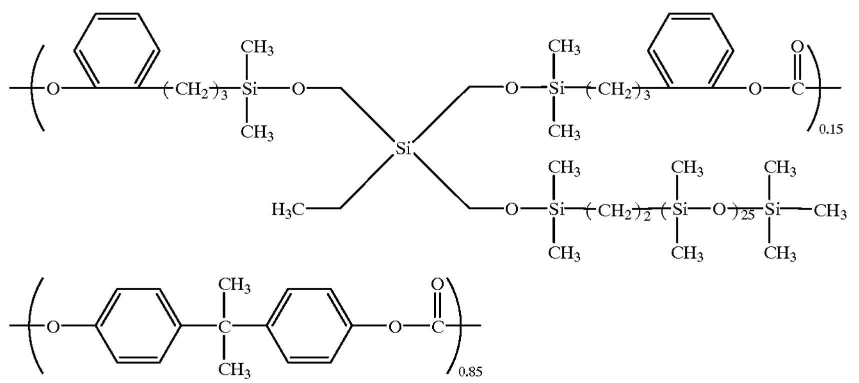

The polycarbonate was pelletized and molded into plate moldings in the same manner as in Example 1. The releasability of the moldings and the contact angle of water were measured in the same manner as in Example 1. The results are listed in Table 1.

EXAMPLE 4

The procedure of Example 3 was repeated except that the polysiloxane-4 (164.0 g) was used in place of the polysiloxane-3 (144.7 g), to obtain 235 g of a polycarbonate (PC-4). The polycarbonate had a reduced viscosity of 0.63 dl/g. The structure of and the copolymerization ratios in the polycarbonate (PC-4) were determined by $^1$H-NMR and $^{29}$Si-NMR spectra. The $^1$H-NMR spectrum indicated peaks due to the polysiloxane-4 (a peak at 0–0.1 ppm due to methyl on the siloxane main chain, a peak at 0.6 ppm due to the ends of siloxane parts, a peak at 0.87 ppm due to the branched siloxane structure) and a peak (1.7 ppm) due to bisphenol A. The $^{29}$Si-NMR spectrum indicated peaks (−21 ppm and 7.8 ppm as chemical shifts with tetramethylsilane as a standard) due to general dimethylsiloxane and a peak (−64 ppm) due to the silicon atom with three oxygen atoms bonded thereto. From these analytical results, the polycarbonate (PC-4) was found to contain the following repeating units in the following ratios.

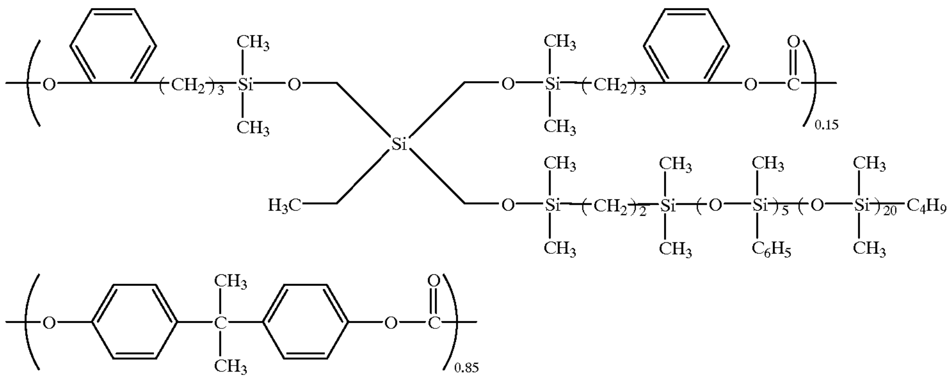

The polycarbonate was pelletized and molded into plate moldings in the same manner as in Example 1. The releasability of the moldings and the contact angle of water were measured in the same manner as in Example 1. The results are listed in Table 1.

EXAMPLE 5

The procedure of Example 3 was repeated except that the polysiloxane-5 (143.7 g) was used in place of the polysiloxane-3 (144.7 g), to obtain 215 g of a polycarbonate (PC-5). The polycarbonate had a reduced viscosity of 0.63 dl/g. The structure of and the copolymerization ratios in the polycarbonate (PC-5) were determined by $^{1}$H-NMR and $^{29}$Si-NMR spectra. The $^{1}$H-NMR spectrum indicated peaks due to the polysiloxane-5 (a peak at 0–0.1 ppm due to methyl on the siloxane main chain, a peak at 0.6 ppm due to the ends of siloxane parts, a peak at 0.87 ppm due to the branched siloxane structure) and a peak (1.7 ppm) due to bisphenol A. The $^{29}$Si-NMR spectrum indicated peaks (−21 ppm and 7.8 ppm as chemical shifts with tetramethylsilane as a standard) due to general dimethylsiloxane and a peak (−64 ppm) due to the silicon atom with three oxygen atoms bonded thereto. From these analytical results, the polycarbonate (PC-5) was found to contain the following repeating units in the following ratios.

The polycarbonate was pelletized and molded into plate moldings in the same manner as in Example 1. The releasability of the moldings and the contact angle of water were measured in the same manner as in Example 1. The results are listed in Table 1.

EXAMPLE 6

The procedure of Example 3 was repeated except that the polysiloxane-3 (48.2 g) and 4,4'-biphenol (8.3 g) were used in place of the polysiloxane-3 (144.7 g), to obtain 120 g of a polycarbonate (PC-6). The polycarbonate had a reduced viscosity of 0.75 dl/g. The structure of and the copolymerization ratios in the polycarbonate (PC-6) were determined by $^{1}$H-NMR and $^{29}$Si-NMR spectra. The $^{1}$H-NMR spectrum indicated peaks due to the polysiloxane-3 (a peak at 0–0.1 ppm due to methyl on the siloxane main chain, a peak at 0.6 ppm due to the ends of siloxane parts, a peak at 0.87 ppm due to the branched siloxane structure), a peak (1.7 ppm) due to bisphenol A and a peak (7.6 ppm) due to 4,4'-biphenol. The $^{29}$Si-NMR spectrum indicated peaks (−21 ppm and 7.8 ppm as chemical shifts with tetramethylsilane as a standard) due to general dimethylsiloxane and a peak (−64 ppm) due to the silicon atom with three oxygen atoms bonded thereto. From these analytical results, the polycarbonate (PC-6) was found to contain the following repeating units in the following ratios.

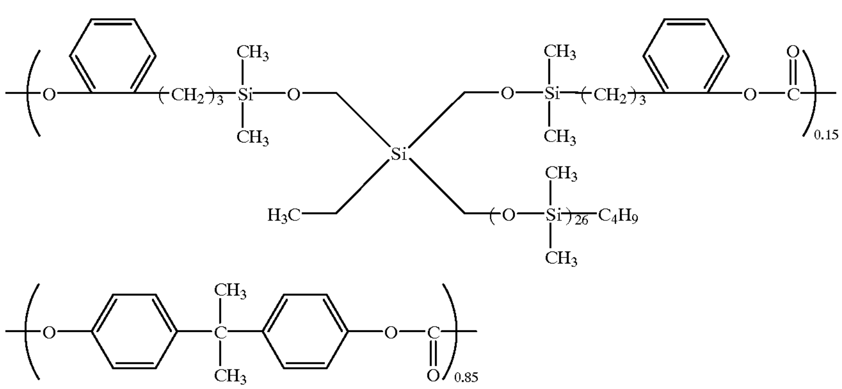

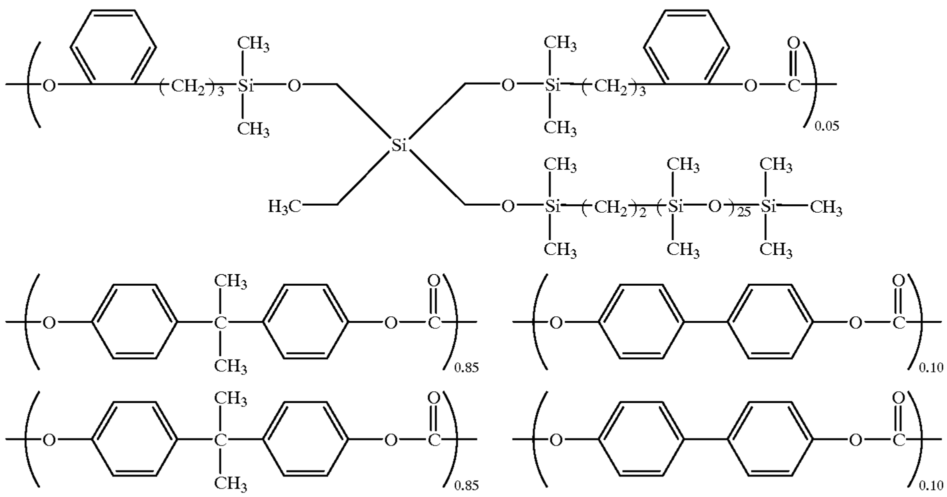

The polycarbonate was pelletized and molded into plate moldings in the same manner as in Example 1. The releasability of the moldings and the contact angle of water were measured in the same manner as in Example 1. The results are listed in Table 1.

EXAMPLE 7

The procedure of Example 3 was repeated except that the polysiloxane-3 (9.6 g) and 4,4'-biphenol (11.8 g) were used in place of the polysiloxane-3 (144.7 g), to obtain 98 g of a polycarbonate (PC-7). The polycarbonate had a reduced viscosity of 0.77 dl/g. The structure of and the copolymerization ratios in the polycarbonate (PC-7) were determined by $^{1}$H-NMR and $^{29}$Si-NMR spectra. The $^{1}$H-NMR spectrum indicated peaks due to the polysiloxane-3 (a peak at 0–0.1 ppm due to methyl on the siloxane main chain, a peak at 0.6 ppm due to the ends of siloxane parts, a peak at 0.87 ppm due to the branched siloxane structure), a peak (1.7 ppm) due to bisphenol A and a peak (7.6 ppm) due to 4,4'-biphenol. The $^{29}$Si-NMR spectrum indicated peaks (−21 ppm and 7.8 ppm as chemical shifts with tetramethylsilane as a standard) due to general dimethylsiloxane and a peak (−64 ppm) due to the silicon atom with three oxygen atoms bonded thereto. From these analytical results, the polycarbonate (PC-7) was found to contain the following repeating units in the following ratios.

The polycarbonate was pelletized and molded into plate moldings in the same manner as in Example 1. The releasability of the moldings and the contact angle of water were measured in the same manner as in Example 1. The results are listed in Table 1.

EXAMPLE 8

The procedure of Example 3 was repeated except that the polysiloxane-3 (1.0 g) and 4,4'-biphenol (12.3 g) were used in place of the polysiloxane-3 (144.7 g), to obtain 90 g of a polycarbonate (PC-8). The polycarbonate had a reduced viscosity of 0.77 dl/g. The structure of and the copolymerization ratios in the polycarbonate (PC-8) were determined by $^{1}$H-NMR and $^{29}$Si-NMR spectra. The $^{1}$H-NMR spectrum indicated peaks due to the polysiloxane-3 (a peak at 0–0.1 ppm due to methyl on the siloxane main chain, a peak at 0.6 ppm due to the ends of siloxane parts, a peak at 0.87 ppm due to the branched siloxane structure), a peak (1.7 ppm) due to bisphenol A and a peak (7.6 ppm) due to 4,4'-biphenol. The $^{29}$Si-NMR spectrum indicated peaks (−21 ppm and 7.8 ppm as chemical shifts with tetramethylsilane as a standard) due to general dimethylsiloxane and a peak (−64 ppm) due to the silicon atom with three oxygen atoms bonded thereto. From these analytical results, the polycarbonate (PC-8) was found to contain the following repeating units in the following ratios.

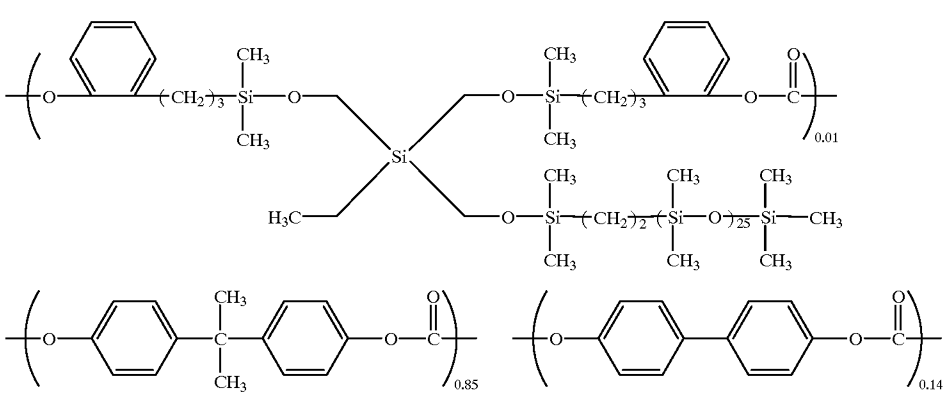

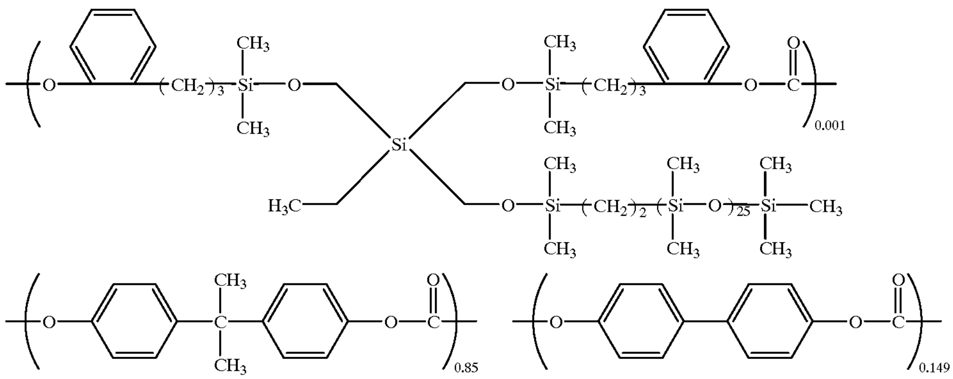

The polycarbonate was pelletized and molded into plate moldings in the same manner as in Example 1. The releasability of the moldings and the contact angle of water were measured in the same manner as in Example 1. The results are listed in Table 1.

EXAMPLE 9

The procedure of Example 3 was repeated except that the polysiloxane-3 (0.1 g) and 4,4'-biphenol (12.3 g) were used in place of the polysiloxane-3 (144.7 g), to obtain 90 g of a polycarbonate (PC-9). The polycarbonate had a reduced viscosity of 0.77 dl/g. The structure of and the copolymerization ratios in the polycarbonate (PC-9) were determined by $^{1}$H-NMR and $^{29}$Si-NMR spectra. The $^{1}$H-NMR spectrum indicated peaks due to the polysiloxane-3 (a peak at 0–0.1 ppm due to methyl on the siloxane main chain, a peak at 0.6 ppm due to the ends of siloxane parts, a peak at 0.87 ppm due to the branched siloxane structure), a peak (1.7 ppm) due to bisphenol A and a peak (7.6 ppm) due to 4,4'-biphenol. The $^{29}$Si-NMR spectrum indicated peaks (−21 ppm and 7.8 ppm as chemical shifts with tetramethylsilane as a standard) due to general dimethylsiloxane and a peak (−64 ppm) due to the silicon atom with three oxygen atoms bonded thereto. From these analytical results, the polycarbonate (PC-9) was found to contain the following repeating units in the following ratios.

The polycarbonate was pelletized and molded into plate moldings in the same manner as in Example 1. The releasability of the moldings and the contact angle of water were measured in the same manner as in Example 1. The results are listed in Table 1.

EXAMPLE 10

The procedure of Example 3 was repeated except that the polysiloxane-3 (1.0 g) and 2,2-bis(3-phenyl-4-hydroxyphenyl)propane (25.1 g) were used in place of the polysiloxane-3 (144.7 g), to obtain 103 g of a polycarbonate (PC-10). The polycarbonate had a reduced viscosity of 0.77 dl/g. The structure of and the copolymerization ratios in the polycarbonate (PC-10) were determined by $^{1}$H-NMR and $^{29}$Si-NMR spectra. The $^{1}$H-NMR spectrum indicated peaks due to the polysiloxane-3 (a peak at 0–0.1 ppm due to methyl on the siloxane main chain, a peak at 0.6 ppm due to the ends of siloxane parts, a peak at 0.87 ppm due to the branched siloxane structure), a peak (1.7 ppm) due to bisphenol A and a peak (6.8 ppm) due to 2,2-bis(3-phenyl-4 -hydroxyphenyl) propane. The $^{29}$Si-NMR spectrum indicated peaks (−21 ppm and 7.8 ppm as chemical shifts with tetramethylsilane as a standard) due to general dimethylsiloxane and a peak (−64 ppm) due to the silicon atom with three oxygen atoms bonded thereto. From these analytical results, the polycarbonate (PC-10) was found to contain the following repeating units in the following ratios.

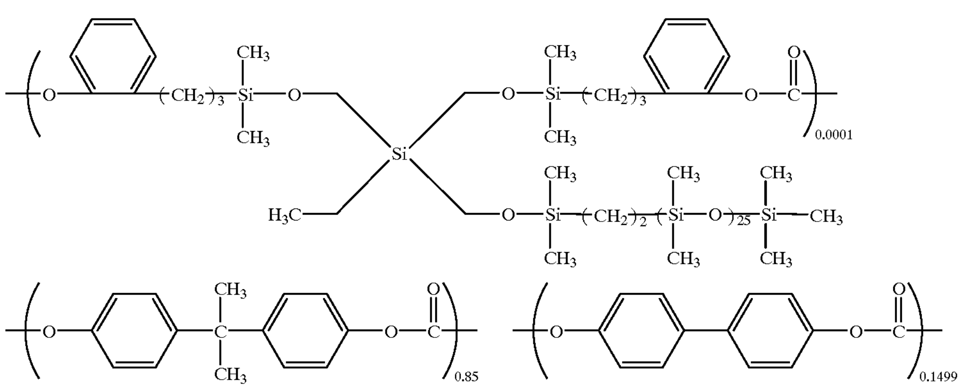

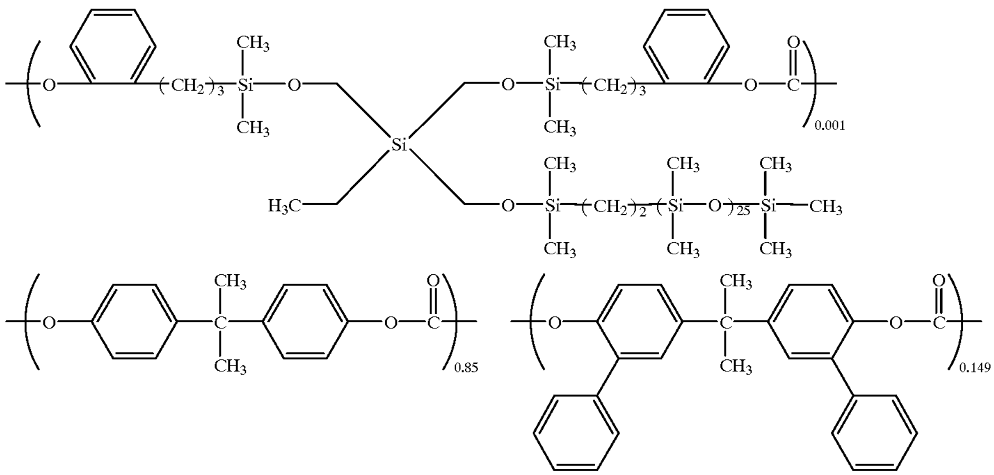

The polycarbonate was pelletized and molded into plate moldings in the same-manner as in Example 1. The releasability of the moldings and the contact angle of water were measured in the same manner as in Example 1. The results are listed in Table 1.

EXAMPLE 11

The procedure of Example 3 was repeated except that the polysiloxane-4 (10.6 g) and 4,4'-dihydroxybenzophenone (13.0 g) were used in place of the polysiloxane-3 (144.7 g), to obtain 100 g of a polycarbonate (PC-11). The polycarbonate had a reduced viscosity of 0.75 dl/g. The structure of and the copolymerization ratios in the polycarbonate (PC-11) were determined by $^{1}$H-NMR and $^{29}$Si-NMR spectra. The $^{1}$H-NMR spectrum indicated peaks due to the polysiloxane-4 (a peak at 0–0.1 ppm due to methyl on the siloxane main chain, a peak at 0.6 ppm due to the ends of siloxane parts, a peak at 0.87 ppm due to the branched siloxane structure), a peak (1.7 ppm) due to bisphenol A and a peak (7.3–7.5 ppm) due to 4,4'-dihydroxybenzophenone. The $^{29}$Si-NMR spectrum indicated peaks (−21 ppm and 7.8 ppm as chemical shifts with tetramethylsilane as a standard) due to general dimethylsiloxane and a peak (−64 ppm) due to the silicon atom with three oxygen atoms bonded thereto. From these analytical results, the polycarbonate (PC-11) was found to contain the following repeating units in the following ratios.

The polycarbonate was pelletized and molded into plate moldings in the same manner as in Example 1. The releasability of the moldings and the contact angle of water were measured in the same manner as in Example 1. The results are listed in Table 1.

EXAMPLE 12

The procedure of Example 3 was repeated except that 9,9-bis(3-methyl-4-hydroxyphenyl)fluorene (123.2 g) was used in place of bisphenol A (74 g) and that the polysiloxane-4 (164.0 g) was used in place of the polysiloxane-3 (144.7 g), to obtain 280 g of a polycarbonate (PC-12). The polycarbonate had a reduced viscosity of 0.48 dl/g. The structure of and the copolymerization ratios in the polycarbonate (PC-12) were determined by $^{1}$H-NMR and $^{29}$Si-NMR spectra. The $^{1}$H-NMR spectrum indicated peaks due to the polysiloxane-4 (a peak at 0–0.1 ppm due to methyl on the siloxane main chain, a peak at 0.6 ppm due to the ends of siloxane parts, a peak at 0.87 ppm due to the branched siloxane structure) and peaks (2.15 ppm, 7.8 ppm) due to 9,9-bis(3-methyl-4-hydroxyphenyl)fluorene. The $^{29}$Si-NMR spectrum indicated peaks (−21 ppm and 7.8 ppm as chemical shifts with tetramethylsilane as a standard) due to general dimethylsiloxane and a peak (−64 ppm) due to the silicon atom with three oxygen atoms bonded thereto. From these analytical results, the polycarbonate (PC-12) was found to contain the following repeating units in the following ratios.

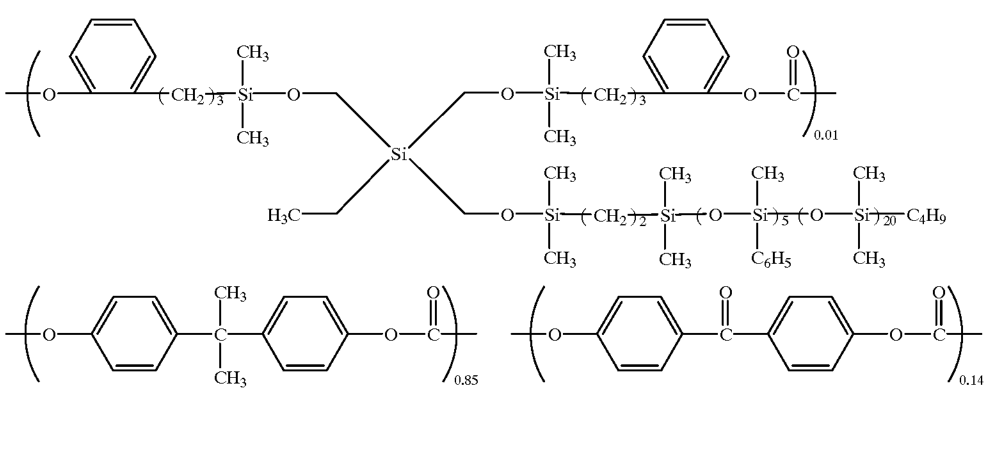

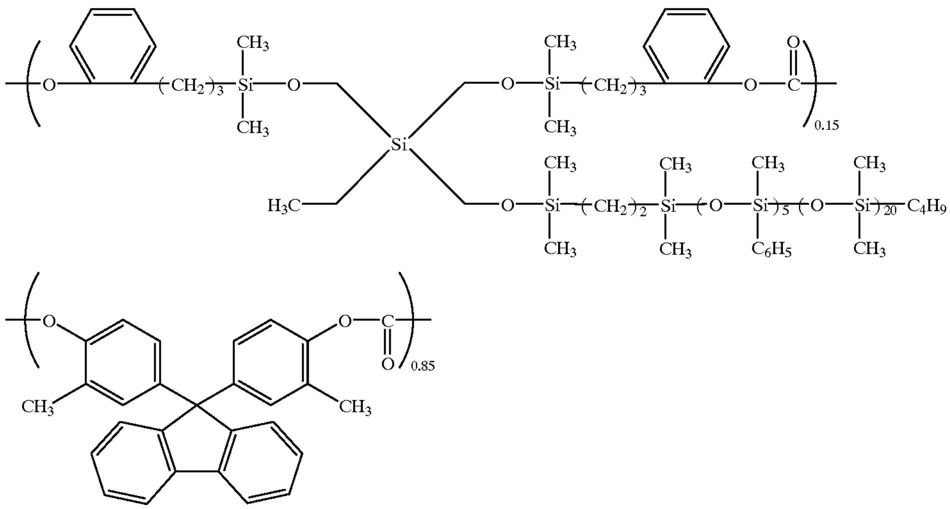

The polycarbonate was pelletized and molded into plate moldings in the same manner as in Example 1. The releasability of the moldings and the contact angle of water were measured in the same manner as in Example 1. The results are listed in Table 1.

EXAMPLE 13

The procedure of Example 3 was repeated except that the polysiloxane-1 (10.6 g) and bis(4-hydroxyphenyl) ether (9.1 g) were used in place of the polysiloxane-3 (144.7 g), to obtain 95 g of a polycarbonate (PC-13). The polycarbonate had a reduced viscosity of 0.62 dl/g. The structure of and the copolymerization ratios in the polycarbonate (PC-13) were determined by $^{1}$H-NMR and $^{29}$Si-NMR spectra. The $^{1}$H-NMR spectrum indicated peaks due to the polysiloxane-1 (a peak at 0–0.1 ppm due to methyl on the siloxane main chain, a peak at 0.6 ppm due to the ends of siloxane parts, a peak at 0.87 ppm due to the branched siloxane structure), a peak (1.7 ppm) due to bisphenol A and a peak (7.0 ppm) due to bis(4-hydroxyphenyl) ether. The $^{29}$Si-NMR spectrum indicated peaks (−21 ppm and 7.8 ppm as chemical shifts with tetramethylsilane as a standard) due to general dimethylsiloxane and a peak (−64 ppm) due to the silicon atom with three oxygen atoms bonded thereto. From these analytical results, the polycarbonate (PC-13) was found to contain the following repeating units in the following ratios.

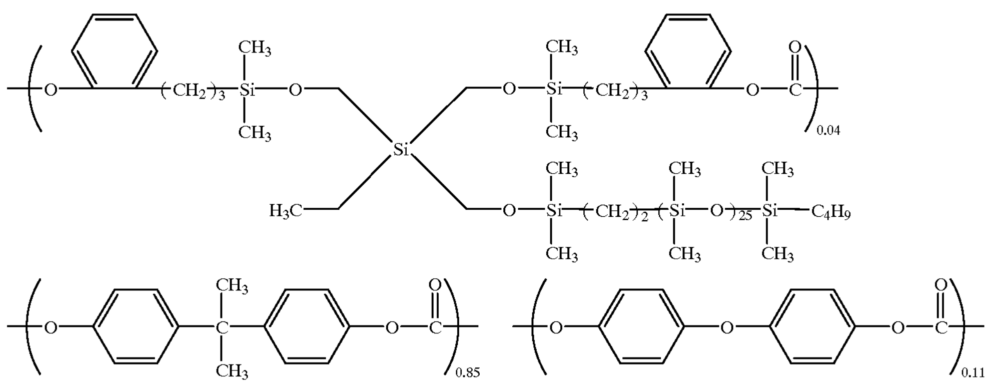

The polycarbonate was pelletized and molded into plate moldings in the same manner as in Example 1. The releasability of the moldings and the contact angle of water were measured in the same manner as in Example 1. The results are listed in Table 1.

EXAMPLE 14

The procedure of Example 3 was repeated except that 1,1-bis(4-hydroxyphenyl)cyclohexane (90.0 g) was used in place of bisphenol A (74 g), and the polysiloxane-1 (146.0 g) was used in place of the polysiloxane-3 (144.7 g), to obtain 149 g of a polycarbonate (PC-14). The polycarbonate had a reduced viscosity of 0.57 dl/g. The structure of and the copolymerization ratios in the polycarbonate (PC-14) were determined by $^{1}$H-NMR and $^{29}$Si-NMR spectra. The $^{1}$H-NMR spectrum indicated peaks due to the polysiloxane-1 (a peak at 0–0.1 ppm due to methyl on the siloxane main chain, a peak at 0.6 ppm due to the ends of siloxane parts, a peak at 0.87 ppm due to the branched siloxane structure) and peaks (1.5 ppm, 2.3 ppm, 7.2 ppm, 7.3 ppm) due to 1,1-bis(4-hydroxyphenyl)cyclohexane. The $^{29}$Si-NMR spectrum indicated peaks (−21 ppm and 7.8 ppm as chemical shifts with tetramethylsilane as a standard) due to general dimethylsiloxane and a peak (−64 ppm) due to the silicon atom with three oxygen atoms bonded thereto. From these analytical results, the polycarbonate (PC-14) was found to contain the following repeating units in the following ratios.

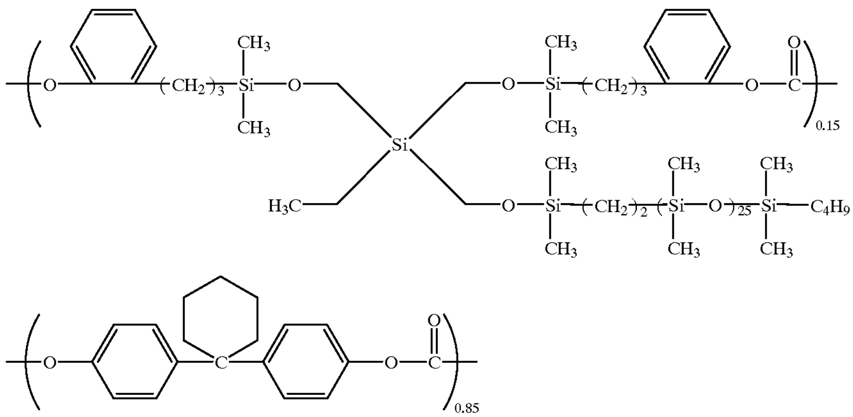

The polycarbonate was pelletized and molded into plate moldings in the same manner as in Example 1. The releasability of the moldings and the contact angle of water were measured in the same manner as in Example 1. The results are listed in Table 1.

EXAMPLE 15

The procedure of Example 3 was repeated except that the polysiloxane-2 (30 g) and 1,1-bis(4-hydroxyphenyl) diphenylmethane (15.8 g) were used in place of the polysiloxane-3 (144.7 g), to obtain 112 g of a polycarbonate (PC-15). The polycarbonate had a reduced viscosity of 0.68 dl/g. The structure of and the copolymerization ratios in the polycarbonate (PC-15) were determined by $^{1}$H-NMR and $^{29}$Si-NMR spectra. The $^{1}$H-NMR spectrum indicated peaks due to the polysiloxane-2 (a peak at 0–0.1 ppm due to methyl on the siloxane main chain, a peak at 0.6 ppm due to the ends of siloxane parts, a peak at 0.87 ppm due to the branched siloxane structure), a peak (1.7 ppm) due to bisphenol A and a peak (7.1–7.3 ppm) due to 1,1-bis(4-hydroxyphenyl) diphenylmethane. The $^{29}$Si-NMR spectrum indicated peaks (−21 ppm and 7.8 ppm as chemical shifts with tetramethylsilane as a standard) due to general dimethylsiloxane and a peak (−64 ppm) due to the silicon atom with three oxygen atoms bonded thereto. From these analytical results, the polycarbonate (PC-15) was found to contain the following repeating units in the following ratios.

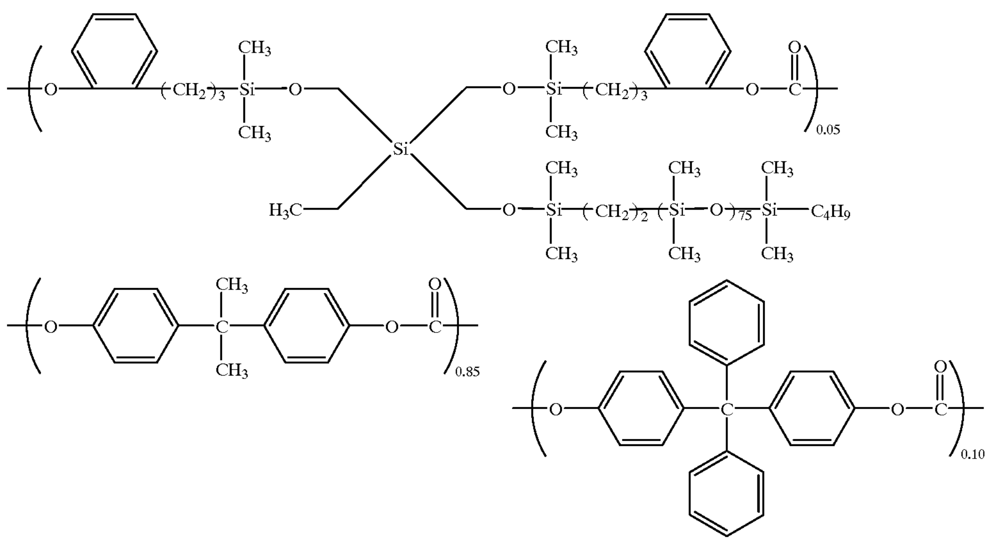

The polycarbonate was pelletized and molded into plate moldings in the same manner as in Example 1. The releasability of the moldings and the contact angle of water were measured in the same manner as in Example 1. The results are listed in Table 1.

EXAMPLE 16

The procedure of Example 3 was repeated except that the polysiloxane-2 (30 g) and bisphenol A (14.5 g) were used in place of the polysiloxane-3 (144.7 g), to obtain 111 g of a polycarbonate (PC-16). The polycarbonate had a reduced viscosity of 0.71 dl/g. The structure of and the copolymerization ratios in the polycarbonate (PC-16) were determined by $^{1}$H-NMR and $^{29}$Si-NMR spectra. The $^{1}$H-NMR spectrum indicated peaks due to the polysiloxane-2 (a peak at 0–0.1 ppm due to methyl on the siloxane main chain, a peak at 0.6 ppm due to the ends of siloxane parts, a peak at 0.87 ppm due to the branched siloxane structure) and a peak (1.7 ppm) due to bisphenol A. The $^{29}$Si-NMR spectrum indicated peaks (−21 ppm and 7.8 ppm as chemical shifts with tetramethylsilane as a standard) due to general dimethylsiloxane and a peak (−64 ppm) due to the silicon atom with three oxygen atoms bonded thereto. From these analytical results, the polycarbonate (PC-16) was found to contain the following repeating units in the following ratios.

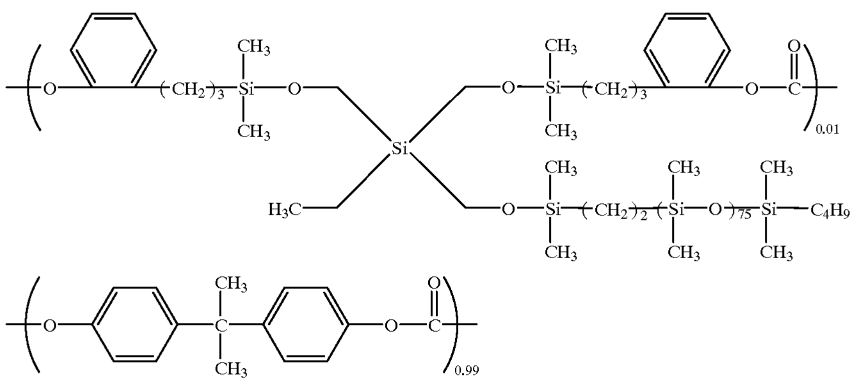

The polycarbonate was pelletized and molded into plate moldings in the same manner as in Example 1. The releasability of the moldings and the contact angle of water were measured in the same manner as in Example 1. The results are listed in Table 1.

EXAMPLE 17

The procedure of Example 3 was repeated except that bis(4-hydroxyphenyl) sulfone (81 g) was used in place of bisphenol A (74 g) and that the polysiloxane-4 (10.6 g) and bis(4-hydroxyphenyl) sulfone (16.0 g) were used in place of the polysiloxane-3 (144.7 g), to obtain 103 g of a polycarbonate (PC-17). The polycarbonate had a reduced viscosity of 0.74 dl/g. The structure of and the copolymerization ratios in the polycarbonate (PC-17) were determined by $^{1}$H-NMR and $^{29}$Si-NMR spectra. The $^{1}$H-NMR spectrum indicated peaks due to the polysiloxane-4 (a peak at 0–0.1 ppm due to methyl on the siloxane main chain, a peak at 0.6 ppm due to the ends of siloxane parts, a peak at 0.87 ppm due to the branched siloxane structure) and a peak (8.0 ppm) due to bis(4-hydroxyphenyl) sulfone. The $^{29}$Si-NMR spectrum indicated peaks (−21 ppm and 7.8 ppm as chemical shifts with tetramethylsilane as a standard) due to general dimethylsiloxane and a peak (−64 ppm) due to the silicon atom with three oxygen atoms bonded thereto. From these analytical results, the polycarbonate (PC-17) was found to contain the following repeating units in the following ratios.

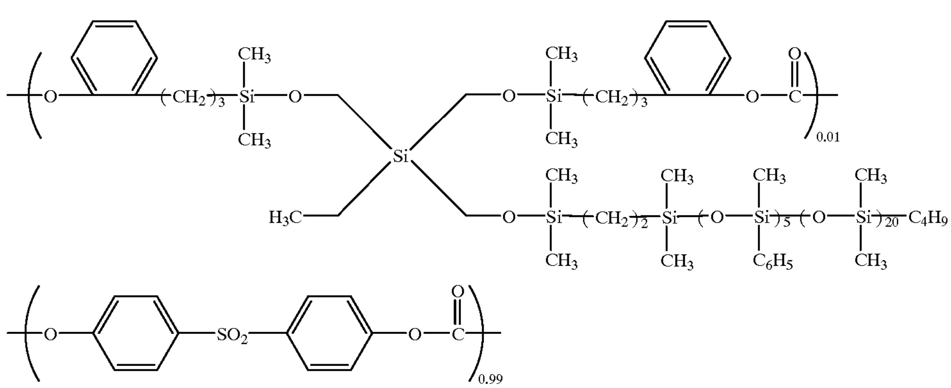

The polycarbonate was pelletized and molded into plate moldings in the same manner as in Example 1. The releasability of the moldings and the contact angle of water were measured in the same manner as in Example 1. The results are listed in Table 1.

EXAMPLE 18

The procedure of Example 3 was repeated except that 2,2-bis(3-methoxy-4-hydroxyphenyl)-1,1,1,3,3,3-hexafluoropropane (129 g) was used in place of bisphenol A (74 g) and that the polysiloxane-4 (10.6 g) and 2,2-bis(3-methoxy-4-hydroxyphenyl)-1,1,1,3,3,3-hexafluoropropane (25.0 g) were used in place of the polysiloxane-3 (144.7 g), to obtain 151 g of a polycarbonate (PC-18). The polycarbonate had a reduced viscosity of 0.68 dl/g. The structure of and the copolymerization ratios in the polycarbonate (PC-18) were determined by $^{1}$H-NMR and $^{29}$Si-NMR spectra. The $^{1}$H-NMR spectrum indicated peaks due to the polysiloxane-4 (a peak at 0–0.1 ppm due to methyl on the siloxane main chain, a peak at 0.6 ppm due to the ends of siloxane parts, a peak at 0.87 ppm due to the branched siloxane structure) and a peak (3.7 ppm, due to methoxy groups) due to 2,2-bis(3-methoxy-4-hydroxyphenyl)-1,1,1,3,3,3-hexafluoropropane. The $^{29}$Si-NMR spectrum indicated peaks (−21 ppm and 7.8 ppm as chemical shifts with tetramethylsilane as a standard) due to general dimethylsiloxane and a peak (−64 ppm) due to the silicon atom with three oxygen atoms bonded thereto. From these analytical results, the polycarbonate (PC-18) was found to contain the following repeating units in the following ratios.

The polycarbonate was pelletized and molded into plate moldings in the same manner as in Example 1. The releasability of the moldings and the contact angle of water were measured in the same manner as in Example 1. The results are listed in Table 1.

EXAMPLE 19

The procedure of Example 3 was repeated except that 2,2-bis(4-hydroxyphenyl)pentane (83 g) was used in place of bisphenol A (74 g) and that the polysiloxane-5 (9.6 g) and 2,2-bis(4-hydroxyphenyl)pentane (16.0 g) were used in place of the polysiloxane-3 (144.7 g), to obtain 101 g of a polycarbonate (PC-19). The polycarbonate had a reduced viscosity of 0.74 dl/g. The structure of and the copolymerization ratios in the polycarbonate (PC-19) were determined by $^{1}$H-NMR and $^{29}$Si-NMR spectra. The $^{1}$H-NMR spectrum indicated peaks due to the polysiloxane-5 (a peak at 0–0.1 ppm due to methyl on the siloxane main chain, a peak at 0.6 ppm due to the ends of siloxane parts, a peak at 0.87 ppm due to the branched siloxane structure and a peak (1.5–1.8 ppm) due to 2,2-bis(4-hydroxyphenyl)pentane. The $^{29}$Si-NMR spectrum indicated peaks (−21 ppm and 7.8 ppm as chemical shifts with tetramethylsilane as a standard) due to general dimethylsiloxane and a peak (−64 ppm) due to the silicon atom with three oxygen atoms bonded thereto. From these analytical results, the polycarbonate (PC-19) was found to contain the following repeating units in the following ratios.

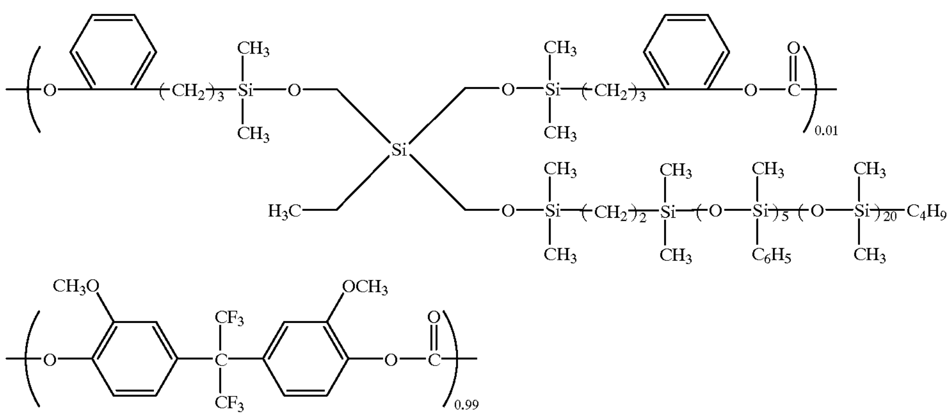

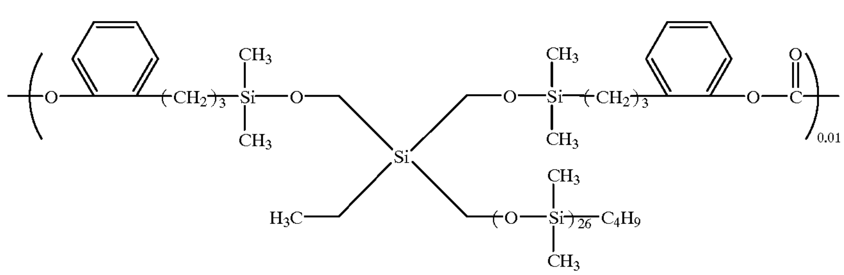

-continued

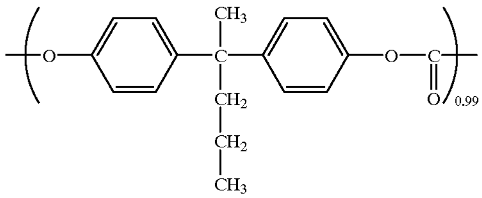

The polycarbonate was pelletized and molded into plate moldings in the same manner as in Example 1. The releasability of the moldings and the contact angle of water were measured in the same manner as in Example 1. The results are listed in Table 1.

EXAMPLE 20

The procedure of Example 3 was repeated except that 2,2-bis(3,5-dibromo-4-hydroxyphenyl)propane (177 g) was used in place of bisphenol A (74 g) and that the polysiloxane-5 (9.6 g) and 2,2-bis(3,5-dibromo-4-hydroxyphenyl)propane (35.0 g) were used in place of the polysiloxane-3 (144.7 g), to obtain 208 g of a polycarbonate (PC-20). The polycarbonate had a reduced viscosity of 0.75 dl/g. The structure of and the copolymerization ratios in the polycarbonate (PC-20) were determined by $^{1}$H-NMR and $^{29}$Si-NMR spectra. The $^{1}$H-NMR spectrum indicated peaks due to the polysiloxane-5 (a peak at 0–0.1 ppm due to methyl on the siloxane main chain, a peak at 0.6 ppm due to the ends of siloxane parts, a peak at 0.87 ppm due to the branched siloxane structure) and a peak (7.5 ppm) due to 2,2-bis(3,5-dibromo-4-hydroxyphenyl)propane. The 29Si-NMR spectrum indicated peaks (−21 ppm and 7.8 ppm as chemical shifts with tetramethylsilane as a standard) due to general dimethylsiloxane and a peak (−64 ppm) due to the silicon atom with three oxygen atoms bonded thereto. From these analytical results, the polycarbonate (PC-20) was found to contain the following repeating units in the following ratios.

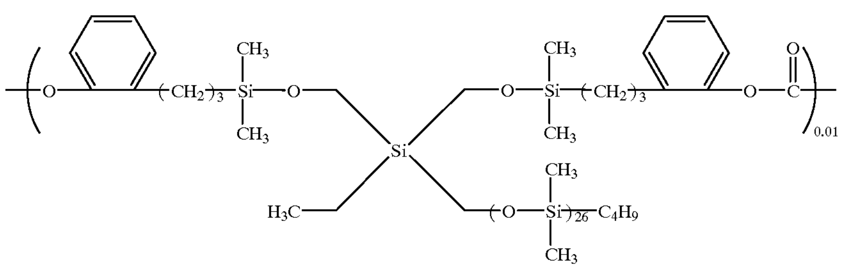

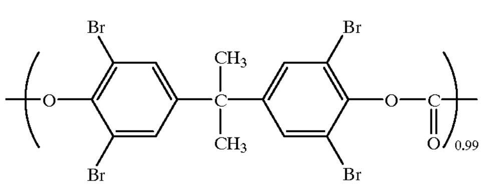

The polycarbonate was pelletized and molded into plate moldings in the same manner as in Example 1. The releasability of the moldings and the contact angle of water were measured in the same manner as in Example 1. The results are listed in Table 1.

COMPARATIVE EXAMPLE 1

114.4 g of sodium hydroxide was dissolved in 1370 ml of water, and then 228.3 g of 2,2-bis(4-hydroxyphenyl)propane and 0.46 g of sodium hydrosulfite were added to and dissolved in the solution while the solution was maintained at 20° C. After 910 ml of methylene chloride was added thereto, 3.00 g of p-t-butylphenol was added with stirring, and then 108.8 g of phosgene was blown therein over 60 minutes. After phosgene was blown in completely, the reaction solution was emulsified by stirring vigorously. After the emulsification, 0.46 g of triethylamine was added, and polymerization was carried out for about 1 hour with stirring. The resulting polymerization solution was separated into an aqueous layer and an organic layer. The organic layer was then neutralized with phosphoric acid and washed repeatedly with water until the pH of washings became neutral. Large excess of isopropanol was added to the organic layer, to precipitate the polymerized product. The precipitate was filtered and dried, to obtain a white powdery polycarbonate (reduced viscosity: 0.67 dl/g). The polycarbonate was pelletized and molded into plate moldings in the same manner as in Example 1. The releasability of the moldings and the contact angle of water were measured in the same manner as in Example 1. The results are listed in Table 1.

COMPARATIVE EXAMPLE 2

91.2 g of 2,2-bis(4-hydroxyphenyl)propane and 0.5 g of sodium hydrosulfite were added to and dissolved in 600 ml of a 8.8% by weight/volume aqueous sodium hydroxide solution. After 360 ml of methylene chloride and 1.44 g of p-t-butylphenol were added thereto and stirred, 51 g of phosgene was blown in the solution over 60 minutes while the solution was maintained at 15° C. When the residual phosgene decreased to 1/10 in the course of blowing phosgene, 10.1 g of a hydroxyphenyl-containing polyorganosiloxane of the following formula:

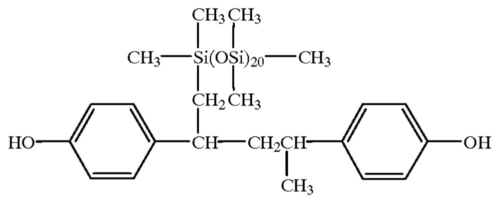

was added. After phosgene was blown therein completely, the reaction solution was emulsified by stirring vigorously. After the emulsification, 0.2 ml of triethylamine was added, and polymerization was carried out for about 1 hour with stirring. The resulting polymerization solution was separated into an aqueous layer and an organic layer. The organic layer was then neutralized with phosphoric acid and washed repeatedly with water until the pH of washings became neutral. Large excess of isopropanol was added to the organic layer, to precipitate the polymerized product. The precipitate was filtered and dried, to obtain a powdery polycarbonate (reduced viscosity: 0.61 dl/g). By NMR analysis, the polycarbonate was identified as a compound comprising the repeating units of the following structural formulae.

Structural formula

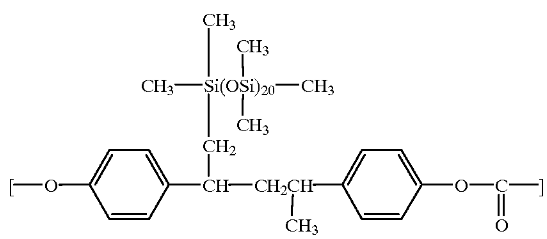

Structural formula

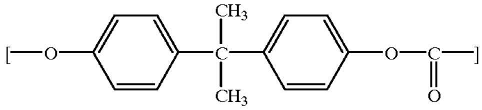

The polycarbonate was pelletized and molded into plate moldings in the same manner as in Example 1. The releasability of the moldings and the contact angle of water were measured in the same manner as in Example 1. The results are listed in Table 1.

COMPARATIVE EXAMPLE 3

By using a polycarbonate (reduced viscosity: 0.73 dl/g) which was produced by using bisphenol Z as a starting material and comprises the following repeating units, plate moldings were molded in the same manner as in Example 1. The releasability of the moldings and the contact angle of water were measured in the same manner as in Example 1. The results are listed in Table 1.

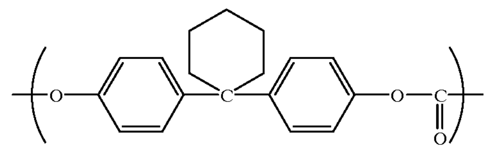

COMPARATIVE EXAMPLE 4

160 g of a polycarbonate was produced in the same manner as in Example 3 except that 137 g of a phenol-modified silicone oil (hydroxyl equivalent weight: 1090) of the following structure was used in place of the polysiloxane-3.

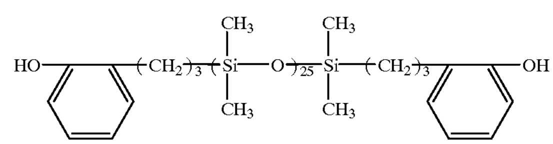

The polycarbonate had a reduced viscosity of 0.64 dl/g. By $^{1}$H-NMR, the polycarbonate was identified to contain the following repeating units in the following ratios.

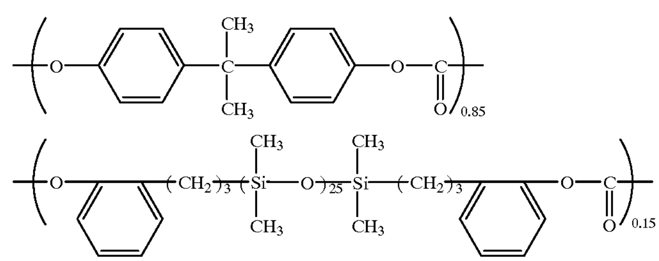

The polycarbonate was pelletized and molded into plate moldings in the same manner as in Example 1. The releasability of the moldings and the contact angle of water were measured in the same manner as in Example 1. The results are listed in Table 1.

TABLE 1

| | Releasability | Contact angle (°) |
|---|---|---|
| Example 1 | ⊚ | 105 |
| Example 2 | ⊚ | 105 |

TABLE 1-continued

| | Releasability | Contact angle (°) |
|---|---|---|
| Example 3 | ◎ | 107 |
| Example 4 | ◎ | 106 |
| Example 5 | ○ | 103 |
| Example 6 | ◎ | 107 |
| Example 7 | ◎ | 107 |
| Example 8 | ◎ | 105 |
| Example 9 | ◎ | 104 |
| Example 10 | ◎ | 106 |
| Example 11 | ◎ | 107 |
| Example 12 | ◎ | 105 |
| Example 13 | ◎ | 104 |
| Example 14 | ◎ | 106 |
| Example 15 | ◎ | 104 |
| Example 16 | ◎ | 105 |
| Example 17 | ◎ | 105 |
| Example 18 | ◎ | 105 |
| Example 19 | ○ | 103 |
| Example 20 | ○ | 103 |
| Comparative Example 1 | X | 85 |
| Comparative Example 2 | Δ | 100 |
| Comparative Example 3 | X | 86 |
| Comparative Example 4 | Δ | 98 |

Note: Evaluation of releasability
◎: The moldings could be pulled out from the mold without applying force.
○: A little force was required by about 10% of the moldings to pull out them from the mold.
Δ: Significant force was required to pull out the moldings from the mold.
X: When pulled out from the mold, the moldings resisted, requiring significant force to pull out them from the mold, and the moldings were partially broken.

The results as shown in Table 1 indicate that the polycarbonate of the present invention has good moldability and gives moldings which are excellent in releasability and water repellence.

EXAMPLE 21

By using 1-phenyl-1,2,3,4-tetrahydroquinoline-6-carboxyaldehyde-1,1'-diphenylhidrazone (C-1) as a charge-transfer substance, and the (PC-3) obtained in Example 3 as a binder resin, a solution of C-1:PC-3:methylene chloride:chlroobenzene=1:1:3:5 (weight ratios) was prepared to use it as a coating fluid. The storage stability (whitening or gelation) of the coating fluid was evaluated. The result is shown in Table 2.

(C-1)

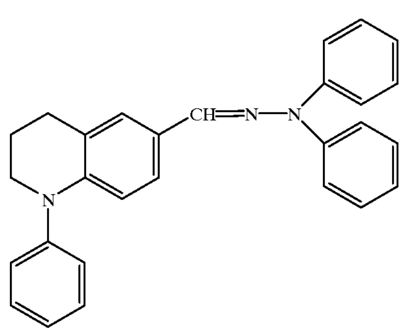

Each of two aluminum conductive substrates (a flat-plate of 50 mm×50 mm and a cylinder of ϕ168 mm×360 mm) was coated with a dispersion of oxotitaniumphthalocyanine:butyral resin:methylene chloride=1:1:38 (weight ratios) by dip-coating, to form a charge-generating layer (about 0.5 μm thick) containing oxotitaniumphthalocyanine. On each charge-generating layer was formed a charge-transfer layer about 20 μm thick by applying the above-described coating fluid by dip-coating and drying, to produce laminate-type electrophotographic photoreceptors. In the course of application and drying, the charge-transfer layers did not crystallized.

The flat-plate photoreceptor was examined for the electric properties (electrophotographic properties). The evaluation of the electrophotographic properties was carried out with an electrostatic charge testing instrument EPA-8100 (produced by Kawaguchi Denki Seisakusho Co., Ltd.) by discharging corona (−6 kV), and measuring the initial surface potential ($V_0$), the residual potential ($V_R$) 5 seconds after the irradiation of light (10 Lux), and the half-value exposure ($E_{1/2}$). The results are shown in Table 2.

The cylindrical organic electrophotographic photoreceptor was examined for the deterioration in resistance to toner-filming caused by repeated uses in a working machine.

The evaluation was carried out by making copies of a test pattern on 30,000 sheets of A4-size paper fed in their longitudinal direction at 22–27° C. at a humidity of 10–30% by using a testing set produced by mounting the organic electrophotographic photoreceptor in a commercial copying machine (a Carlson system using an organic electrophotographic photoreceptor, a cylindrical drum (ϕ168 mm×360 mm, aluminum), corona charging system (voltage—800V), blade cleaning (urethane blade, blade pressure: 10 g/cm$^2$), two-components developer (styrene-acrylic toner, ferrite carrier), and then observing the organic electrophotographic photoreceptor for the number of visible black dots (the toner that adhered to the organic electrophotographic photoreceptor by toner-filming) in an area of 10 mm×10 mm. The results are shown in Table 3.

EXAMPLE 22

The procedure of Example 3 was repeated except that the polysiloxane-1 (145.0 g) was used in place of the polysiloxane-3 (144.7 g), to obtain 214 g of a polycarbonate (PC-21). The polycarbonate had a reduced viscosity of 0.63 dl/g. The structure of and the copolymerization ratios in the polycarbonate (PC-21) were determined by $^1$H-NMR and $^{29}$Si-NMR spectra. The $^1$H-NMR spectrum indicated peaks due to the polysiloxane-1 (a peak at 0–0.1 ppm due to methyl on the siloxane main chain, a peak at 0.6 ppm due to the ends of siloxane parts, a peak at 0.87 ppm due to the branched siloxane structure) and a peak (1.7 ppm) due to bisphenol A. The $^{29}$Si -NMR spectrum indicated peaks (−21 ppm and 7.8 ppm as chemical shifts with tetramethylsilane as a standard) due to general dimethylsiloxane and a peak (−64 ppm) due to the silicon atom with three oxygen atoms bonded thereto. From these analytical results, the polycarbonate (PC-21) was found to contain the following repeating units in the following ratios.

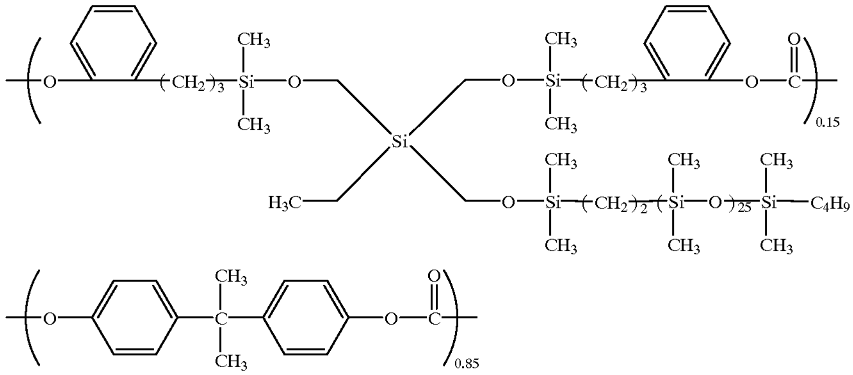

The procedures in Example 21 were repeated except that the polycarbonate (PC-21) was used in place of the polycarbonate (PC-3) obtained in Example 3, to carry out the preparation of a coating fluid, the evaluation thereof, the production of electrophotographic photoreceptors and the evaluation thereof. The results are shown in Tables 2 and 3.

EXAMPLE 23

The procedure of Example 3 was repeated except that the polysiloxane-2 (430.0 g) was used in place of the polysiloxane-3 (144.7 g), to obtain 480 g of a polycarbonate (PC-22). The polycarbonate had a reduced viscosity of 0.52 dl/g. The structure of and the copolymerization ratios in the polycarbonate (PC-22) were determined by $^{1}$H-NMR and $^{29}$Si-NMR spectra. The $^{1}$H-NMR spectrum indicated peaks due to the polysiloxane-2 (a peak at 0–0.1 ppm due to methyl on the siloxane main chain, a peak at 0.6 ppm due to the ends of siloxane parts, a peak at 0.87 ppm due to the branched siloxane structure) and a peak (1.7 ppm) due to bisphenol A. The $^{29}$Si-NMR spectrum indicated peaks (−21 ppm and 7.8 ppm as chemical shifts with tetramethylsilane as a standard) due to general dimethylsiloxane and a peak (−64 ppm) due to the silicon atom with three oxygen atoms bonded thereto. From these analytical results, the polycarbonate (PC-22) was found to contain the following repeating units in the following ratios.

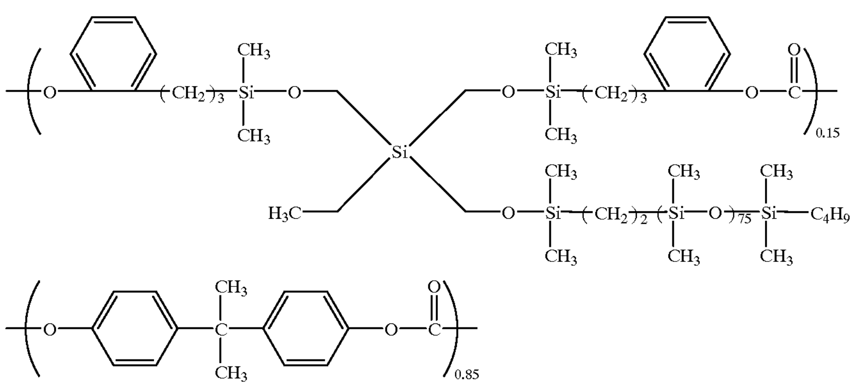

The procedures in Example 21 were repeated except that the polycarbonate (PC-22) was used in place of the polycarbonate (PC-3) obtained in Example 3, to carry out the preparation of a coating fluid, the evaluation thereof, the production of electrophotographic photoreceptors and the evaluation thereof. The results are shown in Tables 2 and 3.

EXAMPLE 24

The procedures in Example 21 were repeated except that the polycarbonate (PC-4) obtained in Example 4 was used in place of the polycarbonate (PC-3) obtained in Example 3, to carry out the preparation of a coating fluid, the evaluation thereof, the production of electrophotographic photoreceptors and the evaluation thereof. The results are shown in Tables 2 and 3.

EXAMPLE 25

The procedures in Example 21 were repeated except that the polycarbonate (PC-5) obtained in Example 5 was used in place of the polycarbonate (PC-3) obtained in Example 3, to carry out the preparation of a coating fluid, the evaluation thereof, the production of electrophotographic photoreceptors and the evaluation thereof. The results are shown in Tables 2 and 3.

EXAMPLE 26

The procedures in Example 21 were repeated except that the polycarbonate (PC-6) obtained in Example 6 was used in place of the polycarbonate (PC-3) obtained in Example 3, to carry out the preparation of a coating fluid, the evaluation thereof, the production of electrophotographic photoreceptors and the evaluation thereof. The results are shown in Tables 2 and 3.

EXAMPLE 27

The procedures in Example 21 were repeated except that the polycarbonate (PC-7) obtained in Example 7 was used in place of the polycarbonate (PC-3) obtained in Example 3, to carry out the preparation of a coating fluid, the evaluation thereof, the production of electrophotographic photoreceptors and the evaluation thereof. The results are shown in Tables 2 and 3.

EXAMPLE 28

The procedures in Example 21 were repeated except that the polycarbonate (PC-8) obtained in Example 8 was used in place of the polycarbonate (PC-3) obtained in Example 3, to carry out the preparation of a coating fluid, the evaluation thereof, the production of electrophotographic photoreceptors and the evaluation thereof. The results are shown in Tables 2 and 3.

EXAMPLE 29

The procedures in Example 21 were repeated except that the polycarbonate (PC-9) obtained in Example 9 was used in place of the polycarbonate (PC-3) obtained in Example 3, to carry out the preparation of a coating fluid, the evaluation thereof, the production of electrophotographic photoreceptors and the evaluation thereof. The results are shown in Tables 2 and 3.

EXAMPLE 30

The procedures in Example 21 were repeated except that the polycarbonate (PC-10) obtained in Example 10 was used in place of the polycarbonate (PC-3) obtained in Example 3, to carry out the preparation of a coating fluid, the evaluation thereof, the production of electrophotographic photoreceptors and the evaluation thereof. The results are shown in Tables 2 and 3.

EXAMPLE 31

The procedures in Example 21 were repeated except that the polycarbonate (PC-11) obtained in Example 11 was used in place of the polycarbonate (PC-3) obtained in Example 3, to carry out the preparation of a coating fluid, the evaluation thereof, the production of electrophotographic photoreceptors and the evaluation thereof. The results are shown in Tables 2 and 3.

EXAMPLE 32

The procedures in Example 21 were repeated except that the polycarbonate (PC-12) obtained in Example 12 was used in place of the polycarbonate (PC-3) obtained in Example 3, to carry out the preparation of a coating fluid, the evaluation thereof, the production of electrophotographic photoreceptors and the evaluation thereof. The results are shown in Tables 2 and 3.

EXAMPLE 33

The procedures in Example 21 were repeated except that the polycarbonate (PC-13) obtained in Example 13 was used in place of the polycarbonate (PC-3) obtained in Example 3, to carry out the preparation of a coating fluid, the evaluation thereof, the production of electrophotographic photoreceptors and the evaluation thereof. The results are shown in Tables 2 and 3.

EXAMPLE 34

The procedures in Example 21 were repeated except that the polycarbonate (PC-14) obtained in Example 14 was used in place of the polycarbonate (PC-3) obtained in Example 3, to carry out the preparation of a coating fluid, the evaluation thereof, the production of electrophotographic photoreceptors and the evaluation thereof. The results are shown in Tables 2 and 3.

EXAMPLE 35

The procedures in Example 21 were repeated except that the polycarbonate (PC-15) obtained in Example 15 was used in place of the polycarbonate (PC-3) obtained in Example 3, to carry out the preparation of a coating fluid, the evaluation thereof, the production of electrophotographic photoreceptors and the evaluation thereof. The results are shown in Tables 2 and 3.

EXAMPLE 36

The procedures in Example 21 were repeated except that the polycarbonate (PC-16) obtained in Example 16 was used in place of the polycarbonate (PC-3) obtained in Example 3, to carry out the preparation of a coating fluid, the evaluation thereof, the production of electrophotographic photoreceptors and the evaluation thereof. The results are shown in Tables 2 and 3.

EXAMPLE 37

The procedures in Example 21 were repeated except that the polycarbonate (PC-17) obtained in Example 17 was used in place of the polycarbonate (PC-3) obtained in Example 3, to carry out the preparation of a coating fluid, the evaluation thereof, the production of electrophotographic photoreceptors and the evaluation thereof. The results are shown in Tables 2 and 3.

EXAMPLE 38

The procedures in Example 21 were repeated except that the polycarbonate (PC-18) obtained in Example 18 was used in place of the polycarbonate (PC-3) obtained in Example 3, to carry out the preparation of a coating fluid, the evaluation thereof, the production of electrophotographic photoreceptors and the evaluation thereof. The results are shown in Tables 2 and 3.

EXAMPLE 39

The procedures in Example 21 were repeated except that the polycarbonate (PC-19) obtained in Example 19 was used in place of the polycarbonate (PC-3) obtained in Example 3, to carry out the preparation of a coating fluid, the evaluation thereof, the production of electrophotographic photoreceptors and the evaluation thereof. The results are shown in Tables 2 and 3.

EXAMPLE 40

The procedures in Example 21 were repeated except that the polycarbonate (PC-20) obtained in Example 20 was used in place of the polycarbonate (PC-3) obtained in Example 3, to carry out the preparation of a coating fluid, the evaluation thereof, the production of electrophotographic photoreceptors and the evaluation thereof. The results are shown in Tables 2 and 3.

COMPARATIVE EXAMPLE 5

The procedures in Example 21 were repeated except that a polycarbonate which was produced by using bisphenol Z and comprised the following repeating units (reduced viscosity=0.73 dl/g) was used in place of the polycarbonate (PC-3) obtained in Example 3, to carry out the preparation of a coating fluid, the evaluation thereof, the production of electrophotographic photoreceptors and the evaluation thereof. The results are shown in Tables 2 and 3.

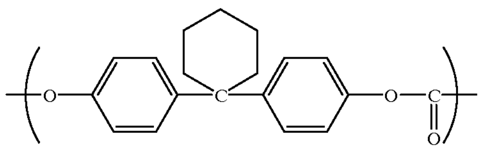

COMPARATIVE EXAMPLE 6

The procedures in Example 21 were repeated except that the polycarbonate obtained in Comparative Example 4 was used in place of the polycarbonate (PC-3) obtained in Example 3, to carry out the preparation of a coating fluid, the evaluation thereof, the production of electrophotographic photoreceptors and the evaluation thereof. The results are shown in Tables 2 and 3.

TABLE 2-1

Stability of Coating Fluid and Electrophotographic Properties

| | Stability of coating fluid | Initial surface potential (V) | Residual potential (V) | Sensitivity (Half-value exposure) (lux · sec) |
|---|---|---|---|---|
| Example 21 | stable for 3 months or more | −747 | −2 | 0.71 |
| Example 22 | stable for 3 months or more | −735 | −4 | 0.74 |
| Example 23 | stable for 3 months or more | −750 | −6 | 0.77 |
| Example 24 | stable for 3 months or more | −742 | −6 | 0.72 |
| Example 25 | stable for 3 months or more | −754 | −3 | 0.78 |
| Example 26 | stable for 3 months or more | −760 | −2 | 0.71 |
| Example 27 | stable for 3 months or more | −754 | −3 | 0.73 |
| Example 28 | stable for 3 months or more | −736 | −4 | 0.74 |
| Example 29 | stable for 3 months or more | −742 | −4 | 0.74 |
| Example 30 | stable for 3 months or more | −746 | −3 | 0.72 |
| Example 31 | stable for 3 months or more | −750 | −6 | 0.77 |
| Example 32 | stable for 3 months or more | −742 | −6 | 0.72 |
| Example 33 | stable for 3 months or more | −747 | −2 | 0.70 |
| Example 34 | stable for 3 months or more | −763 | −5 | 0.71 |

TABLE 2-2

| | Stability of coating fluid | Initial surface potential (V) | Residual potential (V) | Sensitivity (Half-value exposure) (lux · sec) |
|---|---|---|---|---|
| Example 35 | stable for 3 months or more | −729 | −4 | 0.78 |
| Example 36 | stable for 3 months or more | −736 | −4 | 0.77 |

TABLE 2-2-continued

| | Stability of coating fluid | Initial surface potential (V) | Residual potential (V) | Sensitivity (Half-value exposure) (lux · sec) |
|---|---|---|---|---|
| Example 37 | stable for 3 months or more | −744 | −5 | 0.77 |
| Example 38 | stable for 3 months or more | −757 | −4 | 0.73 |
| Example 39 | stable for 3 months or more | −763 | −2 | 0.71 |
| Example 40 | stable for 3 months or more | −759 | −2 | 0.71 |
| Comparative Example 5 | whitened after 1 month | −732 | −4 | 0.85 |
| Comparative Example 6 | set to gel after 1 week | −739 | −10 | 0.93 |

TABLE 3

Evaluation of Filming

| | After 5,000 copies (dots/cm$^2$) | After 30,000 copies (dots/cm$^2$) |
|---|---|---|
| Example 21 | 0, 0, 0 | 0, 1, 0 |
| Example 22 | 0, 0, 0 | 0, 0, 1 |
| Example 23 | 0, 0, 0 | 0, 2, 0 |
| Example 24 | 0, 0, 0 | 0, 1, 0 |
| Example 25 | 0, 0, 0 | 2, 0, 1 |
| Example 26 | 0, 0, 0 | 0, 0, 0 |
| Example 27 | 0, 0, 0 | 0, 0, 1 |
| Example 28 | 0, 1, 0 | 1, 1, 1 |
| Example 29 | 1, 0, 0 | 3, 2, 1 |
| Example 30 | 0, 0, 0 | 0, 0, 0 |
| Example 31 | 0, 0, 0 | 0, 2, 0 |
| Example 32 | 0, 0, 0 | 0, 1, 1 |
| Example 33 | 0, 0, 0 | 2, 0, 0 |
| Example 34 | 0, 0, 0 | 2, 0, 1 |
| Example 35 | 0, 0, 0 | 0, 1, 0 |
| Example 36 | 0, 0, 0 | 0, 0, 1 |
| Example 37 | 0, 0, 0 | 0, 0, 1 |
| Example 38 | 0, 0, 0 | 0, 0, 2 |
| Example 39 | 0, 1, 0 | 3, 1, 3 |
| Example 40 | 1, 0, 0 | 2, 3, 1 |
| Comparative Example 5 | 12, 17, 9 | 30<, 30<, 30< |
| Comparative Example 6 | 2, 2, 5 | 12, 11, 15 |

The results listed in Tables 2 and 3 indicate that the electrophotographic photoreceptor of the present invention is excellent in production efficiency since it is produced by using a polycarbonate which hardly whitens or sets to gel when dissolved in solvents as a resin ingredient in photosensitive layer and has good storage stability. Further, since the polycarbonate is highly compatible with charge-transfer substances and prevents the adhesion of foreign matter that causes the filming on the surfaces of photoreceptors, the electrophotographic photoreceptor of the present invention maintains not only high mechanical strength but also excellent electrophotographic properties for a long term.

INDUSTRIAL APPLICABILITY

The polycarbonate of the present invention has good moldability, and when molded, gives moldings which is excellent in releasability and water repellence.

In addition, the polycarbonate of the present invention enables the preparation of coating fluid having excellent storage stability since it hardly whitens or sets to gel when dissolved in solvents as a resin ingredient in the photosensitive layers of electrophotographic photoreceptors. Therefore, the electrophotographic photoreceptor of the present invention, which is produced by using the polycarbonate as a resin ingredient in the surface layer of photosensitive layer, has high production efficiency. Further, since the polycarbonate is very compatible with charge-transfer substances and prevents the adhesion of foreign matter that causes the filming on the surfaces of photoreceptors, the electrophotographic photoreceptor produced by using it as a binder resin in the photosensitive layer maintains not only high mechanical strength but also excellent electrophotographic properties for a long time.

What is claimed is:

1. A polycarbonate containing repeating units (1) represented by the following general formula (1):

(1)

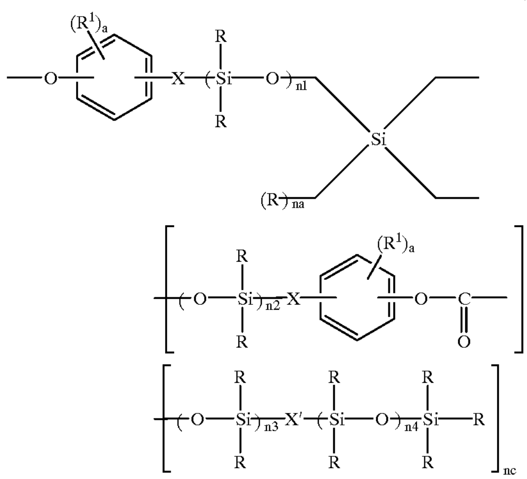

wherein each R is independently an aliphatic unsaturation-free monovalent hydrocarbon group, the R groups being identical with or different from each other, each $R^1$ is independently a halogen atom, a substituted or non-substituted alkyl group of 1 to 6 carbon atoms, a substituted or non-substituted alkoxy group of 1 to 6 carbon atoms or a substituted or non-substituted aryl group of 6 to 12 carbon atoms, each X is independently an alkylene group of 2 or more carbon atoms or an alkyleneoxyalkylene group of 2 or more carbon atoms, each X' is independently an alkylene group of 2 or more carbon atoms, an alkyleneoxyalkylene group of 2 or more carbon atoms or oxygen atom, each a is independently an integer of 0 to 4, na is 0 or 1, nb is 1 or 2, nc is 1 or 2, provided na+nb+nc=3, n1, n2, n3 and n4 are each independently 0 or an integer of 1 or more, provided n1+n2+n3+n4 is an integer of 0 to 450.

2. The polycarbonate of claim 1, which has a reduced viscosity of 0.1 to 10.0 dl/g as measured at a concentration of 0.5 g/dl in methylene chloride.

3. The polycarbonate of claim 1, which comprises the repeating units (1) and repeating units (2) represented by the following general formula (2):

(2)

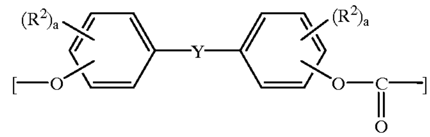

wherein each $R^2$ is independently a halogen atom, vinyl, allyl, a substituted or non-substituted alkyl group of 1 to 10 carbon atoms, a substituted or non-substituted aryl group of 6 to 12 carbon atoms, a substituted or non-substituted cycloalkyl group of 3 to 12 carbon atoms, a substituted or non-substituted alkoxy group of 1 to 6 carbon atoms, a substituted or non-substituted aryloxy group of 6 to 12 carbon atoms, each a is independently an integer of 0 to 4, Y is single bond, —O—, —CO—, —S—, —SO—, —$SO_2$—, —$CR^3R^4$—, a substituted or non-substituted cycloalkylidene group of 5 to 11 carbon atoms, a substituted or non-substituted α,ω-alkylene group of 2 to 12 carbon atoms, 9,9-fluorenylidene, 1,8-menthanediyl, 2,8-menthanediyl, a substituted or non-substituted pyrazinylidene group or a substituted or non-substituted arylene group of 6 to 24 carbon atoms, $R^3$ and $R^4$ are each independently hydrogen atom, a substituted or non-substituted alkyl group of 1 to 10 carbon atoms or a substituted or non-substituted aryl group of 6 to 12 carbon atoms.

4. The polycarbonate of claim 3, wherein the molar ratio of the repeating units (1) to a total of the repeating units (1) and the repeating units (2), (1)/[(1)+(2)], is 0.001 to 1.

5. The polycarbonate of claim 3, wherein the repeating units (1) are the repeating units (A) shown in the following:

(A)

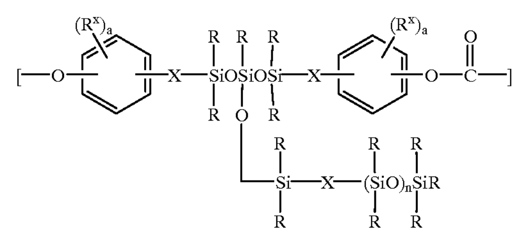

wherein each R is independently an aliphatic unsaturation-free monovalent hydrocarbon group, the R groups being identical with or different from each other, each $R^x$ is independently an alkyl group of 1 to 4 carbon atoms, an alkoxy group of 1 to 4 carbon atoms or a halogen atom, each X is independently an alkylene group of 2 or more carbon atoms or an alkyleneoxyalkylene group of 2 or more carbon atoms, n is an integer of 1 to 400, and each a is independently an integer of 0 to 4.

6. The polycarbonate of claim 3, wherein the repeating units (1) are repeating units selected from the group consisting of the following repeating units:

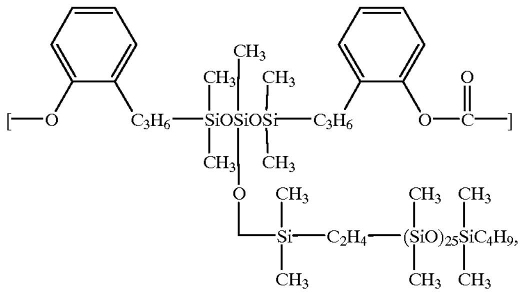
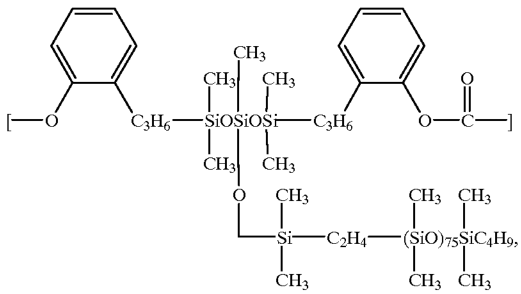
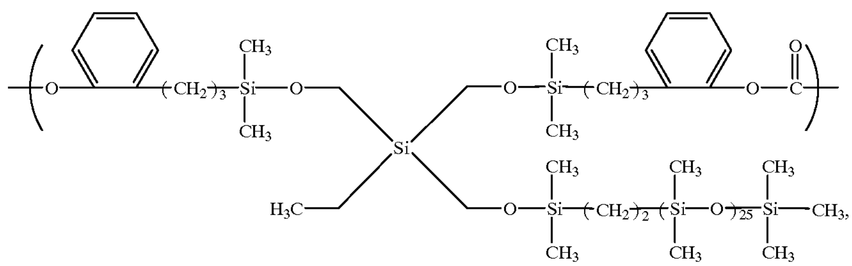
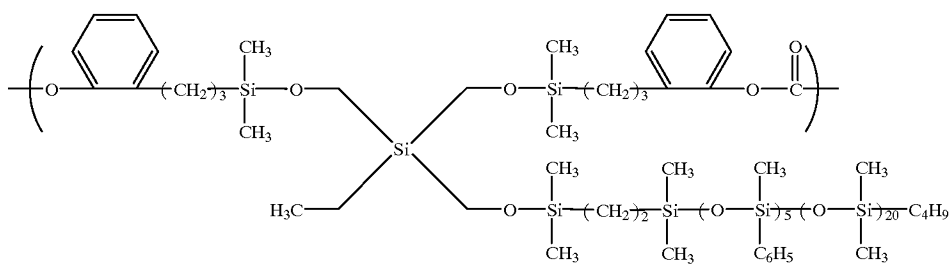
and
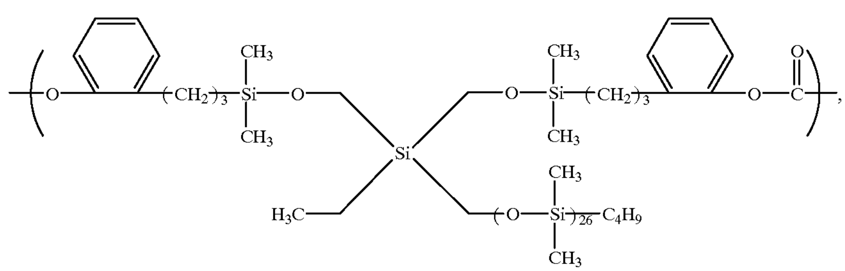
and the repeating units (2) are repeating units selected from the group consisting of the following repeating units:
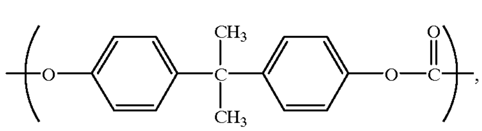
-continued
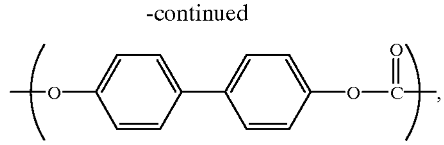

-continued

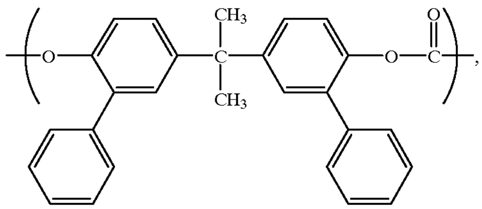

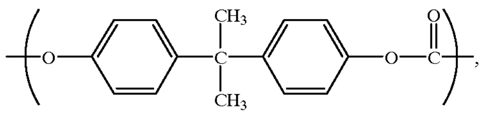

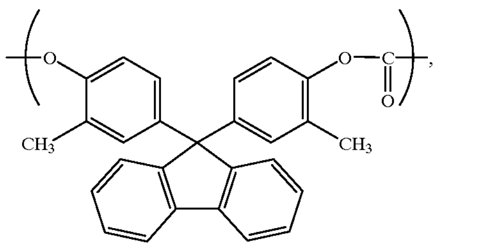

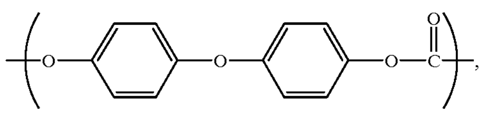

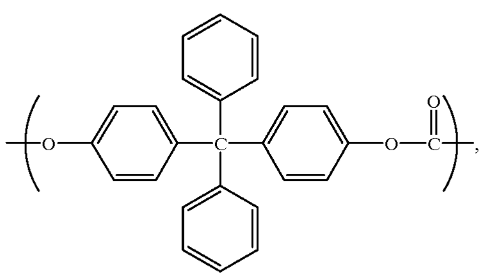

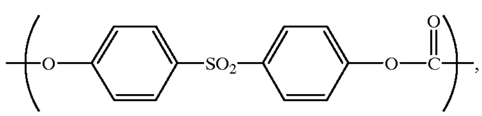

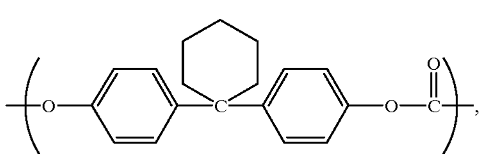

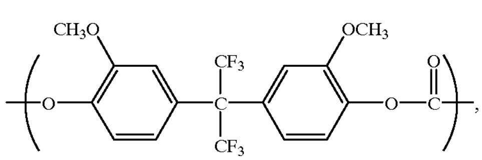

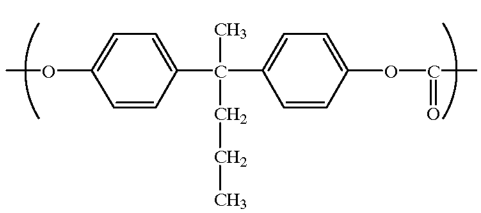

and

-continued

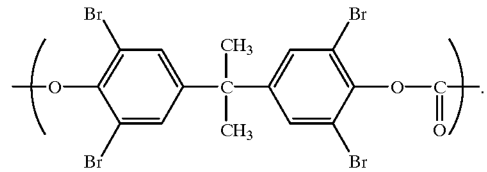

7. The polycarbonate of claim 1, wherein the repeating units (1) are repeating units (A) represented by the following general formula (A), and the polycarbonate contains 0.01 to 100 mol % of the repeating units (A):

(A)

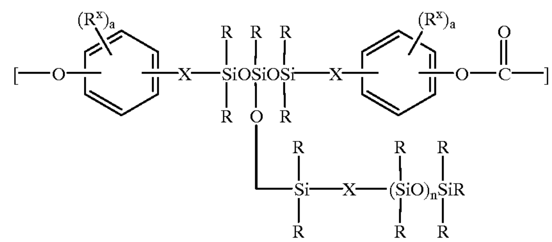

wherein each R is independently an aliphatic unsaturation-free monovalent hydrocarbon group, the R groups being identical with or different from each other, each $R^x$ is independently an alkyl group of 1 to 4 carbon atoms, an alkoxy group of 1 to 4 carbon atoms or a halogen atom, each X is independently an alkylene group of 2 or more carbon atoms or an alkyleneoxyalkylene group of 2 or more carbon atoms, n is an integer of 1 to 400, and each a is independently an integer of 0 to 4.

8. The polycarbonate of claim 1, wherein the repeating units (1) are repeating units (A) represented by the following general formula (A), and the polycarbonate comprises 0.01 to 100 mol % of the repeating units (A) and 99.99 to 0 mol % of repeating units (B) represented by the following general formula (B):

General formula (A)

(A)

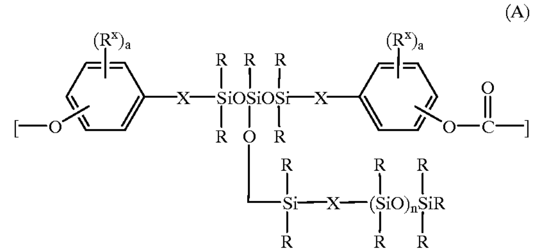

wherein each R is independently an aliphatic unsaturation-free monovalent hydrocarbon group, the R groups being identical with or different from each other, each $R^x$ is independently an alkyl group of 1 to 4 carbon atoms, an alkoxy group of 1 to 4 carbon atoms or a halogen atom, each X is independently an alkylene group of 2 or more carbon atoms or an alkyleneoxyalkylene group of 2 or more carbon atoms, n is an integer of 1 to 400, and each a is independently an integer of 0 to 4, General formula (B)

(B)

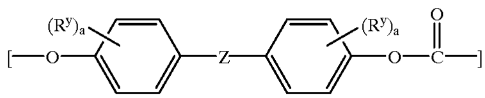

wherein each $R^y$ is independently a halogen atom or a monovalent hydrocarbon group of 1 to 4 carbon atoms, Z is selected from the group consisting of an alkylidene group of 1 to 10 carbon atoms, an aryl-substituted alkylidene group, an alkylene group, an arylene group, —O—, —S—, —CO— and —$SO_2$—, and a is an integer of 0 to 4.

9. The polycarbonate of claim 1, wherein the repeating units (1) are selected from the group consisting of the following repeating units:

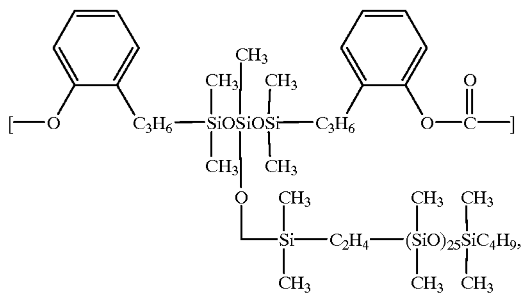

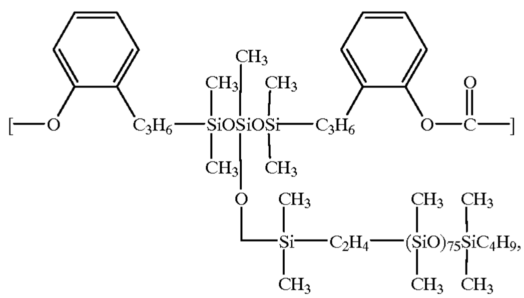

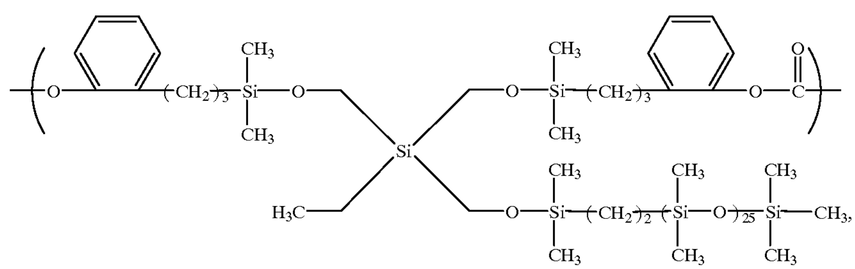

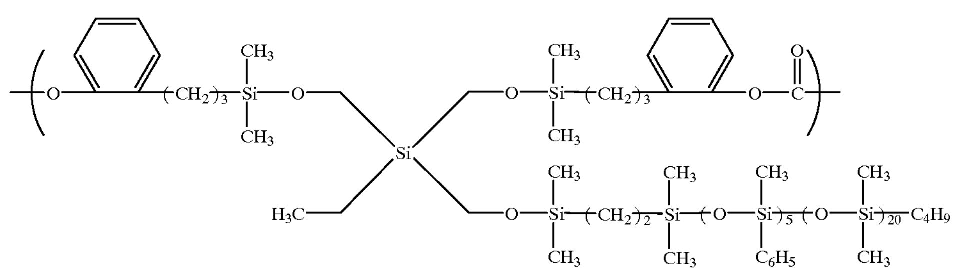

and

-continued

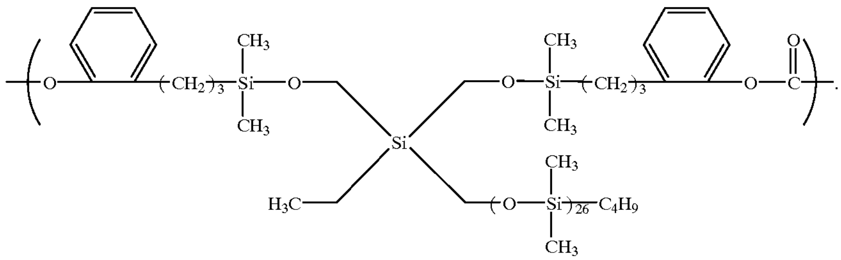

10. An electrophotographic photoreceptor comprising a conductive substrate and a photosensitive layer that is disposed on the conductive substrate, the photosensitive layer having a surface layer which contains a polycarbonate containing repeating units (1) represented by the following general formula (1):

(1)

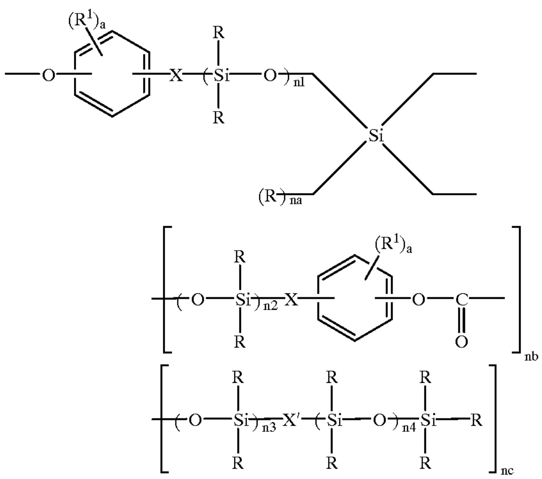

wherein each R is independently an aliphatic unsaturation-free monovalent hydrocarbon group, the R groups being identical with or different from each other, each $R^1$ is independently a halogen atom, a substituted or non-substituted alkyl group of 1 to 6 carbon atoms, a substituted or non-substituted alkoxy group of 1 to 6 carbon atoms or a substituted or non-substituted aryl group of 6 to 12 carbon atoms, each X is independently an alkylene group of 2 or more carbon atoms or an alkyleneoxyalkylene group of 2 or more carbon atoms, each X' is independently an alkylene group of 2 or more carbon atoms, an alkyleneoxyalkylene group of 2 or more carbon atoms or oxygen atom, each a is independently an integer of 0 to 4, na is 0 or 1, nb is 1 or 2, nc is 1 or 2, provided na+nb+nc=3, n1, n2, n3 and n4 are each independently 0 or an integer of 1 or more, provided n1+n2+n3+n4 is an integer of 0 to 450.

11. The electrophotographic photoreceptor of claim 10, wherein the repeating units (1) are selected from the group consisting of the following repeating units:

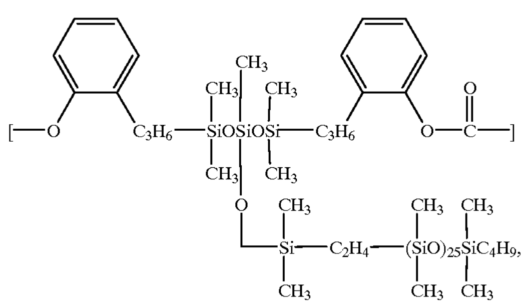

-continued

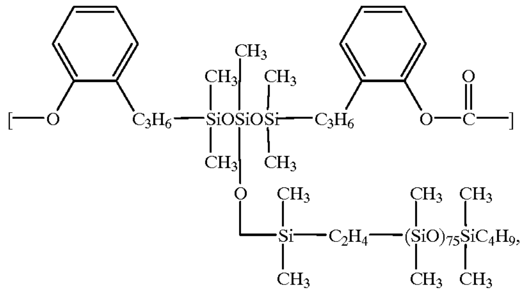

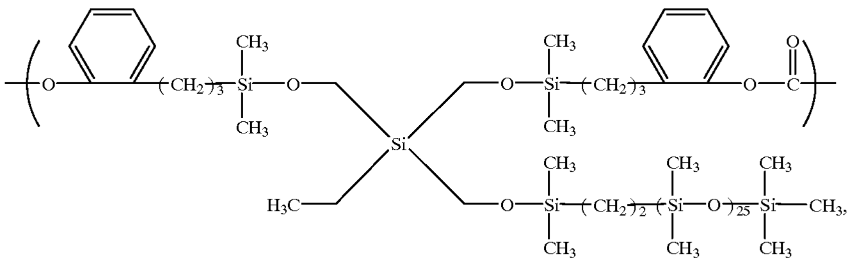

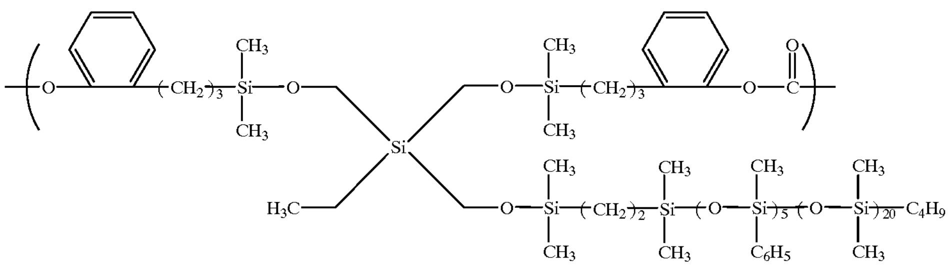

and

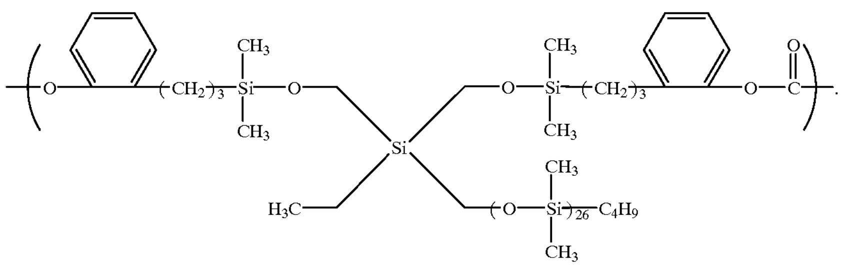

12. The electrophotographic photoreceptor of claim 10, wherein the polycarbonate has a reduced viscosity of 0.1 to 10.0 dl/g as measured at a concentration of 0.5 g/dl in methylene chloride.

13. The electrophotographic photoreceptor of claim 10, wherein the photosensitive layer comprises a charge-generating layer containing a charge-generating substance and the surface layer, the surface layer being a charge-transfer layer containing a charge-transfer substance and a binder resin which contains the polycarbonate.

14. The electrophotographic photoreceptor of claim 10, wherein the polycarbonate comprises the repeating units (1) and repeating units (2) represented by the following general formula (2):

(2)

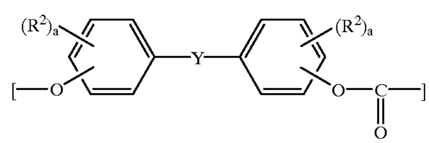

wherein each $R^2$ is independently a halogen atom, vinyl, allyl, a substituted or non-substituted alkyl group of 1 to 10 carbon atoms, a substituted or non-substituted aryl group of 6 to 12 carbon atoms, a substituted or non-substituted cycloalkyl group of 3 to 12 carbon atoms, a substituted or non-substituted alkoxy group of 1 to 6 carbon atoms, a substituted or non-substituted aryloxy group of 6 to 12 carbon atoms, each a is independently an integer of 0 to 4, Y is single bond, —O—, —CO—, —S—, —SO—, —$SO_2$—, —$CR^3R^4$—, a substituted or non-substituted cycloalkylidene group of 5 to 11 carbon atoms, a substituted or non-substituted α,ω-alkylene group of 2 to 12 carbon atoms, 9,9-fluorenylidene, 1,8-menthanediyl, 2,8-menthanediyl, a substituted or non-substituted pyrazinylidene group or a substituted or non-substituted arylene group of 6 to 24 carbon atoms, $R^3$ and $R^4$ are each independently hydrogen atom, a substituted or non-substituted alkyl group of 1 to 10 carbon atoms or a substituted or non-substituted aryl group of 6 to 12 carbon atoms.

15. The electrophotographic photoreceptor of claim 14, wherein the molar ratio of the repeating units (1) to a total of the repeating units (1) and the repeating units (2), (1)/[(1)+(2)], is 0.001 to 1 in the polycarbonate.

16. The electrophotographic photoreceptor of claim 14, wherein the repeating units (1) are repeating units selected from the group consisting of the following repeating units:

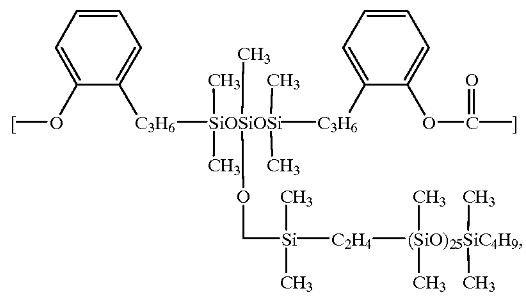

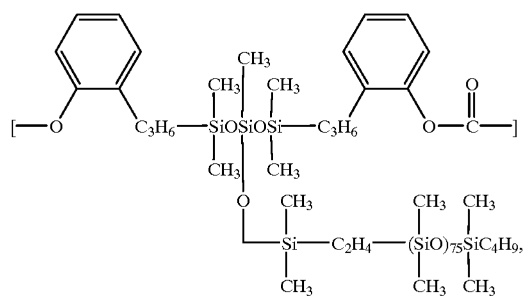

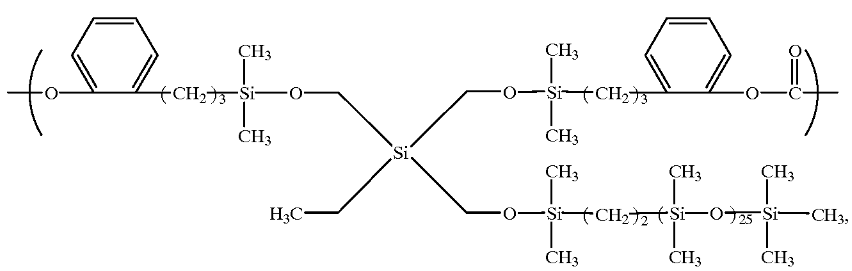

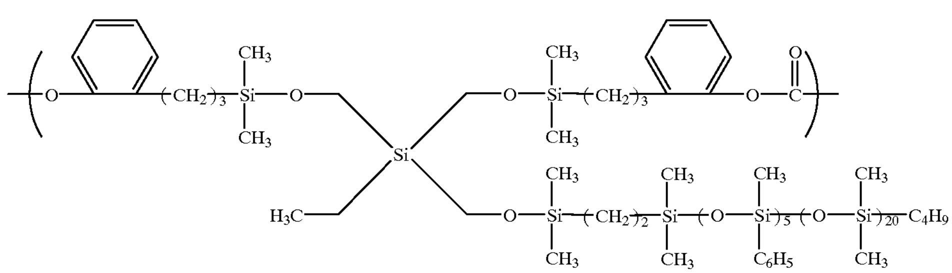

and

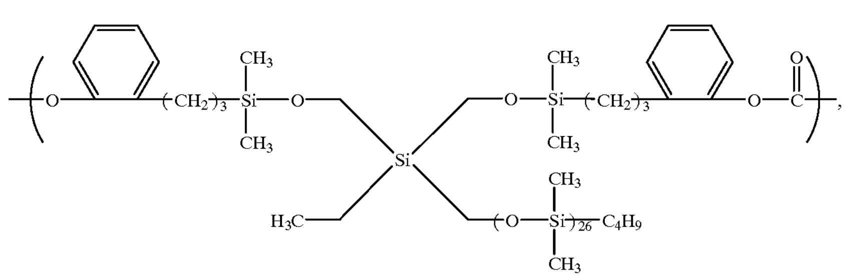

and the repeating units (2) are repeating units selected from the group consisting of the following repeating units:
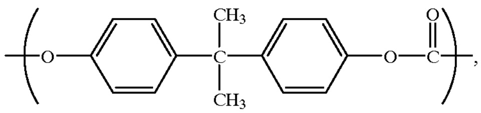
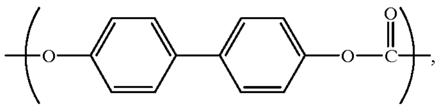
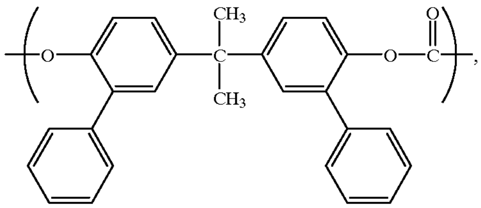
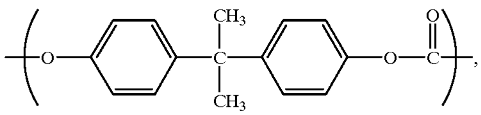
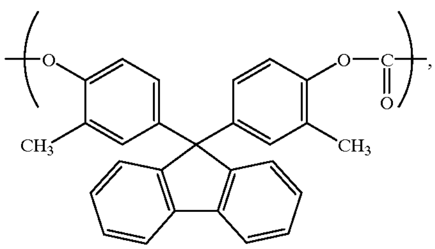
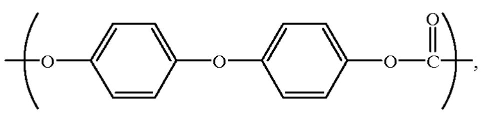
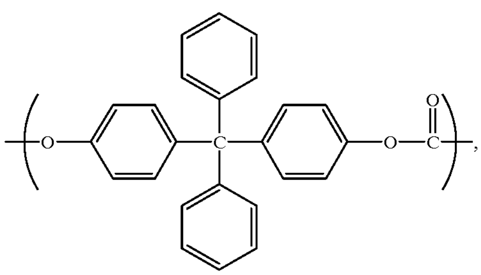
-continued
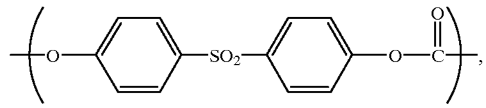
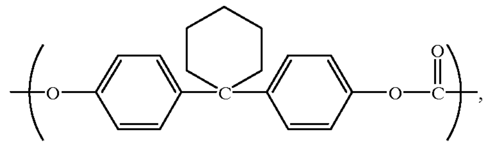
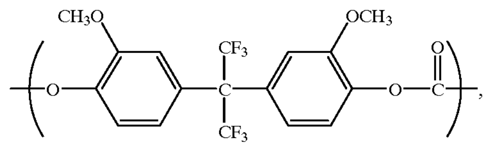
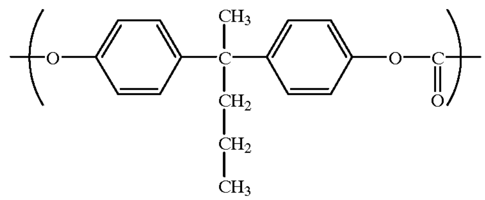
and
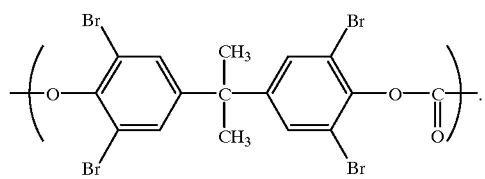
17. A polycarbonate molding which is produced by molding the polycarbonate of any one of claims 1–9.
* * * * *